(12) United States Patent
Paiz

(10) Patent No.: US 8,239,229 B1
(45) Date of Patent: Aug. 7, 2012

(54) PARALLEL COMPUTER NETWORK AND METHOD FOR REAL TIME FINANCIAL RESOURCE MANAGEMENT, INVENTORY CONTROL, AND ONLINE PURCHASING

(76) Inventor: Richard Paiz, Suwanee, GA (US)

( * ) Notice: Subject to any disclaimer, the term of this patent is extended or adjusted under 35 U.S.C. 154(b) by 287 days.

(21) Appl. No.: 12/778,228

(22) Filed: May 12, 2010

Related U.S. Application Data

(63) Continuation-in-part of application No. 12/146,420, filed on Jun. 25, 2008, now Pat. No. 7,908,263, and a continuation-in-part of application No. 11/584,941, filed on Oct. 23, 2006, now Pat. No. 7,809,659, and a continuation-in-part of application No. 10/852,394, filed on May 24, 2004, now abandoned, and a continuation-in-part of application No. 10/926,267, filed on Aug. 25, 2004, now abandoned, and a continuation-in-part of application No. 09/514,940, filed on Feb. 28, 2000, now Pat. No. 7,058,601, and a continuation-in-part of application No. 11/223,226, filed on Sep. 9, 2005, now abandoned, and a continuation-in-part of application No. 10/135,493, filed on Apr. 30, 2002, now abandoned, and a continuation-in-part of application No. 11/584,271, filed on Oct. 20, 2006, now abandoned, and a continuation-in-part of application No. 10/926,446, filed on Aug. 25, 2004, now Pat. No. 7,050,813, and a continuation-in-part of application No. 10/603,963, filed on Jun. 25, 2003, now Pat. No. 6,842,511, and a continuation-in-part of application No. 09/544,238, filed on Apr. 7, 2000, now Pat. No. 6,614,893, and a continuation-in-part of application No. 11/085,678, filed on Mar. 21, 2005, now abandoned, and a continuation-in-part of application No. 09/819,174, filed on Mar. 27, 2001, now abandoned, and a continuation-in-part of application No. 12/764,934, filed on Apr. 21, 2010.

(60) Provisional application No. 60/193,160, filed on Mar. 28, 2000, provisional application No. 60/289,033, filed on May 4, 2001, provisional application No. 60/184,537, filed on Feb. 24, 2000, provisional application No. 60/193,160, filed on Mar. 28, 2000.

(51) Int. Cl.
*G06Q 10/00* (2012.01)
(52) U.S. Cl. ................................ 705/7.11; 705/7.25
(58) Field of Classification Search ................ 705/7.11, 705/7.25
See application file for complete search history.

(56) References Cited

U.S. PATENT DOCUMENTS

| | | | | |
|---|---|---|---|---|
| 7,006,988 | B2 * | 2/2006 | Lin et al. | 705/26.81 |
| 7,059,515 | B2 * | 6/2006 | White | 235/376 |
| 2010/0017267 | A1 * | 1/2010 | Negron | 705/10 |
| 2011/0145088 | A1 * | 6/2011 | Bonner et al. | 705/26.3 |

* cited by examiner

*Primary Examiner* — Eric T Wong
(74) *Attorney, Agent, or Firm* — Gold & Rizvi, P.A.; Glenn E. Gold; H. John Rizvi

(57) ABSTRACT

A method for simulating the entire superset of potential valid keyword regular expression requests constructed during an Internet browser search and converting the result sets into Environmental summary report to enable efficient and accurate searching without requiring Browser Engine supercomputer cluster searching capabilities.

20 Claims, 130 Drawing Sheets

| NAME | SCOPE | CONTROLS | TYPE |
|---|---|---|---|
| HQ7 | GLOBAL | TARIFFS | IDW |
| HQ6 | GLOBAL | FINANCIAL INSTITUTION | IDW |
| HQ5 | GLOBAL | SUPPLIERS | IDW |
| HQ4 | REGIONAL | WHOLESALERS | IDW |
| HQ3 | REGIONAL | RETAILERS | IDW |
| HQ2 | LOCAL | ORGANIZATION USERS | IC |
| HQ1 | LOCAL | GROUP OF USERS | IC |
| HQ0 | LOCAL | SINGLE USERS | IC |
| CRUSADER | USER | ONLINE PURCHASING | SOFTWARE |

FIG. 8

If no synergy exist and lateral integration among the components does not apply then 5,000 excess records are sent to the HQ3. The HBS move and shift resources for maximum efficiency, thus a 5,000 buffer exist which is used to remove the 5,000 excess.

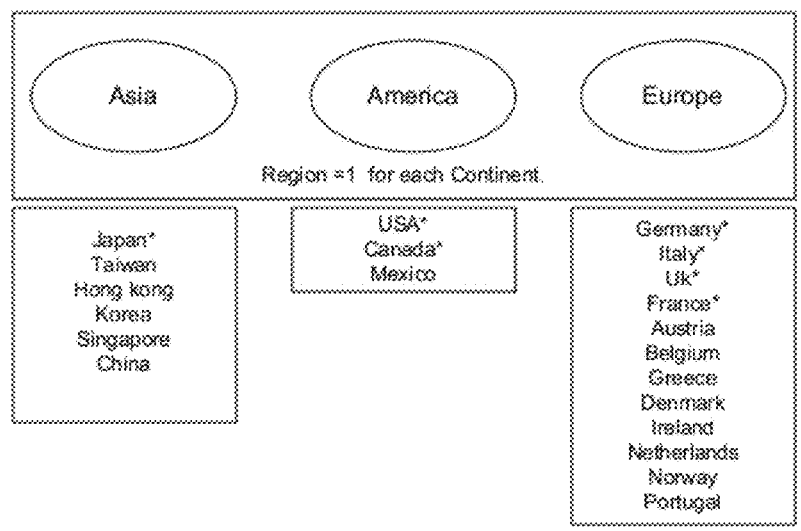
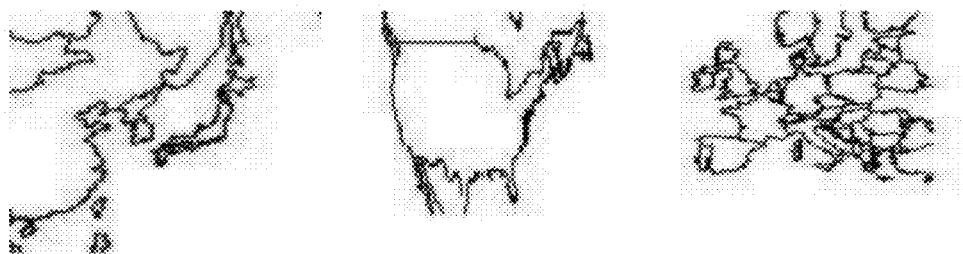
FIG. 30

Consolidates the three shipments from different originating points plus additional U.S custom fees.

X_FOB Multiplier Table

| Day_Delay | XFOB Multiplier |
|---|---|
| 0 | 1.0000 |
| 1 | 1.0234 |
| 2 | 1.0473 |
| 4 | 1.0718 |
| 5 | 1.0969 |
| 6 | 1.1225 |
| 8 | 1.1487 |
| 10 | 1.1756 |
| 12 | 1.2031 |
| 14 | 1.2312 |
| 16 | 1.2600 |
| 18 | 1.2895 |
| 20 | 1.3196 |
| 22 | 1.3505 |
| 24 | 1.3820 |
| 26 | 1.4143 |
| 28 | 1.4474 |
| 31 | 1.4812 |
| 34 | 1.5159 |
| 37 | 1.5513 |
| 40 | 1.5876 |
| 42 | 1.6247 |
| 44 | 1.6627 |
| 46 | 1.7016 |
| 48 | 1.7414 |
| 55 | 1.7821 |
| 62 | 1.8237 |
| 69 | 1.8664 |
| 76 | 1.9100 |
| 83 | 1.9547 |
| 90 | 2.0004 |

FIG. 51

Y_CDIF Multiplier Table

| Delay | YCDIF_Mult |
|---|---|
| 0 | 1.0000 |
| 1 | 1.0040 |
| 2 | 1.0097 |
| 3 | 1.0178 |
| 4 | 1.0292 |
| 5 | 1.0453 |
| 6 | 1.0682 |
| 8 | 1.0829 |
| 10 | 1.1004 |
| 12 | 1.1213 |
| 14 | 1.1461 |
| 16 | 1.1755 |
| 18 | 1.2106 |
| 20 | 1.2523 |
| 24 | 1.3019 |
| 28 | 1.3301 |
| 32 | 1.3609 |
| 36 | 1.3944 |
| 40 | 1.4310 |
| 44 | 1.4709 |
| 48 | 1.5144 |
| 56 | 1.5619 |
| 64 | 1.6136 |
| 72 | 1.6412 |
| 80 | 1.6700 |
| 88 | 1.7001 |
| 96 | 1.7315 |
| 108 | 1.7644 |
| 120 | 1.7986 |
| 132 | 1.8163 |
| 144 | 1.8345 |
| 156 | 1.8895 |
| 168 | 1.9462 |
| 180 | 2.0046 |

FIG. 52

X_FOB Shipping Methods

| | Delay | Description | UC Value | UC_Days |
|---|---|---|---|---|
| 1 | 0d | Inventory In Hand | 0 | 0.00 |
| 2 | 0d* | Black Label | 1 | 0.50 |
| 3 | 1d | Domestic Red Label | 2 | 1.00 |
| 4 | 1d* | International Red Label | 3 | 1.50 |
| 5 | 2d | Domestic Blue Label | 4 | 2.00 |
| 6 | 2d* | International Blue Label | 5 | 2.50 |
| 7 | 3d | Domestic Green Label | 6 | 3.00 |
| 8 | 3d* | International Green Label | 7 | 3.50 |
| 9 | 4-5d | Domestic White Label | 8 | 4.40 |
| 10 | 4-5d* | International White Label | 9 | 5.10 |
| 11 | 1w | Ocean Express | 10 | 7.00 |
| 12 | 1-2w | Regular Ocean | 11 | 11.00 |
| 13 | 2w | Ocean Express | 12 | 14.00 |
| 14 | 2-4w | Regular Ocean | 13 | 19.60 |
| 15 | 3w | Regular Ocean | 14 | 21.00 |
| 16 | 4w | Regular Ocean | 15 | 28.00 |
| 17 | 4w-6w | Regular Ocean | 16 | 31.20 |
| 18 | 1m | Build + Regular Ocean | 17 | 30.00 |
| 19 | 5w | Build + Regular Ocean | 18 | 35.00 |
| 20 | 6w | Build + Regular Ocean | 19 | 42.00 |
| 21 | 7w | Build + Regular Ocean | 20 | 49.00 |
| 21 | 2m | Build + Regular Ocean | 21 | 60.00 |
| 22 | 2-3m | Build + Regular Ocean | 22 | 72.00 |
| 23 | 3m | Build + Regular Ocean | 23 | 90.00 |

FIG. 53

Y_CDIF Shipping Method

| | Delay | Description | UC Value | UC_Days |
|---|---|---|---|---|
| 1 | 0d | CDIF | 0 | 1.00 |
| 2 | 0d* | CDIF Black Label | 1 | 1.50 |
| 3 | 1d | CDIF Dom Red Label | 2 | 2.00 |
| 4 | 1d* | CDIF Inter Red Label | 3 | 2.51 |
| 5 | 2d | Domestic Blue Label | 4 | 3.00 |
| 6 | 2d* | International Blue Label | 5 | 4.18 |
| 7 | 3d | Domestic Green Label | 6 | 4.05 |
| 8 | 3d* | International Green Label | 7 | 5.85 |
| 9 | 4-5d | Domestic White Label | 8 | 5.94 |
| 10 | 4-5d* | International White Label | 9 | 8.52 |
| 11 | 1w | Ocean Express | 10 | 8.75 |
| 12 | 1-2w | Regular Ocean | 11 | 13.75 |
| 13 | 2w | Ocean Express | 12 | 17.50 |
| 14 | 2-4w | Regular Ocean | 13 | 22.54 |
| 15 | 3w | Regular Ocean | 14 | 24.15 |
| 16 | 4w | Regular Ocean | 15 | 32.20 |
| 17 | 4w-6w | Regular Ocean | 16 | 35.88 |
| 18 | 1m | Build + Regular Ocean | 17 | 34.50 |
| 19 | 5w | Build + Regular Ocean | 18 | 38.89 |
| 20 | 6w | Build + Regular Ocean | 19 | 46.67 |
| 21 | 7w | Build + Regular Ocean | 20 | 54.44 |
| 21 | 2m | Build + Regular Ocean | 21 | 66.67 |
| 22 | 2-3m | Build + Regular Ocean | 22 | 80.00 |
| 23 | 3m | Build + Regular Ocean | 23 | 100.00 |

FIG. 54

| UC Value | Delay Multiplier |
|---|---|
| 10 | 1.0000 |
| 9 | 1.0500 |
| 8 | 1.1025 |
| 7 | 1.1576 |
| 6 | 1.2155 |
| 5 | 1.2763 |
| 4 | 1.3401 |
| 3 | 1.4071 |
| 2 | 1.4775 |
| 1 | 1.5513 |
| 0 | 1.6289 |
| -1 | 1.7103 |
| -2 | 1.7959 |
| -3 | 1.8856 |
| -4 | 1.9799 |

FIG. 55

* Request must be satisfied within 36 Hrs.

* All merchandise is assumed to be available.
* All delays are multiplied by 1.15 since they are gold label.
* UCommerce selects Miami - Sao Paolo

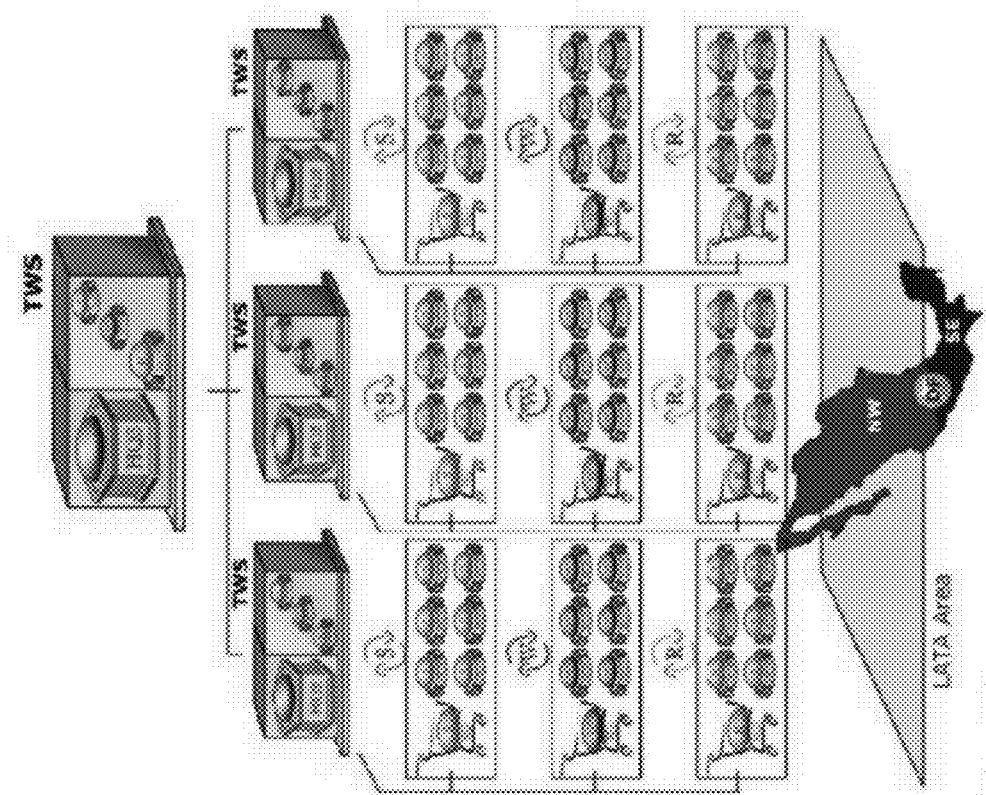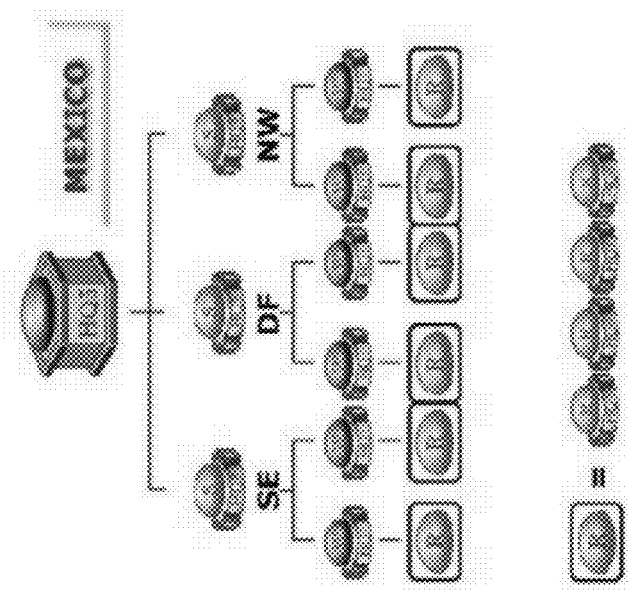
FIG. 98

PARALLEL COMPUTER NETWORK AND METHOD FOR REAL TIME FINANCIAL RESOURCE MANAGEMENT, INVENTORY CONTROL, AND ONLINE PURCHASING

CROSS REFERENCE TO RELATED APPLICATIONS

This Divisional Utility application claims the benefit of:
a. co-pending U.S. Non-Provisional patent application Ser. No. 12/764,934, filed on Apr. 21, 2010, which claims priority to co-pending U.S. Non-Provisional patent application Ser. No. 11/584,941, filed on Oct. 23, 2006, which claims priority to U.S. Non-Provisional patent application Ser. No. 10/852,394 (abandoned), filed on May 24, 2004, which claims priority to U.S. Provisional Application Ser. No. 60/184,537 filed on Feb. 24, 2000;
b. co-pending U.S. Non-Provisional patent application Ser. No. 12/146,420, filed on Jun. 25, 2008;
c. co-pending U.S. Non-Provisional patent application Ser. No. 10/926,267, filed on Aug. 25, 2004, which claims priority to U.S. Non-Provisional patent application Ser. No. 09/514,940 (now issued as U.S. Pat. No. 7,058,601) filed on Feb. 28, 2000, which also claims priority to U.S. Provisional Application Ser. No. 60/193,160 filed on Mar. 28, 2000;
d. co-pending U.S. Non-Provisional patent application Ser. No. 11/223,226, filed on Sep. 9, 2005, which claims priority to U.S. Non-Provisional patent application Ser. No. 10/135,493 (abandoned), filed on Apr. 30, 2002, which claims priority to U.S. Provisional Application Ser. No. 60/289,033 filed on May 4, 2001;
e. co-pending U.S. Non-Provisional patent application Ser. No. 11/584,271 filed on Oct. 20, 2006, which claims priority to U.S. Non-Provisional patent application Ser. No. 10/926,446 (now issued as U.S. Pat. No. 7,050,813), filed on Aug. 25, 2004, which claims priority to U.S. Non-Provisional patent application Ser. No. 10/603,963 (now issued as U.S. Pat. No. 6,842,511), filed on Jun. 25, 2003, which claims priority to U.S. Non-Provisional patent application Ser. No. 09/544,238 (now issued as U.S. Pat. No. 6,614,893), filed on Apr. 7, 2000, which claims priority to U.S. Provisional Application Ser. No. 60/184,537 filed on Feb. 24, 2000; and
f. co-pending U.S. Non-Provisional patent application Ser. No. 11/085,678 filed on Mar. 21, 2005, which claims priority to U.S. Non-Provisional patent application Ser. No. 09/819,174 (abandoned), filed on Mar. 27, 2001, which claims priority to U.S. Provisional Application Ser. No. 60/193,160 filed on Mar. 28, 2000;
all of which are incorporated herein in their entirety.

FIELD OF THE INVENTION

The present invention relates generally to the field of financial resource management, inventory control, and online purchasing transactions between customers, retailers, suppliers, and wholesalers. More particularly, the present invention relates to a computerized system and method for paralleling and simulating an existing network of retailer, supplier, and wholesaler organizations wherein the system has the capability of instantaneously generating, plotting and updating an optimal price and shipping cost trajectory between two geographic locations to enable an end user to locate the lowest FOB, C&F, and CDF shipping costs for goods and services.

The system manages production rates for suppliers, by purchasing at optimal cost order quantities and shipping at maximized discount rates. By coordinating the resources of multiple customers through common suppliers and financial institutions, the system takes advantage of economies of scale to reduce transactional service charges and obtain the best supplier price for the consumer.

The system is comprised of computers configured, linked and otherwise arranged to form a distributed Simulation Network of computers, subdivided into multiple hierarchical neural-like subcomponents having neural elements residing at remote sites hereinafter referred as computer network system as used in the U.S. Pat. No. 7,058,601 claim language.

BACKGROUND OF THE INVENTION

With the advent of the Internet and related technologies, electronic commerce and related online services has become one of the fast growing segments of the economy. Organizational data networks gather, validate, verify and exchange end user information in an effort to understand, for example, the kinds of products, services and qualities consumers value most, and how and why they make such determinations.

With regard to the electronic trade (or e-Trade) industry, there have long been individual computers loaded with programs for performing online purchasing, inventory control and accounting functions to manage resources. Such systems rely upon the processing power and data within the single stand-alone computer. A problem with these single computer applications has been that more processing power and data access capability are needed, as well as reduced bandwidth usage coupled with web and virtual world access.

Another related problem is that each transaction must be paid in full before goods and services are shipped, which particularly complicates matters for consumers who must obtain funds through financial institutions. Solutions to these problems are presented in the published doctoral dissertation of the present inventor, entitled *Designing Hot billing Systems for Large Volume and or Complex Network*, hereinafter referred as the doctorial dissertation, submitted for the degree of Doctor of Philosophy in Management at California Coast University in November of 1999, the entire contents of which are incorporated herein by reference.

The present invention also relates generally to the field of Telecommunications, using parallel cluster computers to create a very fast and inexpensive computer network system that allows the integration of the Internet as a large and complex Telco Network. The application is meant to further clarify and elucidate the reader with the intellectual property contained in U.S. Pat. Nos. 6,614,893, 6,842,511, 7,050,813 and 7,058,601 by expanding from simple ILEC to national carriers, global IP Telephony and Wireless Telecommunications Real Time billing of which are incorporated herein by reference.

The concept of vector CDR is further expanded to include roaming surcharges and multi-organization calls. The invention solves intrinsic drawbacks of clusters by dividing them into a grid of nodes that are able to move large amounts of data, and can perform decisions on their own absent of the centralized Symmetric Multiprocessor (SMP) of which are incorporated herein by reference.

The computer network system and each of its Intelligent Components analyze, gather and distill the messages of the environment and then prime, rate and match/merge the plurality of CDR into a correlated billing entity that, in turn, is stored. The technology has evolved into a mission critical system that is designed to simulate and plot circuit by circuit all of message of the Simulation Network.

Finally, the technology uses fuzzy math to measure the quality, performance and strength of the traffic traveling through the environment, so that human intelligence can perform strategic planning, and using Business Intelligence programs better understand the needs of the end users.

By incorporating a computer network system into a UCommerce, the supplier system will be able to identify inefficiencies, match/merge multiple quotes to take benefit of economies of scale, perform savings optimizing the traffic patterns of the movement of merchandise from Leg A (origin) to Leg B (destination) using X_FOB and Y_CDIF, and convert all of the suppliers, wholesalers, retailers, warehouses and links to possess geospatial, demographic and debit card functionalities to improve product, quality and service.

Accordingly, there is a well-established unmet need for financial resource management, online purchasing and inventory control systems overcoming the drawbacks and limitations of the prior art.

It is thus an object of the present invention to provide a computer network system operating in parallel and simulating a network of existing retailers, wholesalers and suppliers, wherein the system has the capability to produce, sell or transfer goods and/or services without taxing the capacity of the existing network.

It is another object of the present invention to provide such a computer network system configured to instantaneously generate, plot and update a lowest price and optimal shipping cost trajectory between two geographical locations for each user's request, immediately upon scanning the user's initial network message.

It is still another object of the present invention to provide such a computer network system which plots the optimal shipping trajectory, providing the lowest cost and delay time for a particular transaction. Where the purchase order contains pricing data that enables billing to commence, the moment of the financial resources are made available and continued in real time as the transaction progresses.

It is yet another object of the present invention to provide such a computer network system that minimizes bandwidth usage by performing scheduled and synchronized "available inventory" calculations and updates throughout the network. The Simulation Network can accurately project future resource requirement trends in order to update end user's software to avoid system congestion. Preferably, a Summit Tier is provided to update all of the components by sending only summarized information packets to their organizational subordinates.

It is still another object of the present invention to provide such a computer network system that enables customers and multiple suppliers to collectively partially satisfy an entire purchase order.

It is still a further object of the present invention to provide such a network system that maximizes network-processing power by shunting calls from computers momentarily operating at or near capacity, and thus having smaller buffers to less-taxed computers having larger buffers. Preferably, this process of sharing available resources between members of the systems mimics lateral and vertical synergy.

It is still another object of the present invention to provide such a system that enables customers and multiple suppliers to collectively and partially satisfy an entire purchase order.

It is still another object of the present invention to partition the main cluster or superset into sets, subsets and elements, which are placed in a distributed manner for better efficiency and effectiveness of handle tasks.

It is still another object of the present invention to add geospatial components to X_FOB and Y_CDIF methods and multi transport dimensioning to permit sophisticated logistic planning of resources from origin to destination.

It is still another object of the present invention to create a method that identifies the best P/U at the local, regional and global scope, commercially known as Z_PRICE, pronounced as 'The Price'. And using Z_Price to match/merge a plurality of quotes into a macro quote with several transport and time sensitive dimensions.

It is still another object of the present invention to give vector characteristics to the geospatial information into traffic patterns that permit the optimal distribution of goods and services.

It is still another object of the present invention to transform the Summit Tier into a global domain Superset cluster, the Middleware tier into a regional domain set cluster and the Lower Tier into a local domain subset cluster.

It is still another object of the present invention to transform local warehousing means that can accommodate retailers, wholesalers and suppliers organizations, UCommerce, Free Trade Zone and customs warehouses.

It is still another object of the present invention to optimize transport dimensions using X_FOB and Y_CDIF to comply with Z_PRICE optimizations. And optimize the search engines dimensions using W_RANK environmental bitmap data or summary report data.

It is still another object of the present invention to convert all of the physical and electronic information into optimal relational inventory data structures and assigned physical inventory with geospatial characteristics.

It is still another object of the present invention to apply the process of cleaning and standardizing the environmental spaghetti, and enabling a lingua franca interface to distribution and storages means of goods and services converting all of the data into an Informational superset (U).

It is still another object of the present invention to transforming and organizing the spaghetti of global traffic and availability of merchandise that is delivered door to door. This is the process where the summit tier removes all of the anarchy, chaos, redundancy and saturation, and in turn, Information Entropy is achieved.

It is still another object of the present invention to create the Z_PRICE method that analyzes and evaluates the bottlenecks of the logistical queue of traffic in order to identify the lowest cost and time delays associated with the transportation of goods and services door to door by using optimal X_FOB and Y_CDIF prices from the local, regional and global scope points of view.

It is still another object of the present invention to create the W_RANK method that analyzes and evaluates the Internet's environmental spaghetti to associate, coordinate, control, optimize, synchronize and then match/merge a plurality of independent searches into higher informational quality results. The top valued W_RANK bitmaps are used as display means to end users.

Note: from related art that was incorporated by reference that uses the commercial name of the tiers, the summit tier is also known as the Managerial Pyramid Switch or MPS, the middleware tier is also known as the Synergy Interface Switch or SIS, and the Lower Tier is also known as Team Work Switch or TWS.

The supercomputer can have a plurality of switches per tier, and each tier is programmed with artificial intelligence to make proactive decisions and purchase merchandise, or update the its own database with the up to date latest information derived from the simulation environment that continuously replicates an echo of the environment. E.g. the simulation environment for the XCommerce is the Internet and it is updated by web crawlers as the find new relevant and significant information as per Z_Price optimal inventories.

SUMMARY OF THE INVENTION

The present invention overcomes the aforementioned limitations of the prior art, and accomplishes the above-stated objectives as well as others as may be determined by a fair reading and interpretation of the entire specification.

UCommerce (Ser. No. 10/852,394)

Computer Network System: The computer network system consists of a plurality of nodes, where each one is programmed with Artificial Intelligence to perform predefined ad hoc tasks that are logistical rationalized based on the current conditions of the environment. The computer network system is synonymous with the Superset (U). The cluster is divided into three geospatial tiers: a) Global, b) Regional, and c) Local. Each tier has the following functions:

a) Provisioning.
b) Total Quality Management or (TQM).
c) Data Manipulation.
d) Management Information Systems (or MIS).
e) Expert Information Systems (or EIS).
f) Inventory Control.

Computer Network System Nodes: All nodes work collectively and independently from each other, and still simultaneously and in parallel analyze, evaluate, gather and process information from the environment in real time. From incipiency upon receiving the fuzzy logic piece of information that triggers a new task or update pending activities. Each node is assigned to a Superset (I), Set (I, J), or Subset (I, J, K) cluster tier, and is assigned to geospatial domains (X) or global, (Y) or regional, and (Z) local to create sub clusters Elements(I, J, K, X, Y, Z) that help to build the managerial hierarchy as follows:

Managerial Hierarchy: The Summit Tier coordinates Business Intelligence and Invoicing databases via the Internet that allows users to have access to their information in real time. The Middleware Tier manages UCommerce warehouses based on geographical area. The Lower Tier controls a plurality of points of presence belonging to $3^{rd}$ party suppliers, wholesalers and retailers, and collectively constitutes the workhorse of the system.

Node Synchronization and Buffer Resources: Every predefined cycle each node synchronizes the latest inventory and optimizes via artificial intelligence programming its organizational management logistics. Nodes can request to members of the same group any excess buffer resources to complete a task using vertical and lateral synergy. Parent nodes can use their chain of command to coordinate the resources of their subordinates to complete a task. Members of different regional clusters can synergistically collaborate to process tasks. Each node is able to replace and perform the organizational task of at least one node, so that collectively the computer network system engulfs a global supplier.

Eliminates the 'Spaghetti Phenomena': The computer network system has specialized interaction means with the environment to gather, distill, analyze and then standardize and convert the raw information into primed lingua franca data, which in turn is quantified, qualified, organized and transformed, so that Information Entropy is achieved and thus removes the chaos and anarchy or >Spaghetti Phenomena=.

Primes Vector CDR: Lingua franca messages are primed by the computer network system as single version of the truth Vector CDR. And contain the vector trajectory and all pertinent transactional segments information. Prior art send all the transactional segments to a centralized billing data warehouse that match/merges all the transactional components and then correlates the information into a single version of the truth billing entity. Whereas the computer network system uses artificial intelligence programming to assign a hierarchical owner and then plots circuit by circuit the vector trajectory. And then activates all relevant nodes to the transaction so that nodes can communicate amongst themselves via forward and reward chaining. And send all the dynamic and fixed cost to hierarchical owner so it can match/merge and then correlate a single version of the truth billing entity absent of a centralized billing data warehouse.

Interact with the Human Resources: The human resources of the organization proactively can use business intelligence software to send parameters to the computer network system. This enables individuals to directly control their own network, and then send command instructions with the latest conditions of the environment so the computer network system can optimally analyze, coordinate, prioritize and synchronize throughput.

Computer Network System has three Tiers of Nodes: Middleware and Summit tier nodes perform data warehouse functions, and are programmed to monitor and control their chains of command. They act as virtual simulation of the organization. Lower tier nodes are designed to remove redundancy, geographically distribute activities, and then correlate and update information.

Avoids Taxing the Throughput: The computer network system monitors the limited resources and capacities of the network to avoid taxing available throughput in real time. Each node can create, plot and update purchase orders as soon as new relevant messages from the environment are detected.

Uses Synergy to Maximize Throughput: Upon receiving environment command instructions each node can manage and organize the flow of information of their subordinates from predefined point A to point B routes to avoid clogs and saturation. Each node via synergy attempts to maximize throughput, and assign, prioritize and shares with other nodes that have substantial buffer resources, since unused resources are considered waste, which is one the confounding variable that is directly related in creating the >Spaghetti Phenomena=.

Analyzes Network Traffic: Network traffic is analyzed by tier as the informational traffic is measured based on the latest command instructions and known routing throughput limitations of each given domain. The summit nodes of each tier performs the non obvious task of removing complexity in order to be a real time system by eliminating data redundancy, filtering, quantifying, qualifying data as good or garbage, and minimizing waste before beginning to transmit the data through the managerial hierarchy system.

Computer Network System Reaches Informational Entropy: Nodes are programmed to remove the >Spaghetti Phenomena= at the point of attack that is one transaction at a time, so that the computer network system can reach Informational Entropy at the organizational level which is a necessary condition to be considered a real time invention.

Computer Network System Stabilize the Flow of Information: Summit and Middleware nodes stabilize the flow of information concerning financial conditions, inventories, shipping costs and tariffs required for billing, and update the XLDB database with trending statistics that in turn are used to optimize resources and available bandwidth. Each node is programmed to be autonomous, and through means of the managerial hierarchical synergy, can work in parallel with others nodes to work as a single unit. Each node processes network information and then simulate, plot, map, tract and vector each message to create a virtual instance of the organizational environment.

Computer Network System is a Real Time System: Once the >Spaghetti Phenomena= is eliminated, Informational Entropy is achieved and thus a state of balance, harmony and proportion exists. The computer network system distributed configuration removes the need for a central mainframe. Consequently, a real time solution consists of synergistically synchronizing all the computer network system functions.

Computer Network System Evaluates Network Resources: Each node has its own location identification means and must be assigned to one geospatial specific domain cluster such as local, regional or global. Every single activity and purchase order is processed in parallel, starting from the point of origin and ending at the point of destination. The computer network system then rearward chains the routing vector information through the simulation network to the point of origin. The computer network system analyzes and evaluates the best usage of network resources as follows:

a) Administer, coordinate, control, manage, synchronize and transform the network.

b) Use Business Intelligence to predict when a customer becomes dissatisfied.

c) Manages the flow of money in real time.

d) Send summarized information packets to their organizational subordinates.

e) Assign cost to each activity and limiting each resource.

f) Uses synergy to load balances the demand on the organization=s resources.

g) Work always at maximal assigned throughput.

h) Redundant with reserve to compensate for network faults.

i) Work in parallel with the simulated Legacy System.

j) Parent nodes create command messages with resource allocation instructions.

k) Create partial vectors measure one independent environment.

l) Match/merge all partial vectors to create the final billing entity or purchase order.

XCommerce (Ser. No. 11/584,941)

XCommerce, Server Side Supercomputer: XCommerce is a method based on UCommerce that simulates the entire superset of potential valid keyword regular expression requests construed during an Internet browser search and converting the results set into a vector based statistical data that enable efficient and accurate searching without requiring existing Browser based search engine supercomputer capabilities. XCommerce is the server side supercomputer that simulates, standardizes and transforms the Internet into a plurality of concurrently working environment using a Managerial hierarchical method of indexing and searching web pages the following:

1) Managerial Hierarchical Relationship Indexing: a request is broken down into keywords and clusters, and then converted into a search pattern that optimally minimizes the quantity of valid and visible web pages with regards to a particular search.

2) Determining what is Relevant and Irrelevant: Keyword and Cluster: serve as the basis of each Managerial Hierarchical Relationship Index to analyze and distill what is relevant and irrelevant. Irrelevant web pages are discarded completely from analysis.

3) Partition the Environment into Blocks: the environment is subdivided into a plurality of blocks that are arranged based on a three Managerial Hierarchical levels as follows:

a) The primary relationship index is the Superset or (I) comprising the visible domain for a search pattern.

b) The second relationship index the Set or (J) is subordinate to the primary relationship index includes all relevant web pages for a search pattern.

c) The third relationship index the Subset or (K) is subordinate to the secondary relationship index includes the most likely web page for a search pattern.

d) The Internet environment is distilled by applying the three Managerial Hierarchical levels, and the visible web pages comprise the block environment.

4) Identifies Static Search Patterns: the computer network system determines if the search pattern already exist and if yes obtains the top (n) web pages from the databases.

5) Calculates Dynamic Search Patterns:

a) Distills the Internet using relationship indices to create optimal size block.

b) Uses remaining keywords and clusters to determine if they match against the content of the top (n) web page. When a match occur each web page value is dynamically adjusted by each keyword or cluster relative vector value.

c) Picks the top (n) web pages from the block environment

6) Finds New Search Patterns: XCommerce stores new search pattern and its associate top (n) web pages into the database.

7) Displays Top (n) Web Pages: Send and display the top (n) web pages to the end user's terminal.

BRIEF DESCRIPTION OF THE FIGURES

Reference is now made to the drawings, wherein like characteristics and features of the present invention shown in the various figures are designated by the same reference numerals.

FIG. 8 Scope of the Intelligent Components;
FIG. 30 Supra Region (Overview)

FIG. 51 X_FOB Multiplier Table;
FIG. 52 Y_CDIF Multiplier Table;
FIG. 53 X_FOB Shipping Methods;
FIG. 54 Y_CDIF Shipping Methods;
FIG. 55 UC value delay multipliers;
FIG. 98 UCommerce transformation (TWS or Lower Tier)

DETAILED DESCRIPTION OF THE PREFERRED EMBODIMENTS RESPECTIVE TO UCOMMERCE

Ser. No. 10/852,394

Figure 1:
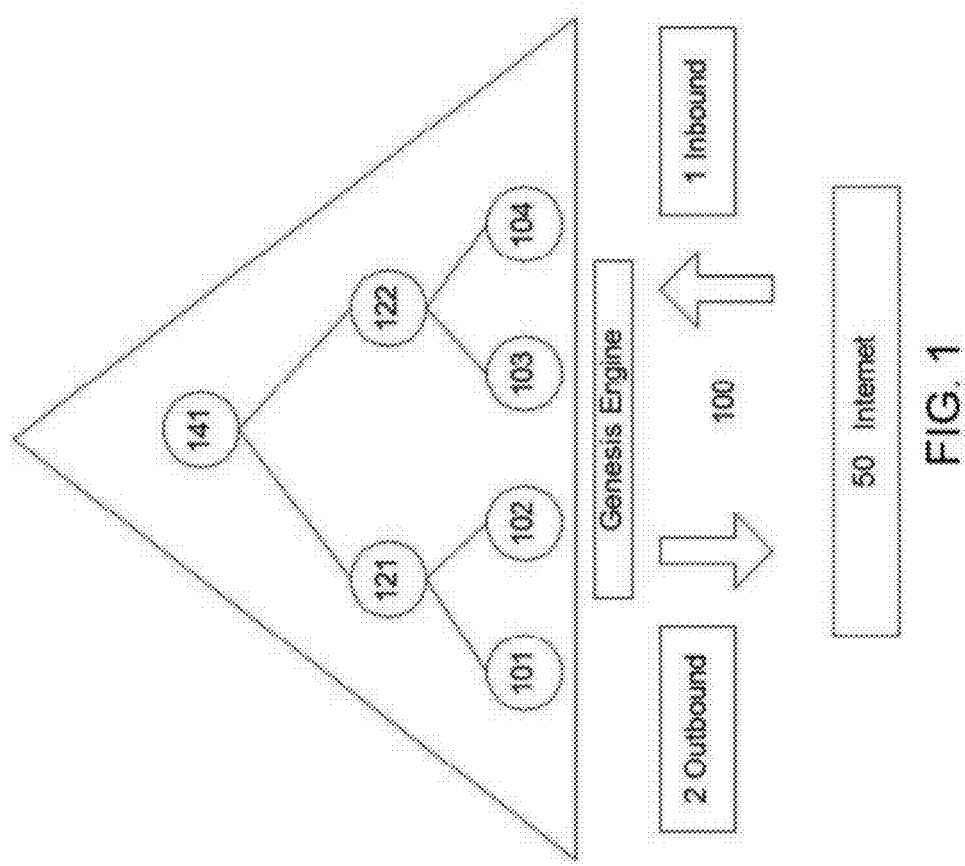
FIG. 1 Basic System Elements of the Supercomputer.

FIG. 1 shows how the multi-tiered components work together to build a supplier system (100). The system includes a summit tier (141) Intelligent Data Warehouse that functions as a parent to all the components. A middleware tier (121-122) manages and controls all the activities for financial institutions, retailers, suppliers and wholesalers, and aids the parent summit tier component (141) with coordinating and managing all available resources. Each middleware tier manages multiple lower tier Intelligent Components (101-104).

Any nodes can perform synergy (lateral and vertical) to finish pending tasks with unused bandwidth, allowing components based on specified protocols to share the resources of lesser-taxed subordinates, group members or their parents. The supplier system interacts with the consumer (50) preferably via the Internet.

In essence the summit tier updates the latest inventory information relating to supply, whereas the nodes (101-104), match/merge multiple end user requests, taking advantage of economies of scale to purchase goods at the lowest prices. Alternatively, using end user criteria, each node accommodates particular needs and offers door-to-door service with domestic and international rush shipping options.

Figure 2:
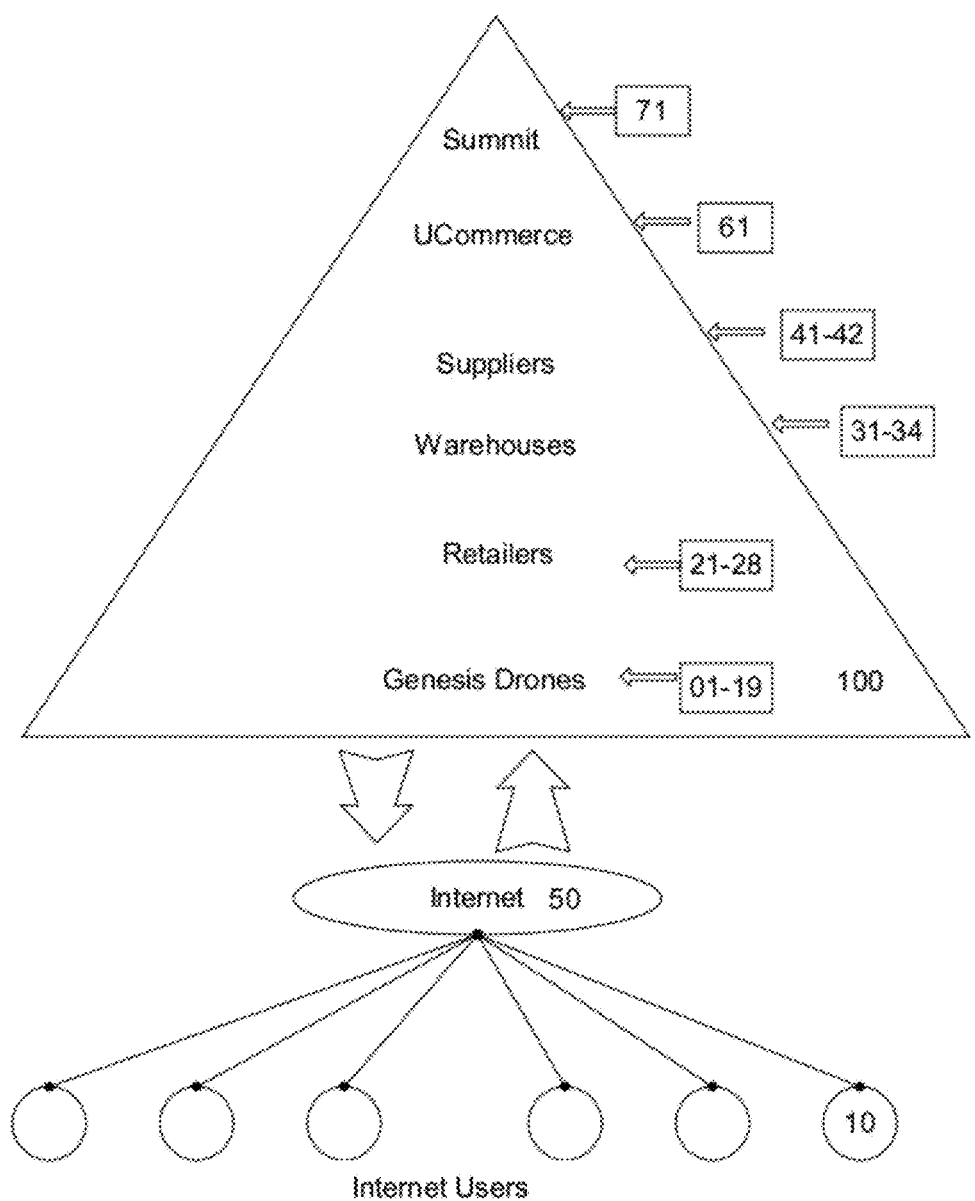
FIG. 2 Organizations interacts with the system.

FIG. 2 is a diagrammatical representation of an Intelligent Component, or the core element of the system. Each intelligent component (21) of the computer network system (100) monitors and controls resources such as Operation Support System (OSS) equipment (11), in the form of a gateway to the inventory of an organization and to human resources of a business entity such as the production manager. Each node (101) continuously monitors the environment (50) in the form of inbound messages (1) and outbound messages (2). Summit tier nodes (171) communicate with financial institutions, and update and consolidate requests.

Continentally-distributed geographic nodes (161) update the inventory of each warehouse as physical inventory is received; other nodes (141, 131-132, and 121-124) link directly to the provisioning of the organization they are monitoring. Specifically, some nodes (141) interact with suppliers, while other nodes (131-132) interact with wholesalers, and still other nodes (121-124) interact with retailers. When a supplier has a complex infrastructure that also includes wholesalers and retailers in their distribution chain, the supplier nodes (141) work in unison with wholesaler nodes (131-132), and retailer nodes (121-124) to more accurately reflect global, regional and local territorial restrictions. The supplier system can purchase merchandise based upon anticipated demands of its end users, and stock its U-Commerce warehouse (161) accordingly. This available stock is known as inventory-in-hand and is not subject to brand territorial restriction, since each continental or regional U-Commerce warehouse can barter with inventory between each other.

The U-Commerce warehouse (161) dramatically reduces end user delivery time, cost, and availability delays. The merchandise is only available when domestic and/or international rush shipping is requested. For standard C&F shipments, the end user request is consolidated by the (171) summit tier. The nodes (101) when analyzing and end user request uses several supplier nodes inventory availability, price, and time of delivery. The ultimate decision maker is the end user.

Figure 3:
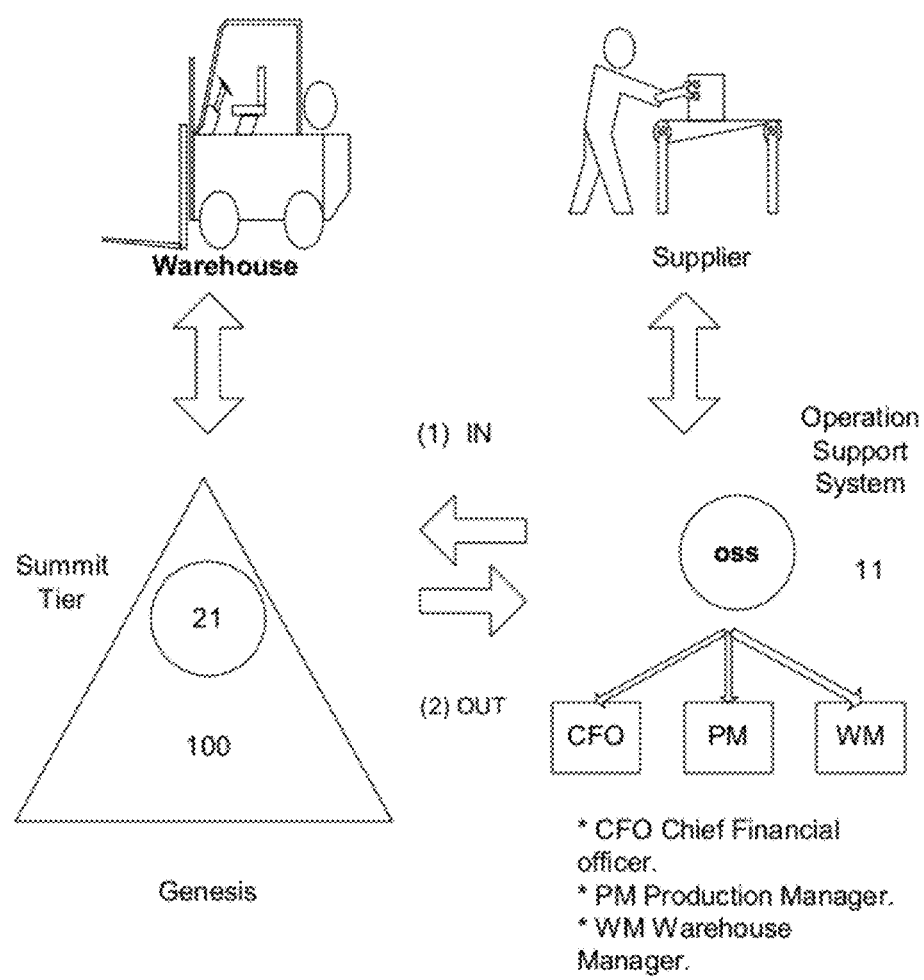
FIG. 3 System interaction with suppliers and warehouses.

FIG. 3 is diagram of the basic system elements of supplier system (100) that can interact with customers (10) via the Internet (20). The request messages are queued by the Information Manager (30), and then are converted into a lingua franca standard so that any node, if necessary, can respond by searching in the organization's data warehouse for information. The system can also interact with the human resources (40) of participating organizations such as financial institutions, retailers, suppliers and wholesalers, or directly scan the activities, resources, and transactions of the online purchasing network (50).

Collectively, each node (21) gathers information from the environment elements that they monitor, and work together to keep the supplier system data synchronized and up to date in real time. The summit tier (171), U-Commerce warehouse (161), supplier (141), wholesalers (131-132) and retailers (121-124) continuously scan and analyze the environment, and logically eliminate redundant data, then review end user needs and notify the computer network system nodes that in turn disseminate information to end users.

Figure 4:
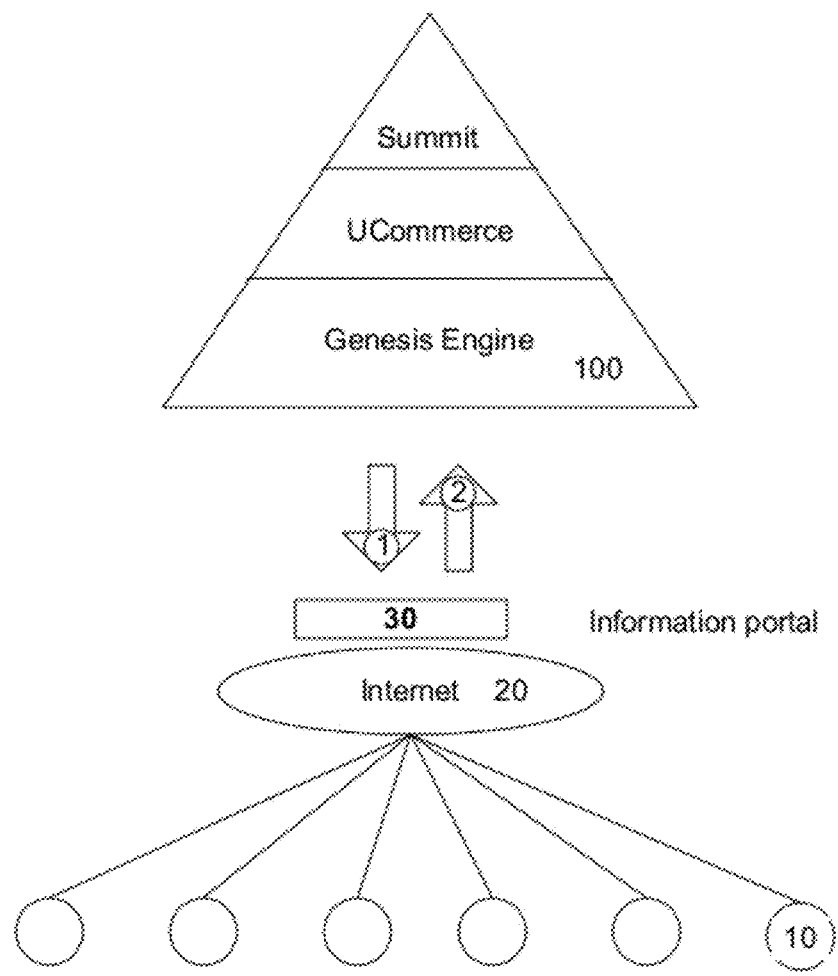
FIG. 4 Flow of the real time data.

FIG. 4 shows how the consumer can have immediate access to their data in real time from the Supercomputer or supplier system (100) via the Internet (20). Since an organization is more than just assets, buildings, and network equipment, it must have the ability to communicate with the outside environment and allow the customer (10) to have access to their own information. The Information Manager (30) receives requests and replies, and converts these messages into computer-readable mathematical variables, such that the system can determine and find the required information and respond in the form of a system response or written report.

Figure 5:
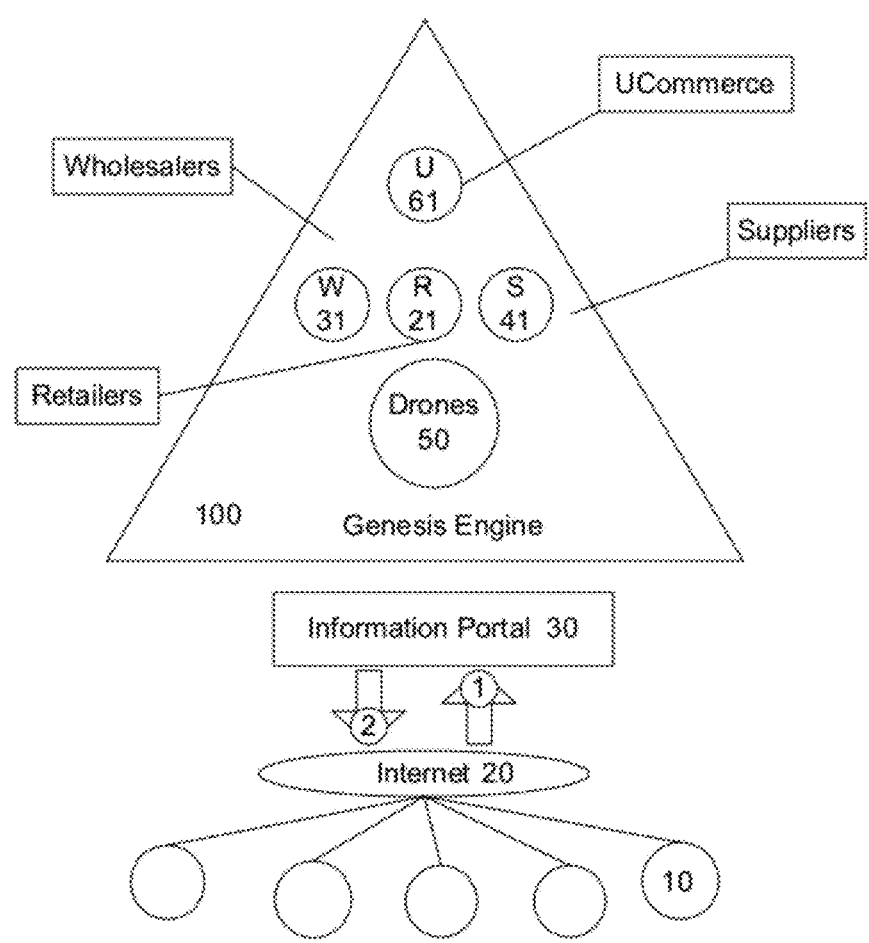
FIG. 5 Proactive interaction of the e-Trade Network.

FIG. 5 shows the continuous proactive scanning of the system (100) of the e-Trade network nodes (50). Each node mimics the activity of each inbound (1) and outbound (2) protocol message, and then analyzes the information to better understand what is going on the environment to make a decision. Subordinate elements update their respective parents until the Summit Tier nodes are reached, so that organizational domain elements respond to all the nodes with the same message based on the entire network conditions. To increase bandwidth, the system resources can be subdivided into geographic regions and district domain elements can further adjust the message as it reaches individual subordinates. Each node has the opportunity to compete and bid for each end user purchase on its own, since it has current organizational domain in real time. U-Commerce nodes (61) communicate with supplier system inventory warehouses (41), supplier organizations (31), and wholesalers, distributors and retailers (collectively 21).

Figure 6:
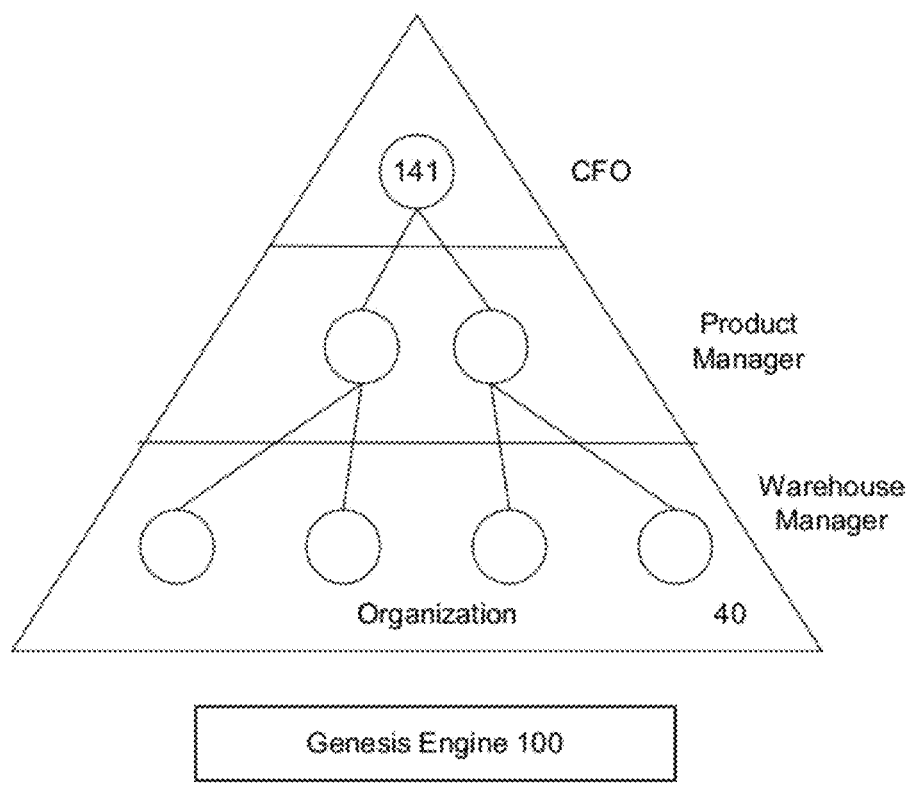
FIG. 6 Interaction with Human Resources.

FIG. 6 shows the continuous proactive interaction of the Supercomputer system (100) with the organizations (40) management and labor. Nodes serve the organization human resources by aiding individuals with decision-making in real time. Since human beings are better adapted to understand and survive the conditions of the environment, they can supply the system with vital information, conditions and parameters so that decisions reflect their experiences. Where the CFO (141) of an organization might interact with the summit tier of the organization to determine overall sales, the product manager can use the middleware tiers of the system to update prices and inventory, and the warehouse manager can interact with the Lower Tiers to notify or update a sales order, purchase order and/or quote.

Figure 7:
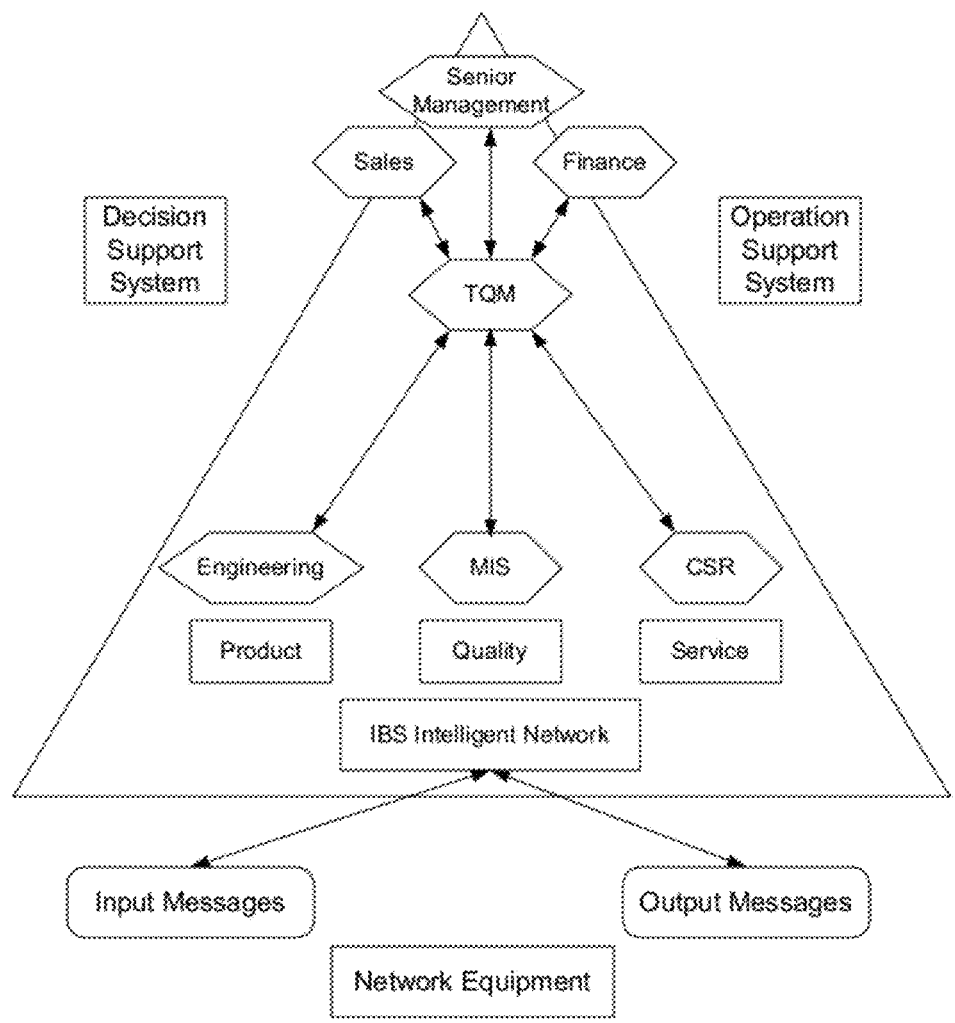
FIG. 7 Total Quality Management in the Network.

FIG. 7 shows the relation that Total Quality Management (TQM) has with regard to the organization. The supplier system origin was derived from TQM and not an engineering model. Engineering is concerned with making platform networks equipment effective and efficient, while TQM is concerned with identifying what the customer values, and improving organizational quality, products and services.

FIG. 8 shows the different scope levels of Intelligent Components and Intelligent Data Warehouses. Nodes belong to the lowest tier that connects directly with the end user software; and consist of HQ2, HQ1 and HQ0, which control a plurality of platform equipment. The next tier consists of HQ4 and HQ3, which control regional and district domain interaction with retailers, suppliers and wholesalers' platform equipments. The summit tier consists of HQ6, which controls outside world domains, and HQ5 which controls e-Trade organizational domain. The next tier consists of HQ7 that controls the Internet domain, and the interactive software controls and monitors the activities of a single end user. These Intelligent Data Warehouses that controls the Internet are responsible for managing the flow of the information from the outside world with the organization, and converting all requests and replies into a lingua franca.

Figure 9:
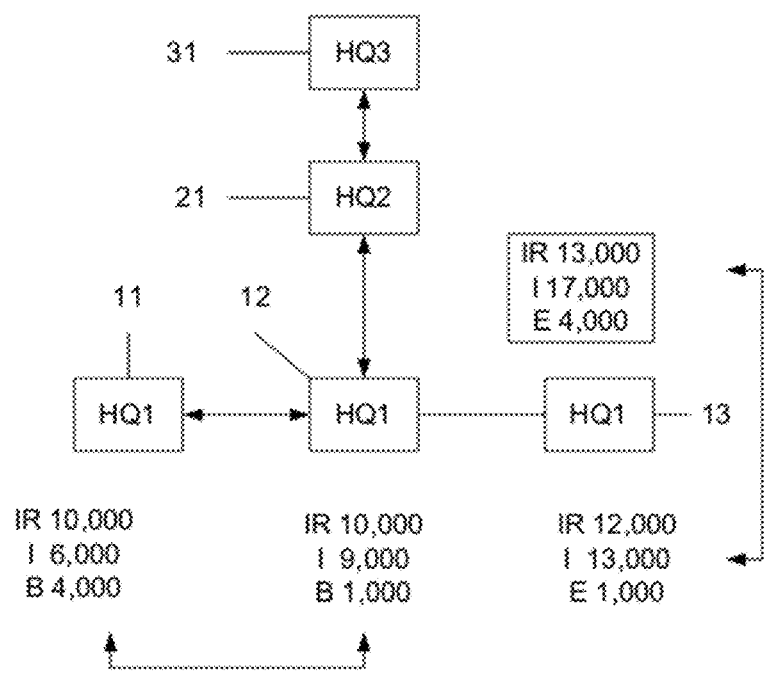
FIG. 9 Management Synergy.

FIG. 9 is an example of Intelligent Component's management synergy. If no synergy exists and lateral integration among the components does not apply, then 5,000 excess records are sent to the HQ3 (31). Since HQ2 (21) can manage and control the resources of itself and its subordinates (11, 12, and 13), it can move and shift resources for maximum efficiency. Thus, a 5,000 buffer exists which is used to remove the 5,000 excess records.

FIGS. 10-13 illustrate the way transactions occur within the e-Trade network (51) between consumers (10), financial institutions (61), retailers (21), suppliers (41), and wholesalers (31). These examples further described how the system constructs a purchase order and updates the organization of network activities in real time. Each purchase order has FOB, C&F, or CDF origination and destination points. The consumer (10) uses the wholesaler warehouse e-Trade Supplier System Network inventory (51), commercially known as U-Commerce, when readily available. The end users exchange request (1) and replies (2) with the 'HIVE' (100) via the nodes (11-18) using traditional search method.

Figure 10:
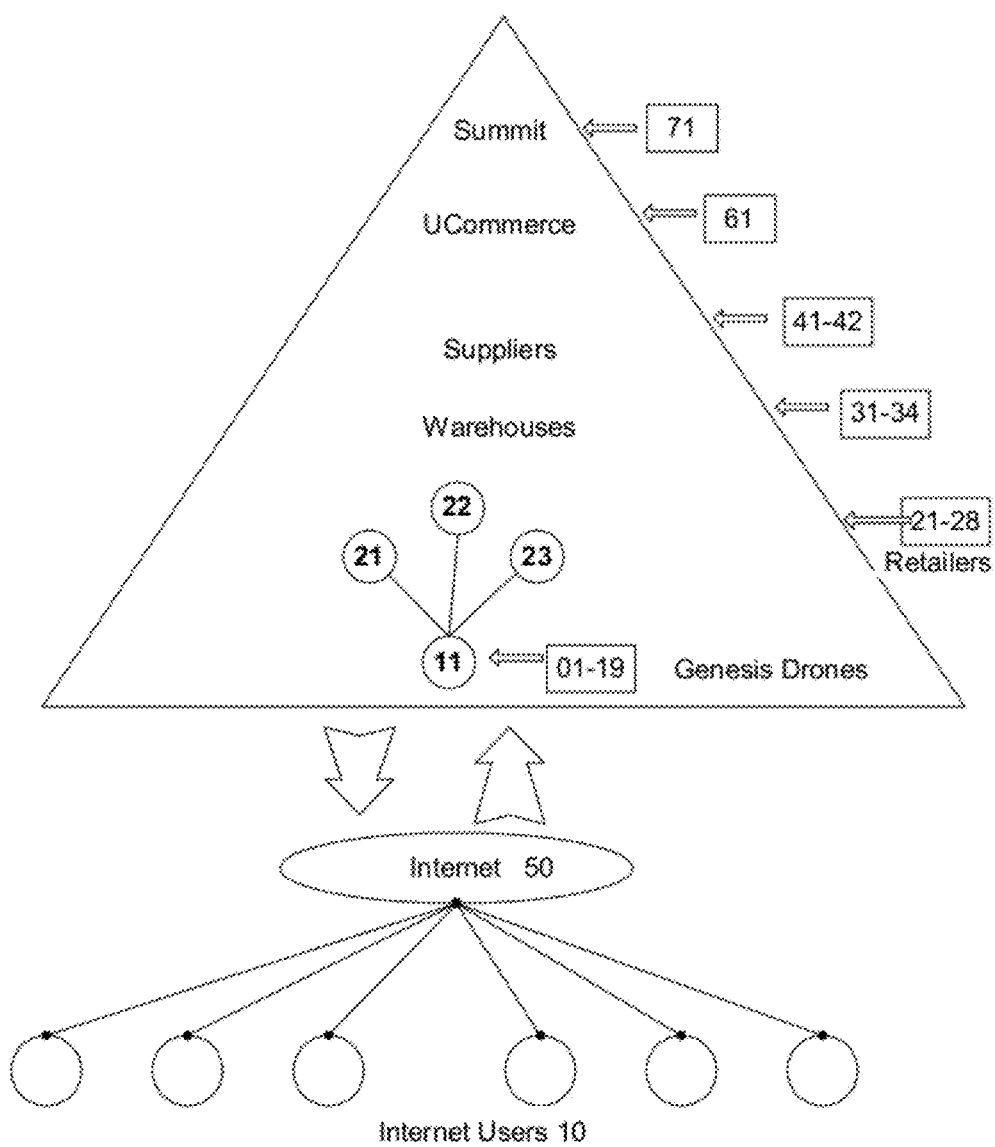
FIG. 10 Retailer's interaction with the system.

FIG. 10 is a diagrammatical representation of the interaction of the consumer (10) and retailers (21-28). When the end user logs in the computer network system assigns a predefined node to manage the quote transaction. E.g. the end user wants immediate pickup of merchandise from a local retailer. The system scans by making a simultaneous request to each of the retailer nodes (21-28) that has inventory in-hand and the lowest price, and in turn notifies the end user.

Figure 11:
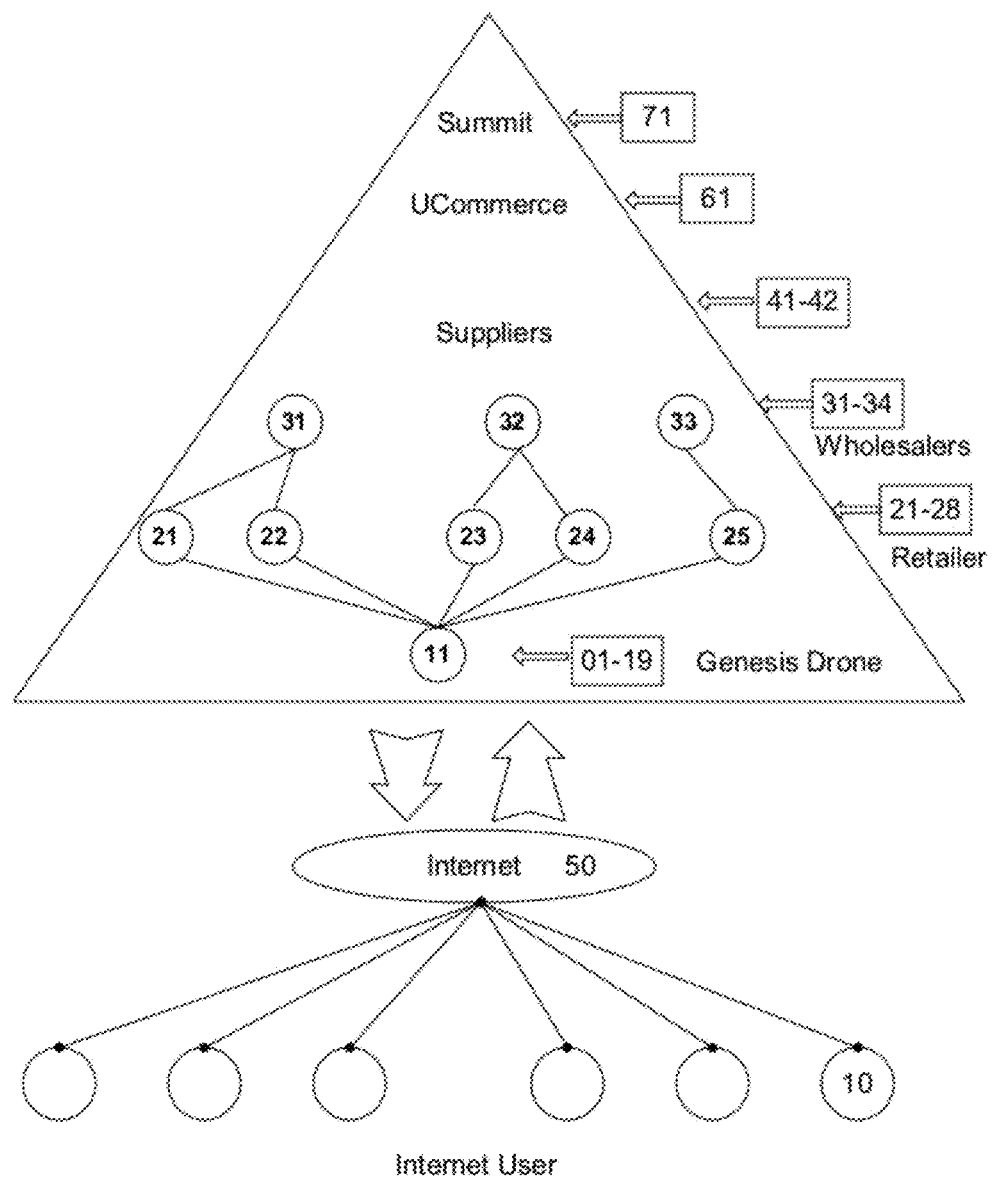
FIG. 11 Wholesaler's interaction with the system.

FIG. 11 is a diagrammatical representation of the interaction of the consumer (10) and wholesaler (31). The computer network system makes requests to each of the retailer (21-28) and (31-34) wholesaler nodes that has Inventory In Hand and determines the lowest price and then notifies the end user. The (31) wholesaler is a regional provider of goods and services to the consumer with FOB and C&F. And satisfies the end users request, since both local retailers (21-28) and wholesalers (32) are unable to delivery goods and services at optimal conditions.

Figure 12:
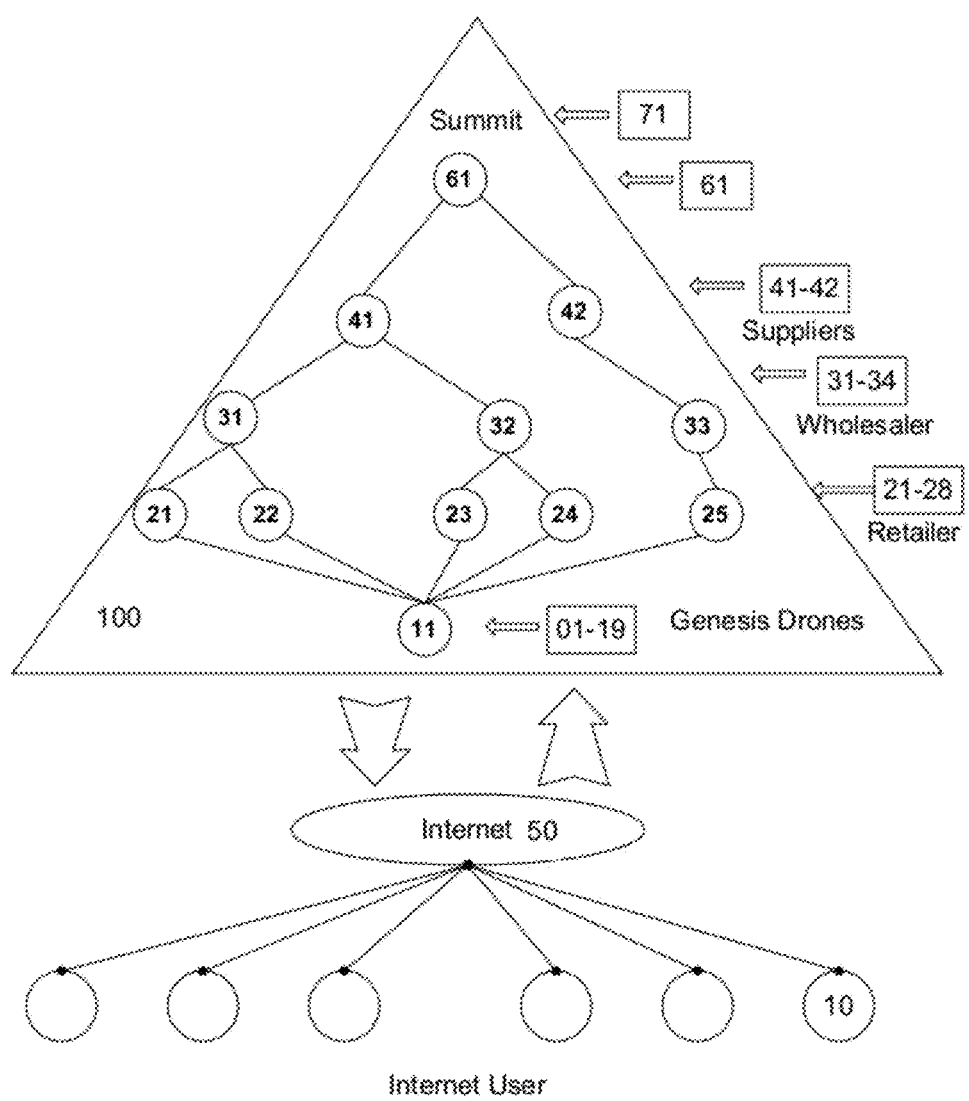
FIG. 12 Supplier's interaction with the system.

FIG. 12 is a diagrammatical representation of the interaction of the consumer (10) and supplier (41). The computer network system makes requests to each of the retailer (21-28), wholesaler (31-34), and supplier (41-42) nodes having inventory in-hand and the lowest price and, in turn, notifies the end user. The supplier (41) is a manufacturer of goods and services and interacts with U-Commerce (51) to deliver the lowest price where time is not necessarily of the essence for CIF shipping. The supplier (41) will sell inventory when readily available. The supplier node (41) satisfies the end users request, since all the local retailers (21-28) and the regional wholesaler (31-34) and supplier node (42) are unable to delivery goods and services.

Figure 13:
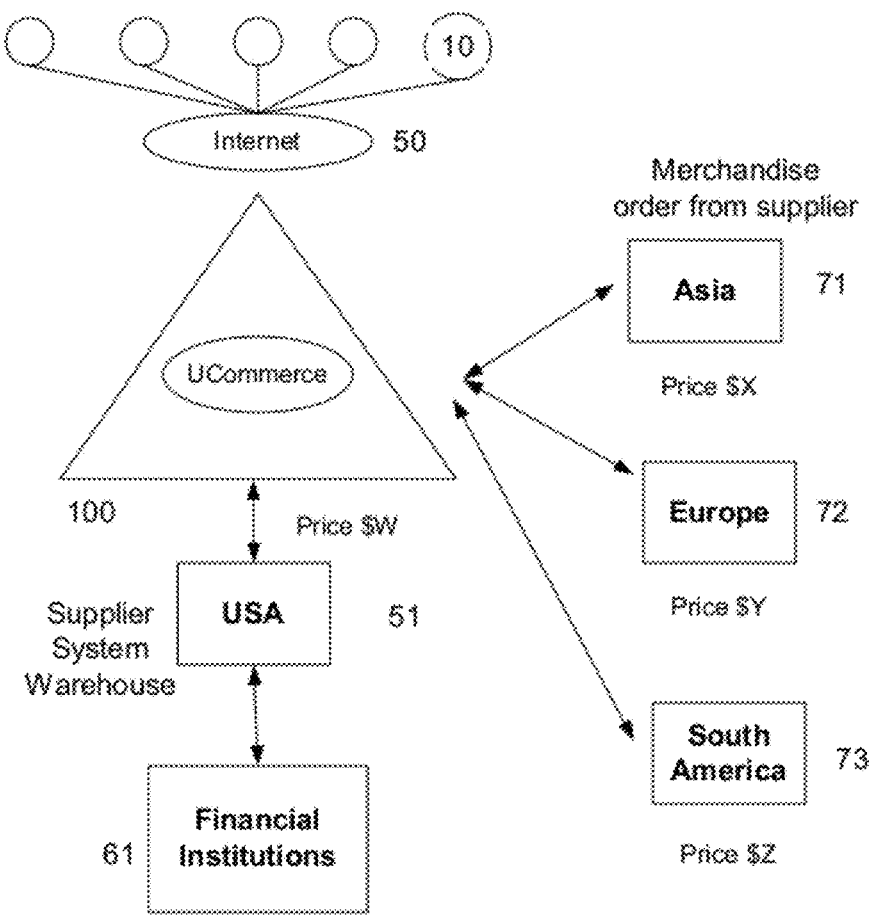
FIG. 13 Find the best worldwide price.

FIG. 13 is a diagrammatical representation of the interaction of the consumer (10) and the system (100). The system requests from the U-Commerce computer network system (51) the lowest overall price, fastest shipping method and financial terms for the purchase of goods and services. U-Commerce Warehouse (50) sells available inventory at price $W, or requests the product manager of a supplier (71-73) for its production and then ships to the destinations at price $X, $Y and $Z. The end users, based on need and time constraints, select the best alternative from $W, $X, $Y, and $Z, and consummate the transaction. The system identifies the most cost efficient financial institution (61) to purchase the goods.

FIGS. 14-17 show how U-Commerce (51) receives a quote from a customer (11) and requests pertinent retailers (21-23), suppliers (41), and wholesalers (31) to find the lowest P/U based on C&F, CDF or FOB terms. To maximize bandwidth and reduce redundant requests to the computer network system normalizes the entire Inventory by using Intelligent Inventory Delivery, as further described herein below.

Figure 14:
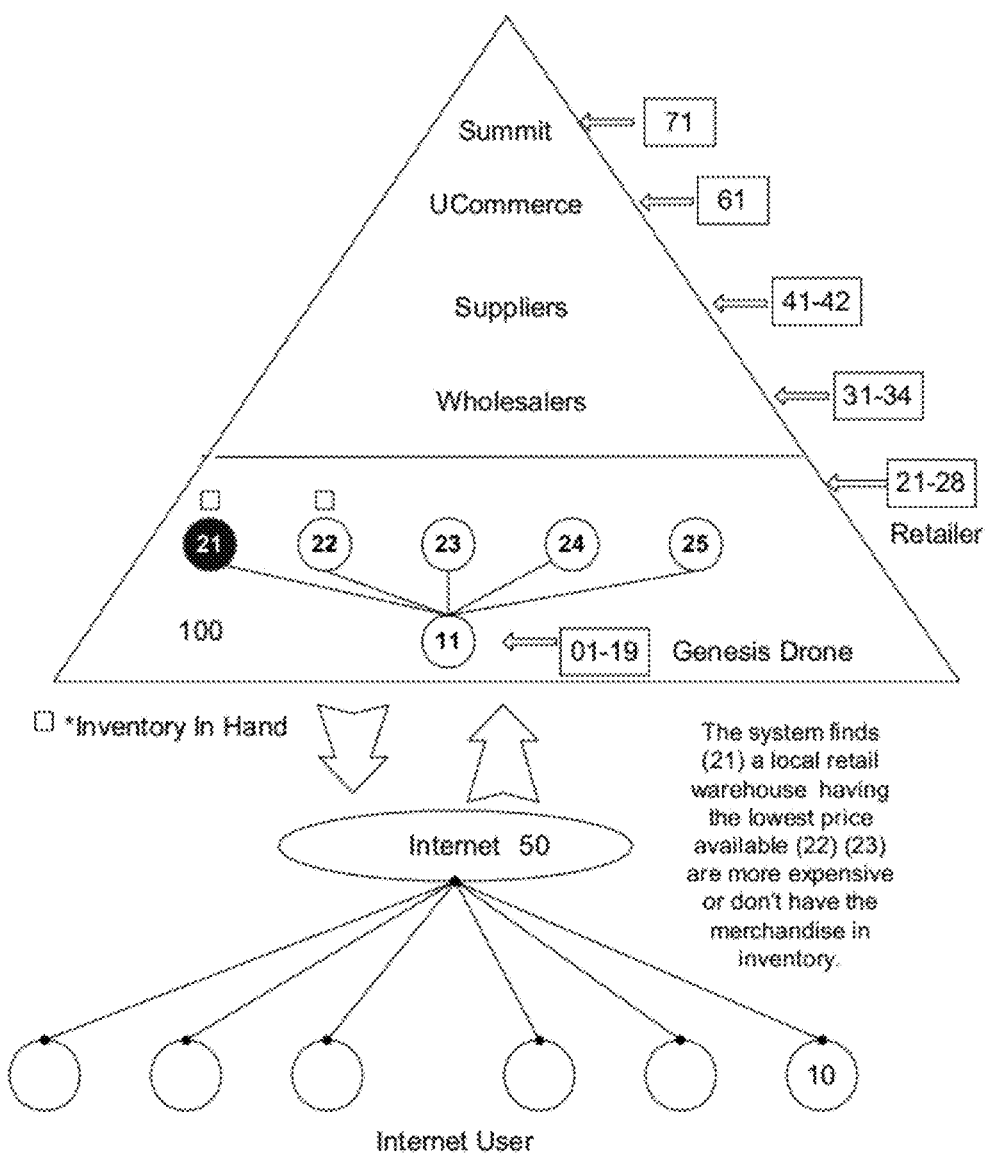
FIG. 14 UCommerce identifies the best retailer's price.

FIG. 14 is a schematic representation illustrating the way U-Commerce (51) identifies the needs of a customer and utilizes a retailer (21) (i.e., local warehouse). The system identifies that a retailer (21) has stock in-hand for the consumer within the cost, financing, and time constraints of a purchase order. E.g. (22) the retailer with the best cost is selected. The consumer uses the local retailer when the specific product is required immediately. And the node in charge of the transaction performs the following steps:
(1) Determine which retailers carry the required inventory. (22, 25, 27 and 28);
(2) Determine, by comparison with known inventory levels, which retail nodes have adequate inventory in-hand. Retail nodes (22, 27) can satisfy the request;
(3) Find the best price using Intelligent Inventory Rules Algorithm. Retail node (27) has the best price value;
(4) Compares the best price against U-Commerce warehouse prices. And dispatch the best price, lowest delay and most reliable shipment route.

In this manner, the node was able to find the best price without having to chain thousands of requests and responses that clog the system, as is inherent with a centralized system. In sharp contrast, 'HIVE', due to its distributed tier architecture, geospatial configuration and hierarchical arrangement of each node is able to perform pre-calculated inventory calculations design to minimize bandwidth usage, and allow the system to always work at its maximal rated capacity.

Figure 15:
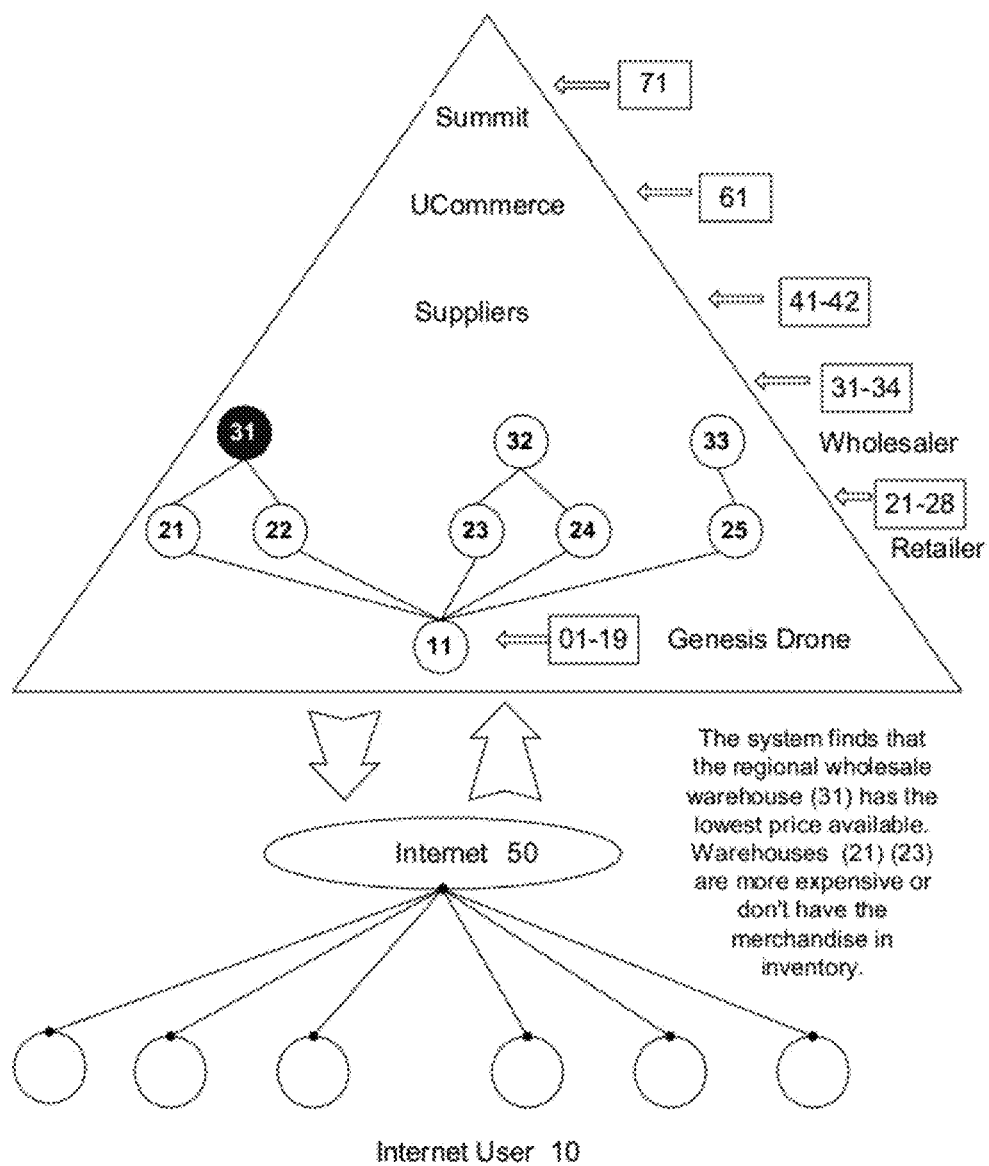
FIG. 15 UCommerce identifies the best wholesaler's price.

FIG. 15 is a schematic representation of how U-Commerce (51) identifies the needs of a customer and uses a wholesaler (31) (i.e., U-Commerce warehouse). The system identifies that a wholesaler (31) has stock in hand, in queue, or can order from a regional supplier for the consumer within the cost, financing, and time constraints of purchase order.

E.g. we will assume the following: (a) the end user has allowed enough time for all regional wholesalers to satisfy the request with the allotted time, and (b) the wholesale prices are lower than retail prices. Each node in charge of the transaction performs the following steps:
(1) Determine using Intelligent Inventory Delivery to the best retail node price (retail node (27) has the best price from FIG. 10);
(2) Determine, by comparison with known inventory levels, which wholesaler nodes have adequate inventory in-hand. Wholesalers (32 and 33) can satisfy the request;
(3) Find the best price using Intelligent Inventory Rules Algorithm. Wholesaler node (32) has the best price value;
(4) Sell products from wholesaler node (32) if the price is lower than retail node (27);
(5) Compares the best price against the U-Commerce warehouse prices. The system will dispatch the best price, lowest delay and most reliable shipment route.

Figure 16:
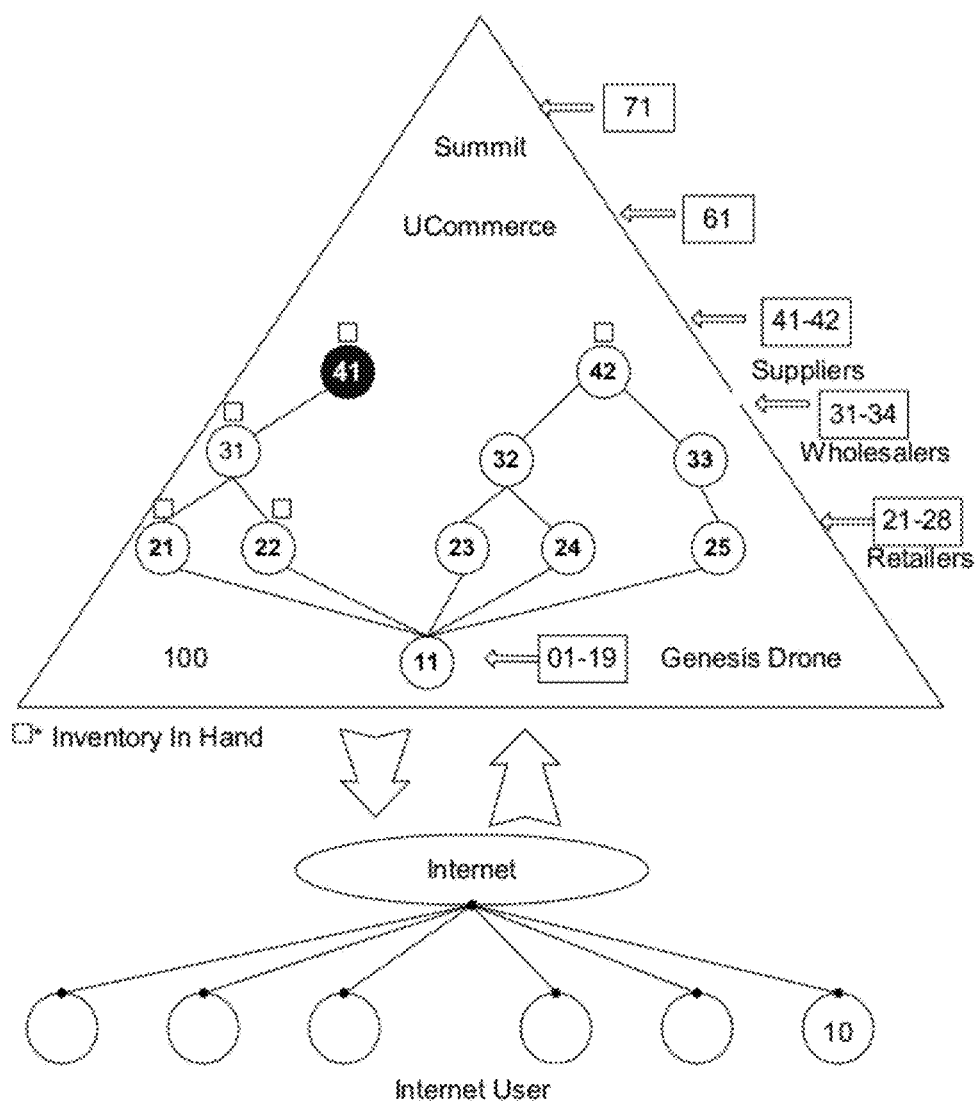
FIG. 16 UCommerce identifies the best supplier's price.

FIG. 16 is a schematic representation showing how U-Commerce (51) identifies the needs of a customer and selects a wholesaler (41) (i.e., U-Commerce warehouse). The system identifies that a supplier (41) (i.e., global domain warehouse) has stock in hand, in queue, or under production for the consumer within the cost, financing, and time constraints of purchase order. E.g. we will assume that the end user has allowed enough time for global suppliers to satisfy the request with the allotted time, and that supplier prices are lower than retail and/or wholesalers. In this case node in charge of the transaction performs the following steps without requesting any information from any of the higher tiers:

(1) Determine the best retail node price (From FIG. 10 retail node (27));
(2) Determine the best wholesale node price (From FIG. 11 retail node (32));
(3) Determine, by comparison with known inventory levels, which supplier nodes have adequate inventory in-hand. Supplier (32 and 33) can satisfy the request;
(4) Find the best price using Intelligent Inventory Rules Algorithm. Supplier node (41) has the best price value;
(5) Sell products from supplier node (41) if the price is lower than retail node (27) and wholesaler node (32) using X_FOB and Y_CDIF multipliers for time sensitive request;
(6) Compares the best price against the U-Commerce warehouse prices. The system will dispatch the best price, lowest delay and most reliable shipment route.

Figure 17:
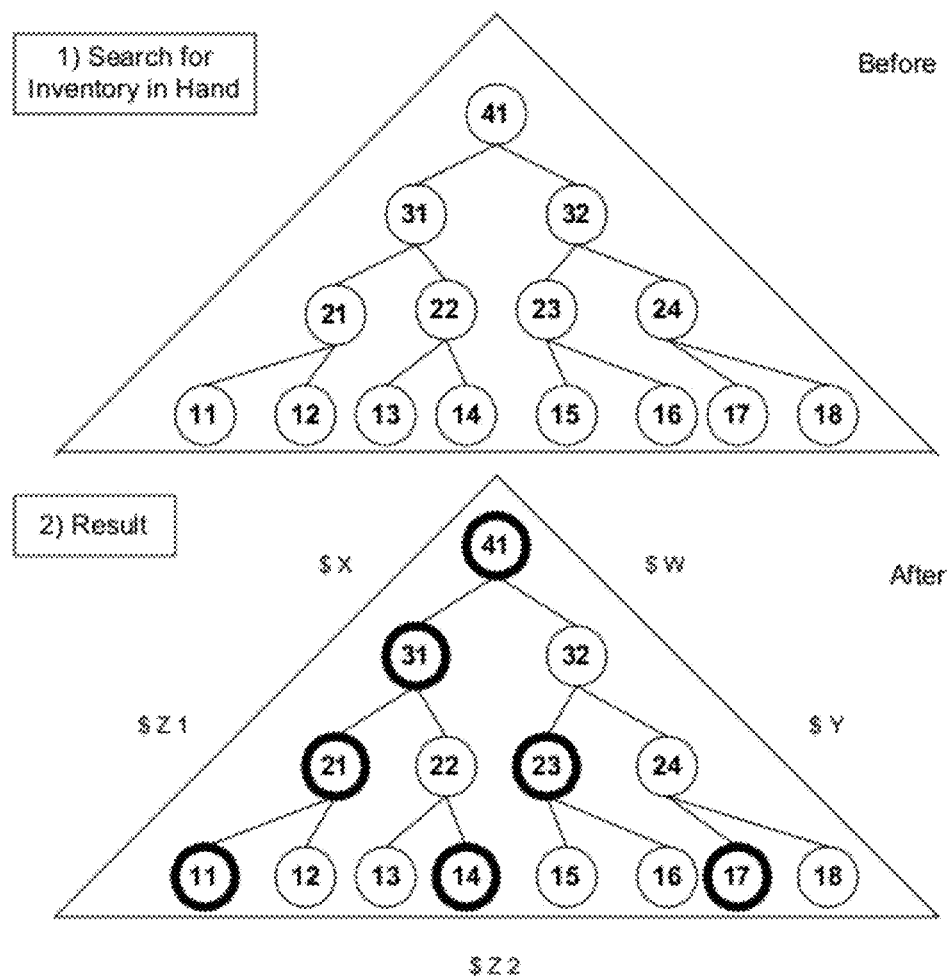
FIG. 17 Finding Inventory In Hand.

FIG. 17 is a schematic representation of how U-Commerce (51) identifies the needs of a customer and uses retailers (21), suppliers (41), and/or wholesalers (31) (i.e., U-Commerce warehouse). The system negotiates with the different retailers (21), suppliers (41) and a wholesalers (31) having stock in hand, in queue, or under production for the consumer within the contractual terms and conditions, cost, financing, and time constraints of purchase order. The system also offers same day, red and blue label express services that will be applied to the FOB, C&F, or CDF prices as to offer the consumer an efficient delivery method.

Figure 18:
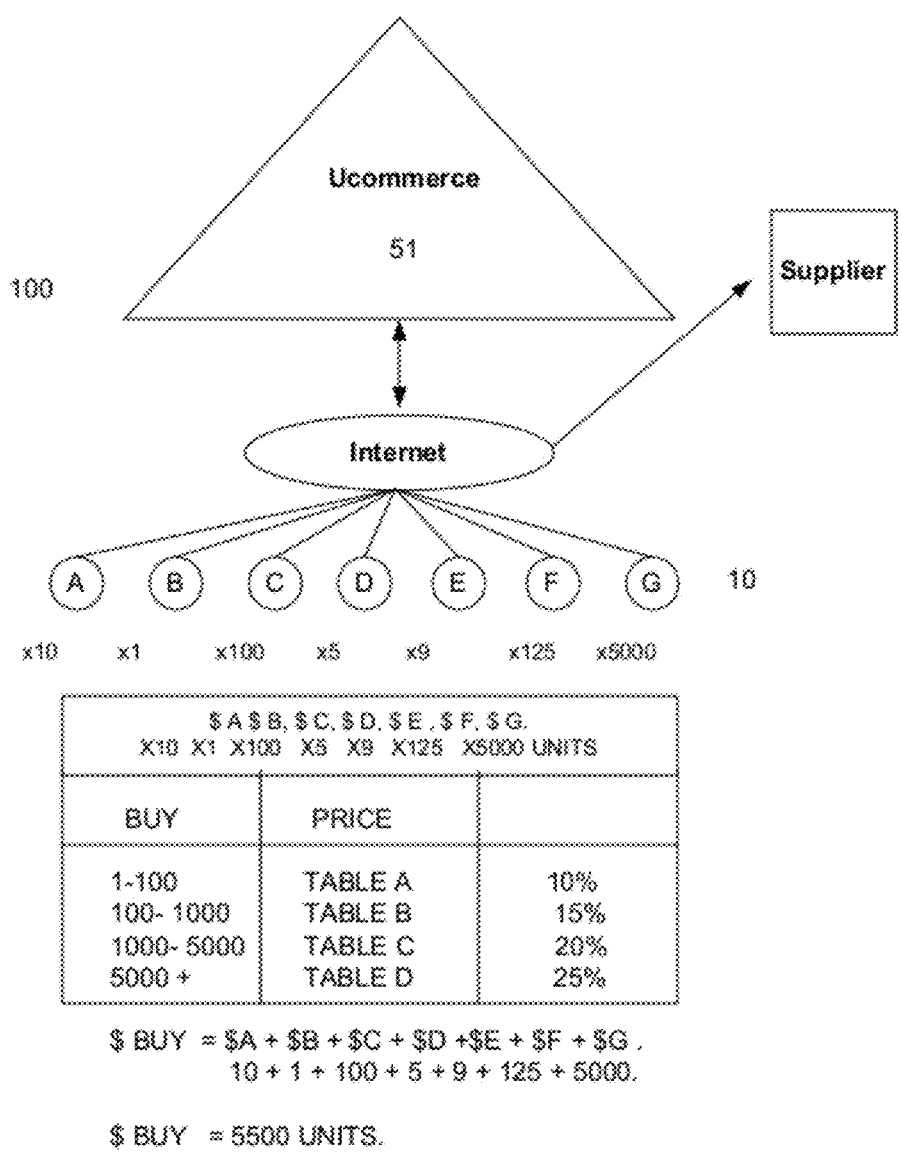
FIG. 18 Merging multiple orders in aggregate.

FIG. 18 is a schematic representation of how U-Commerce (51) merges the request of multiple customers (10) to increase the size of the order quantity and purchase at lower prices using economies of scale.

Figure 19:
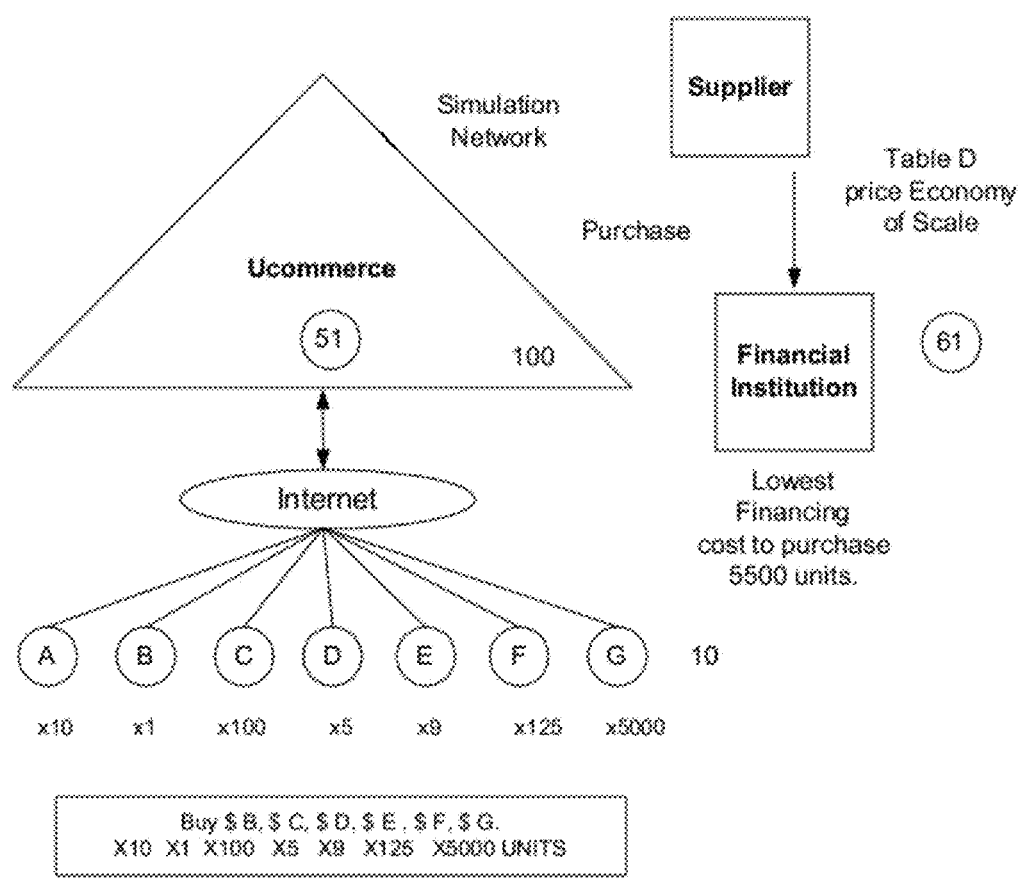
FIG. 19 Coordinating the sale of goods and services.

FIG. 19 is a schematic representation of how U-Commerce (51) coordinates the sale of goods and services by facilitating and making readily available capital to the consumer (10) from financial institutions (61).

Figure 20:
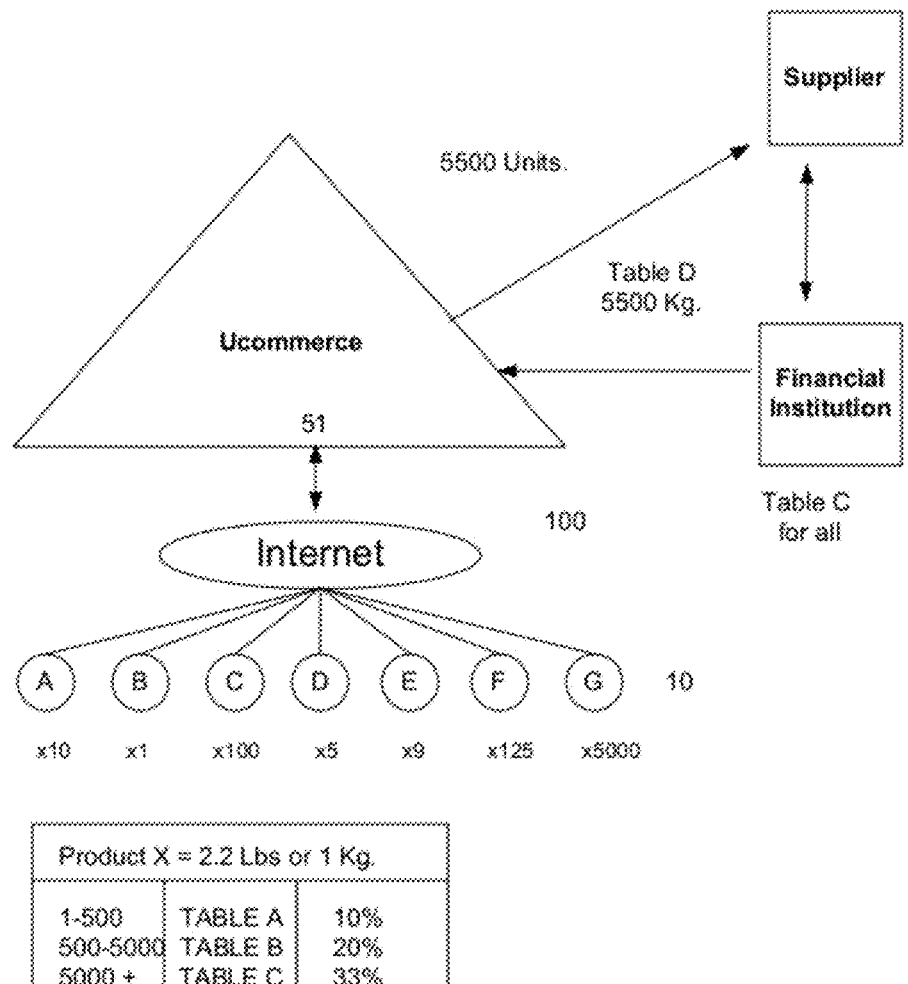
FIG. 20 Merging multiple shipments.

FIG. 20 is a schematic representation of how U-Commerce merges several shipping request that are moving to the same trajectory and time constraints to lower the shipping cost to the consumer (10).

Figure 21:
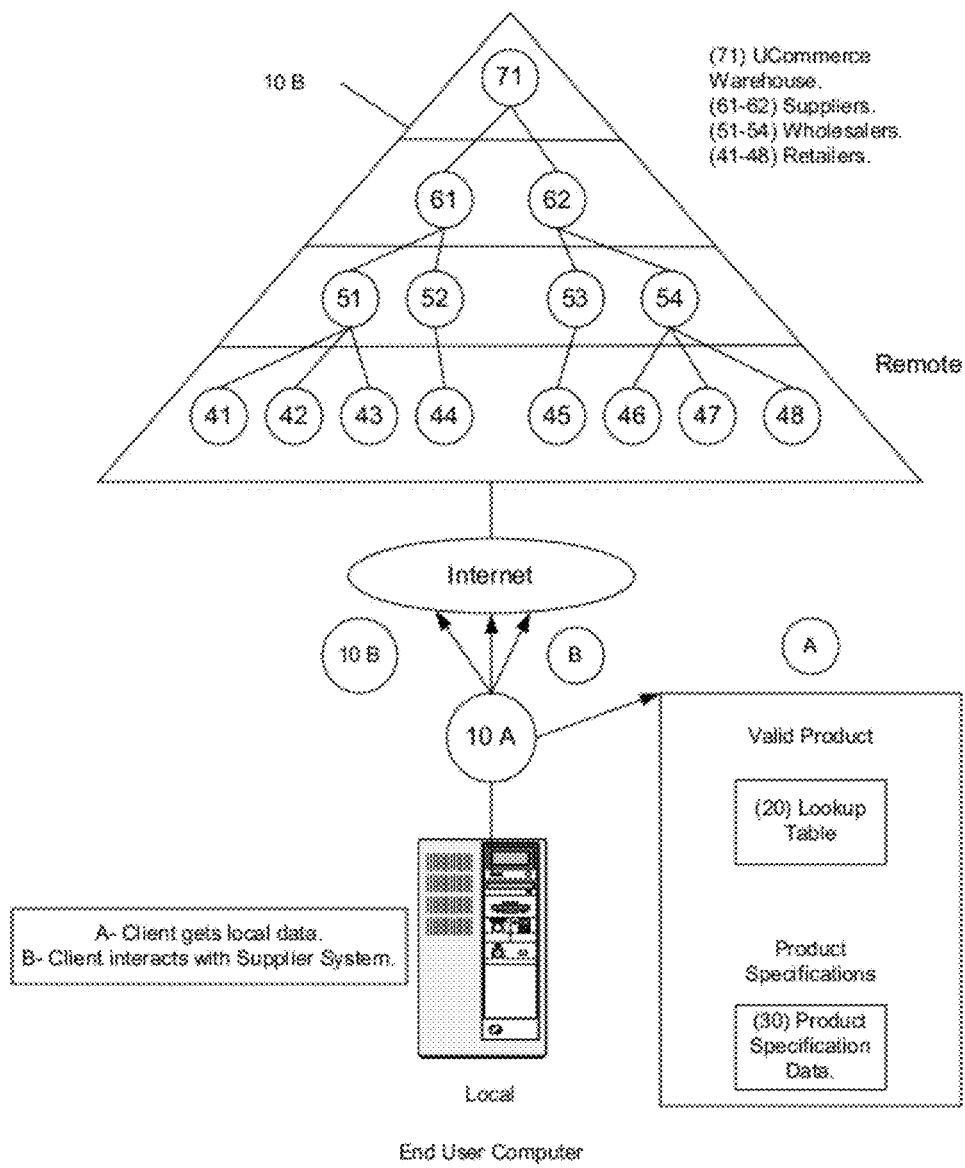
FIG. 21 Client search flow.

FIG. 21 shows how the client software uses the predefined file structure to filter redundant search of products, and explains the business rules used to identity which retailers, wholesalers, suppliers and supplier system warehouses are available and have inventory in hand.

Figure 22:
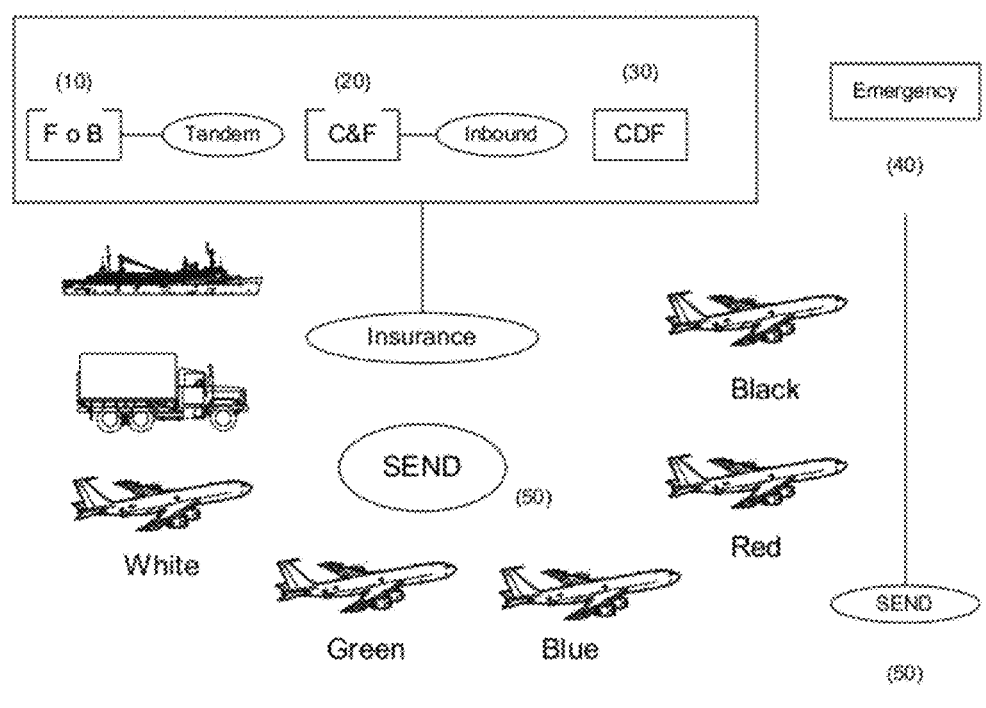
FIG. 22 Selecting shipping methods.

FIG. 22 is a schematic representation of how U-Commerce identifies and classifies shipments based on FOB, C&F, CDF, inbound shipment, priority mail from origination and destination, or Gold Label services. The system immediately stores a value to quote and order products that are used during the decision making process.

Figure 23:
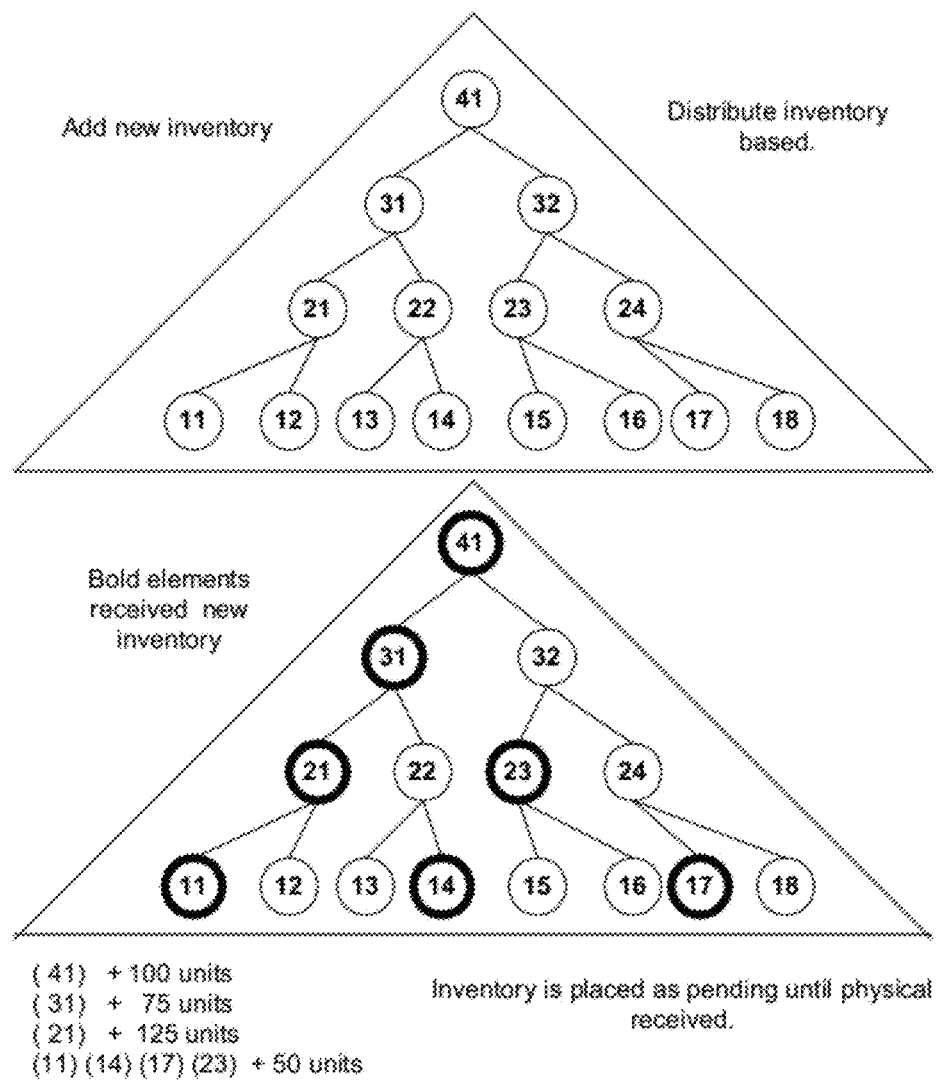
FIG. 23 Physical Distribution of Inventory.

FIG. 23 shows how a supplier restocks physical merchandise in their warehouse or computer databases, how it affects the supplier system inventory in hand, shipped inventory, and adjustment of reorder inventory levels.

Figure 24:
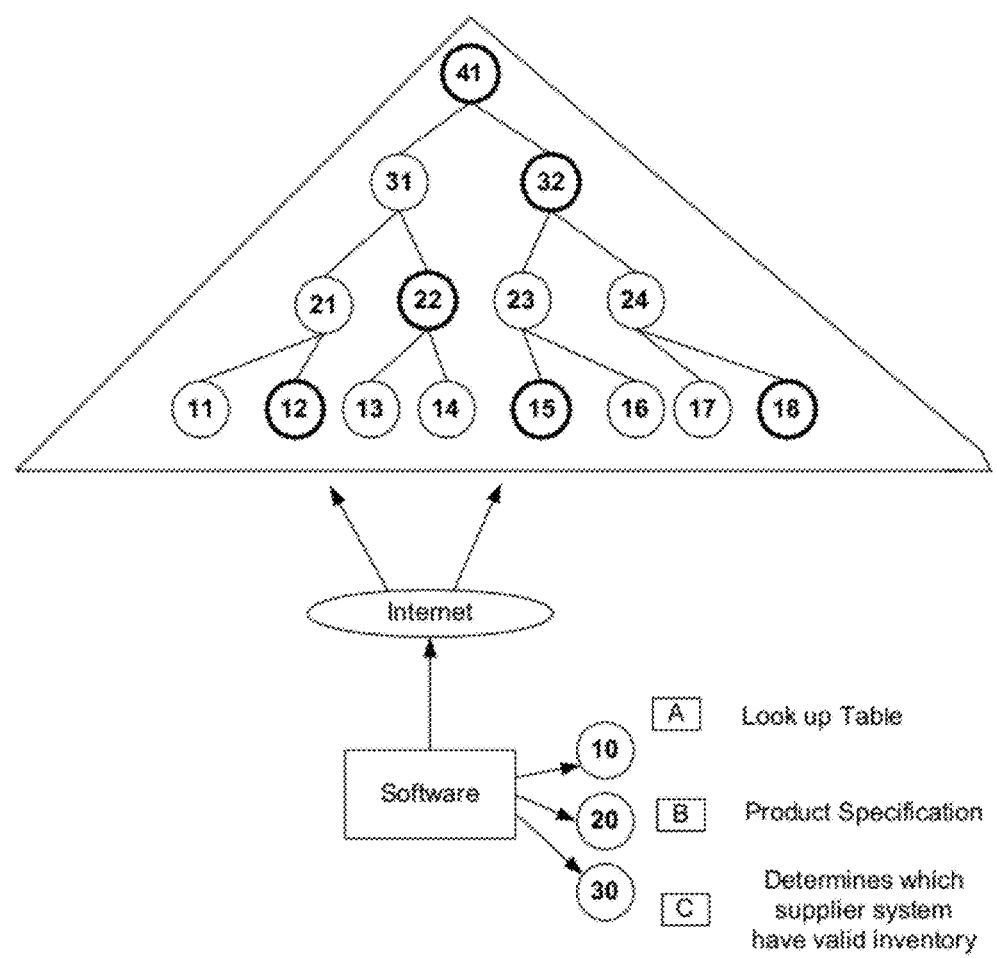
FIG. 24 Client coordinated supplier system search.

FIG. 24 shows how the client software (10) uses the lookup product information files (20), and product specification data files (30). The system uses U-Commerce algorithms to derive the search pattern based on the end user criteria. The client coordinates with the supplier system components that are responsible for the given supplier products. The retailers (41-48), the wholesalers (51-54), the suppliers (61-62) and the U-Commerce continent-region warehouse (71) notify the end user of availability and pricing.

Figure 25:
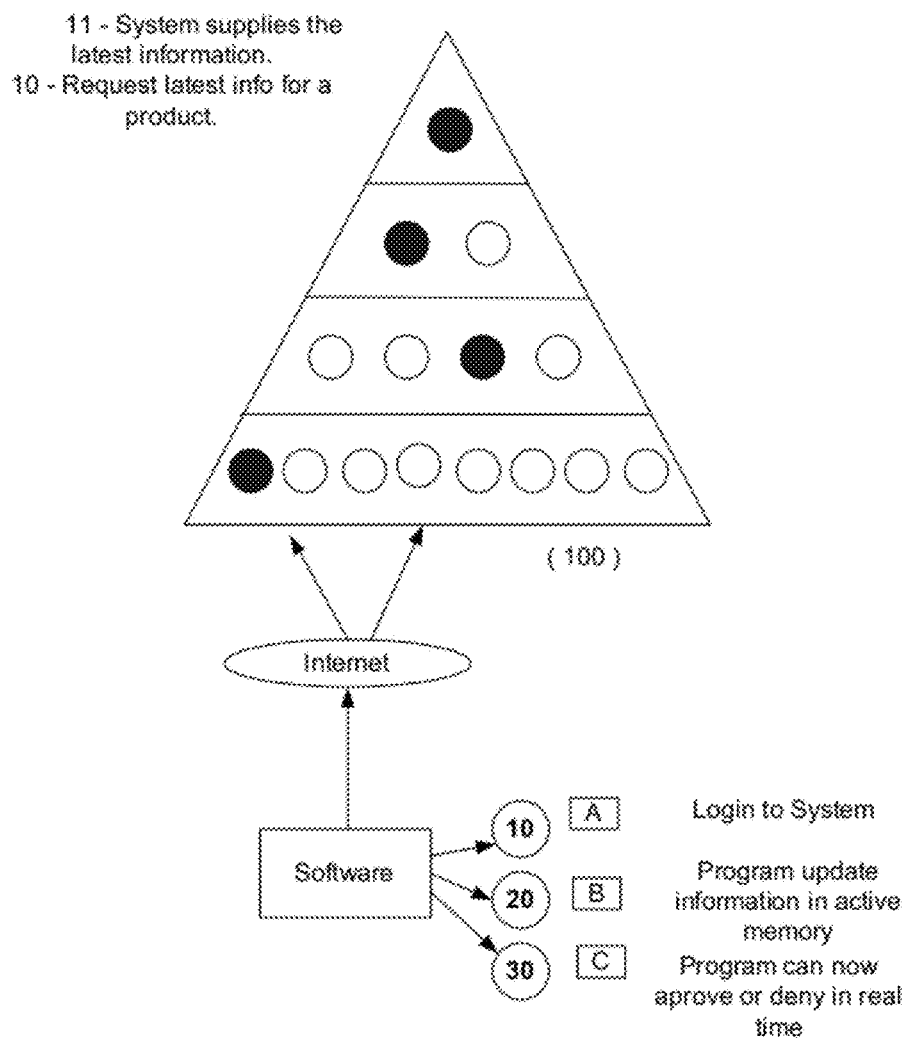
FIG. 25 Updating client's information.

FIG. 25 shows how each Intelligent Component interfaces with a database, and a third-party interface to get the latest data. Once each node has the latest information and updates the information in its active memory, it approves or denies an order, provides prices to an end user, and assigns (by country) the U-Commerce value for their inventory. Parent Intelligent components can alternatively only validate the information of a given group of sibling intelligent components having the highest U-Commerce value to a given continent, region, and or country.

Figure 26:
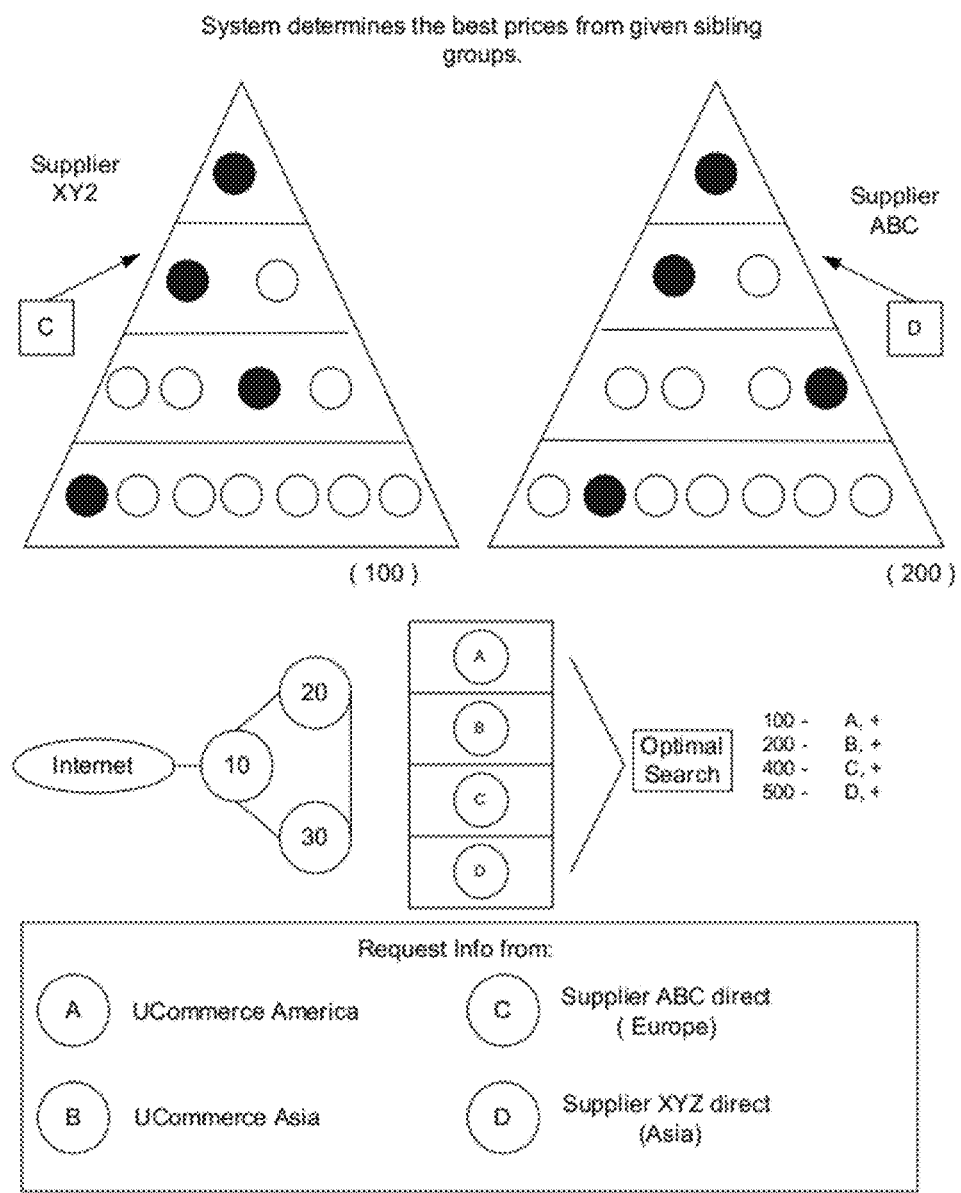
FIG. 26 Advanced product search.

FIG. 26 shows how the supplier system takes advantage of its distributed architecture to conduct a search of products and inventory availability. The end user (10a) uses the look up tables (20) and data specification files (30) to properly validate and verify the partial search commands. Then, the client (10b) derives the optimal solution to the user supercomputer hierarchy by analyzing the latest information of the entire network. E.g. the end user requests products from ABC (61) and XYZ (161) suppliers. The system of components (41-71) represents the American continent region, whereas (141-171) represent the Asian continent region. The end users geographical U-Commerce warehouse is located in Miami, and all the FOB, FOB rush, C&F, C&F rush, and CDF prices are calculated from Miami. All of the inbound prices from Asia are quoted from Osaka, Japan. Note: Gold Label services are coordinated by the global summit tier, since this node has the authority to administer, control, coordinate, delegate, and prioritize tasks from its subordinates.

Figure 27:
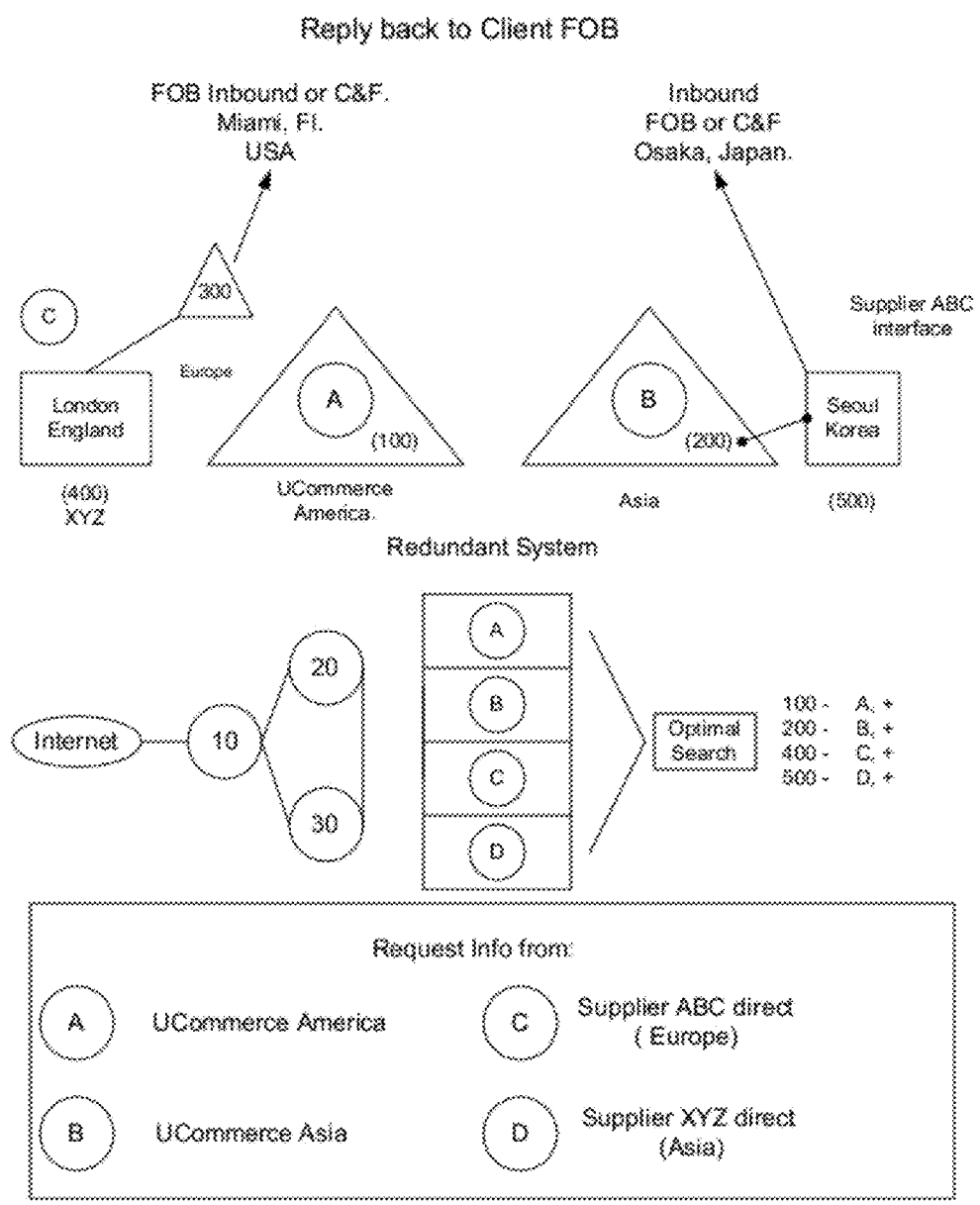
FIG. 27 Scanning optimal prices and availability.

FIG. 27 illustrates how U-Commerce retailers (41-48) wholesalers (51-54), suppliers (61-62) and the geographic U-Commerce warehouse (71) have the ability to update a prior quote to all the clients by updating the intelligent components HQ0 that monitor the task of each independent end user. The system detects that Miami, USA warehouse (71) and Osaka, Japan (171) have active users requesting information of a given supplier. The retailers, wholesalers, and suppliers update all the previous quotes that are still pending. Each node verifies the new information and notifies each end user client with the latest prices and inventory availability. The end user is notified via a message signal that their quote data has been optimized. The system displays the newly optimal data in the screen.

Figure 28:
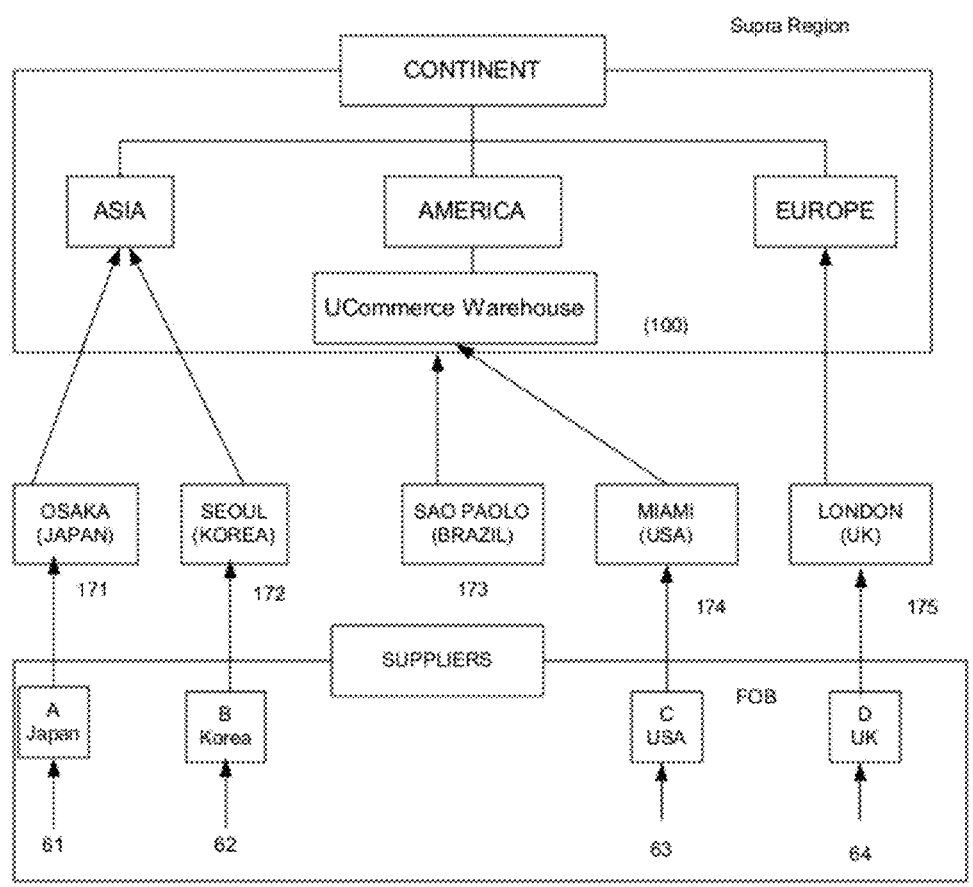
FIG. 28 Product flow.

FIG. 28 illustrates that when an end user searches for a product, the system determines from the Supra Region (100), which U-Commerce warehouses have the merchandise available. The system readily identifies Osaka, Japan (171), Seoul, Korea (172), Sao Paolo, Brazil (173), Miami, Fla., USA (174), and London, UK (175) as carrying the item within its logistical supply line. Supplier (61) is linked to U-Commerce warehouse (171), (62) is linked to (172), (63) is linked to (173-174), and (64) is linked to (175). E.g. when an optimal FOB stock price is searched the system first searches for inventory in hand. And if the U-Commerce warehouse doesn't have adequate inventory the system will make available the inventory of the suppliers (61-64). When the end user requests merchandise from a Supplier (61-64) the shipping method to the linked U-Commerce Warehouse (171-175) must be selected ranging from regular ground 2-4 weeks (White Label services), or Green, Blue, Red, Black, or Gold Label express services.

Figure 29:
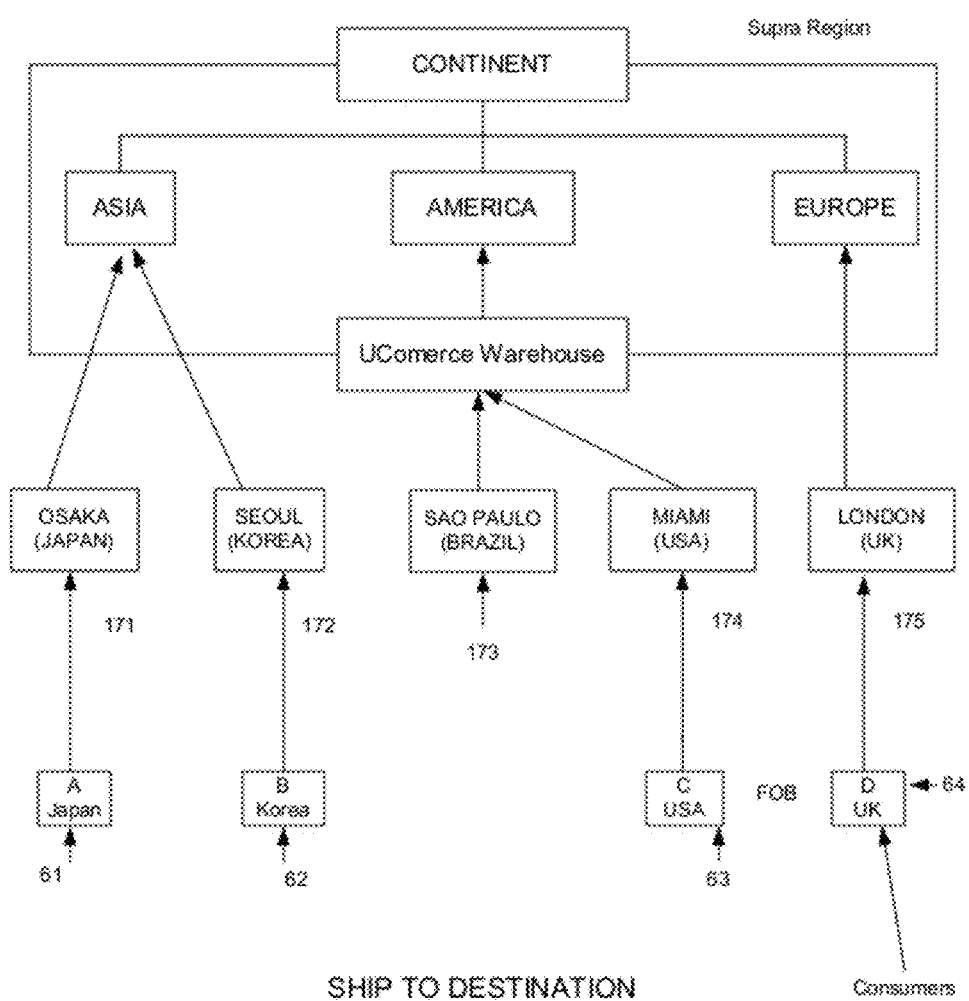
FIG. 29 Delivery flow.

FIG. 29 illustrates that once the system replies to the end users with the U-Commerce Warehouse having inventory, the system consolidates the order between linked Suppliers (61-64) and U-Commerce Warehouses (171-175). The end users must now select the merchandise destination, and then the system determines the optimal path from origin to destination.

FIG. 30 illustrates how the Supra Region is derived from the geographical areas in the three continents of America, Asia, and Europe. The Supra Region consists of many Industrial Economies. The commerce between the regional members is furthered enhanced by the Asian Pacific Treaty, NAFTA, and UECM.

Figure 31:
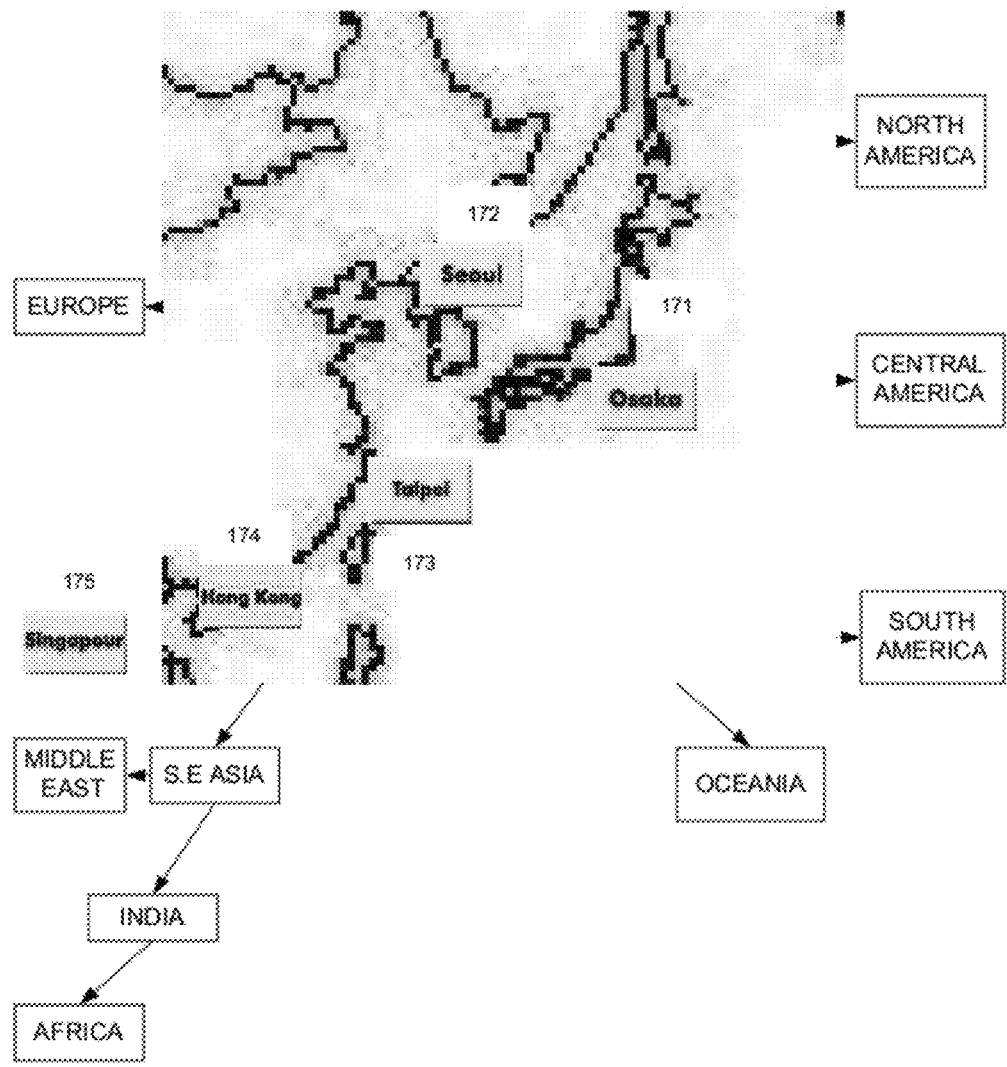
FIG. 31 Asia Pacific industrial economies.

FIG. 31 illustrates the primary U-Commerce Warehouses logistical supply lines to send merchandise from Asia Pacific Industrial Economies.

Figure 32:
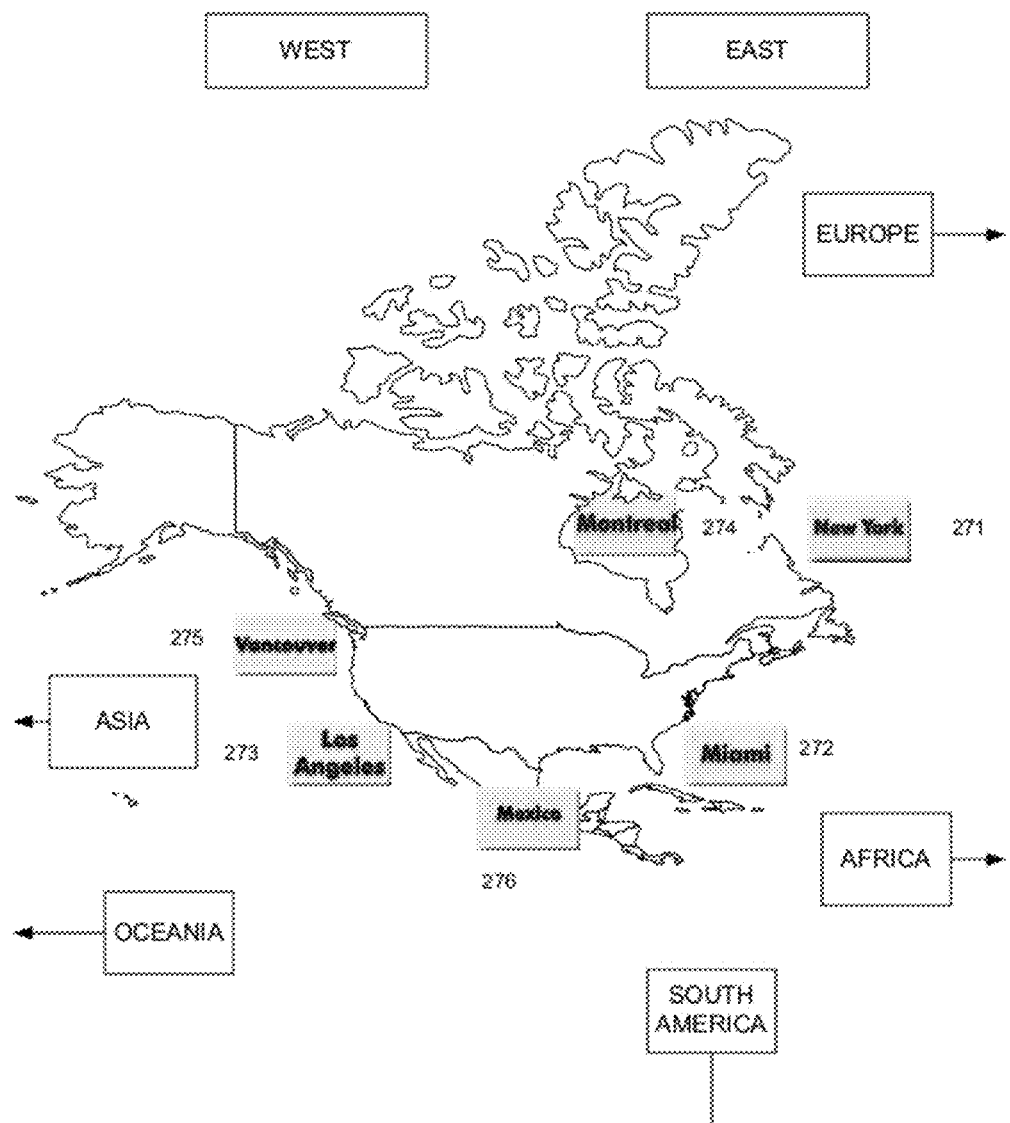
FIG. 32 NAFTA region.

FIG. 32 illustrates the primary U-Commerce Warehouses logistical supply lines to send merchandise from NAFTA Industrial Economies.

Figure 33:
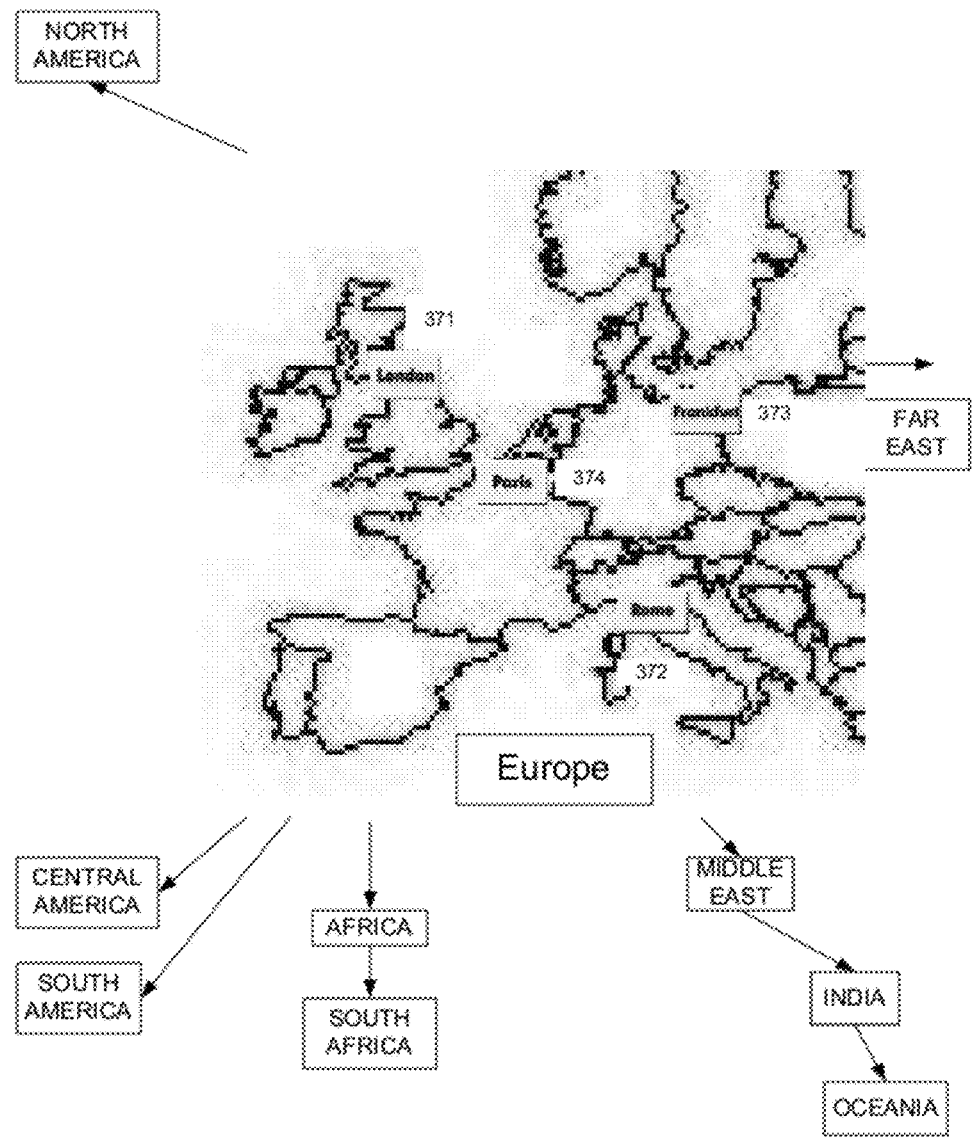
FIG. 33 UECM.

FIG. 33 illustrates the primary U-Commerce Warehouses and their logistical supply lines the system utilizes to send merchandise from the (UECM) European Common Market Industrial Economies.

Figure 34:
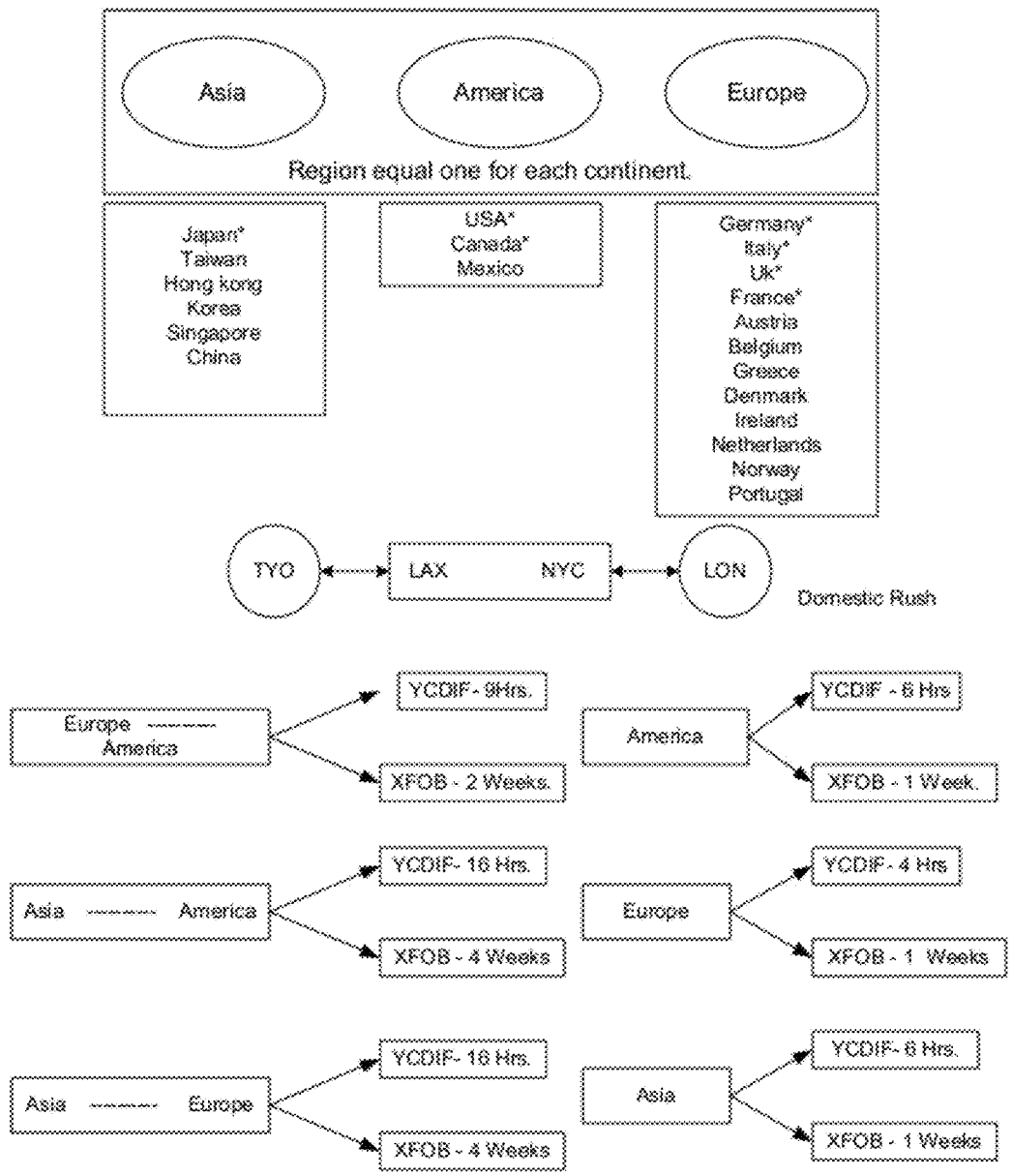
FIG. 34 Supra Region—Data Flow.

FIG. 34 illustrates the primary logistical links between the key U-Commerce ports of Tokyo, Japan (TYO), Los Angeles, USA (LAX), New York City, USA (LGA), and London, UK (LHR). Then the system shows the time delays used for X_FOB that calculates the most inexpensive P/U via regular ground or ocean, and Y_CDIF estimates the P/U for the quickest delivery express mail services. A domestic rush Y_CDIF time delay is added when the express shipment originates from a participating supplier, while X_FOB suffers no adverse penalty.

Figure 35:
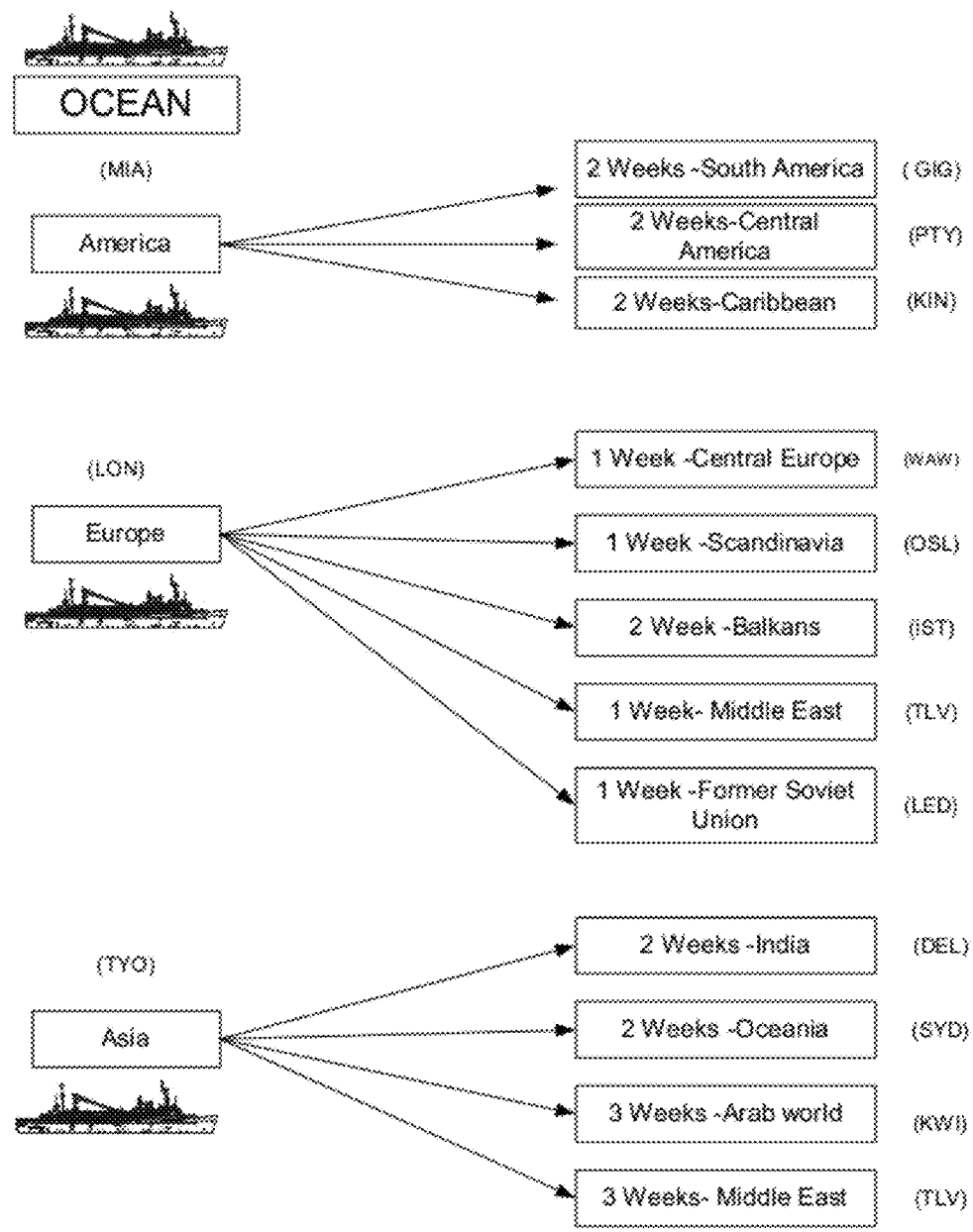
FIG. 35 Supra Region—X_FOB flow.

FIG. 35 illustrates the primary logistical links commerce that the origin and destination belongs to the same continent. In each case the point of origin is located within the Supra Region (=1) and then shows the associated time delays for X_FOB shipping to different continental regions.

Figure 36:
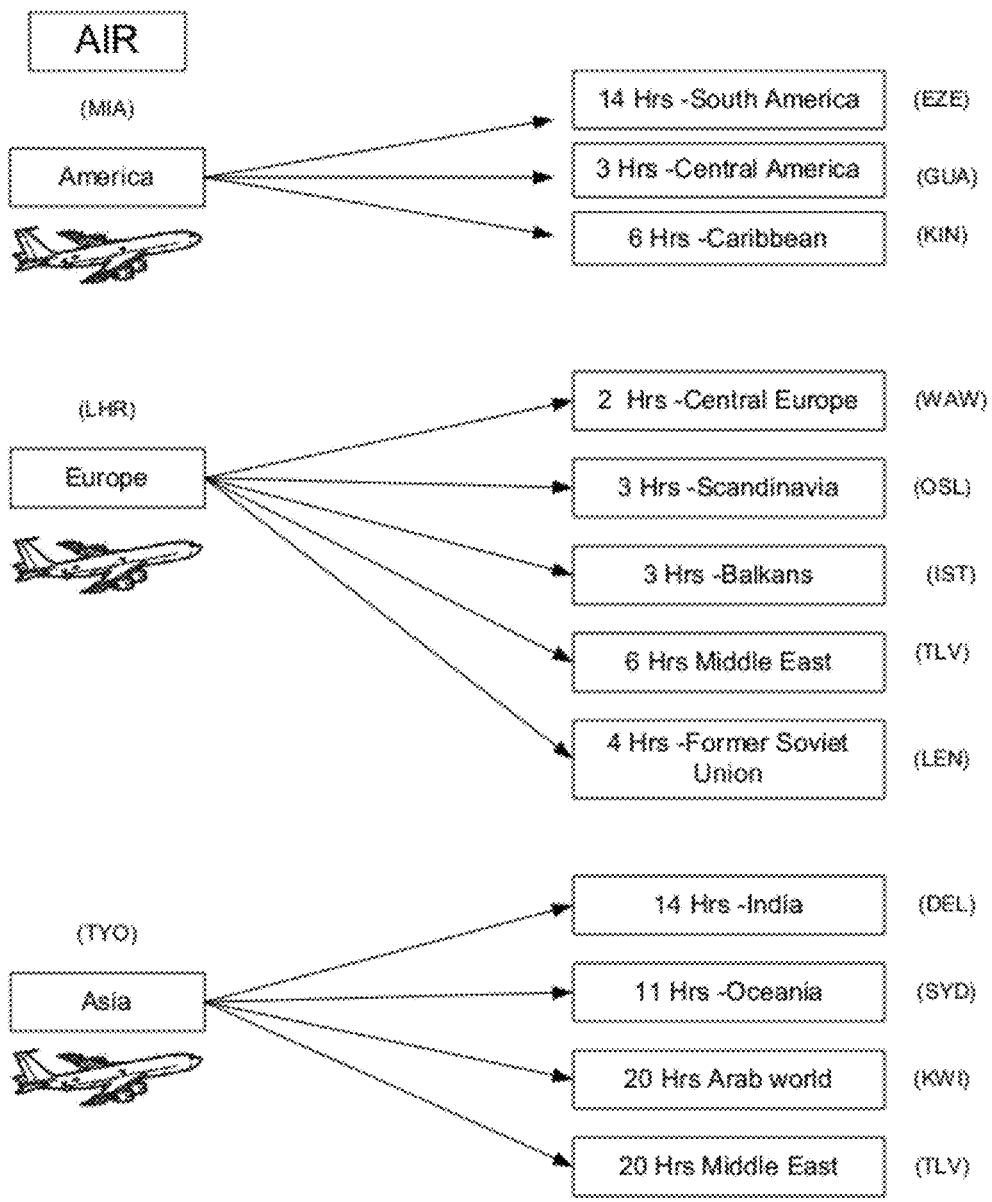
FIG. 36 Supra Region—Y_CDIF.

FIG. 36 illustrates the primary logistical links commerce that the origin and destination belongs to the same continent. In each case the point of origin is located within the Supra Region (=1) and then shows the associated time delays for Y_CDIF express shipping to different continental regions.

Figure 37:
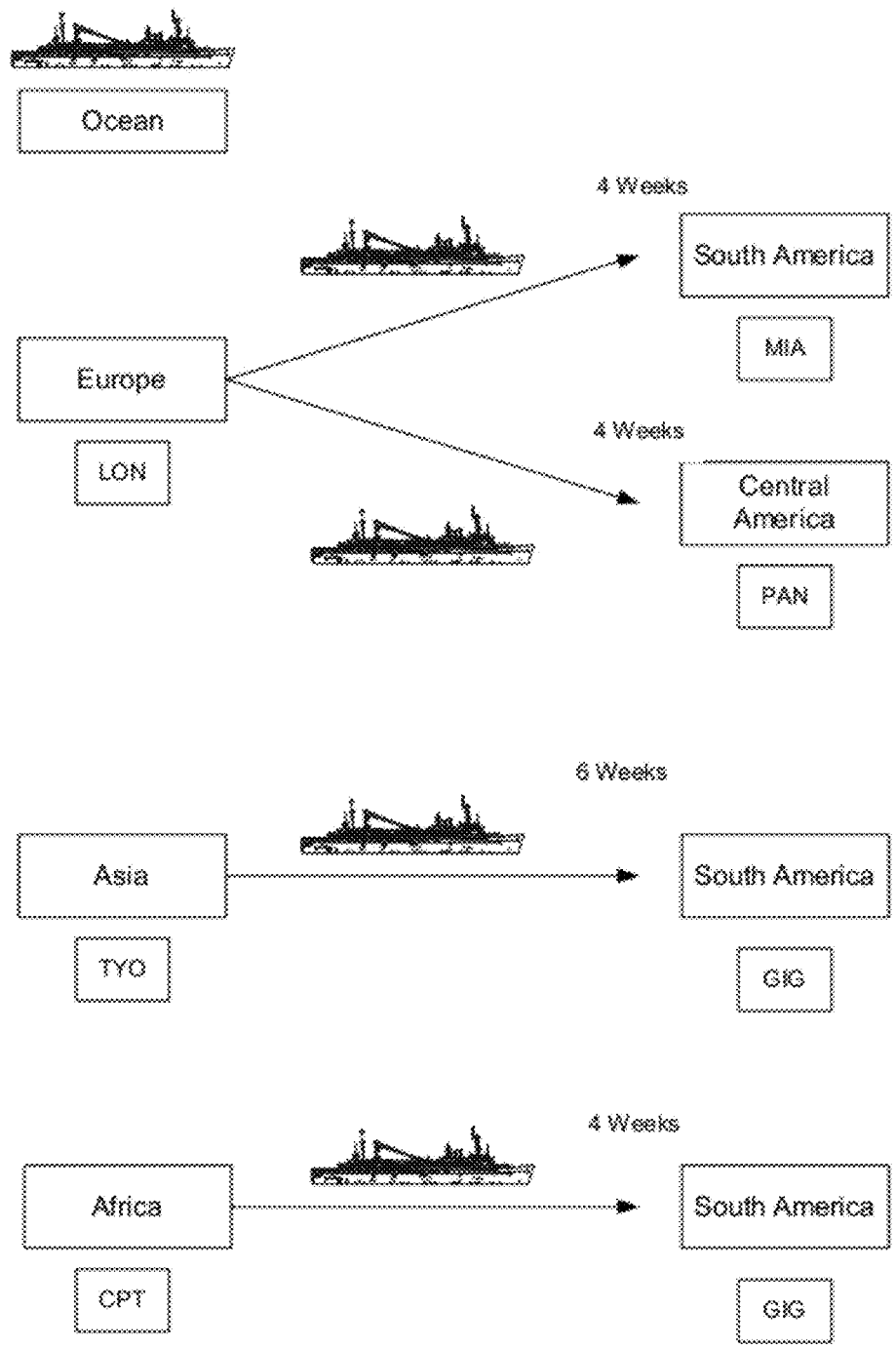
FIG. 37 America—X_FOB.

FIG. 37 illustrates the primary logistical links for intercontinental commerce originating from the Supra Region with destination in America region 2 (South) or 3 (Central). In each case the point of origin is located within the Supra Region=1 and then shows the associated time delays for X_FOB shipping to different continental regions that are directly available.

Figure 38:
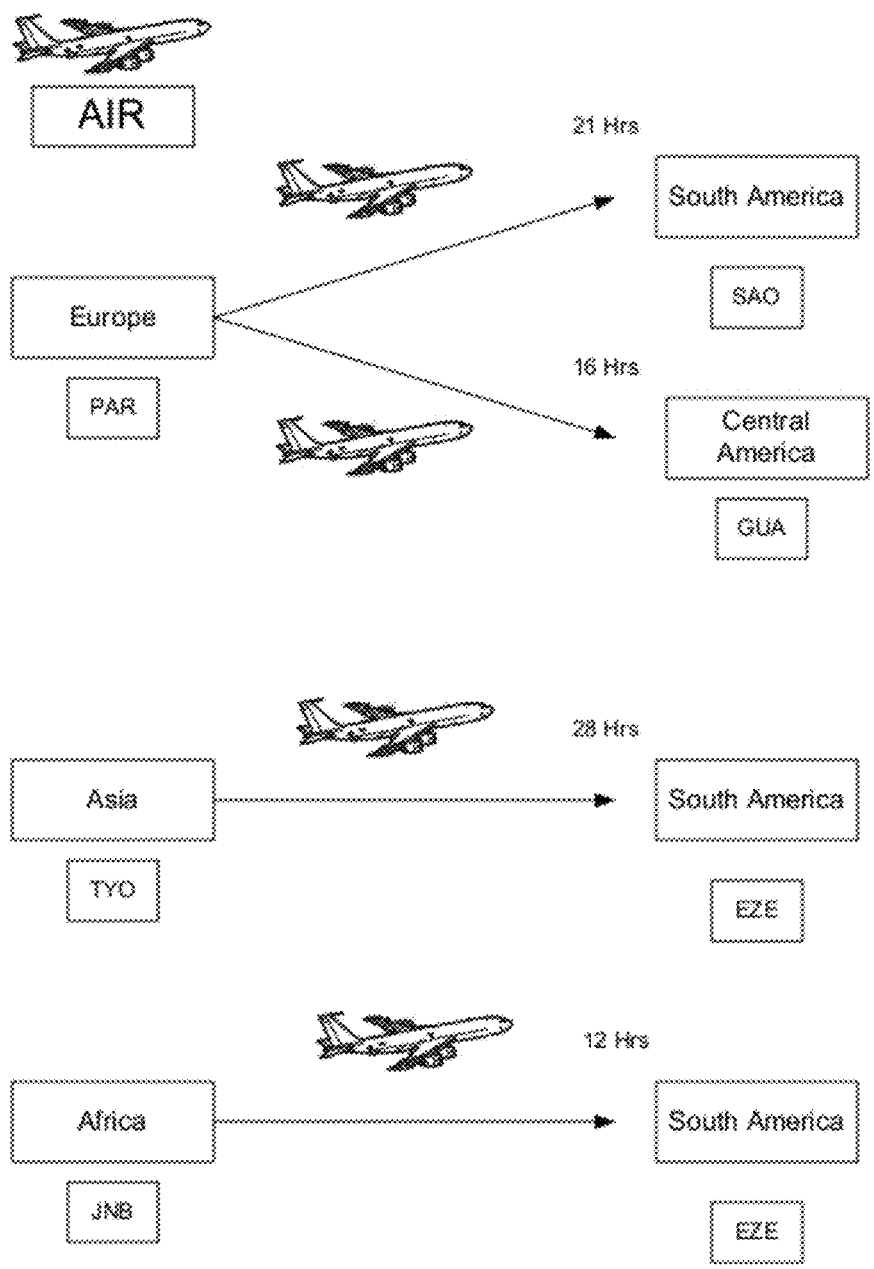
FIG. 38 America—Y_CDIF.

FIG. 38 illustrates the primary logistical links for intercontinental commerce originating from the Supra Region with destination in America region 2 (South) or 3 (Central). In each case the point of origin is located within the Supra Region (=1) and then shows the associated time delays for Y_CDIF express shipping to different continental regions that are directly available.

Figure 39:
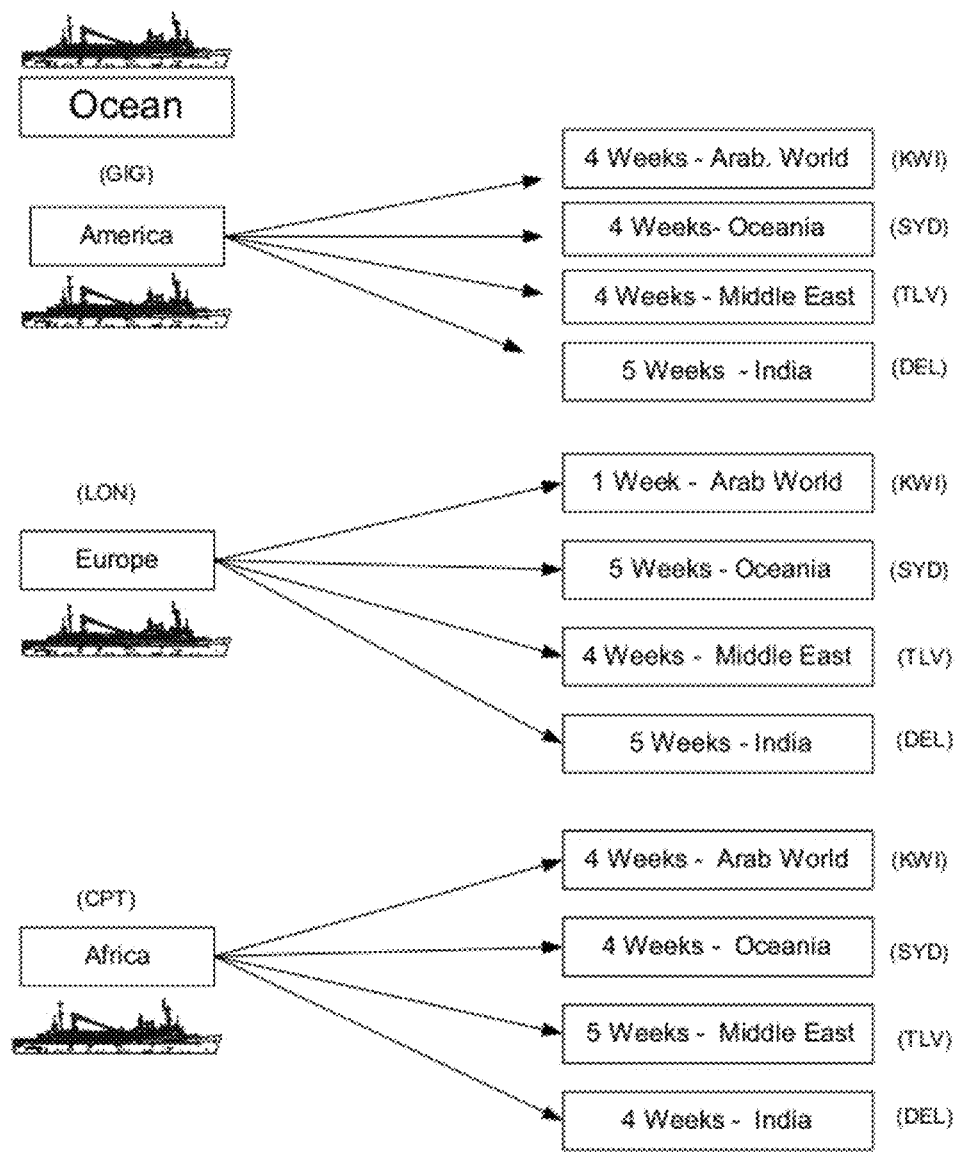
FIG. 39 Asia—X_FOB.

FIG. 39 illustrates the primary logistical links for intercontinental commerce originating from the Supra Region with destination in Asia region 2 (Arab World), 3 (Oceania), 4 (Middle East), or 5 (India). In each case the point of origin is located in the Supra Region (=1) and shows the associated time delays for X_FOB shipping to different continental regions that are directly available.

Figure 40:
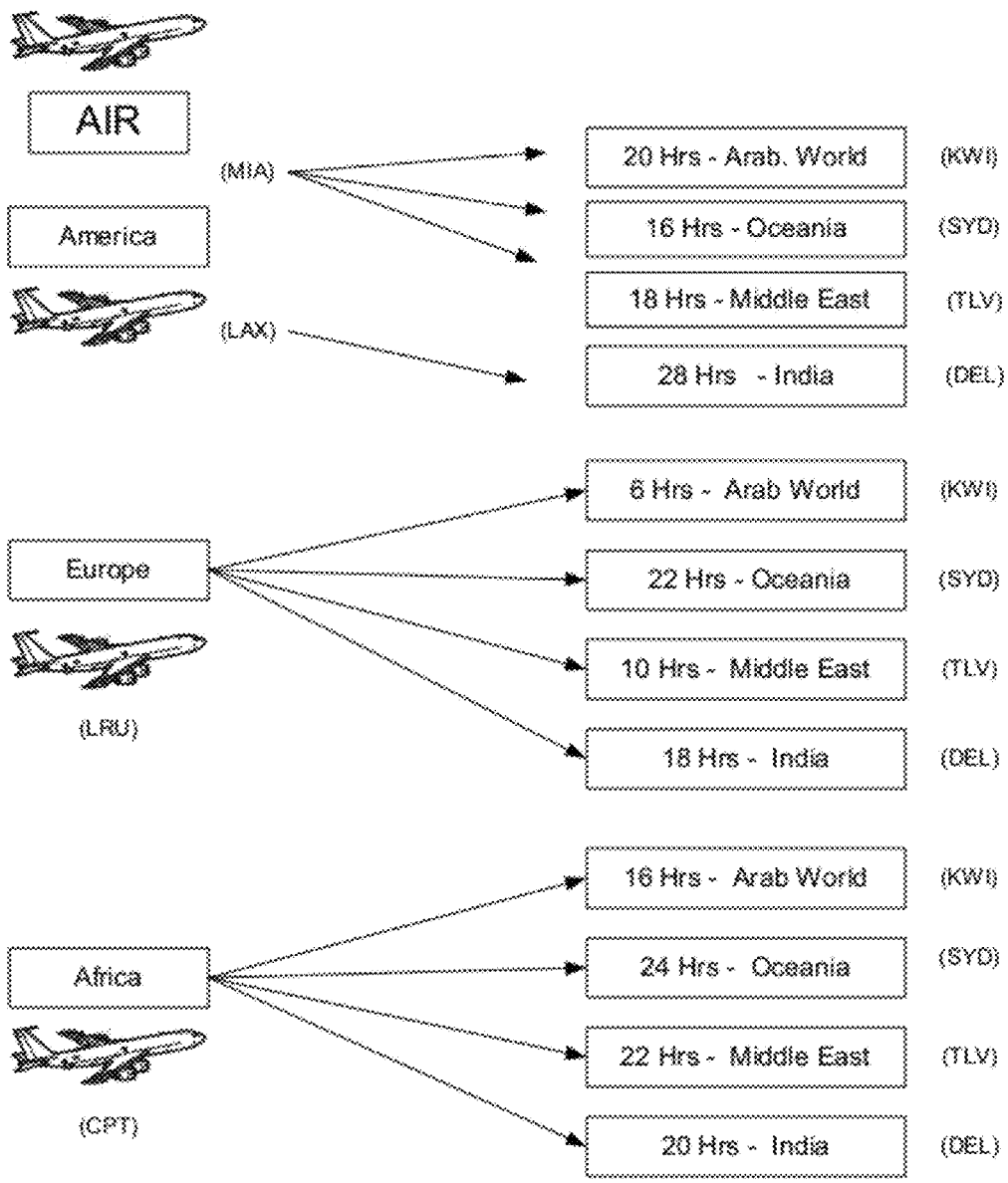
FIG. 40 Asia—Y_CDIF.

FIG. 40 illustrates the primary logistical links for intercontinental commerce originating from the Supra Region with destination in Asia region 2 (Arab World), 3 (Oceania), 4 (Middle East), or 5 (India). In each case the point of origin is located in the Supra Region (=1) and shows the associated time delays for Y_CDIF express shipping to different continental regions that are available.

Figure 41:
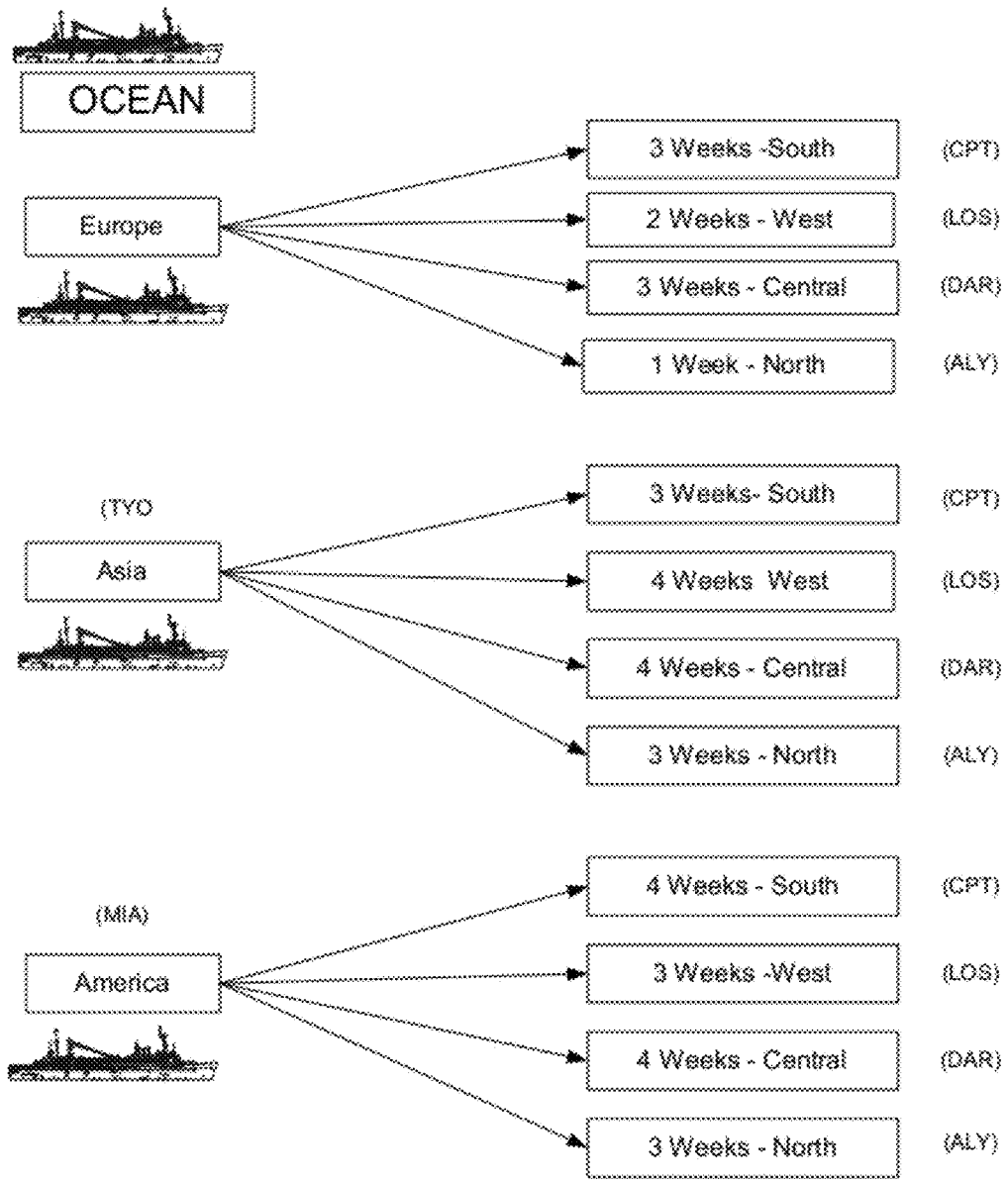
FIG. 41 Africa—X_FOB.

FIG. 41 illustrates the primary logistical links for intercontinental commerce originating from the Supra Region with destination in Africa region 1 (South), 2 (Western), 3 (Central), or 4 (North). In each case the point of origin is located within the Supra Region (=1) and then shows the associated time delays for X_FOB shipping to different continental regions that are directly available.

Figure 42:
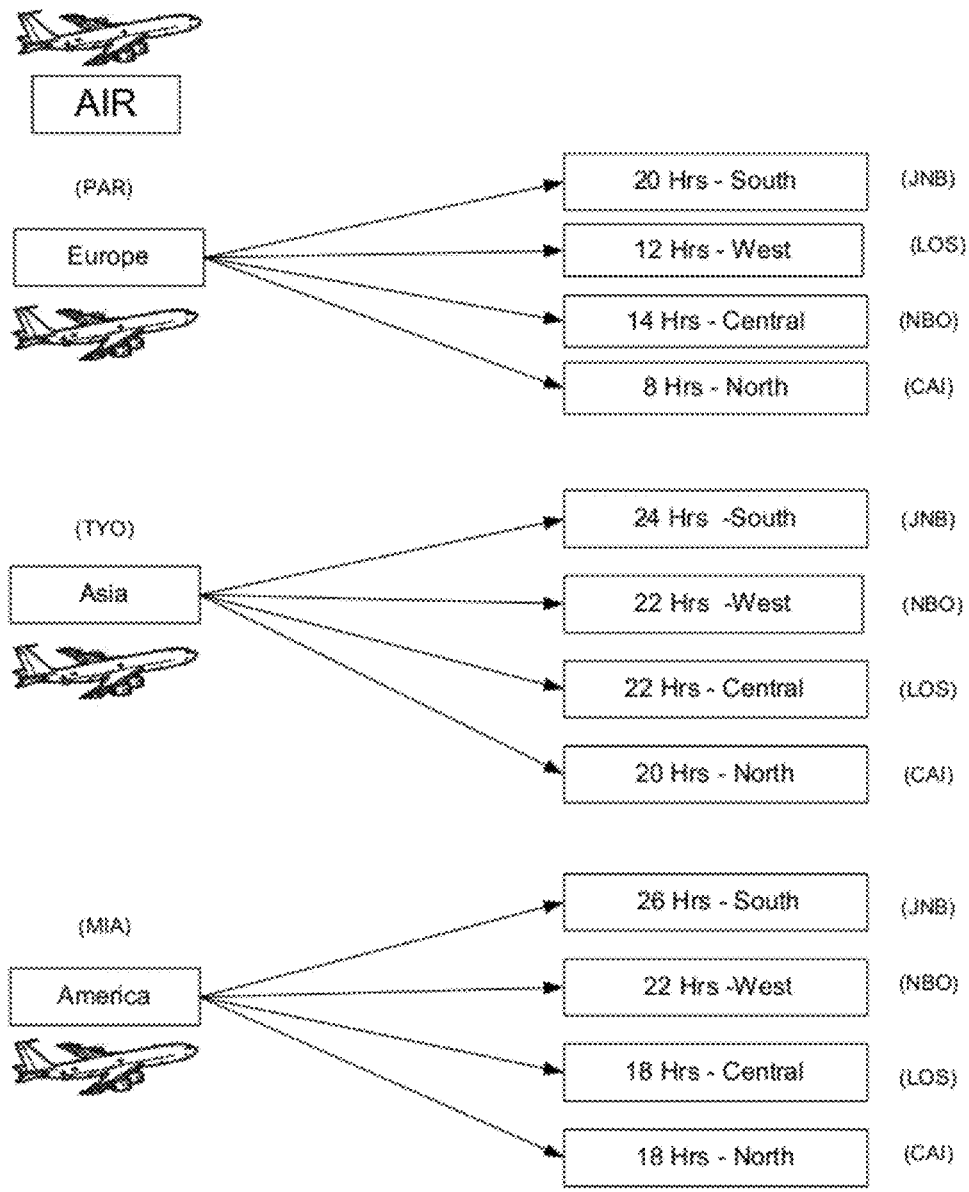
FIG. 42 Africa—Y_CDIF.

FIG. 42 illustrates the primary logistical links for intercontinental commerce originating from the Supra Region with destination in Africa region 1 (South), 2 (Western), 3 (Central), or 4 (North). In each case the point of origin is located with the Supra Region (=1) and shows the associated time delays Y_CDIF express shipping to different continental regions that are available.

Figure 43:
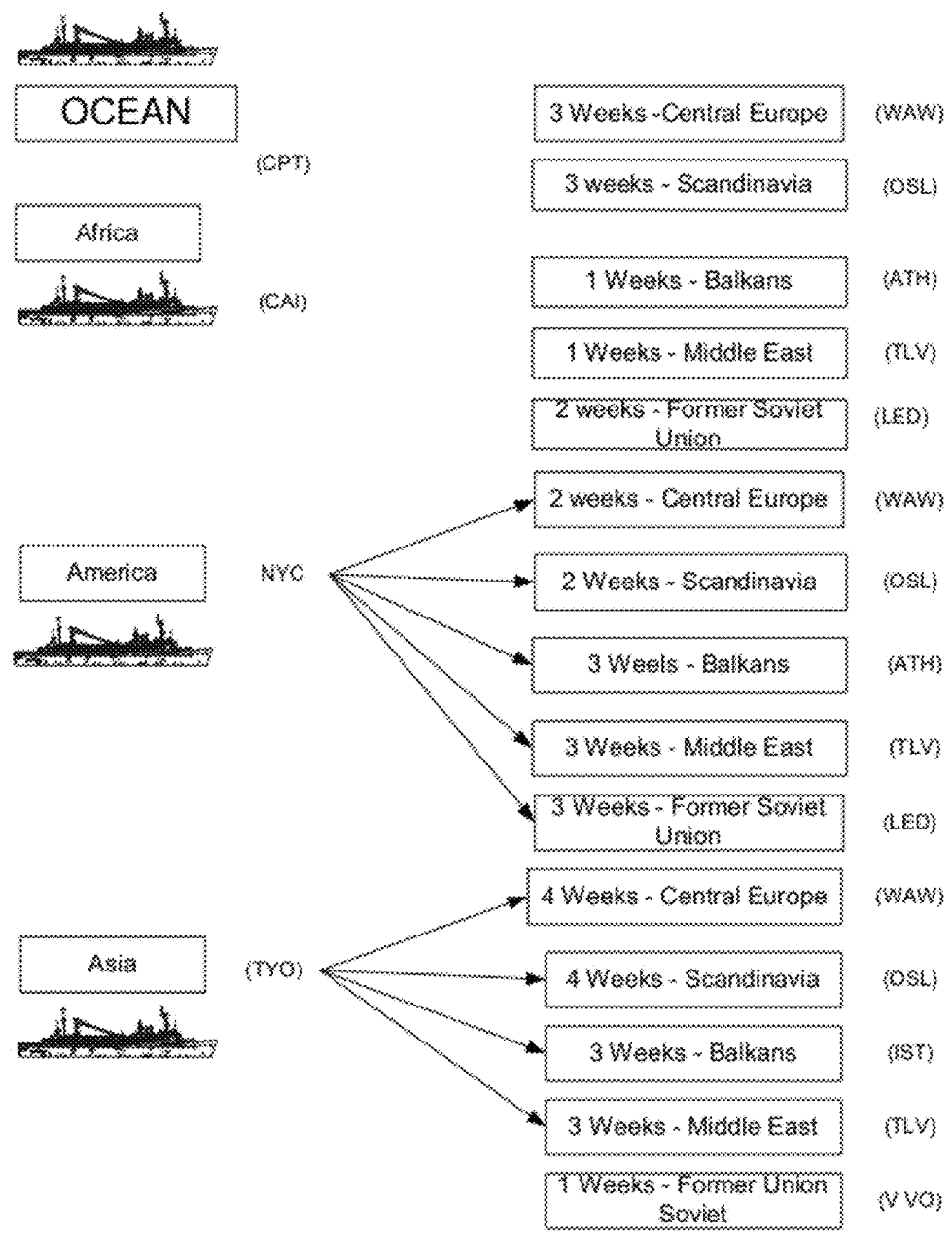
FIG. 43 Europe—X_FOB.

FIG. 43 illustrates the primary logistical links for intercontinental commerce originating from the Supra Region with destination in Europe region 2 (Central), 3 (Scandinavia), 4 (Middle East), or 5 (Former Soviet Union). In each case the point of origin is located within the Supra Region (=1) and shows the associated time delays for X_FOB shipping to different continental regions that are directly available.

Figure 44:
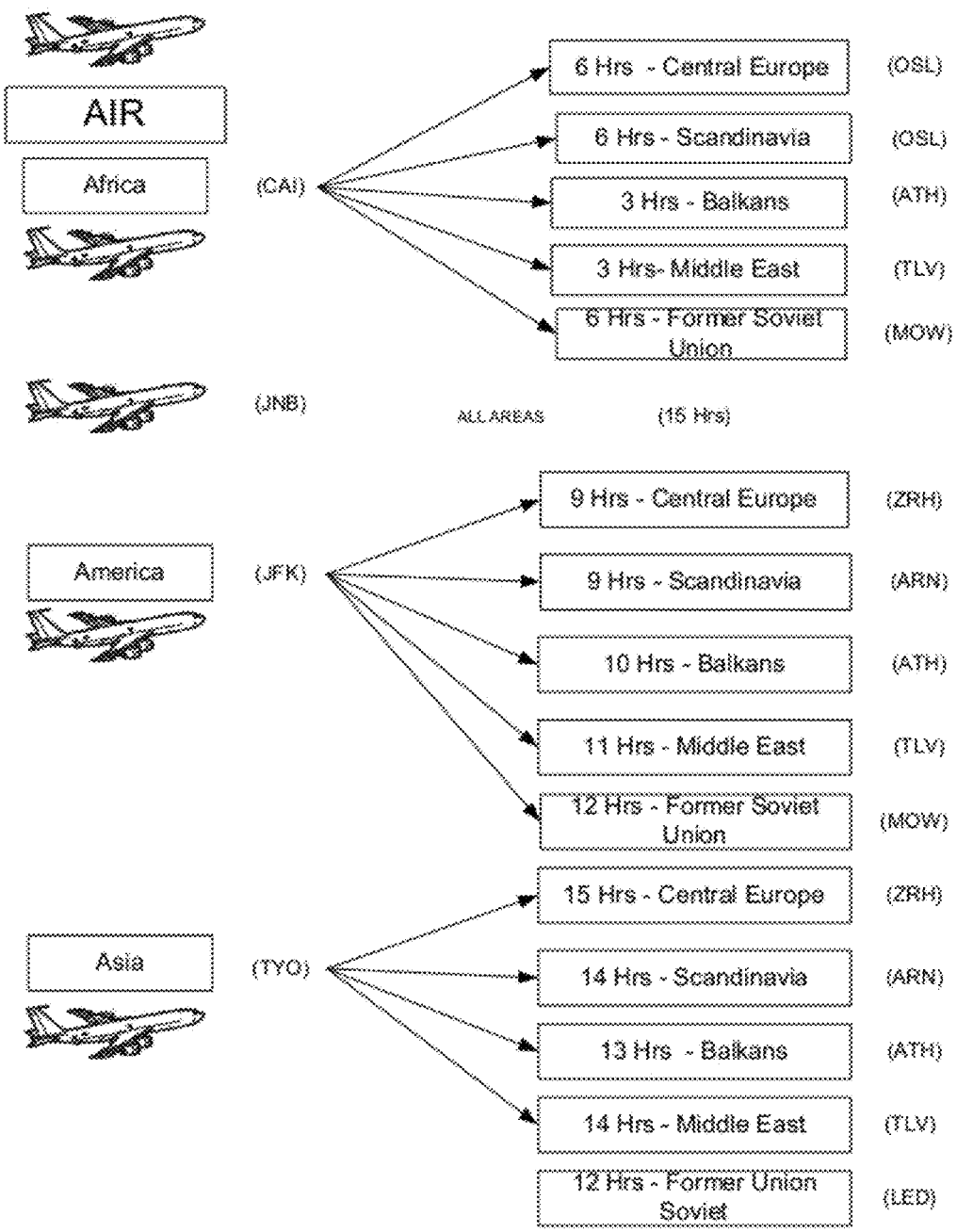
FIG. 44 Europe—Y_CDIF.

FIG. 44 illustrates the primary logistical links for intercontinental commerce originating from the Supra Region with destination in Europe region 2 (Central), 3 (Scandinavia), 4 (Middle East), or 5 (Former Soviet Union). In each case the point of origin is located within the Supra Region (=1) and then shows the associated time delays for Y_CDIF express shipping to different continental regions that are directly available.

Figure 45:
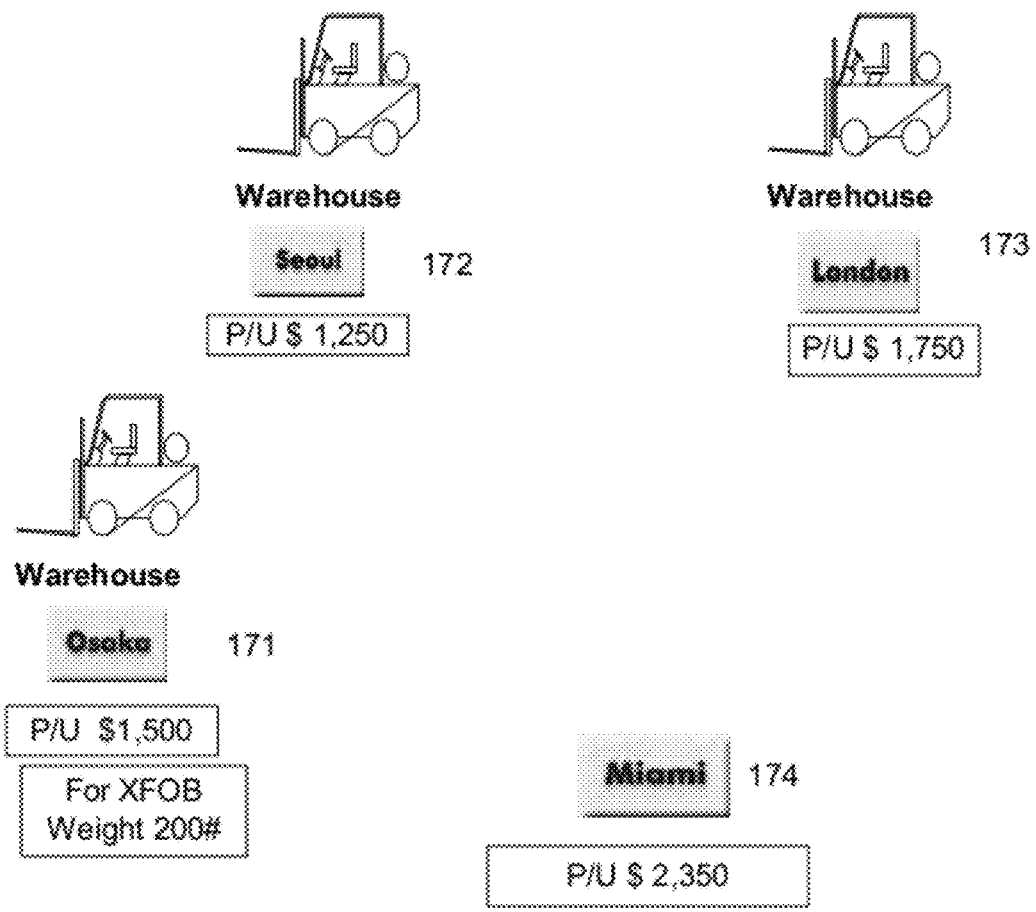
FIG. 45 FOB.

FIG. 45 illustrates a system replies end users for a given product at the different U-Commerce Warehouses (171-174) that is to be shipped via Miami. For this product that weights 200 lbs, the cheapest FOB price is located in Seoul, Korea for $1,250 per unit.

Figure 46:
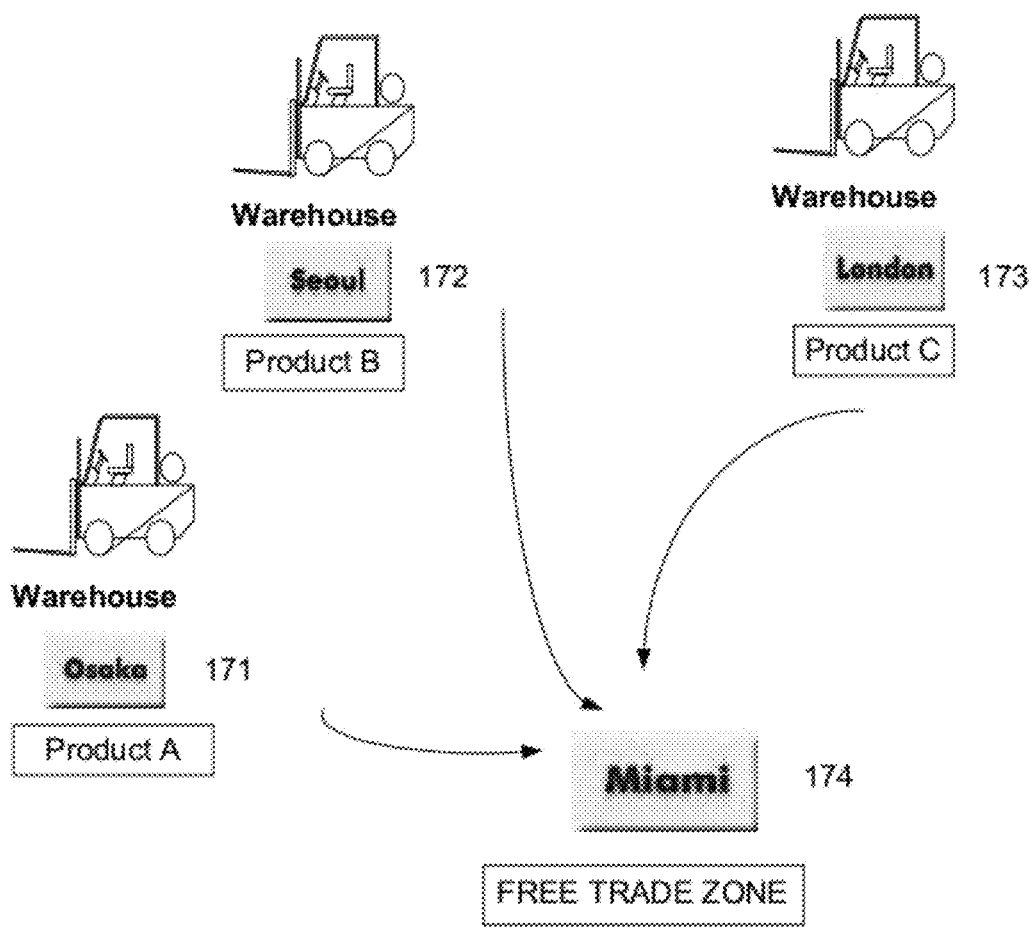
FIG. 46 INBOUND.

FIG. 46 illustrates a system consolidates multiple shipments to the Free Trade Zone in Miami, USA. The end user pays an additional $300+ in US Customs fees to perform such an inbound service.

Figure 47:
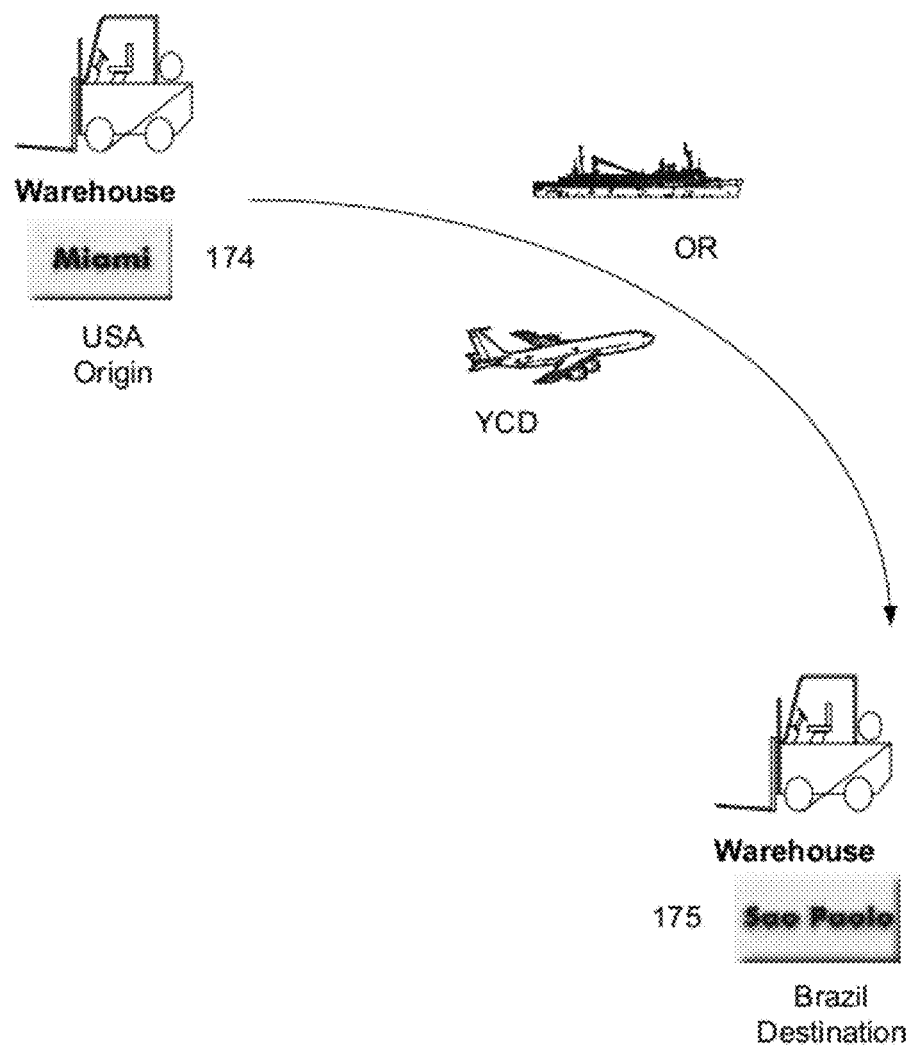
FIG. 47 C&F (Cargo and Freight)

FIG. 47 illustrates the method of purchasing a product through U-Commerce Warehouse FOB located in Miami, Fla. USA (174). Then the merchandise is shipped C&F to its final destination Sao Paulo (175).

Figure 48:
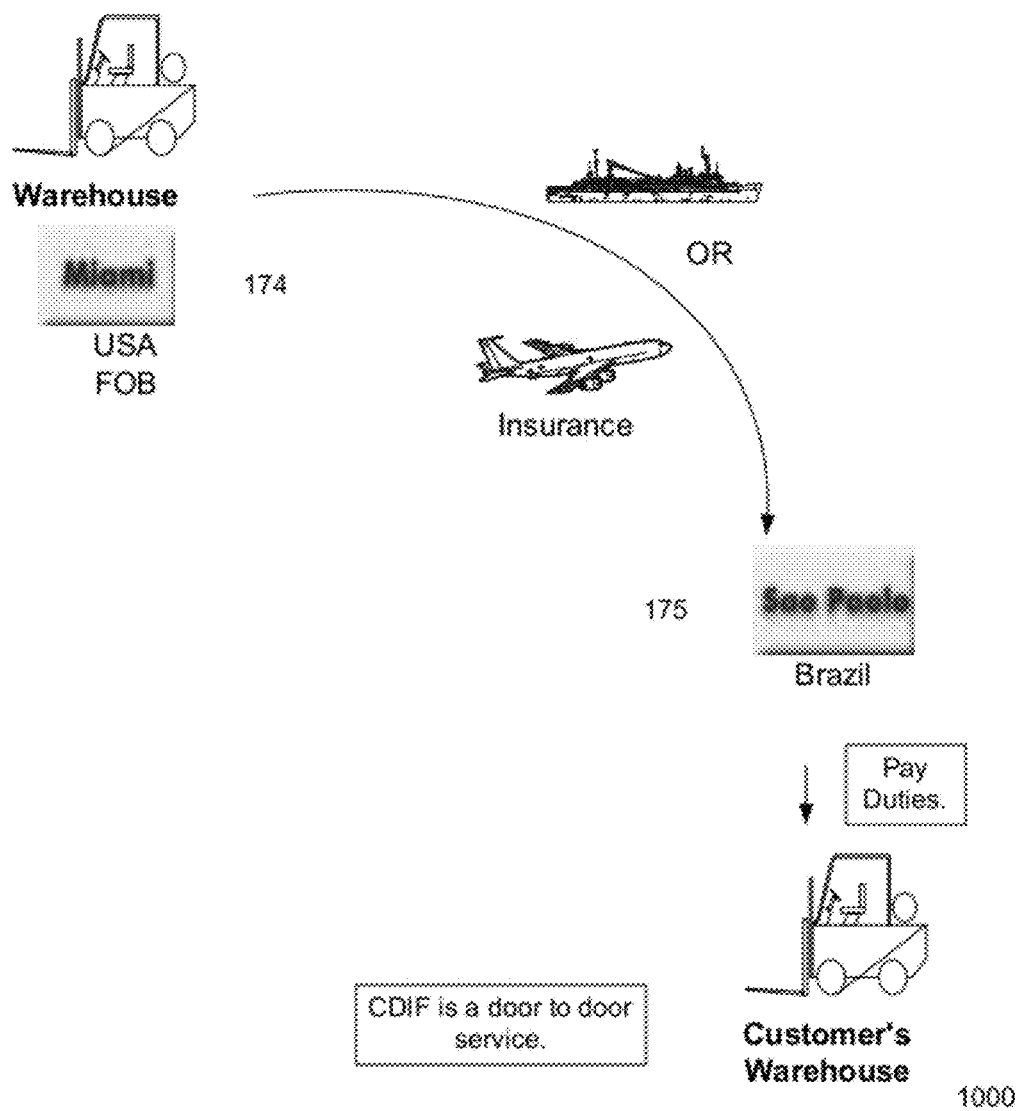
FIG. 48 CDIF (Cargo Duties Insurance and Freight)

FIG. 48 illustrates insured merchandise being shipped CDIF from the U-Commerce Warehouse (174) to the final destination port of Sao Paolo (175). Upon arrival duties are paid, and then the merchandise is delivered at the customer's warehouse (1000).

Figure 49:
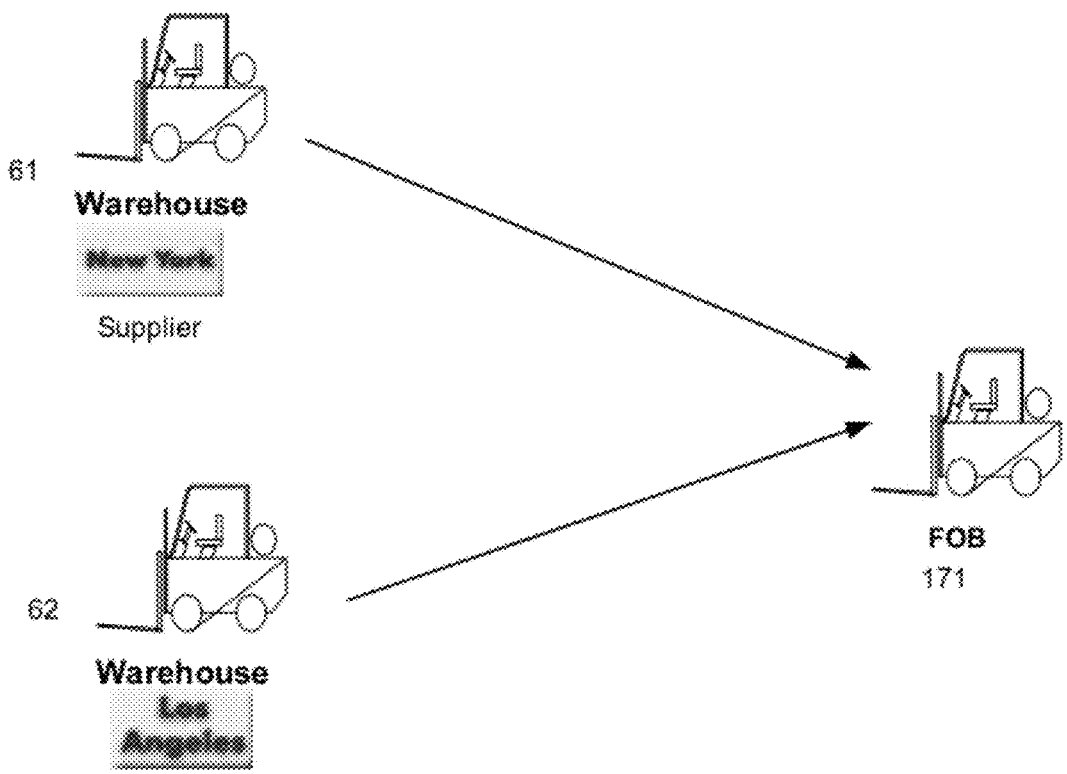
FIG. 49 White Label.

FIG. 49 illustrates the method of offering via an U-Commerce Warehouse (171) located in Miami, Fla. USA merchandise from different Suppliers (61-62). The end user selects the shipping method. Ground or White Label 2-4 weeks, Green Label 3-5 days, Blue Label 2 days, Red Label Next Day, Black Label Next Flight, or Gold Label Emergency Delivery.

Figure 50:
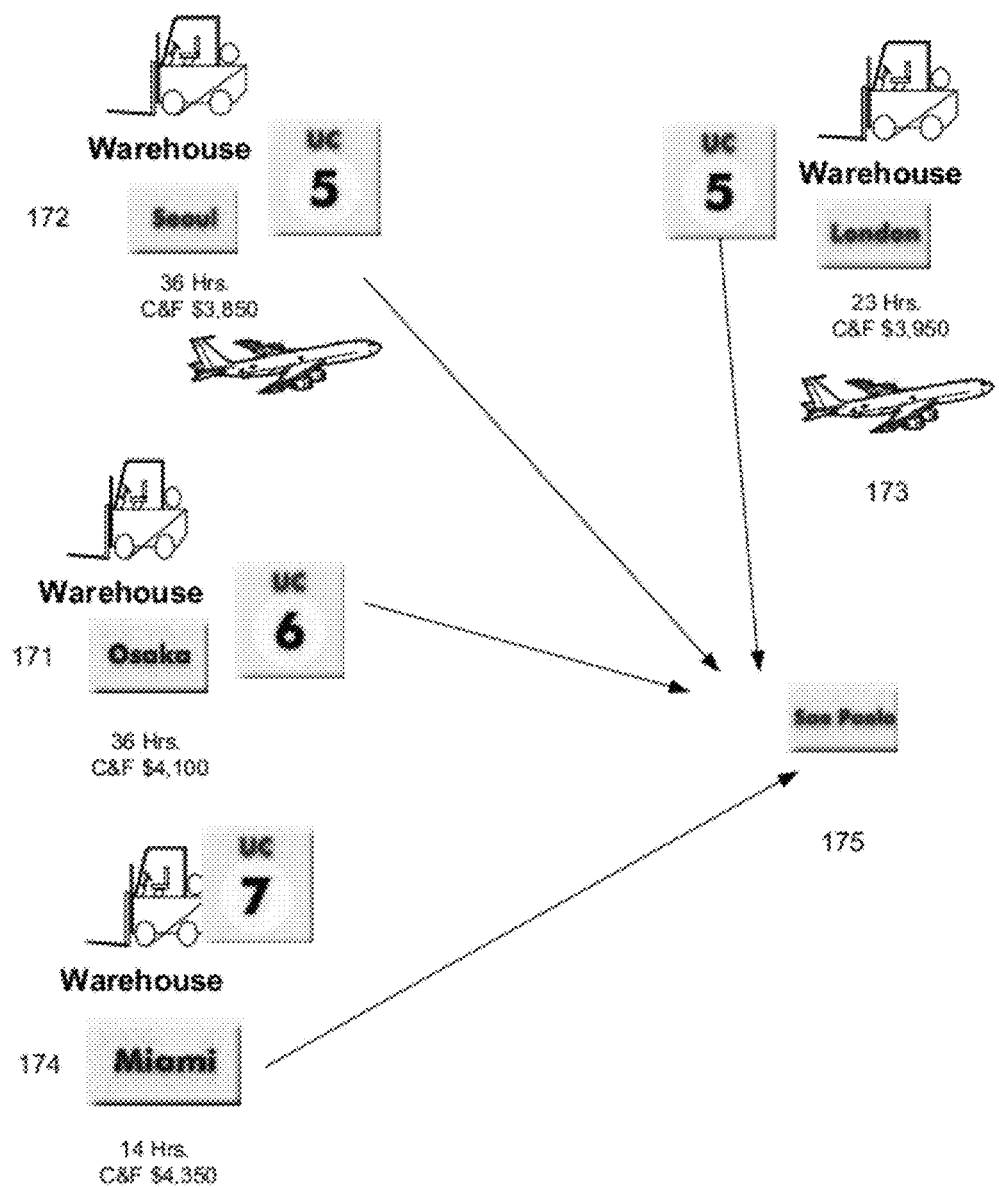
FIG. 50 Gold Label (Emergency Express)

FIG. 50 illustrates how the system determines the point of origin for C&F shipment. In this example U-Commerce Warehouse (171) Miami, Fla. USA, (172) Osaka, Japan, (173) Seoul, Korea, and (174) London, UK have available an emergency spare part to be shipped to Sao Paolo Brazil (175). In this case the delay from (173-174) Far East Asia have a 36 hrs delay, (174) Europe has a 23 hrs delay, and (171) the US has a delay of 14 hrs. The system selects Miami even though it is more expensive, since it has the highest U-Commerce Value of 7 and the least delay of 14 hrs.

UCommerce 2010: the artificial intelligence programming must anticipate demand and stock its warehouses with optimal quantities of inventory in hand so that the lowest delay UCommerce warehouse also has the lowest P/U at all times.

FIG. 51 illustrates the X_FOB multiplier table that U-Commerce uses to adjust worldwide product availability with no delays. X_FOB adjustments are based on Ocean shipments and are expressed in days.

FIG. 52 illustrates the Y_CDIF multiplier table that U-Commerce uses to adjust CDIF shipment to the destination port. Y_CDIF adjustments are based on Air shipments and are expressed in hrs.

FIG. 53 illustrates domestic and ocean method priority levels. Where the best is Inventory In Hand and has no delay and a UC Value of 0. The worst type of availability is 3 months, where the supplier must first manufacture the product and then ship the merchandise via regular ocean service, and has a UC Value of 23.

FIG. 54 illustrates actual door-to-door delivery parameters. The system assumes one day in delay is lost to perform customs.

FIG. 55 illustrates the UC value multiplier to further adjusted raw delays. E.g. sending an inventory in hand product from Los Angeles to Miami has a delay of 6 hrs and a UC Value of 10. The system compares the shipment of the same product via domestic rush when no inventory is in hand UC Value=8. The system calculates the shipment delay to have ((6 hrs LAX-MIA+4 hrs domestic rush)*1.1) or 11 hrs.

Figure 56:
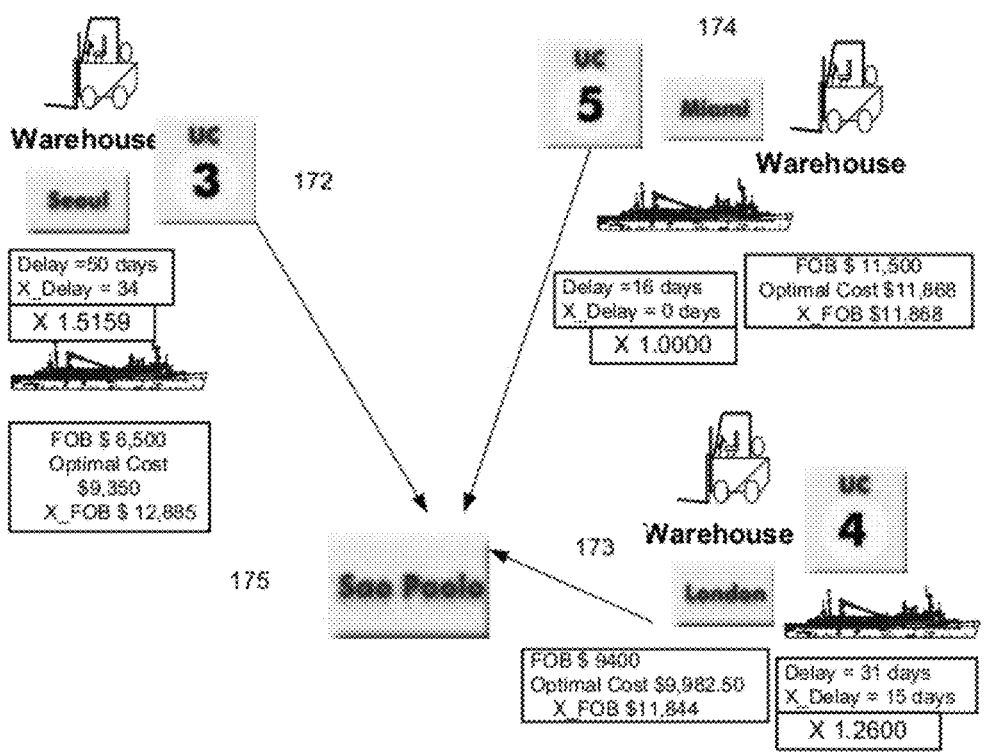
FIG. 56 Example #1: System X_FOB calculations.

FIG. 56 illustrates how the system determines the X_FOB price. 1) Determine the shortest delay path to Sao Paolo, Brazil. In this example the lowest delay=16 days Miami to Sao Paolo. 2) Subtract from each delay value 16 days. The X_FOB is useful when then end user wants the merchandise to arrive ASAP via Ocean. The optimal solution consist C&F from Seoul (172) to Sao Paolo @ $8,500 FOB P/U delivered in 50 days. While the best satisfying solution is delivery from London (174) to Sao Paolo (175) @ $11,844 X_FOB P/U delivered in 31 day. In this example none of the warehouses have Inventory In Hand and must request merchandise from local suppliers. The end user is willing to pay an additional $9,982-$9,350 or $642 to receive the merchandise 19 days earlier. E.g. the end user want the merchandise immediately, the end user would pay an additional $11,868-$9,350 or $2,538 to receive the merchandise 34 day earlier, obviously then Air method calculations would be better . . . .

Nevertheless: UCommerce 2010, the artificial intelligence programming must anticipate demand and must buy using economies of scale to always have the lowest delay warehouses with ample inventory in hand and the best P/U.

Figure 57:
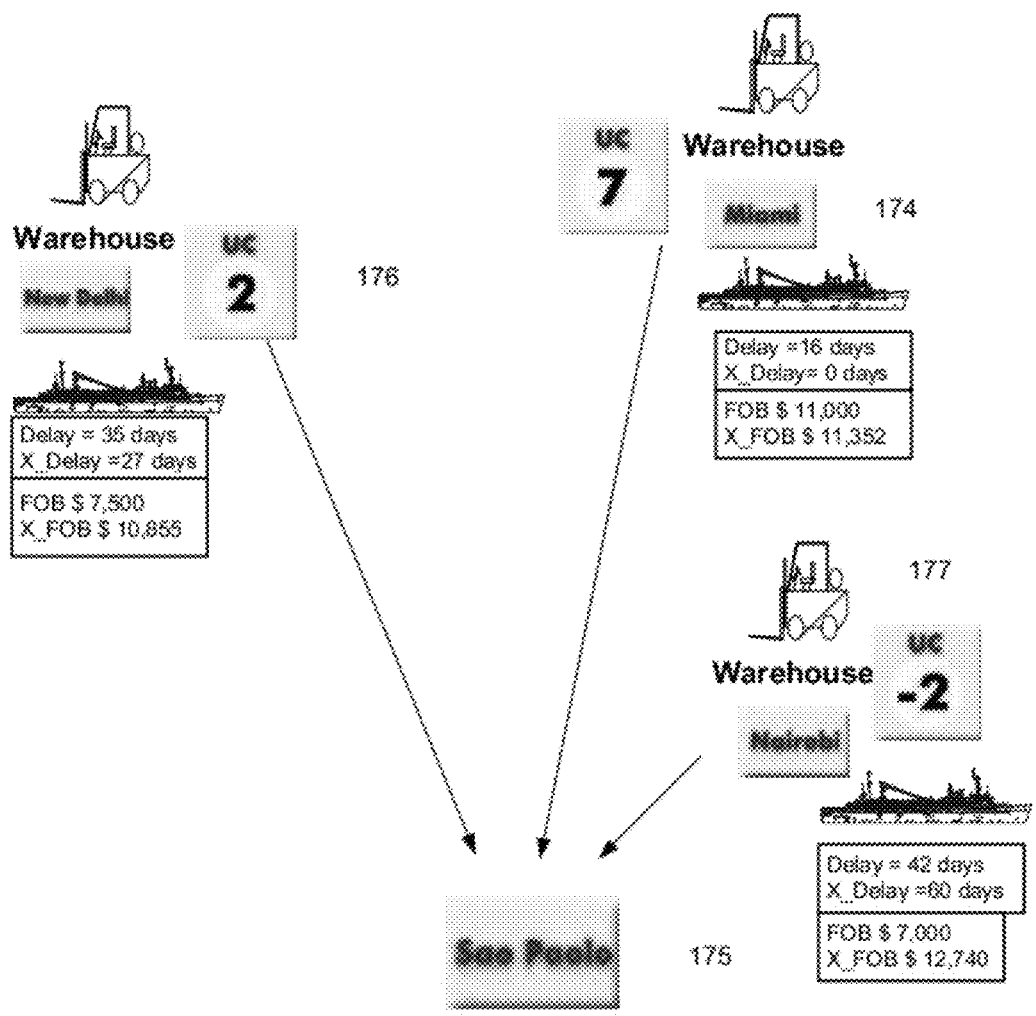
FIG. 57 Example #2: System X_FOB calculations.

FIG. 57 illustrates how the U-Commerce supplier system uses X_FOB calculations to determine the most cost and time efficient method of delivering goods and service from different origination ports such as New Delhi, India (177), Miami, USA (174) and Nairobi, Kenya (176). The system identifies the safest route to be between Miami, USA and Sao Paolo Brazil (175). The system will recommend the New Delhi, India route since it is the most cost efficient. X_FOB calculates routes via ocean shipping method. E.g. none of the warehouses have Inventory In Hand and must request merchandise from local suppliers. Delay is expressed in Days.

Figure 58:
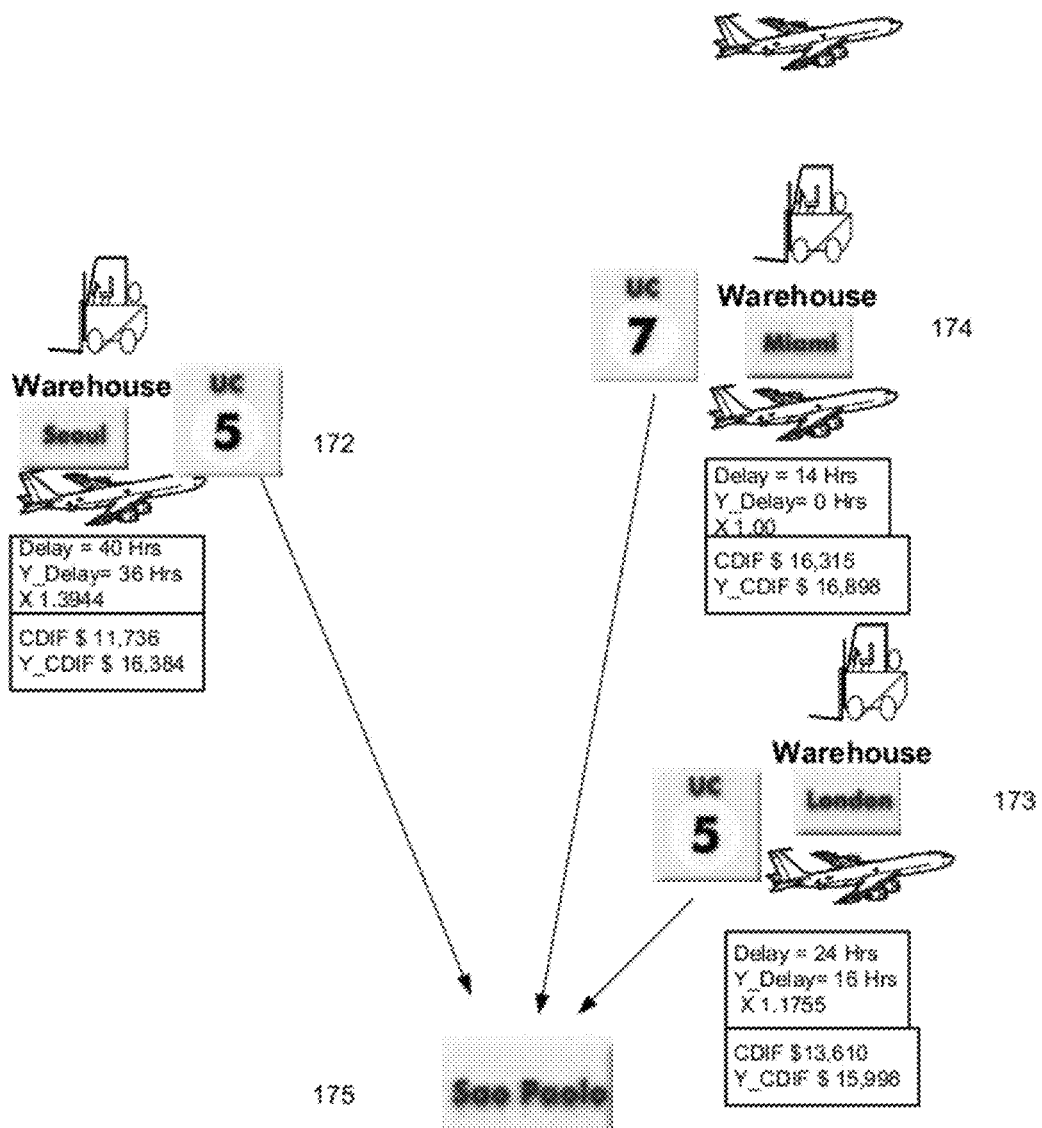
FIG. 58 Black Label Y_CDIF shipments.

FIG. 58 illustrates how the U-Commerce supplier systems determines the best Y_CDIF calculation using Black Label Next Flight service from Seoul Korea (172), Miami, USA (174) and London, UK (173) to the destination point of Sao Paolo Brazil (175). In this case the fastest method is Miami-Sao Paolo with an intrinsic delay of 14 hrs. The system selects to ship the goods and service from UK since it has the lowest price of Y_CDIF value of $15,998 after paying duties and insurance. Delay is expressed in hours.

Shipping Reference Table

| | Delay Multiplier | Available | Inventory In Hand |
| --- | --- | --- | --- |
| Ocean | 0.35 | $35 | $25 |
| White Label | 0.60 | $75 | $50 |
| Green Label | 0.85 | $150 | $100 |
| Blue Label | 0.95 | $250 | $200 |
| Red Label | 1.00 | $500 | $400 |
| Black Label | 1.05 | $1,000 | $850 |
| Gold Label | 1.15 | $1,500 | $1,000 |

Figure 59:
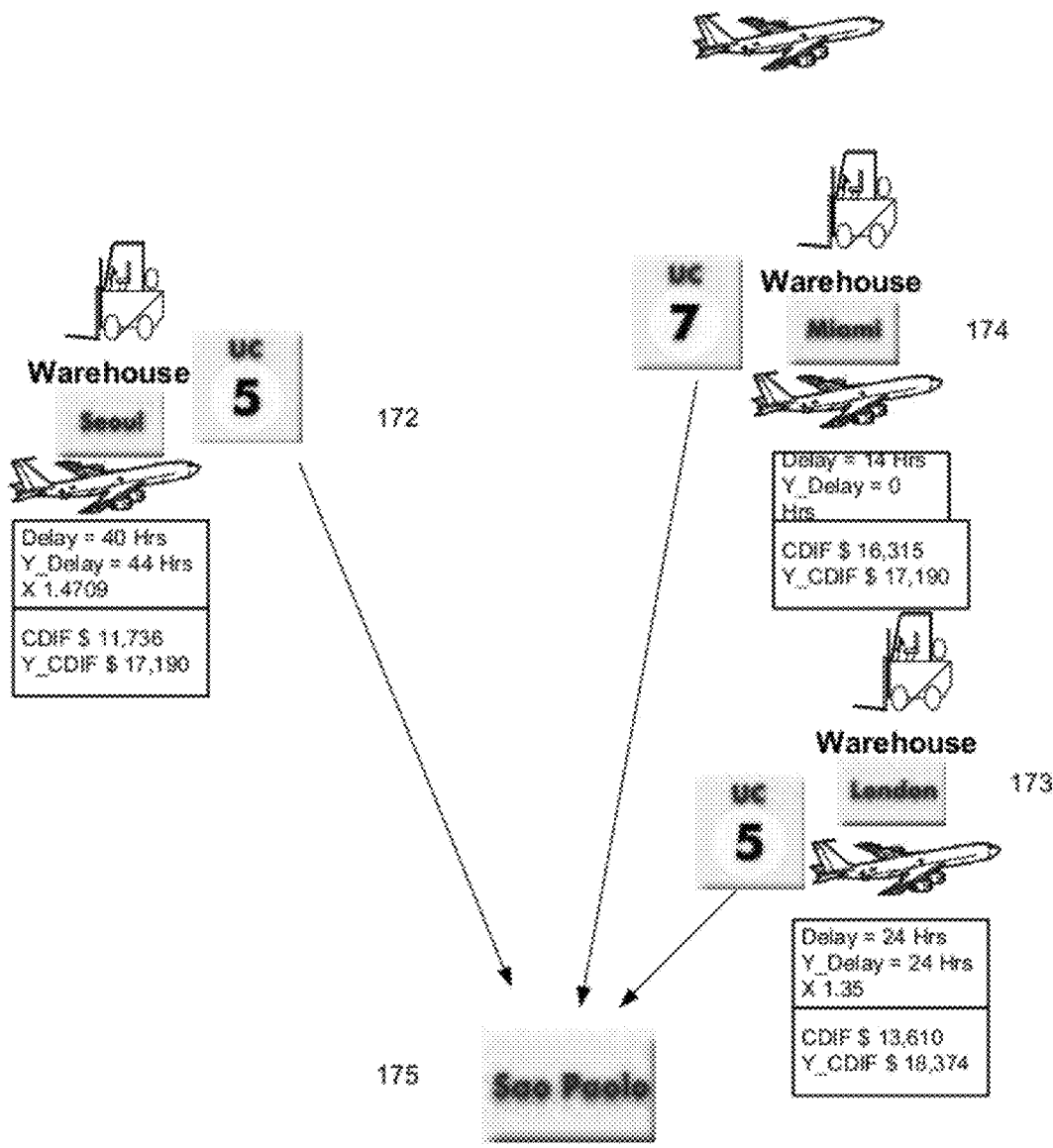
FIG. 59 Gold Label Y_CDIF shipments.

FIG. 59 illustrates how the U-Commerce supplier systems determines the best Y_CDIF calculation using Gold Label Emergency Delivery from Seoul Korea (172), Miami, USA (174) and London, UK (173) to the destination Sao Paolo Brazil (174) within 36 hrs. In this case the fastest method is Miami-Sao Paolo with an intrinsic delay of 14 hrs. The system selects to ship the goods from Miami, Fla. USA since it allows the Emergency Spare Part to be delivered to the end user door to door. Shipments from Korea are made non-applicable since their delay value exceeds 36 hrs. Note: in the same example should all of the warehouses have Inventory In Hand with a UC value of 10 then Korea's Y_Delay would be 36 hrs and the system would select to ship the goods from Seoul, Korea to Sao Paolo, Brazil.

Figure 60:
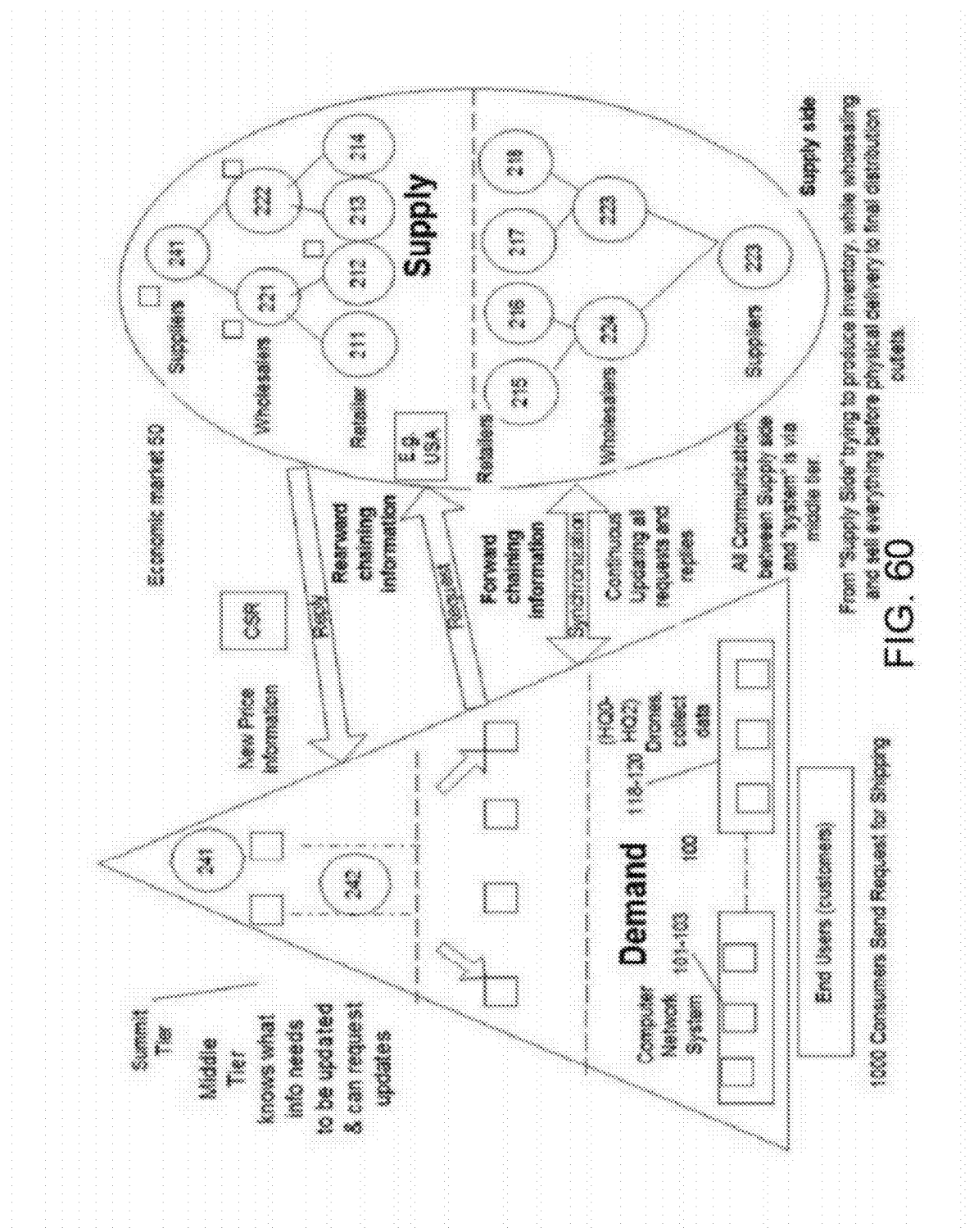
FIG. 60 UCommerce System Overview.

FIG. 60 illustrates the overall U-Commerce supplier system architecture: the system is divided into the following main sections: (1) Supplier system (100); (2) Retailer (200), Wholesalers and Retailer located in different geographical locations. End users interact with both the supplier and organizational provisioning systems; and (3) Internet (50) is the medium of choice of the environment for communication.

In the spirit of supply side economics, end users collectively constitute "demand," and the supplier system tries to identify critical path condition to delivery if goods produced by manufacturers constitute "supply." The system, by using the Intelligent Inventory Delivery method, has access to the information of all the inventory of each node. U-Commerce reviews multiple common denominator orders with the same tandem or destination to make economies of scale type purchase, lowering the overall cost to the consumer. As the system (100) gathers changes in the environment with regard to supply (200), the appropriate retail, wholesaler, and/or supplier node information gets updated.

Detailed Description of the Preferred Embodiments Respective to XCommerce

Ser. No. 11/584,941

Figure 61:
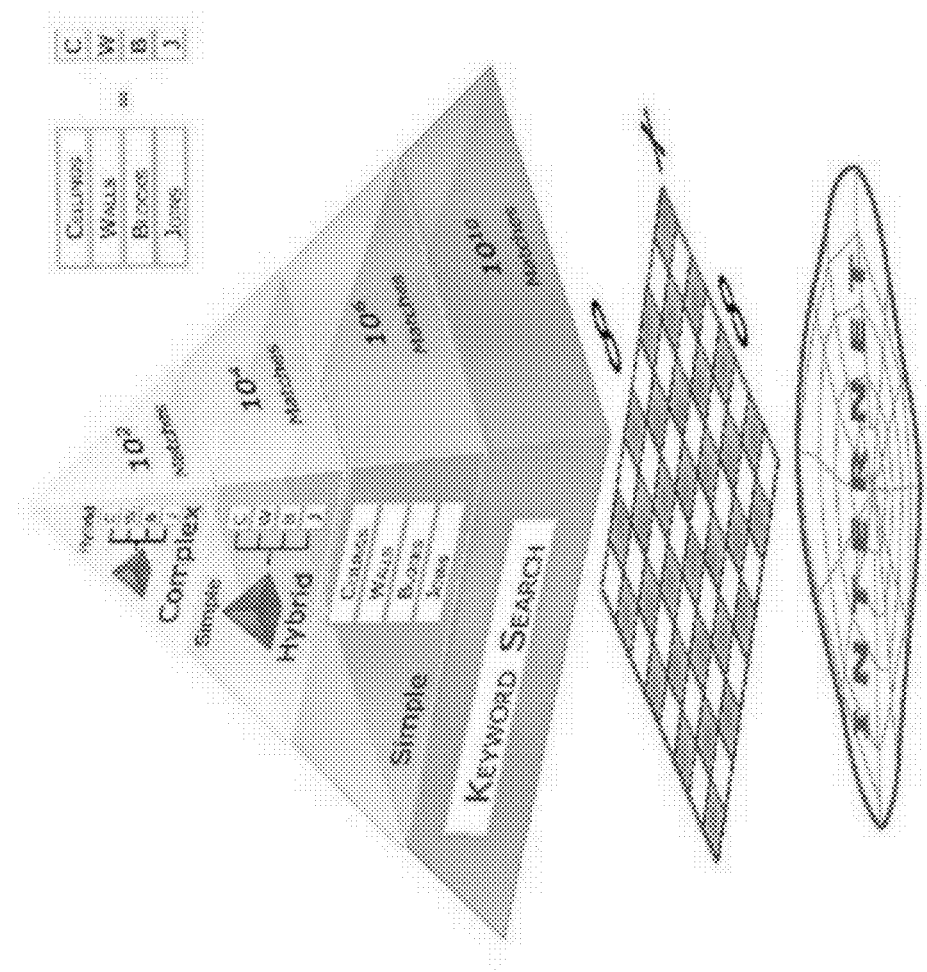
FIG. 61 Informational Pyramid Structure.

FIG. 61: is a schematic representation of the Information Pyramid Structure that interacts with the environment or Internet. The supplier system simulates the entire superset of valid KEYWORD regular expression requests, and converts the results in Environmental Bitmap map data, so that future request are made absent of the Browser Engine supercomputer (8×8) cluster searching capabilities. The system measures each KEYWORD regular expression magnitude or quantity of hits belonging to a query.

For a vague KEYWORD search the system assumes, that a large number of valid hits implicitly exists such as 10,000, 000,000 making the value of the response meaningless.

For a vague KEYWORD search, the system associates them to a Simple Pyramid Structure search that filters down the magnitude of vagueness by a factor of 10,000. The process of improving the Informational Entropy begins by filtering the vague KEYWORD search by reading, comparing validating the semantic structure of the content of the all the responses and not just the highest page ranks. The supplier system measures the value of the content by comparing the quantity and quality of Simple Joins, Blocks, Ceiling and Walls, which are another name for collections of words and grammatical rules that are used to write properly in a given language.

For a concise KEYWORD search the system assumes, that a medium number of valid hits implicitly exists such as 1,000,000 making the value of the response virtually meaningless. For a concise KEYWORD search, the system associates them to a Hybrid Pyramid Structure search that filters down the magnitude of vagueness by a factor of 100. The process of improving the Informational Entropy continues by filtering the concise KEYWORD search by further reading, comparing validating the semantic structure with their association to higher magnitude words. The supplier system further measures the value of the content by comparing the quantity and quality of Hybrid Joins, Blocks, Ceiling and Walls, which consists of less common word collections, geospatial data, antonyms and synonyms.

For a precise KEYWORD search the system assumes, that a small number of valid hits implicitly exists such as 10,000 making the value of the response discrete. For a precise KEYWORD search, the system associates them to a Complex Pyramid Structure search that filters down the magnitude of vagueness by a factor of 100. The process of improving the Informational Entropy continues by filtering the precise KEYWORD search by further reading, comparing validating the semantic structure with their association to higher magnitude words. The supplier system further measures the value of the content by comparing the quantity and quality of Complex Joins, Blocks, Ceiling and Walls, also analyzes all the HTML information, and associated links to make sure the content is not a spam or viral contamination. Then system finds the optimal KEYWORD search by using the content, page and security value achieve Informational Entropy and derive the top 10 most satisfying results.

The condensed and simplified FIG. 62 to FIG. 81 from related art show the basic concepts that enable the Simulation Network to be partitioned into three tiers of switches, where each switch is an independent component of the overall Simulation Network and collectively work together as a single Super Switch Supercomputer that is able to process, standardize, transform, clean and purify all the information, move the data from origin to destination in real time, and have the necessary processing power to control, coordinate and manage the Simulation Network as if the entire telecommunication network was a single Network Platform Equipment being capable of handling millions of fixed, wireless and IP telephony subscribers. The Simulation Network requires at least one client and one server nodes for each switch, and consists of at least one tier of switches having one or more switches.

Figure 62:
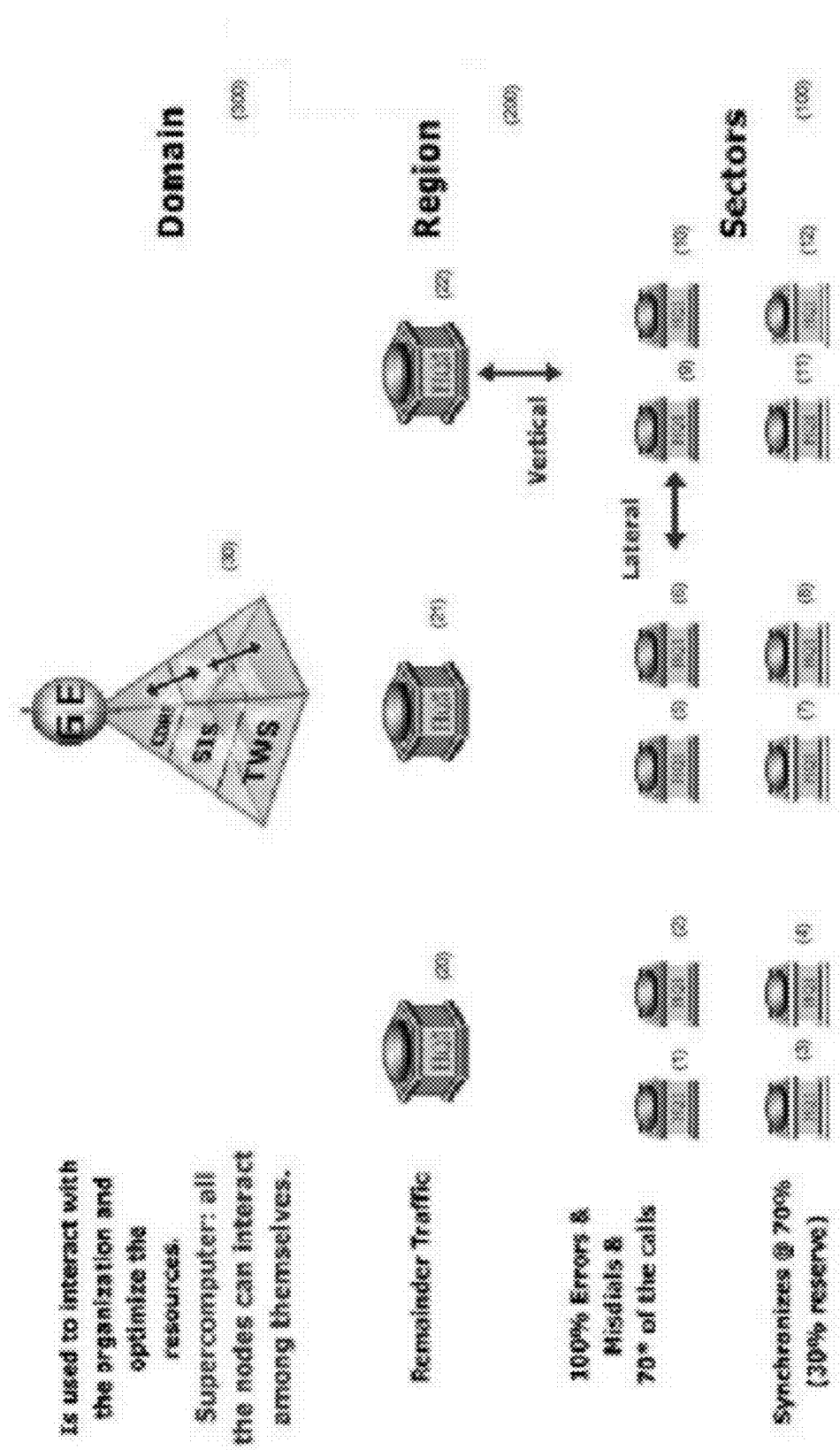
FIG. 62 Managerial Pyramid Switch—Architecture.

FIG. 62: is a diagram of the Computer Network System commercially known as the Managerial Pyramid Switch and shows how a telecommunication network domain (300) is subdivided in a plurality of Regions (200) that are further partitioned in Sectors (100). For each Sector (100) of the network a lower tier switch (1 to 12) consists in a plurality of nodes that map and simulate all of the activities of the Fixed, IP Telephony, and Wireless Network Platform Equipment that performs local traffic for a PTT. E.g. the lower tier switch working at 70% kept 30% of their resources to perform lateral and vertical synergy and is responsible for accounting all of the errors, misdials and 70% of the connected calls, in particular all of the Intra LATA calls. For each Region (200) of the network, a middleware tier switch (20 to 22) consists in a plurality of nodes that match/merge all of the calls within a specific network such as Fixed, IP Telephony or Wireless and any Regional Inter LATA hybrid call. For the entire Domain (300), a summit tier switch (30) is used to optimize resources of the system and connect the complex and international calls. The summit tier switch simulation network duplicates the environment and fetches each end user with the latest information of the organization telecommunication network domains.

Figure 63:
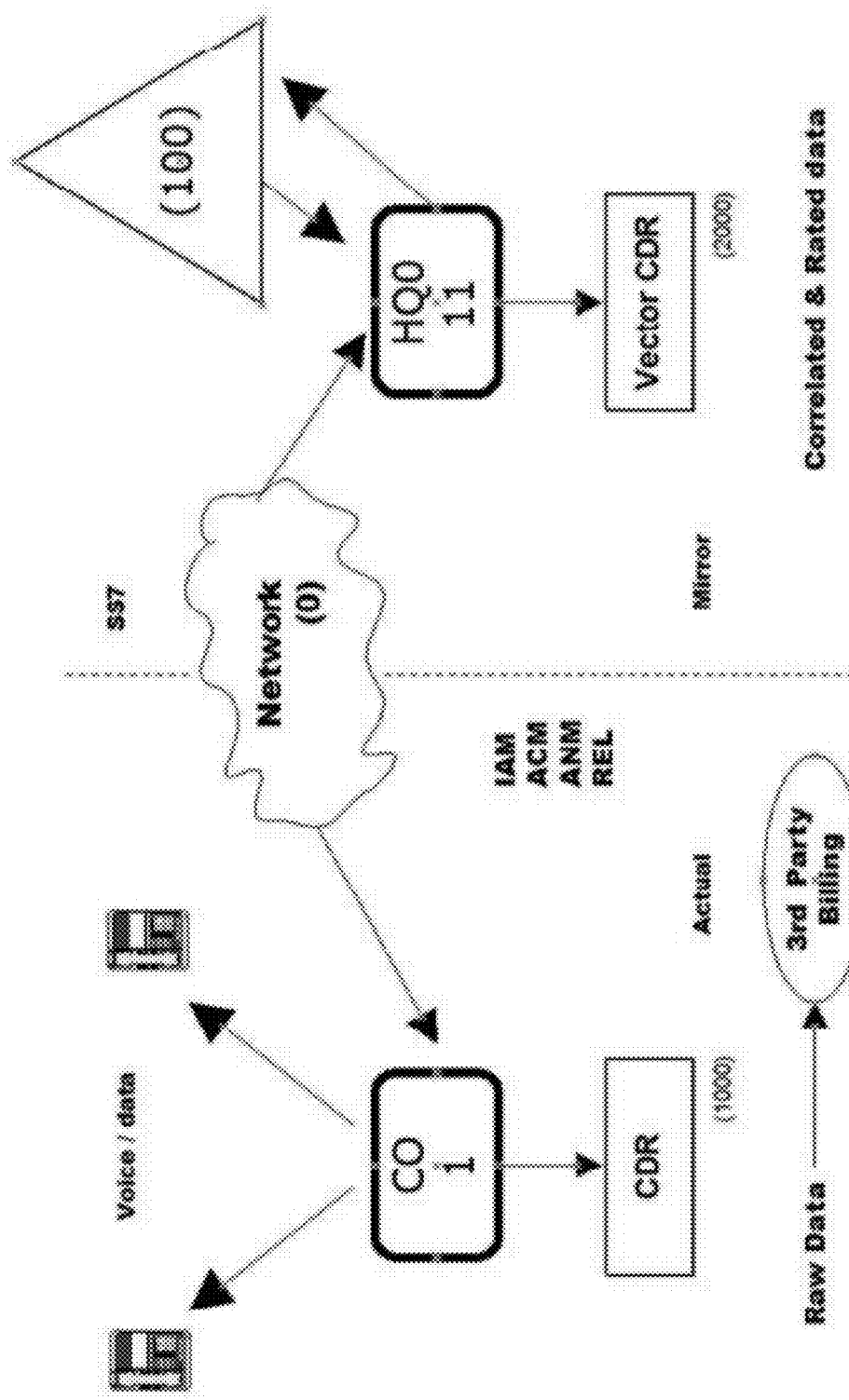
FIG. 63 CO 'Spaghetti Phenomena' simplification.

FIG. 63: shows the CO Spaghetti Simplification where each Class 5 Central Office (1) connects calls with data and voice, and then creates a Call Detail Record (1000) from INBOUND and OUTBOUND calls made by one of its POTS. The infrastructure of the Fixed Network Spaghetti is simplified by virtually mapping the location of each CPE. Each CO (11) of the system then converts IAM, ACM, ANM and REL SS7 messages to create a Vector CDR (2000). The Vector CDR has the following components: 1) Vector Owner, 2) Leg A owner, 3) Leg C owner, 4) Tandem routes, 5) Leg X Owner, 6) Leg Y Owner and 7) Complex Tandem routes.

Figure 64:
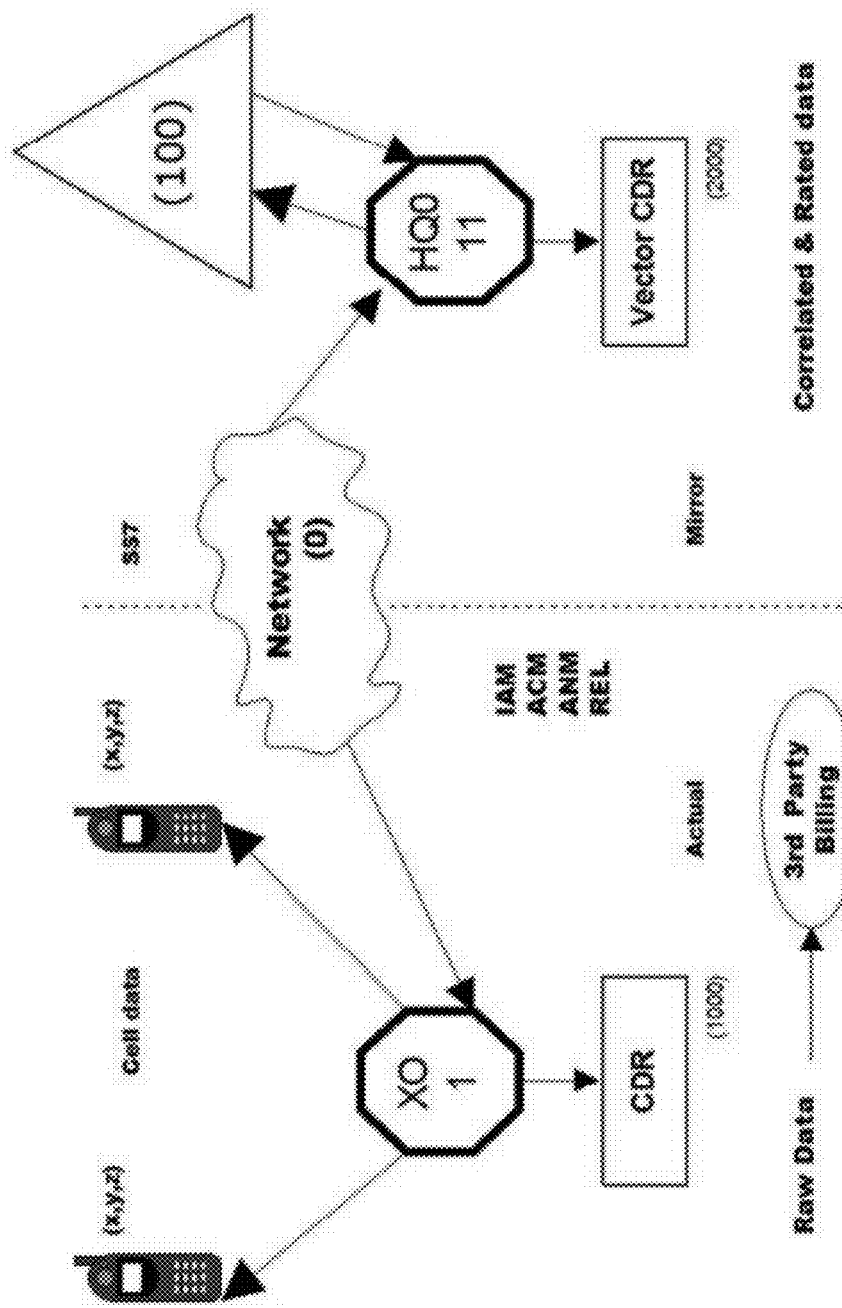
FIG. 64 XO 'Spaghetti Phenomena' simplification.

FIG. 64: shows the XO Spaghetti Simplification where each Mobile Telephone Subscriber Office (1) connects calls with data and voice, and then creates a Call Detail Record (1000) from INBOUND and OUTBOUND calls made by one of its wireless devices. The Wireless Network Infrastructure Spaghetti is simplified by virtually mapping each wireless CPE and by triangulating and approximating the origin and destination signal. Each XO (11) of the system then converts IAM, ACM, ANM and REL SS7 messages or VOIP messages to create a Vector CDR (2000). The Vector CDR has 4 or 8 components: Vector Owner (A), Leg A owner (B), Leg B owner (C) and Tandem routes (D). The Complex Vector CDR has 8 components: Leg X Owner (E), Leg Y Owner (F) and Complex Tandem routes (G-H).

Figure 65:
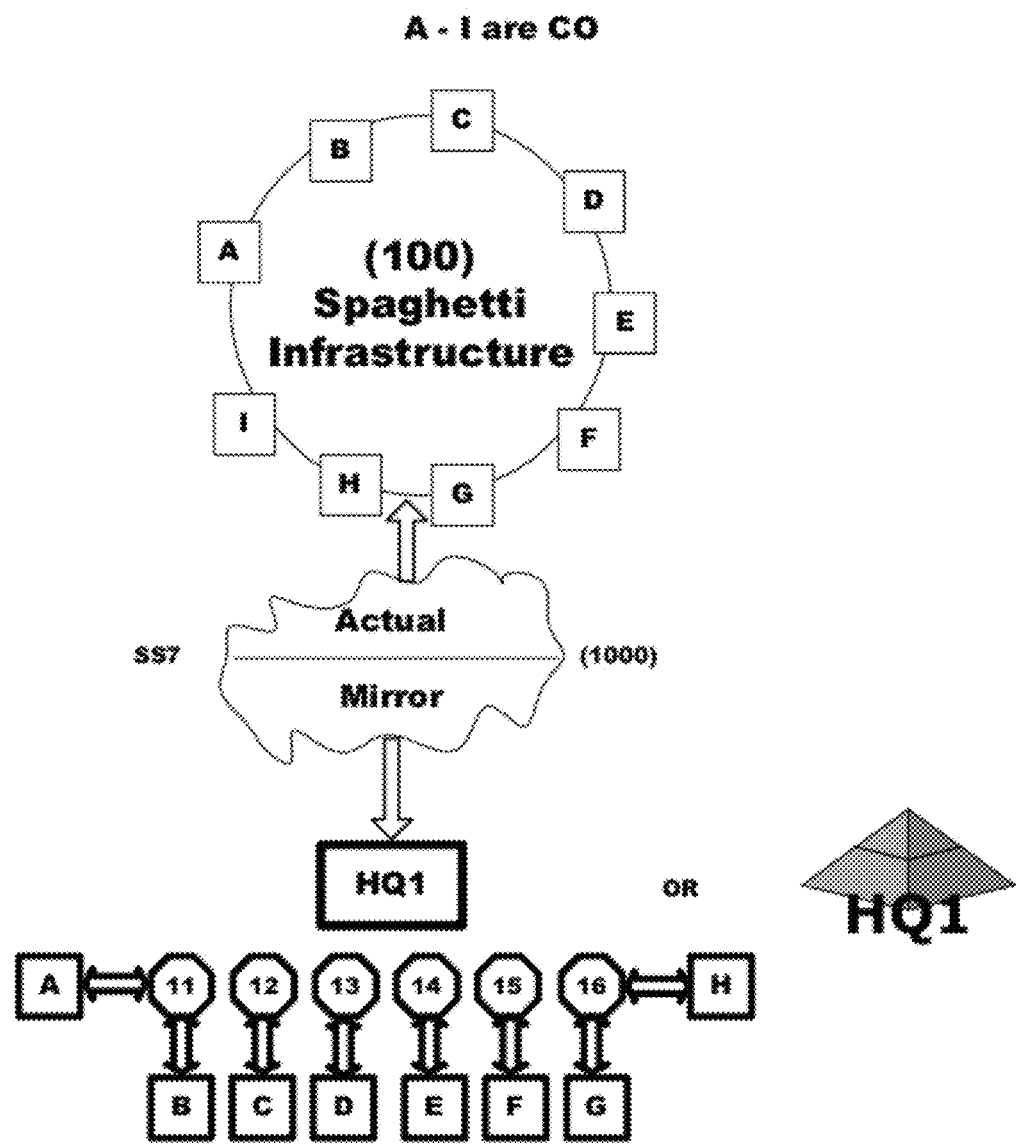
FIG. 65 Organizing NXX 'Spaghetti Phenomena' infrastructure.

FIG. 65: is a schematic representation of how by organizing the NXX 'Spaghetti Phenomena' Infrastructure (100) a HQ1 node controls the flow of traffic within Fixed Exchange SONET and receives a copy of each SS7 packet (1000). And replicates a Virtual Reality mirror of the actual networks and environmental conditions. Each subordinate CO (11-16) controls a plurality of Class 5 Central Office switches (A-I). For simplicity, each HQ1 controls approximately 250,000 ports.

Figure 66:
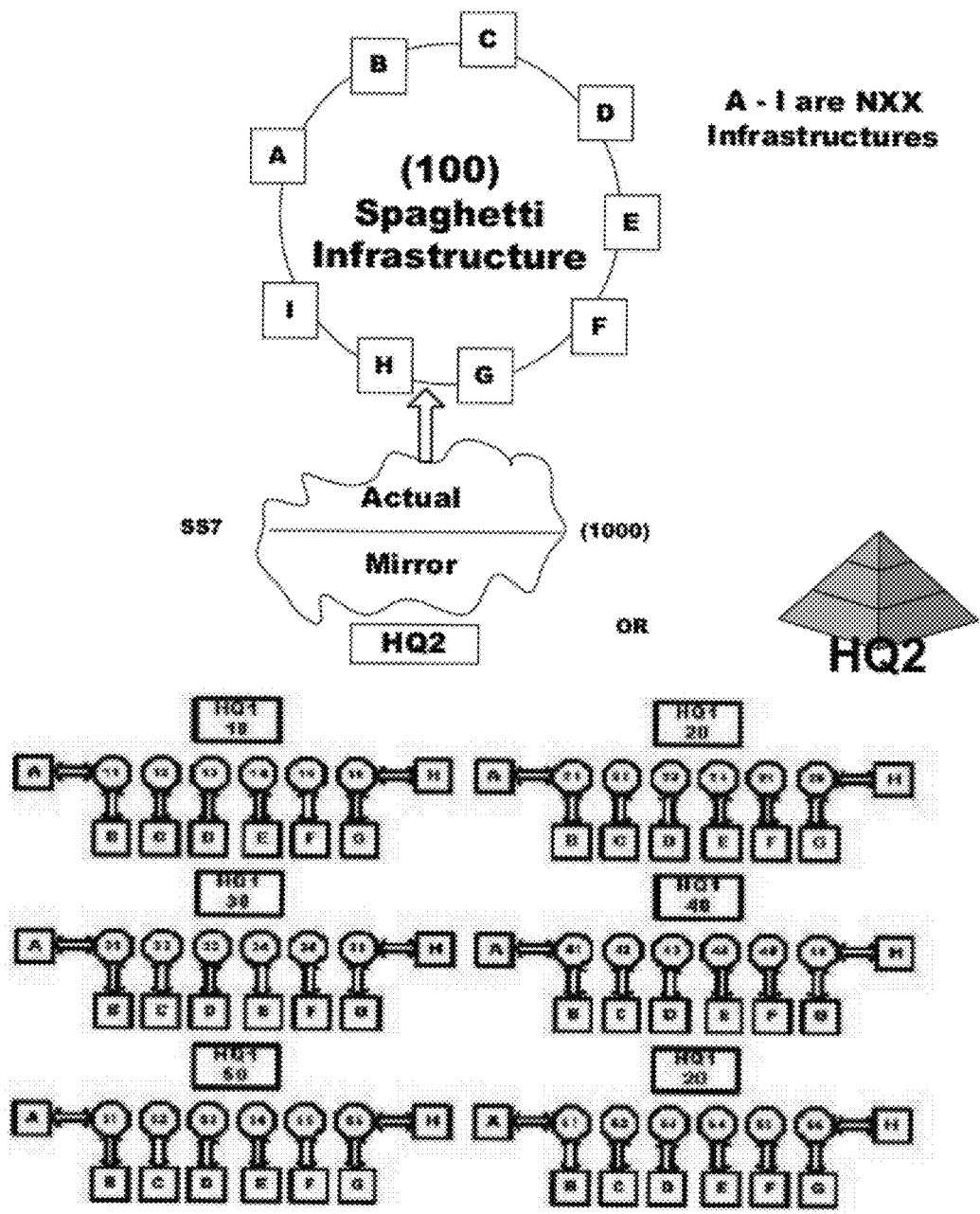
FIG. 66 Organizing NPA 'Spaghetti Phenomena' infrastructure.

FIG. 66: is a schematic representation of how by organizing the NPA 'Spaghetti Phenomena' Infrastructure (100) a HQ2 controls the flow of traffic within Fixed Exchange SONE and receives a copy of each SS7 packet (1000). And replicates a Virtual Reality minor of the actual physical networks and associated environmental conditions. Each HQ2 structure has several subordinates HQ with their corresponding CO (11-66) that control a plurality of Class 5 Central Office switches (A-I). For simplicity, each HQ2 controls approximately 1,000,000 ports.

Figure 67:
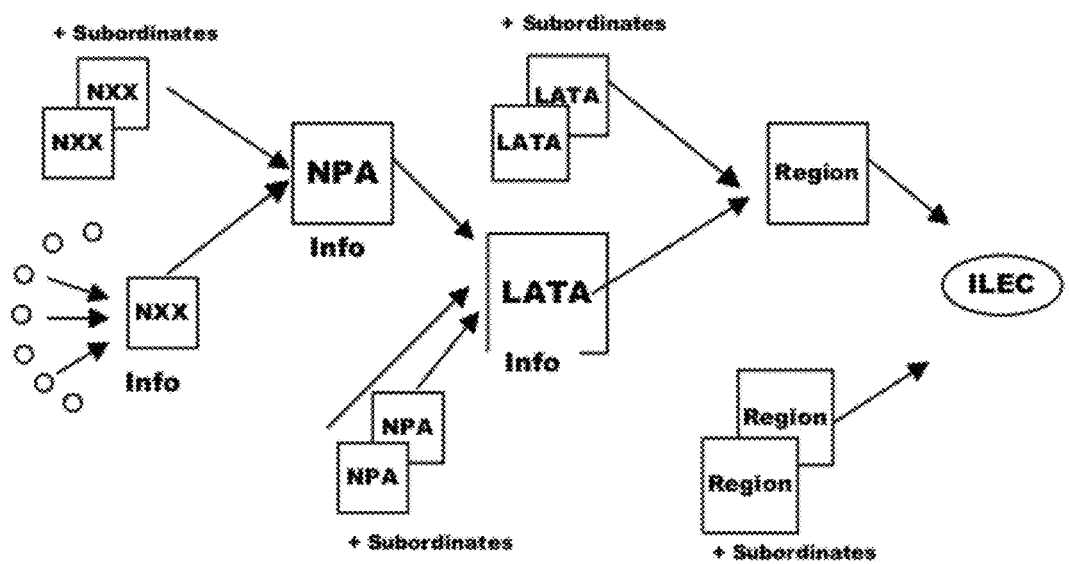
FIG. 67 Synchronization of resources.

FIG. 67: is a schematic representation of the Synchronization of Resources that permits the system to have network wide environment information. Starting from left, a plurality of Central Office Switches performs a statistical analysis of traffic that is outside the norm to their parents NXX nodes. Each NXX node, from their own perspective, does the same analysis and communicates the results to the NPA. The process of moving information from a plurality of child nodes to the parents is continued until the summit tier is reached. Note: if all of the data is within the norm, the summit node will receive an empty message since there is no need to resubmit known information. Each node can send a plurality of different reports to the summit tier such as connection rates, error rates, faults, trunks bandwidth.

Figure 68:
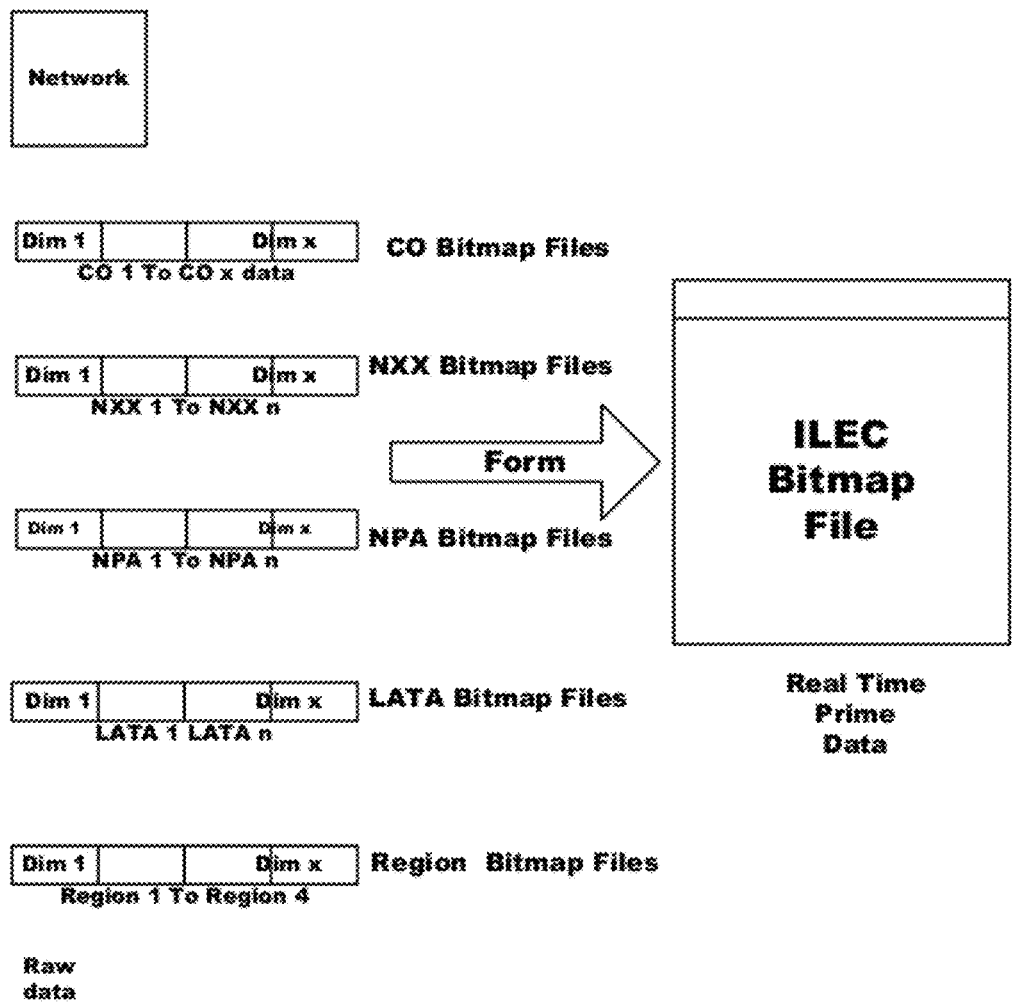
FIG. 68 Building an ILEC Bitmap file.

FIG. 68: is a graphical representation of how to build an ILEC Bitmap File or summary report by allowing a plurality of Central Office Switches to migrate several dimensions of statistical information to the ILEC node. The ILEC node analyzes, complies and normalizes the latest data. If any specific ILEC bitmap field information is significant and the condition of the environment is notified.

Figure 69:
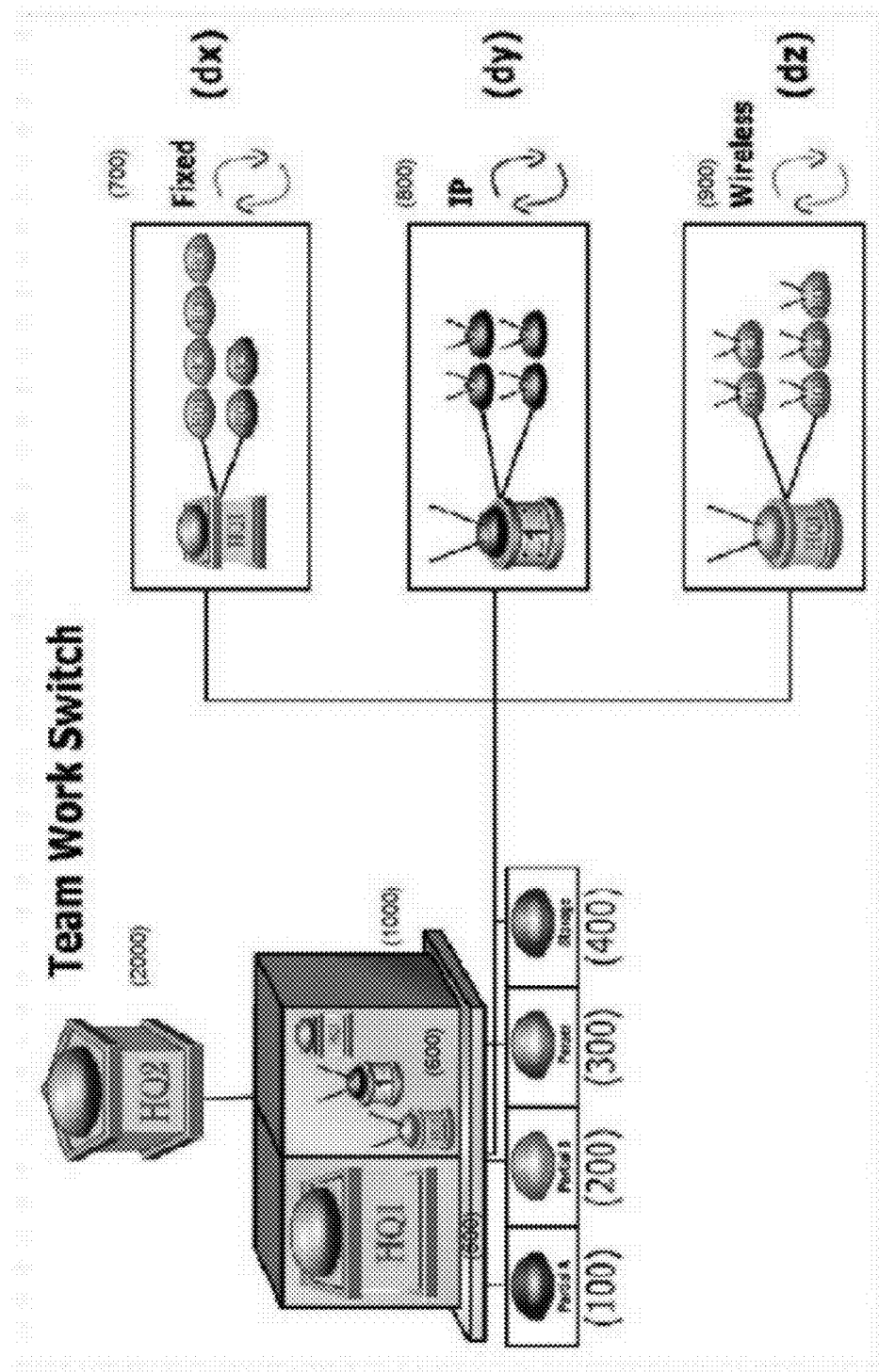
FIG. 69 Team Work Switch (Overview)

FIG. 69: is a diagram of a lower tier switch that is commercially known as Team Work Switch (1000) that is part of a computer network system (2000). The lower tier can be divided into separate parts:

Lower Tier Partial Leg A: (100) and partial Leg B node (200) use Artificial Intelligence Business rules to fill the missing gaps of information.

Lower Tier Parser: (300) is responsible for converting all of the INBOUND messages of the environment into a lingua franca, and the OUTBOUND messages to the appropriate NPE packet protocol.

Lower Tier Storager: (400) is designed to load balance and to distribute tasks, so that the nodes can scan for new activities and upon detecting new messages execute predefined task. E.g. JAM messages instantiate a new record and SSN, which the assigned Call Owner must create.

Lower Tier Summit Grid Node: (500) is responsible for all of the activities of the lower tier switch. This node can match/merge as its parent middleware tier switch when creating regional calls, once it has determined its own Leg A or its equivalent, since subscribers might reside outside of the network's environment.

Lower Tier Partial Summit Grid Node: (600) is responsible for correlating Partial Vector Legs (B, T) data of a call, so that the Summit Grid Node of the partial Leg A can match/merge the different Partial Vector CDR into a single billing entity.

Lower Tier Independent Networks: Fixed Layer Nodes (700), Wireless Layer Nodes (800), IP telephony Layer Nodes (900) mimic, monitor, replicate and simulate the activities of the messages of their corresponding networks, and convert the raw and redundant data into normalized and primed data, so that other grid and cluster nodes can use them.

The main problem with telephony is that 98% of the calls use more than 1 NPE to create a single version of the truth billing entity, and to further exacerbate the situation as Wireless becomes the dominant player of the globe with respect to telecommunications, up to 50% of the calls will become Hybrid, and 5% complex.

Thus, an improvement with regards to the existing patents was required and the lower tier switch that behaves as a macro switch that assimilates all of the Fixed, IP Telephony and Wireless messages within a geographical location.

Each Fixed network Central Office Switch, wireless network XO IP Telephony Intelligent Component and CPE is simulated and the location of the end user is triangulated to a specific location based on organizational Business Rules.

Parser Nodes Interfaces with the Environment: And is responsible for interfacing with the environment, and converting all of the information into a lingua franca and assigning it to the correct directory and the appropriate forward and rearward chained updates to the system, the assignment of unique ID, and the different distinct call elements Legs (A, B, T, X, Y, W) and Call Owner.

Storager Functions Nodes Update and Load Balance Data: And is responsible for Deleting, Inserting, Load Balancing, Replicating and Updating Data that is pertinent to the system. And has the information of each circuit and subscriber belonging to the system, and have special scripts to follow the organization Business Rules to determine the acceptable location of each circuit of the call.

Partial A function Node Determines Leg A: And is responsible for determining that the call originates (Leg A), resides within the local domain of the lower tier switch, then gathers all of the information to creates a bitmap packets so that the each HQ can match/merge Partial Vector CDR information.

Partial B function Node Determines Leg B: And is responsible for determining that the call destination (Leg B), resides within the local domain of the lower tier switch, then gathers all of the information to creates a bitmap packets so that the each HQ can match/merge Partial Vector CDR information.

Summit Grid Node Controls the Cluster of Computer Grid: The Summit Grid Node for each HQ integrates the flow of information of the Fixed, IP Telephony and Wireless nodes, so they can work together using lateral and vertical synergy to logically find the missing gaps of information by using organizational Business Rules.

Middleware Tier Switch may act as it Parent: when it knows that an entire call is within the domain of a single network, and the ownership of the call resides within its organization. This upgrade was created to eliminate the unnecessary flow of data upwards towards the summit tiers that saturate the system.

Middleware Tier Partial B Handles Hybrid & Complex Calls: permits the HQ summit node to handle the Leg B side of a Hybrid or Complex Call. Using business rules determines if the Leg B side vector trajectory is within the geospatial area of coverage of its organization so it can match/merge the Vector CDR since it possesses all of the Partial Vector components.

Lower Tier the Workhorse: the lower tier switch is a subdivision of the computer network system and its workhorse. E.g. FIG. 60, X-Commerce and U-Commerce are commercial examples of the three tier Supercomputer architecture.

Matching 2 Independent Calls with Partial Differential Equation: the use of Partial Differential Equations permits the system to handle 2+ independent calls, eliminating the unnecessary flow of data upwards towards the summit tiers that tend to saturate the system. Once the geospatial data is normalized and plotted, the summit tier uses routing algorithms to fill the missing gaps of information to match/merge the Vector CDR without placing any burden to the summit tiers.

Figure 70:
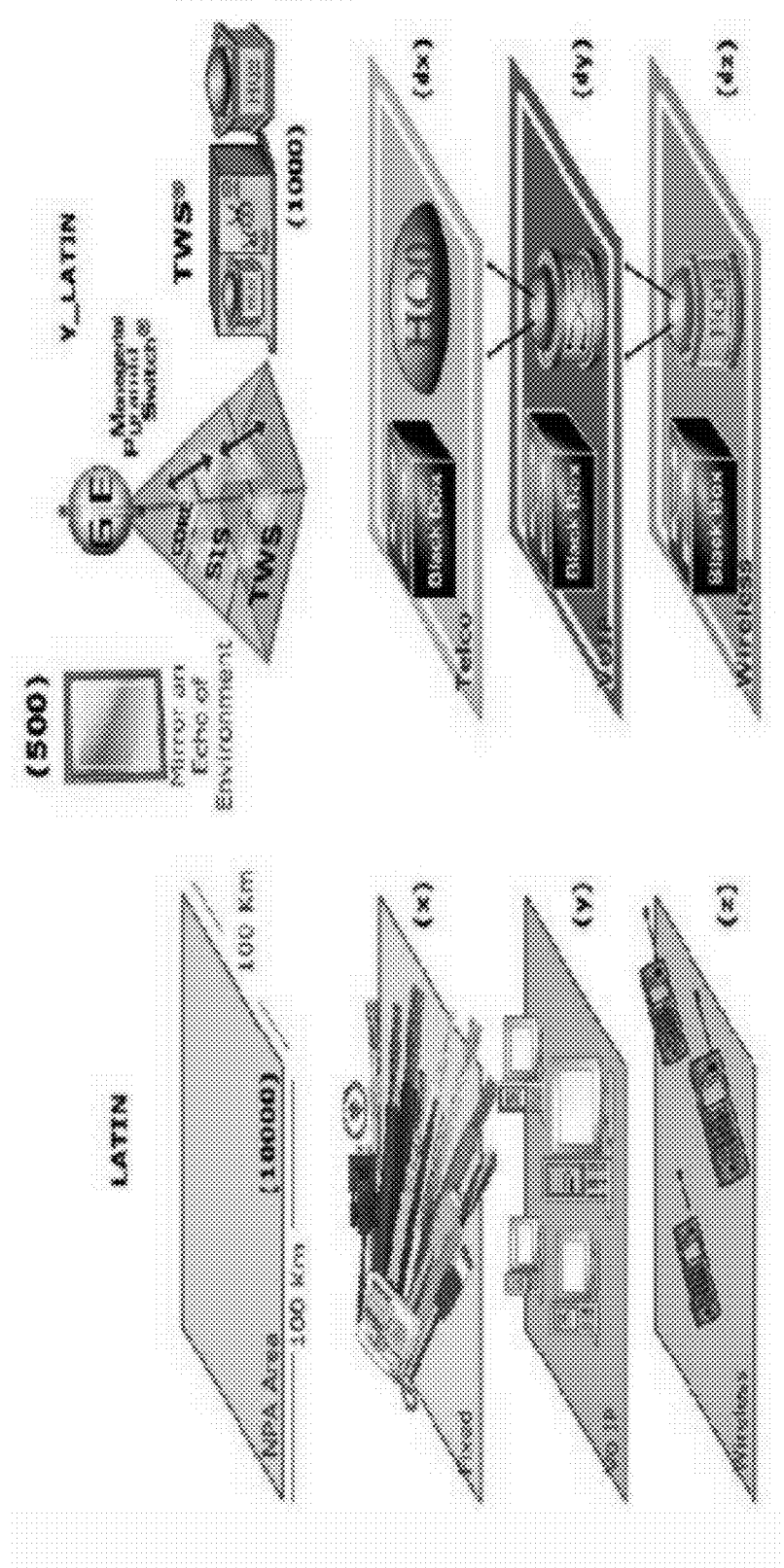
FIG. 70 Converting and Simplifying the NPA 'Spaghetti Phenomena'.

FIG. 70: Converting and Simplifying the NPA Spaghetti by transforming existing NPA Area environment (10000), such as Area Code 305 that covers Dade County Florida comprised of Fixed (dx), Wireless (dy) and Vo IP (dz) networks that work in parallel to deliver Telecommunications services. The system minors (500) an echo of all of the activities of the NPA Area environment into the appropriate lower tier switch (1000), assigning messages with geospatial data and then converting them into a standard format. The system continuously mimics, monitors and simulates the environment, and transfers controls to the appropriate Intelligent Component Fixed (dx), Wireless (dy) and Vo IP (dz) based trajectory path.

Figure 71:
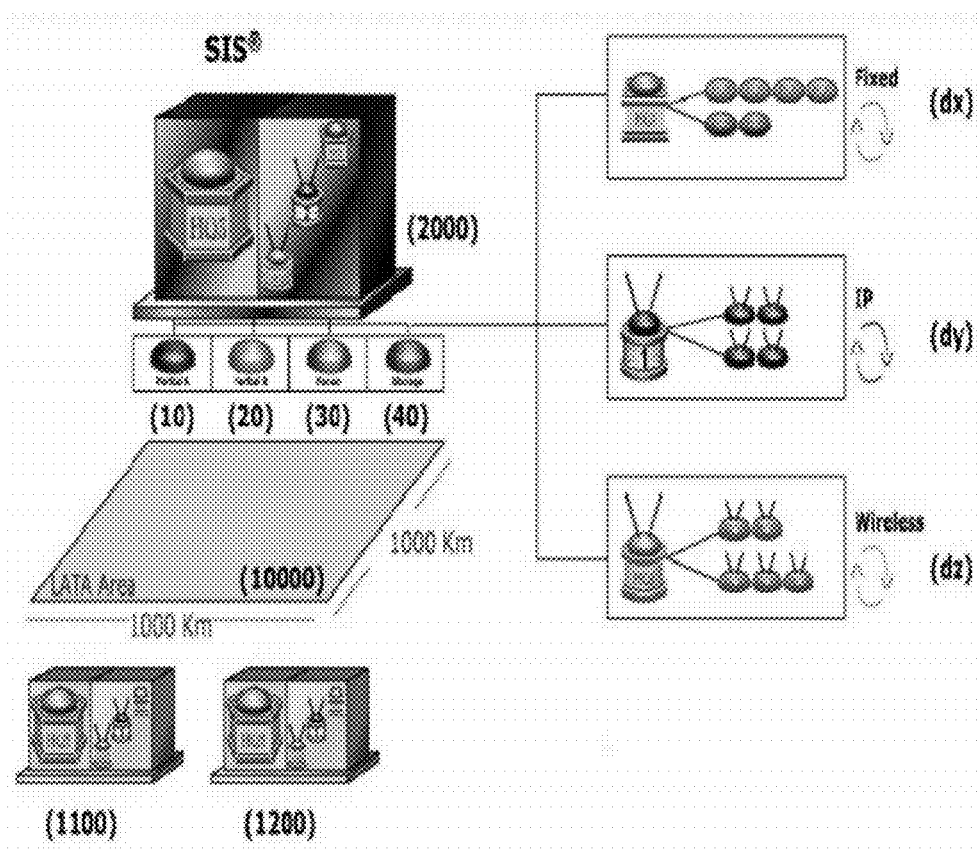
FIG. 71 Normalizing and Organizing a LATA (SIS or Middleware Tier)

FIG. 71: Normalizing and Organizing a LATA (SIS or Middleware Tier) by gathering the information from a Subset of the environment, in this case a given LATA Area (10000). The LATA is broken into independent Subsets, one per NPA Area. The LATA Area HQ3 middleware tier or Synergy Interface Switch (2000) has its own independent NPA Area HQ2 lower tier switch or Team Work Switches (1100 to 1300) domains with all of its corresponding subordinate managerial hierarchical organization. The middleware tier processes an echo of the network messages that begins, ends or travels through this geographical area and immediately standardizes and converts each message into geospatial data, and associates cost to each component, to render a mirror image of the environment.

Figure 72:
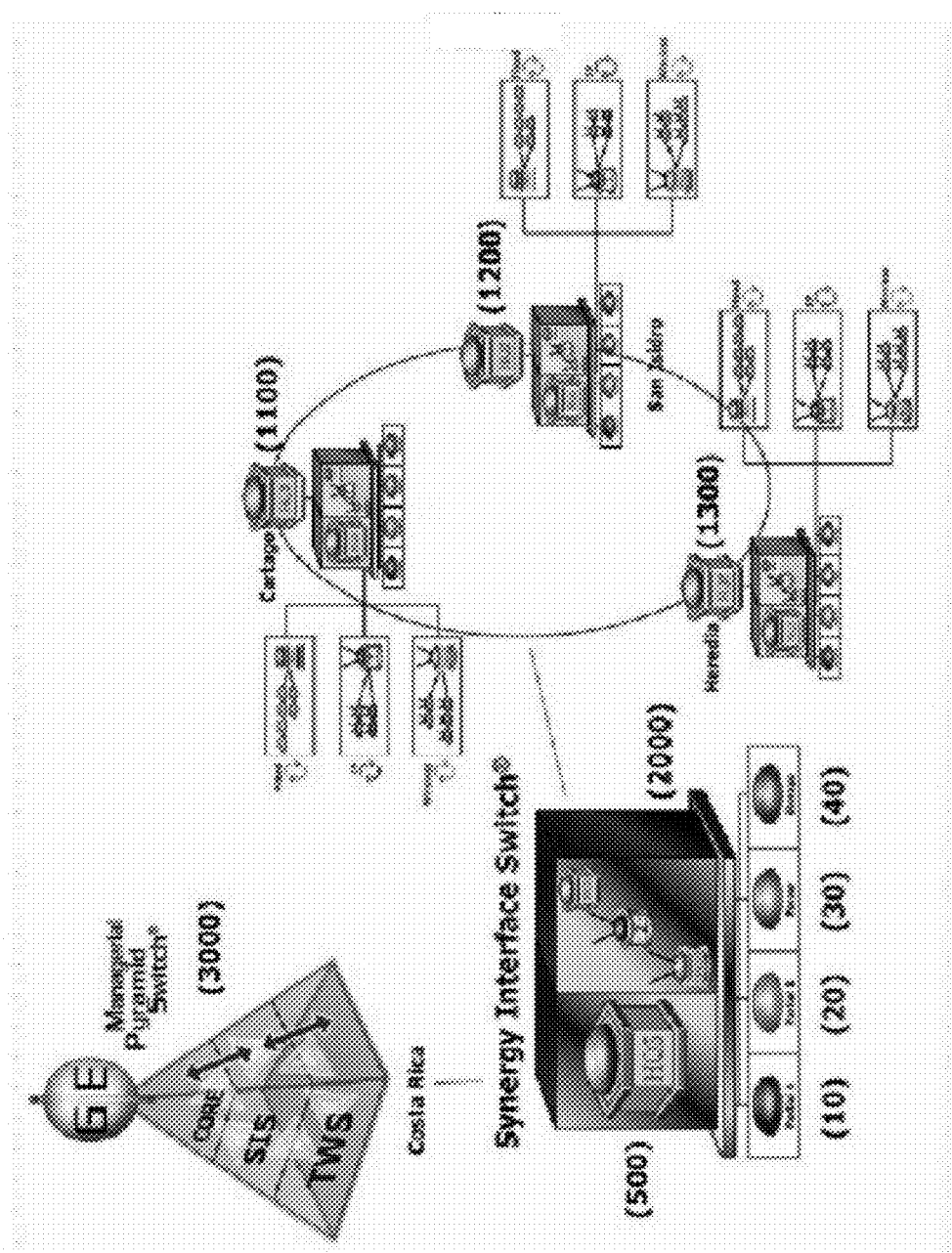
FIG. 72 Synergy Interface Switch (Overview)

FIG. 72: is a diagram of a middleware tier that is commercial known as Synergy Interface Switch (2000) and its subordinate lower tier (1100), (1200) and (1300) that are part of the computer network system with the same exact functionalities as in FIG. 71, covering a larger geospatial area.

Figure 73:
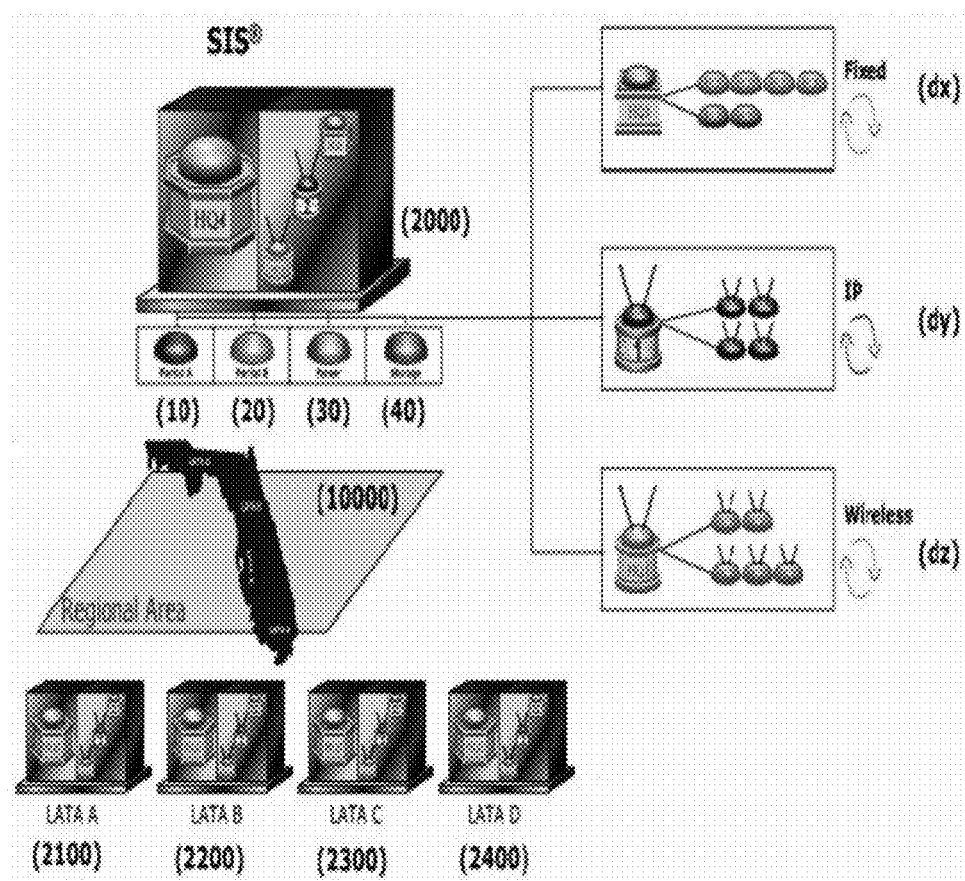
FIG. 73 Normalizing and Organizing a Region (SIS or Middleware Tier)

FIG. 73: Normalizing and Organizing a Region (SIS or Middleware Tier) by gathering information from a Subset of the environment, in this case a given Region Area (10000). The Region is broken into independent Subsets, one per LATA Area, that are further subdivided into NPA Areas. Each LATA Area HQ3 middleware tier or Synergy Interface Switches (1100 to 1400) has its own plurality of independent NPA Area HQ2 Team Work Switches domains with all of its corresponding subordinate managerial hierarchical organization. The Regional Area HQ4 middleware tier (2000) processes an echo of the network messages that begins, ends or travels through this geographical area, and immediately standardizes and converts each message into geospatial data, and associates cost to each component, to render a minor image of the environment.

Figure 74:
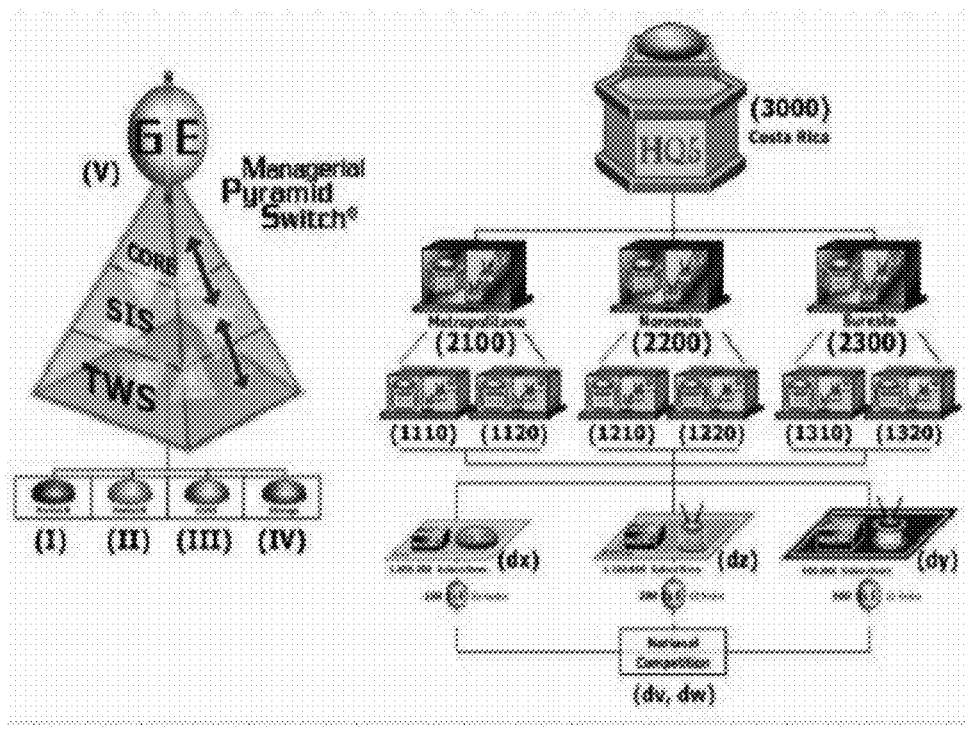
FIG. 74 Managerial Pyramid Switch (Overview)

FIG. 74: is a diagram of a summit tier switch that is commercial known as Managerial Pyramid Switch (MPS or Summit Tier) (3000) and its subordinate middleware tier or Synergy Interface Switches (2100), (2200) and (2300) that are part of the computer network system with the same exact functionalities as in FIG. 71, covering the entire Simulation Network.

Figure 75:
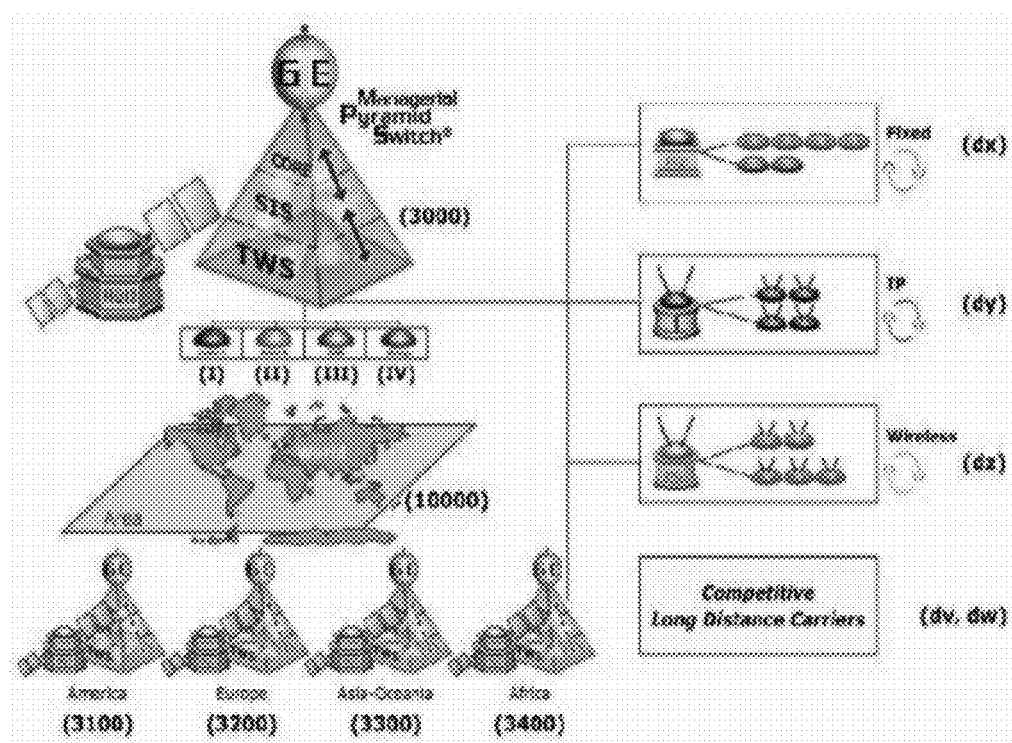
FIG. 75 Normalizing and Organizing a Global Area (MPS or Summit Tier)

FIG. 75: Normalizing and Organizing a Global Area (MPS or Summit Tier) by gathering information from a Subset of the environment, in this case the Worldwide Area (10000) that consists of America, Europe, Asia-Oceania and Africa. The Worldwide Area is broken into four independent continents areas: America (3100), Europe (3200), Asia-Oceania (3300) and Africa (3400), which are subdivided by Sub Continent, Country, LATA and discrete NPA Areas. Each Managerial Pyramid Switch processes an echo of the network messages, which starts, ends or travels through this geographical area, and immediately standardizes and converts each message into geospatial data, and associates cost to each component, to render a minor image of the environment.

Figure 76:
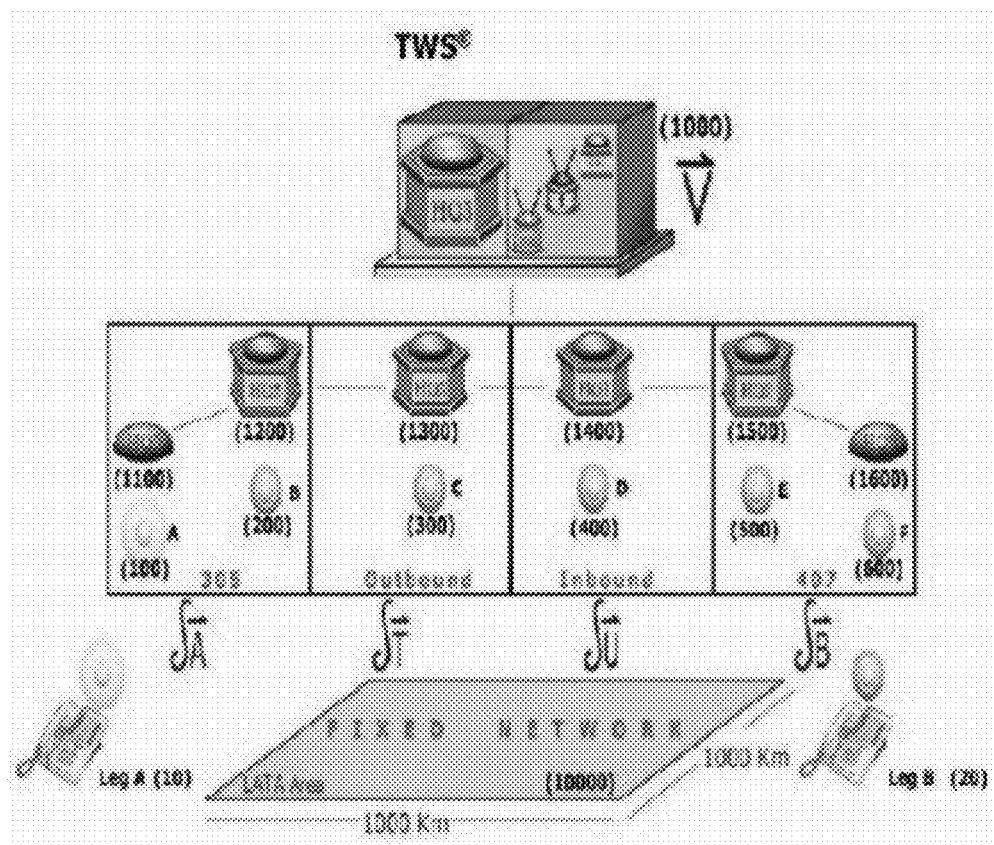
FIG. 76 Building a Intra LATA Fixed Call (TWS or Lower Tier)

FIG. 76: is a schematic representation of building an Intra LATA Fixed Call (TWS or Lower Tier) by generating a correlated resultant Vector CDR from a call that resides within the domain of a LATA Area (10000). The connected call uses Leg A (100), the origin, Leg B (600), the destination, POP Leg A (200) and POP Leg B (500), and Partial Vectors: Leg T (300) and Leg U (400) that represents the transport segments. The Team Work Switch (1000) uses nodes (1100, 1200, 1300, 1400, 1500, and 1600). In this case, (1300/1400) represents distinct functions of the same node. (200) node owns the call and is responsible for generating the resultant Vector CDR as the vector trajectory is being built via the forward and rearward packet messages with the billing components required to match/merge the Vector CDR.

Figure 77:
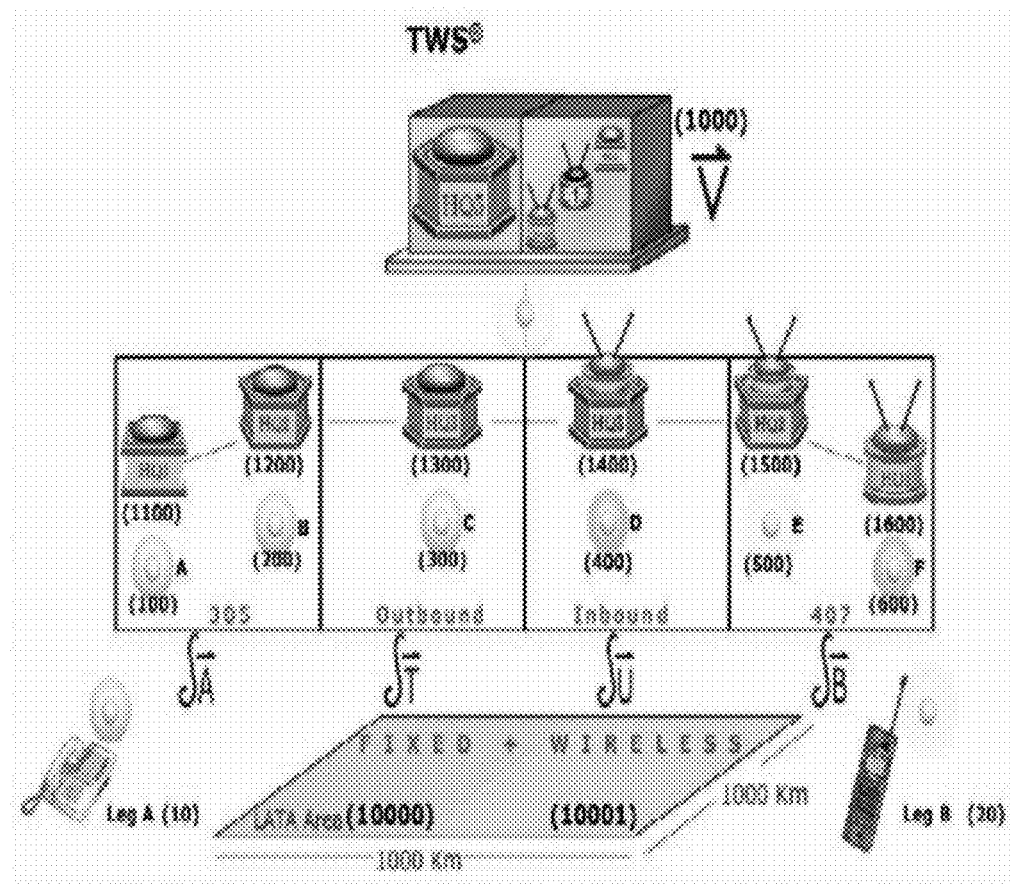
FIG. 77 Building a Intra LATA Hybrid Call (TWS or Lower Tier)

FIG. 77: is a schematic representation of building an Intra LATA Hybrid Call (TWS or Lower Tier) by generating a correlated resultant Vector CDR (1000) from a call that resides within the domain of a Fixed/Wireless LATA Area (10000/10001). Leg A (10) belongs to a Fixed Network, whereas Leg B (20) to a Wireless Network. The connected call uses Leg A (100), the origin, Leg B (600), the destination, POP Leg A (200) and POP Leg B (500), and Partial Vectors Leg A (200), Leg B (500), Leg T (300) and Leg U (400) that represent the network transport segments. The Team Work Switch (1000) uses nodes (1100, 1200, 1300, 1400, 1500, and 1600). (1300) node owns the call since it is a Hybrid Call and is responsible for generating the resultant Vector CDR. (1300/1400) represents the summit node of the Team Work Switch that performs the match/merge as the vector trajectory is being built via the forward and rearward packet messages the billing components.

Figure 78:
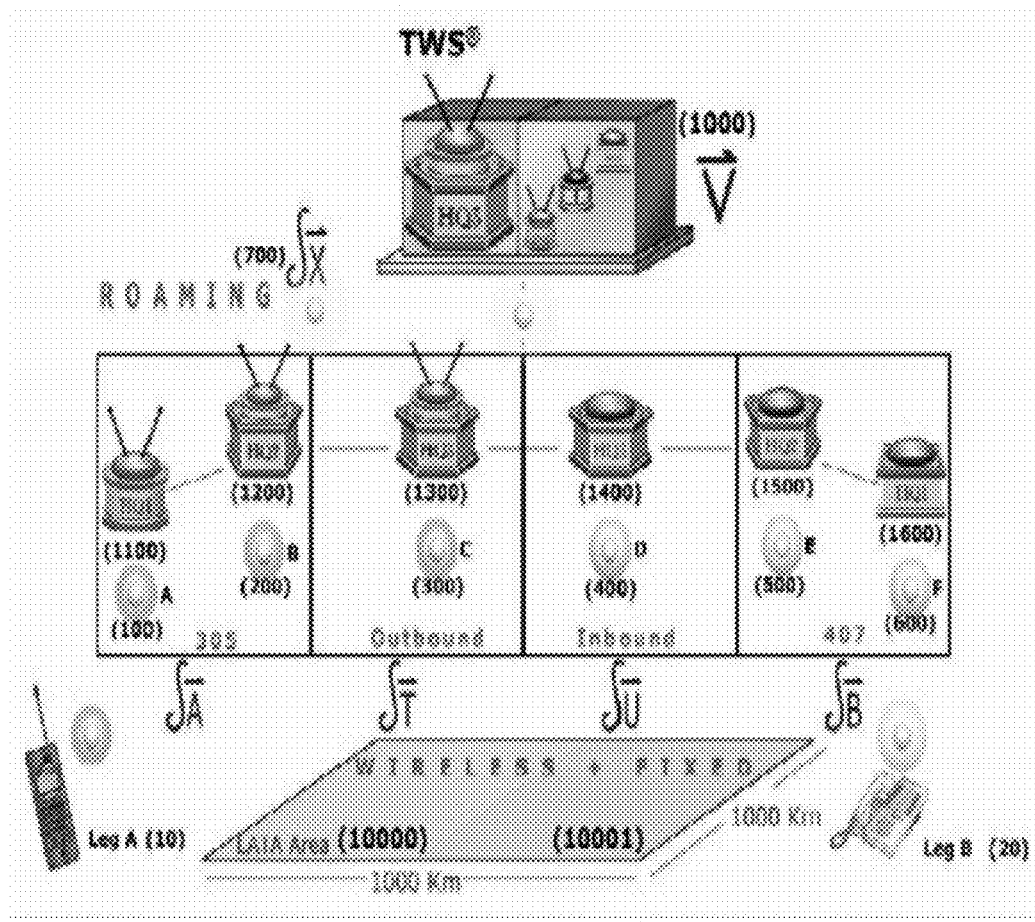
FIG. 78 Building a Intra LATA Complex Call (TWS or Lower Tier)

FIG. 78: is a schematic representation of building an Intra LATA Complex Call (TWS or Lower Tier) by generating a correlated resultant Vector CDR (1000) from a call that resides within the domain of a LATA Wireless/Fixed Area (10000/10001). Leg A (10) belongs to a Wireless Network, whereas Leg B (20) to a Fixed Network. The connected call uses Leg A (100), the origin, Leg B (600), the destination, POP Leg A (200) and POP Leg B (500), and Partial Vectors Leg A (200), Leg B (500), Leg T (300), and Leg U (400) that represent the network transport segments, and Leg X (700) the roaming segments. The Team Work Switch (1000) uses nodes (1100, 1200, 1300, 1400, 1500, and 1600). (200) node owns the call since it is a Complex Call and is responsible for generating the resultant Vector CDR. (1300/1400) represents the summit node of the Team Work Switch that performs the match/merge as the vector trajectory is being built via the forward and rearward packet messages the billing components.

Figure 79:
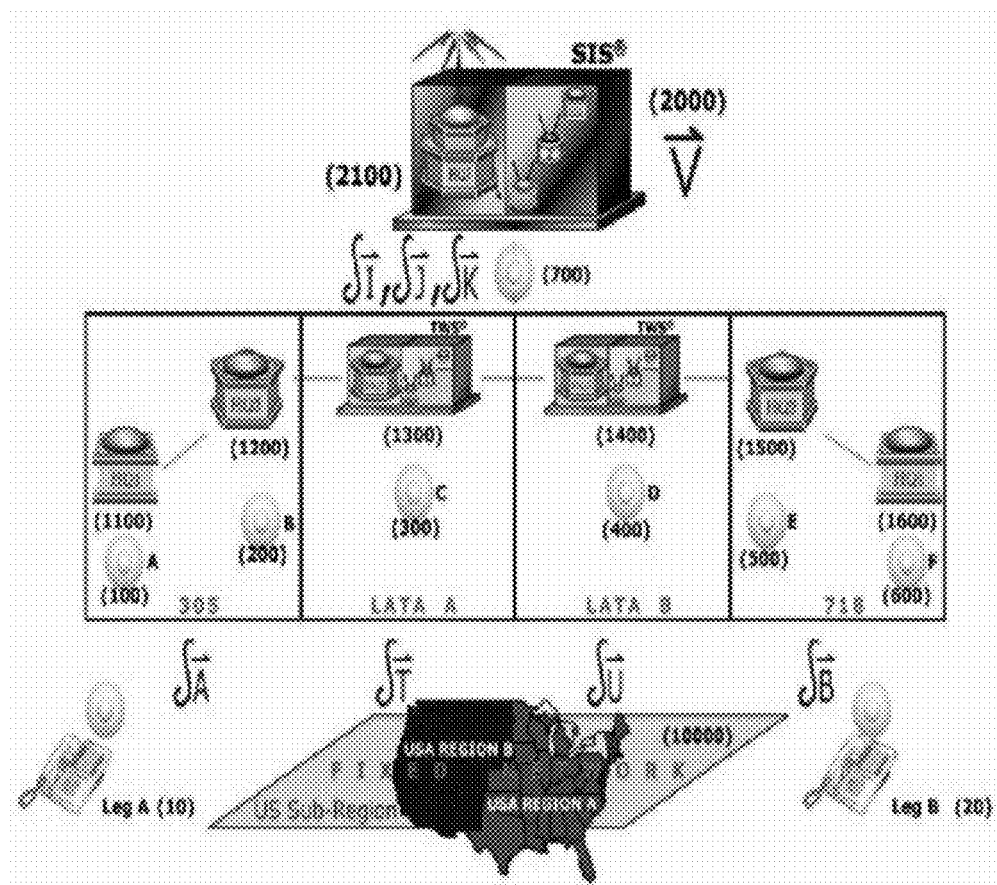
FIG. 79 Building a US Sub Region Simple Call (SIS or Middleware Tier)

FIG. 79: is a schematic representation of building a US Sub Region Simple Call (SIS or Middleware Tier) by generating a correlated resultant Vector CDR from an Inter LATA Fixed Simple call that resides within the domain of a plurality of LATA Areas (10000), in this case East USA. The connected call uses at least four NPE: Leg A (100), the origin, Leg B (600), the destination, POP Leg A (200) and POP Leg B (500), and Partial Vectors: Leg T (300), Leg U (400) and Legs (I, J, K) (700) that represent transport segments that bind them within the plurality of LATA Areas. The Synergy Interface Switch (2000) uses nodes (1100, 1200, 1300, 1400, 1500, 1600, 2100). (1300) owns the call since it is a Simple Call and is responsible for generating the resultant Vector CDR. (2100) the summit node of the Middleware Tier that performs the match/merge as the vector trajectory is being built via the forward and rearward packet messages the billing components.

Figure 80:
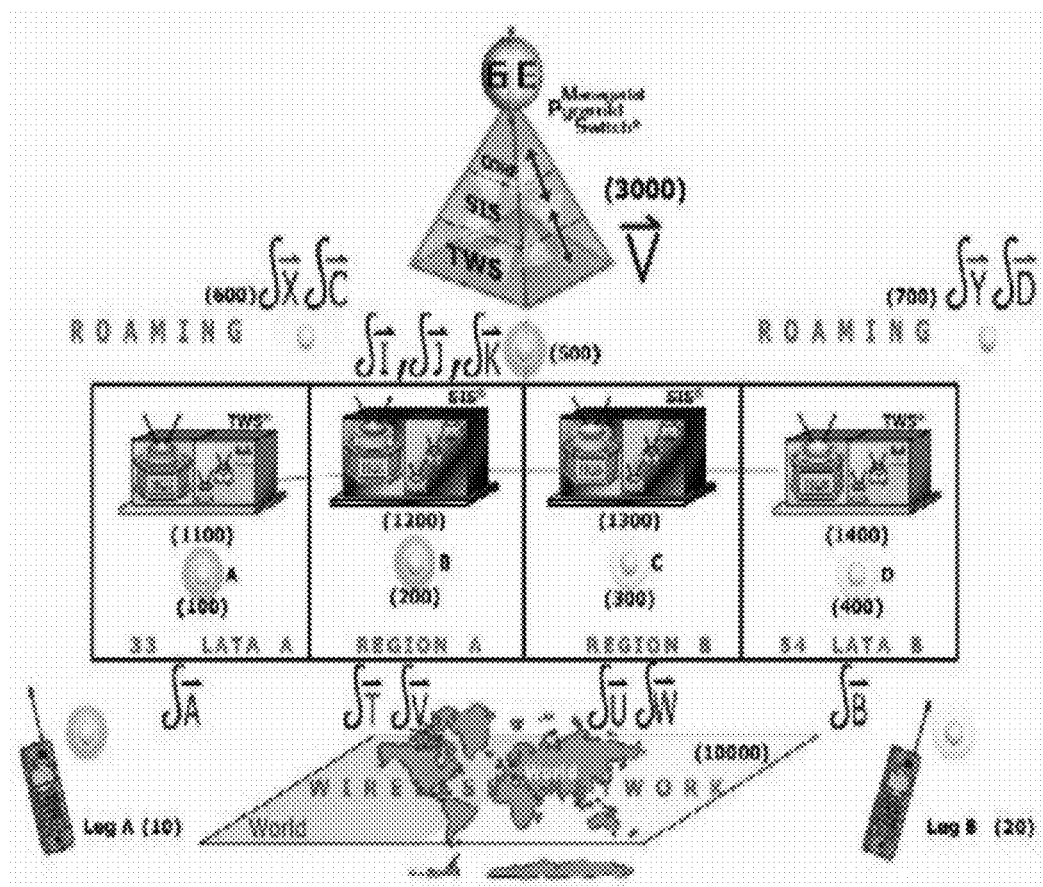
FIG. 80 Building an International Complex Call (MPS or Summit Tier)

FIG. 80: is a schematic representation of building an International Complex Call (MPS or Summit Tier) by generating a correlated resultant Vector CDR from a call that resides within the domain of a plurality of Wireless LATA Areas (10000/10001), in this case the world. This call is the worst case scenario illustration that tags at least four calls. The connected call uses POP Leg A (100), the origin, and POP Leg B (400), the destination, and Partial Vectors: Legs (T, V) (300), Legs (U, W) (400) and Legs (I, J, K) (700) that represent transport segments, and Legs (X, C) (800) and Legs (Y, D) (900) roaming segments. The Managerial Pyramid Switch (3000) uses nodes (1100, 1200, 1300, 1400). (1200) owns the call since it is a Complex Call and is responsible for generating the resultant Vector CDR. (3000) the summit node of the Managerial Pyramid Switch that match/merges the vector trajectory as is it being built using the forward and rearward packet messages.

Figure 81:
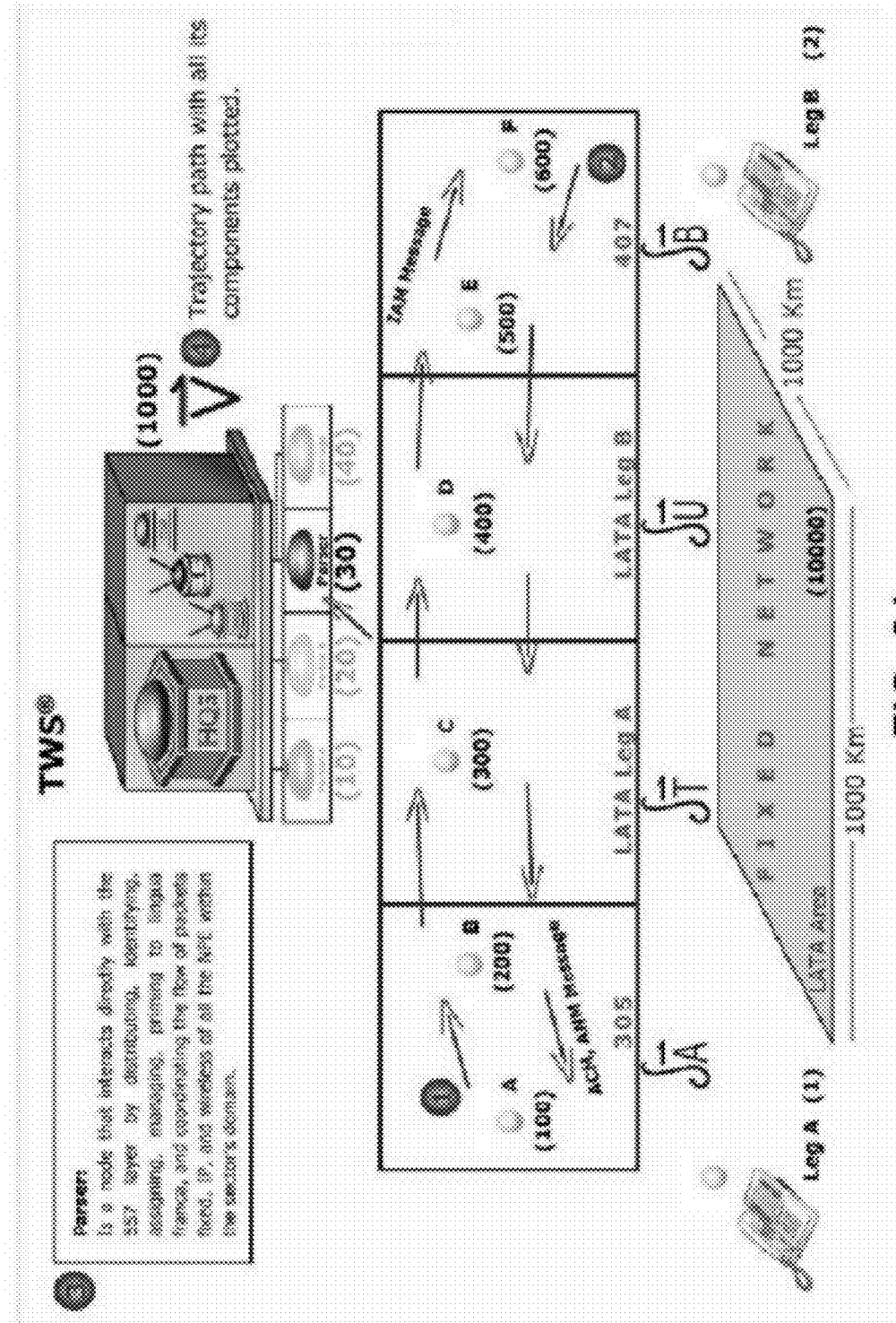
FIG. 81 Parser Function (TWS or Lower Tier)

The Use of Partial Vectors:

FIG. 81: is a schematic representation the Parser (TWS or Lower Tier) detecting (10000) all of the circuits required to map and plot the call trajectory. When a call instantiates an (1) IAM message is transmitted through the environment domain of a Team Work Switch (1000) from Leg A (10), the origin, to Leg B (20), the destination. This permits the Parser function (30) to determine the vector trajectory path, HQ Call Owner and also Legs (A, B) geospatial location. (2) ACM and ANM messages are received as the call connects. (3) Using deductive reasoning (30) find the missing gaps of information, known as the Partial Vectors or δ Leg A, δ Leg T, δ Leg U and δ Leg B. (4) The trajectory path with all its components plotted.

Figure 82:
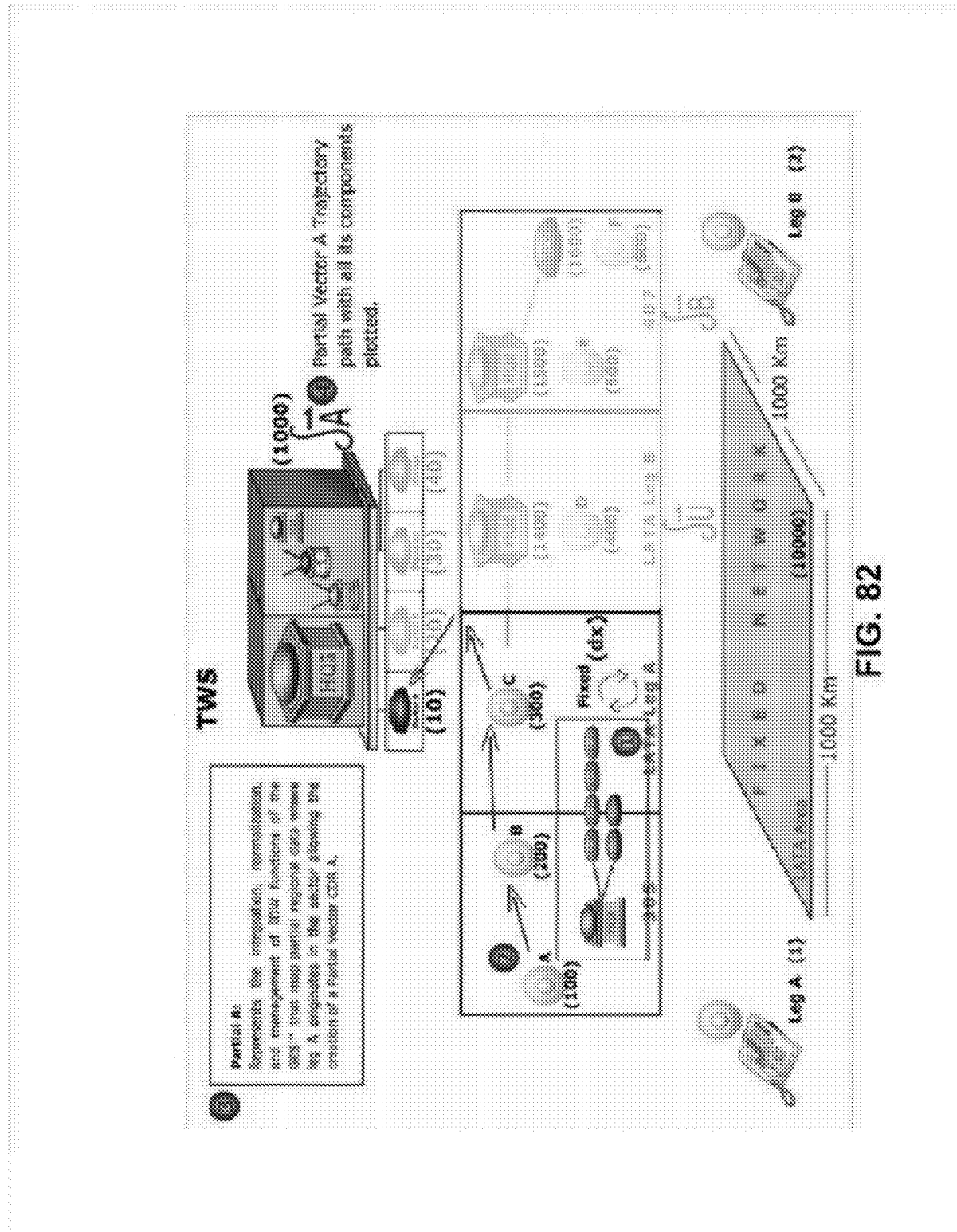
FIG. 82 Partial A Function (TWS or Lower Tier)

FIG. 82: is a schematic representation the Partial A function (TWS or Lower Tier) detecting (10000) the different circuits (100), (200) and (300) of the call required to plot the trajectory. The system detects messages from the echo of the wireless environment (dz) that are (1) immediately converted into lingua franca messages. (2) The call exceeds domain of the (1000) Team Work Switch. (3) (300) uses Leg A side information only. (4) Partial Vector A trajectory path with all its components plotted to match/merge the resultant correlated Vector CDR.

Figure 83:
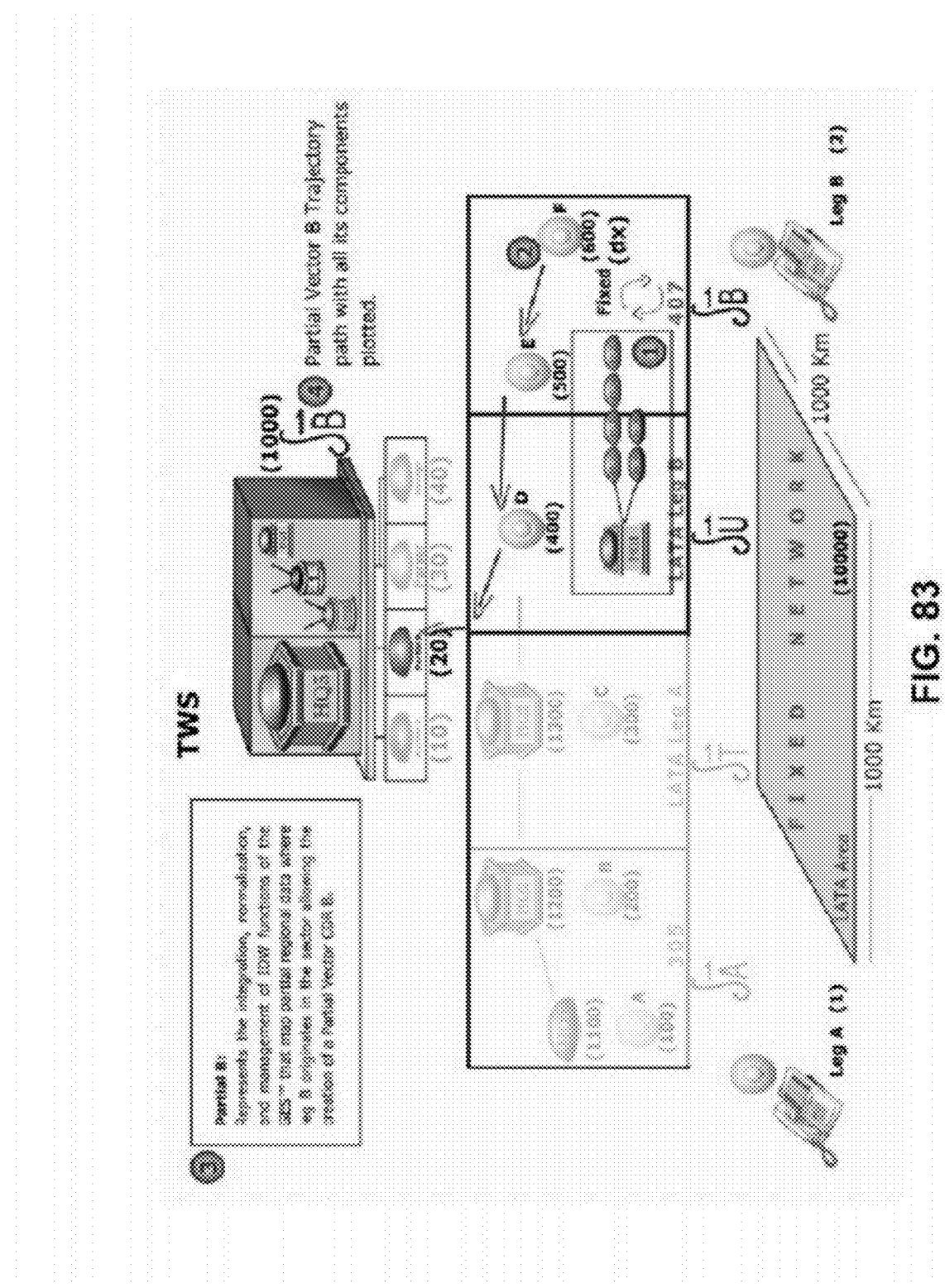
FIG. 83 Partial B Function (TWS or Lower Tier)

FIG. 83: is a schematic representation the Partial A function (TWS or Lower Tier) detecting (10000) the different circuits (400), (500) and (600) of the call required to plot the trajectory. The system detects messages from the echo of the fixed environment (dx) that are (1) immediately converted into lingua franca messages. (2) The call exceeds domain of the (1000) Team Work Switch. (3) (400) uses Leg B side information only. (4) Partial Vector B trajectory path with all its components plotted to match/merge the resultant correlated Vector CDR.

Figure 84:
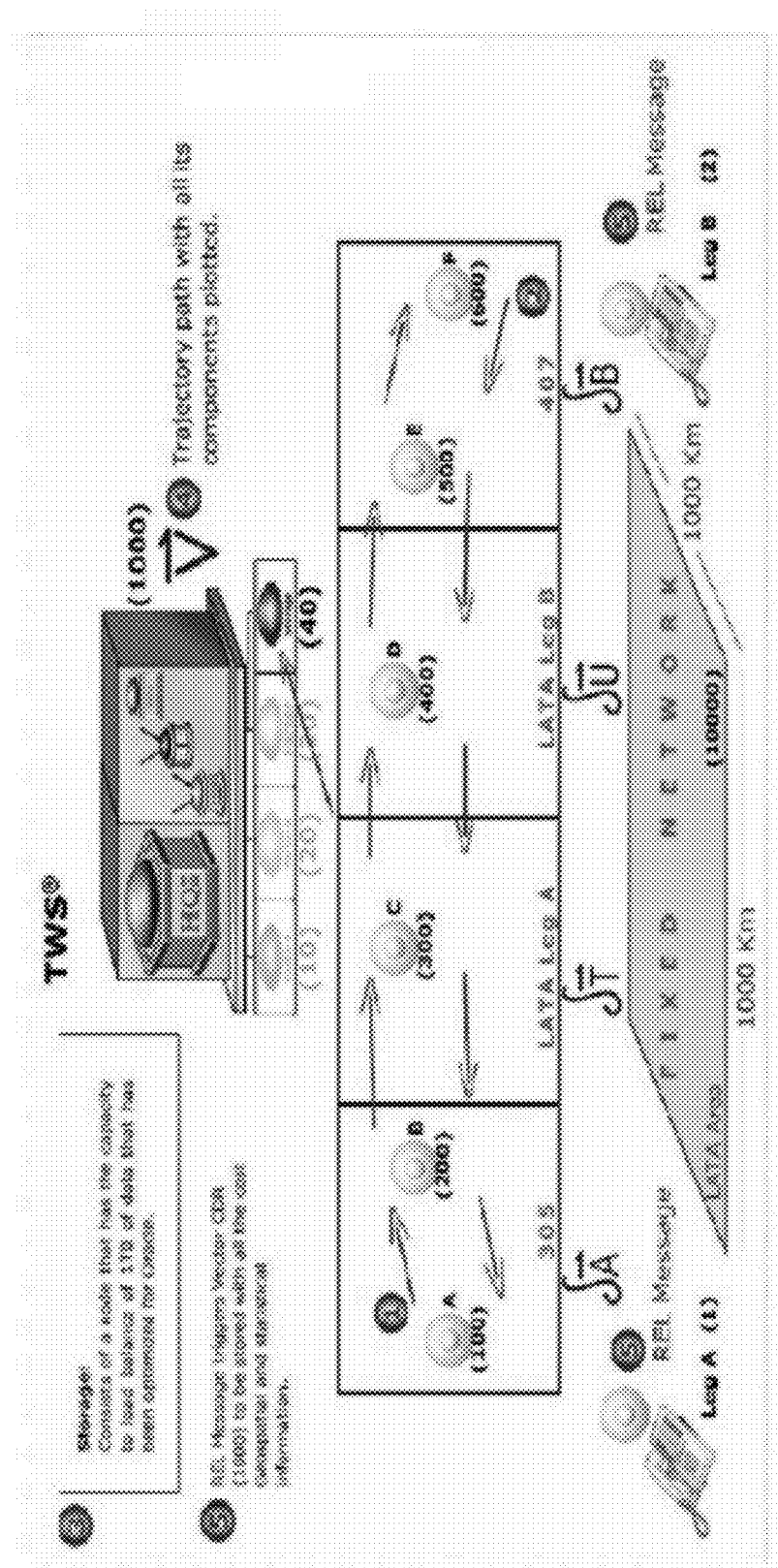
FIG. 84 Storager Function (TWS or Lower Tier)

FIG. 84: is a schematic representation of the Storager function (TWS or Lower Tier) detecting (10000) all of the circuits required to map and plot the call trajectory. When a call instantiates an (1) IAM message, it is transmitted through the environment domain of a Team Work Switch (1000) from Leg A (10), the origin, to Leg B (20), the destination. (2) ACM and ANM messages are received as the call connects. (3) The Storager (40) load balances the data amongst its subordinate nodes. (4) Each node sends cost, geospatial and statistical information to the call owner. (5) Creating the resultant Vector CDR upon receiving the REL message.

Figure 85:
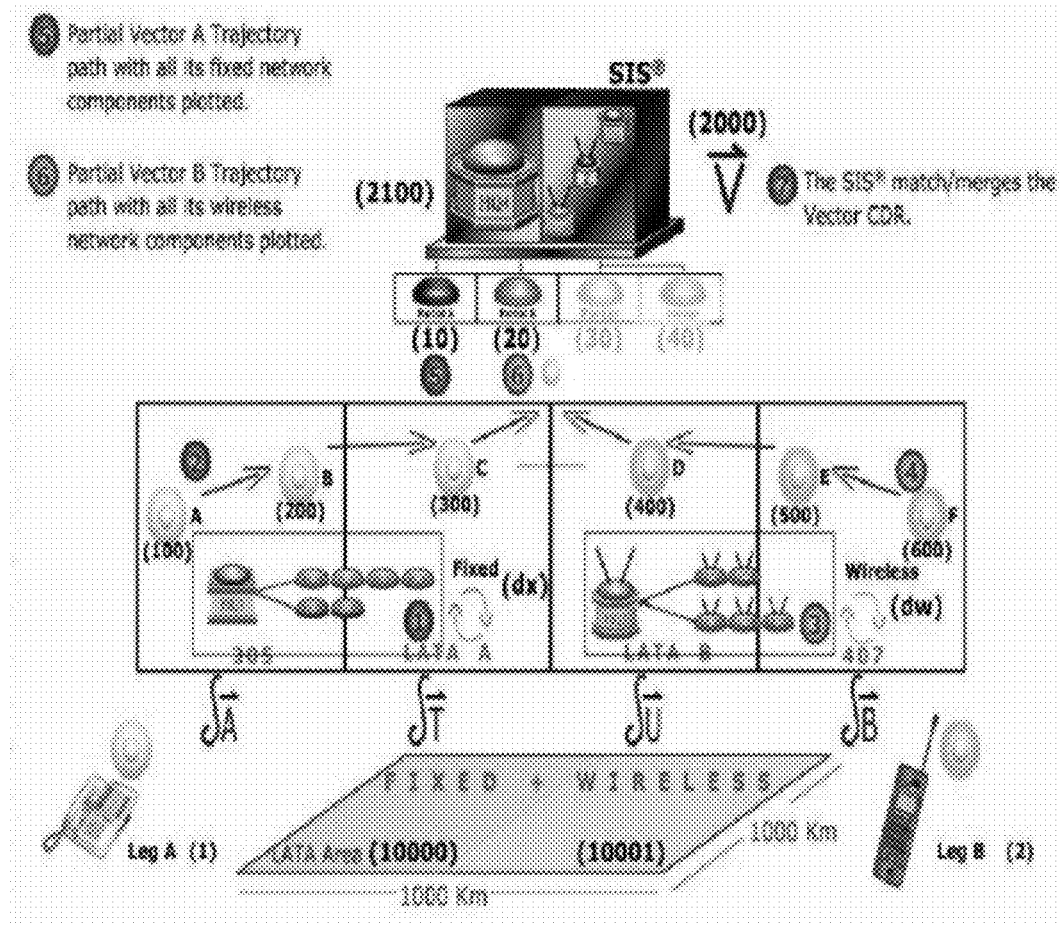
FIG. 85 Match/Merge a Hybrid Call (SIS or Middleware Tier)
Figure 86:
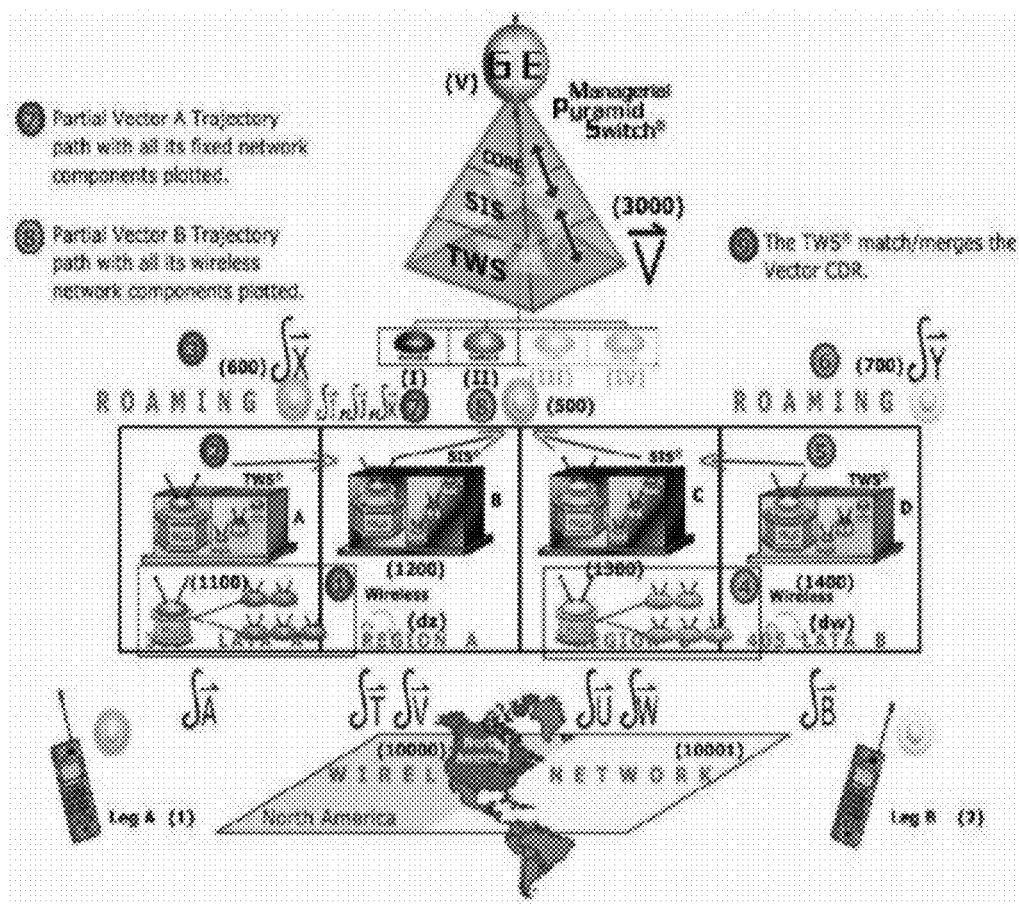
FIG. 86 Match/Merge a Complex Call (MPS or Summit Tier)

FIG. 85: is a schematic representation of match/merging a Hybrid Call (SIS or Middleware Tier) by detecting the fixed/wireless environment (10000/10001). (1) (100), (200), (300), (400), (500) and (600) of the call required to plot the trajectory. The system detects messages from (2) fixed (dx) and (3) wireless (dw) environment, and immediately converts them into lingua franca messages and (4) rearward and (5) forward chains the information to the (6) Call Owner, so it can match/merge the resultant correlated (7) Vector CDR.

Figure 87:
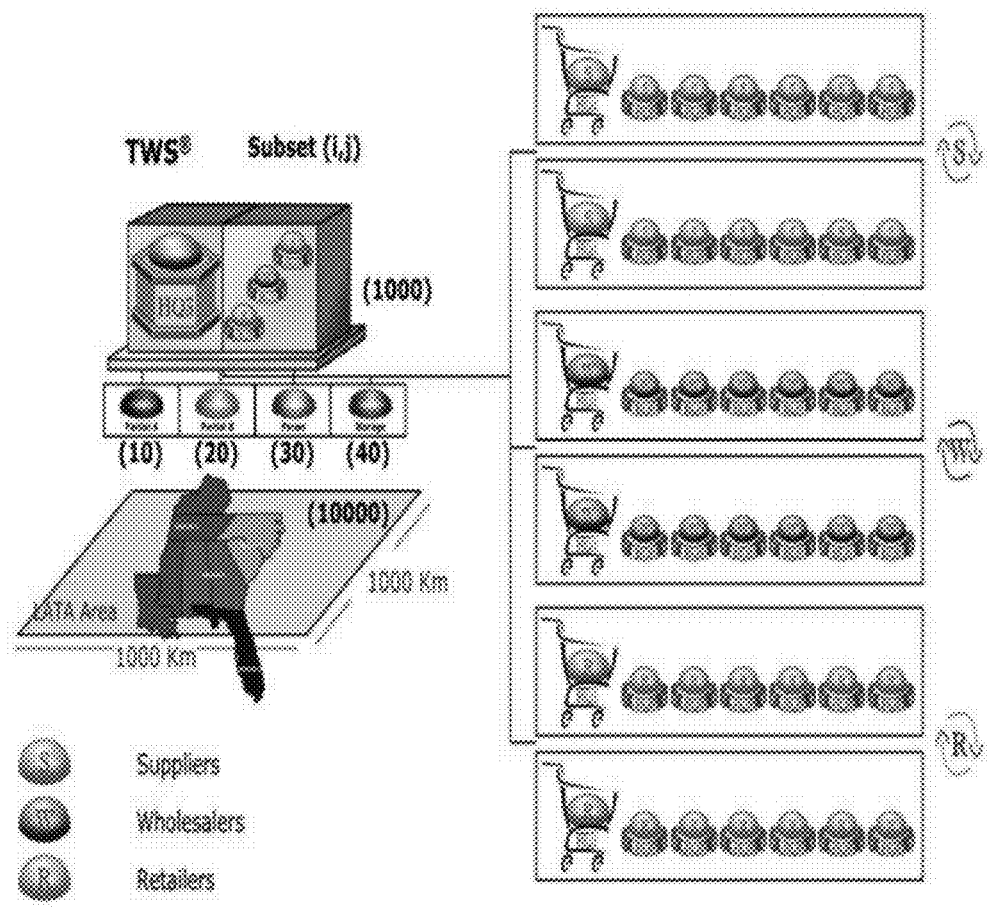
FIG. 87 UCommerce (TWS or Lower Tier)
Figure 88:
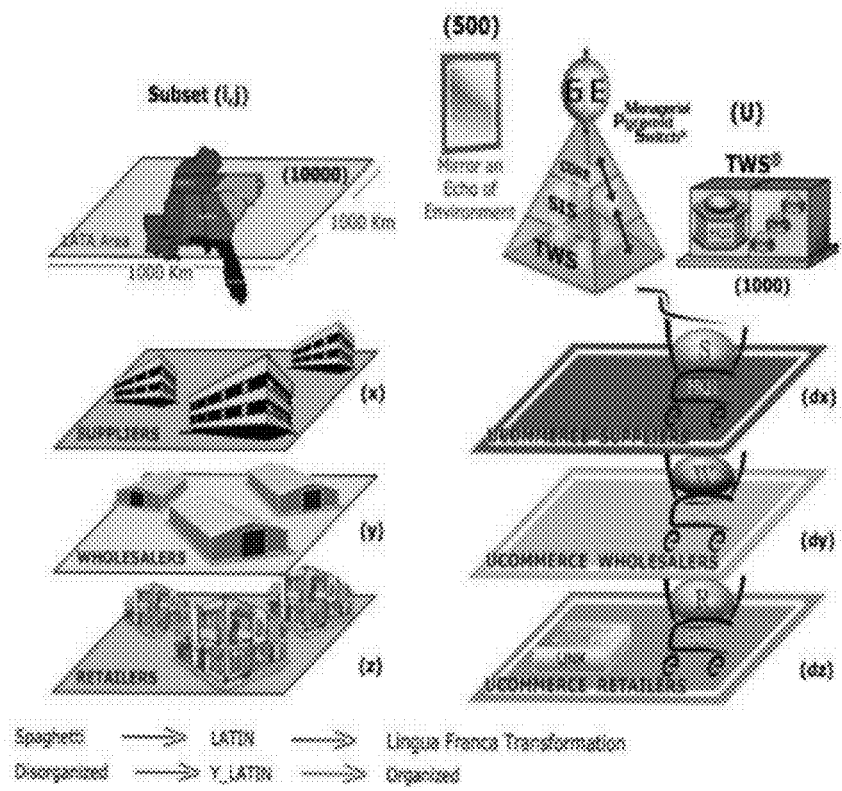
FIG. 88 Converting and simplifying a Subset (I, J)

FIG. 87: is a schematic representation of match/merging a Complex Call (MPS or Summit Tier) by detecting the fixed/wireless environment (10000/10001). (1) (100), (200), (300), (400), (500), (600) and (700) of the call required to plot the trajectory. The system detects messages from (2) fixed (dx) and (3) wireless (dw) environment, and converts them into lingua franca messages and (4) rearward and (5) forward chains the information to the (6) Call Owner, so it can match/merge the (7, 8) Partial Vector CDR into the correlated (9) resultant Vector CDR.

FIG. 87: is a schematic representation of UCommerce (TWS or Lower Tier) (1000) is part of a greater cluster and controls a predefined geographical area covering a plurality of LATA (Local Access and Transport Areas) (10000). Partial Leg A (10) and Partial Leg B (20) functions consist of Artificial Intelligence means to create Quotes, Micro, Macro, Super and Global Orders from a plurality of origination points to a common denominator UCommerce, Warehouse or destination port.

The Parser (30) converts messages into a lingua franca standard and updates $3^{rd}$ party inventory means. The Storager (40) distributes tasks to a plurality of Intelligent Components the latest conditions of the environment and priorities to satisfy quotes and orders with the lowest cost and time delays to the end user. The <S> for Suppliers, <W> for Wholesalers and <R> Retailers consists of a plurality of HQ1-HQ0 nodes that manage and control the $3^{rd}$ party inventory means of suppliers and their organizations. <R>, <S> and <W> have the geographic subset (i, j) and are linked to a common denominator <U> UCommerce Warehouse H3-HQ2 that serves as Leg B final destination when merchandise is shipped from originating $3^{rd}$ parties.

The system creates a Vectors CDR that has a complete quote or order that is part of more complex data structures such as a macro order. The Lower Tier is a subset (i, j) subordinate of a Middleware Tier set (i) that controls a continental region, which in turn belongs to the superset (U). The partial differential equation permits the match/merge of a plurality of quotes and orders into complex structures and also permits that each end user request be unique. Once the geospatial data is normalized the system can use available Inventory to find the optimal price.

Figure 89:
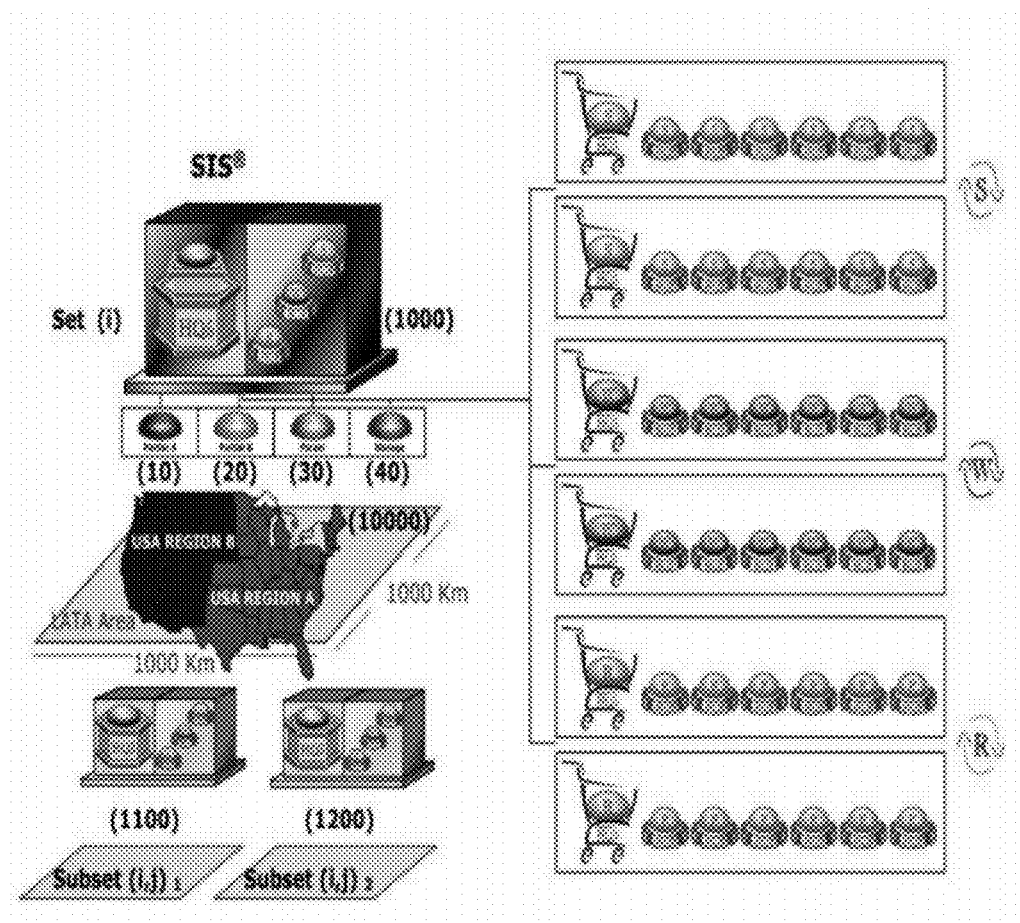
FIG. 89 UCommerce (SIS or Middleware Tier)

FIG. 89: Converting and Simplifying a subset (i, j) (SIS or Middleware Tier), and creating a minor of the environment (500) that is converted, standardized and transformed to remove the spaghetti phenomena of disassociated <R> Retailers, <S> Suppliers and <W> Wholesalers belonging to a geographical area (10000), in this case Southeastern USA. These $3^{rd}$ parties are managed and controlled by a particular <U> UCommerce Warehouse that regulates and rations the available inventory based on cost and need.

The system integrates an x or Retailers, y or Suppliers and z or Wholesalers, and then optimizes its inventory means into dx, dy and dz respectively that are available to a UCommerce warehouse. The messages from these $3^{rd}$ party inventory means are integrated and standardized as Vectors CDR that possess Leg A origin, Leg (T, U) Tandem destination and Leg B final destination points for the world wide delivery of merchandise. Using business rules, the system can purchase one item for one end user or in mass for a plurality of customers.

FIG. 89: UCommerce/SIS (1000) is part of a greater cluster and controls a predefined geographical area covering a plurality of Continental Area sets (i) (10000) with a plurality of LATA Area subsets (i, j) 1 (1100) and (i, j) 2 (1200) Partial Leg A (10) and Partial Leg B (20) functions consist of Artificial Intelligence means to create Quotes, Micro, Macro, Super and Global Orders from a plurality of origination points to a common denominator UCommerce, Warehouse or destination port.

The Parser (30) converts the messages into a lingua franca standard and updating the $3^{rd}$ party inventory means. The Storager (40) distributes tasks to a plurality of nodes with the latest conditions of the environment and priorities to satisfy quotes and orders with the lowest cost and time delays to the end user. The <S> for Suppliers, <W> for Wholesalers and <R> Retailers consists of a plurality of HQ3-HQ2 nodes that manage and control the $3^{rd}$ party inventory means of suppliers and their organizations. <R>, <S> and <W> have the geographic subset (i, j) and are linked to a common denominator <U> UCommerce Warehouse H5-HQ4 that serves as Leg B final destination when merchandise is shipped from originating $3^{rd}$ parties.

The system creates a Vectors CDR that has a complete quote or order that is part of more complex data structures such as a macro order. Middleware Tier set (i) controls a continental region belongs to the superset (U) that belongs to the Summit Tier. The Middleware Tier has a plurality of subordinates Lower Tiers that consist of a plurality of nodes. HQ3+ Nodes have IDW (Intelligent Data Warehouse) characteristics. The partial differential equation permits the match/merge of a plurality of quotes and orders into complex structures and permits each end user request be unique. Upon the geospatial data is normalized the system can use available Inventory to find the optimal price.

Figure 90:
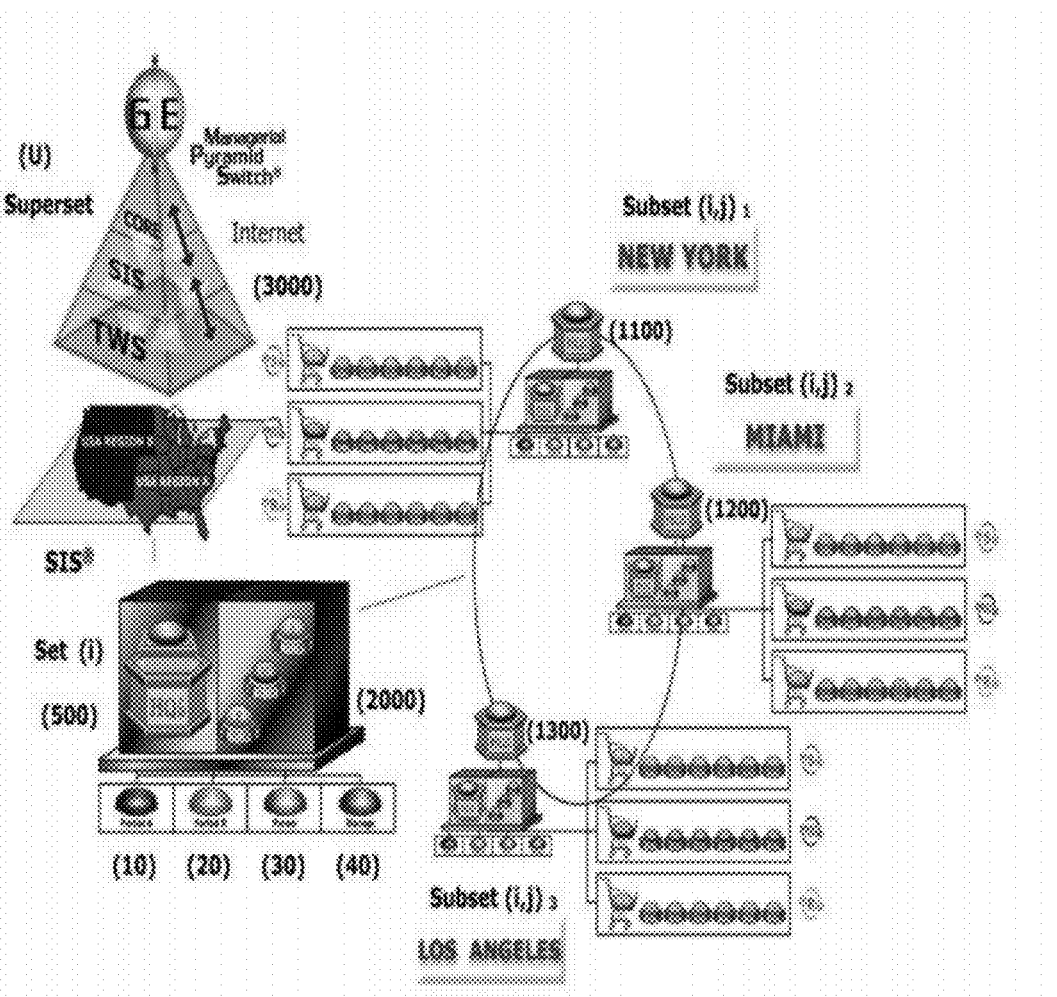
FIG. 90 UCommerce Set (X)—USA.

FIG. 90: UCommerce Set(x) USA is a diagram that shows how all of the inventories belong to the United States belonging to a Middleware Tier (2000). This organization of computers has the means to interact and process transactions in parallel with its parent Summit Tier (3000) and the Superset (U) that has global scope. This specific organization of computers consists of a SIS that possesses Partial A (10), Partial B (20), Parser (30) and Storager (40) functions that manage and control a plurality of subordinates (i, j) 1 (1100) situated in New York City, N.Y., (i, j) 2 (1200) situated in Miami, Fla., and (i, j) 2 situated in Los Angeles, Calif.

Each of the subordinate also possesses Partial A (10), Partial B (20), Parser (30) and Storager (40) that manage and control regions that match/merge regional scope transactions or the portion of the transaction under their command.

Figure 91:
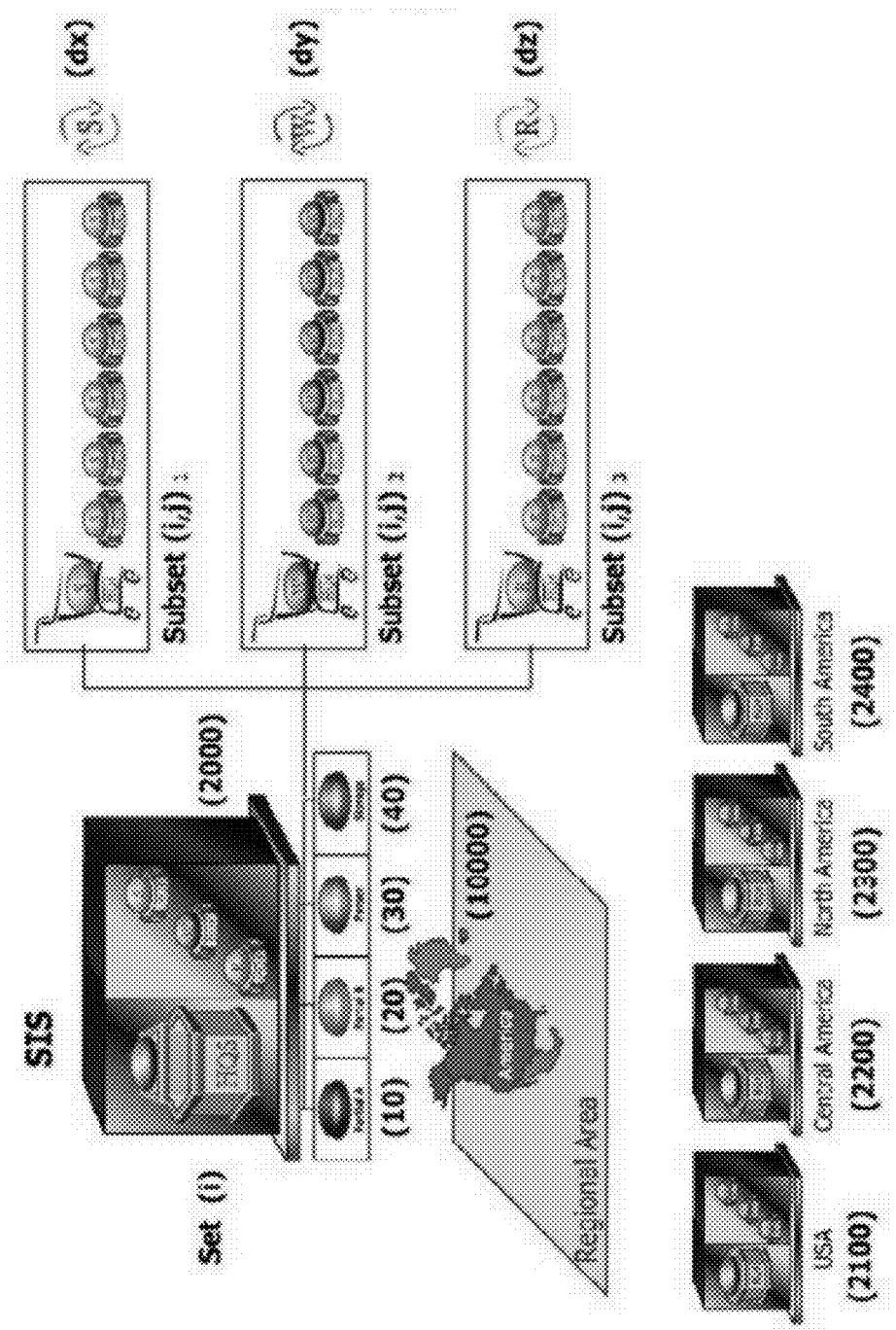
FIG. 91 Normalizing and simplifying a continent.

FIG. 91: is a diagram of Normalizing and Simplifying a Continent (10000) that consists of a set (i) that is managed and controlled by a Middleware Tier or SIS (2000) that possesses a plurality of subordinates TWS with the following regions: USA (2100), Central America (2200), North America (2300) and South America (2400). The plurality of retailers, suppliers, UCommerce warehouses and wholesalers are distributed amongst the Intelligent Components as (dx), (dy) and (dz). The system uses Environmental Bitmaps or Summary Report that calculate, using X_FOB and Y_CDIF methods optimal delivery means to any point of the Continent. Each $3^{rd}$ party is managed and controlled by a particular UCommerce Warehouse Lower Tier that regulates and rations the available inventory based on cost and need.

Figure 92:
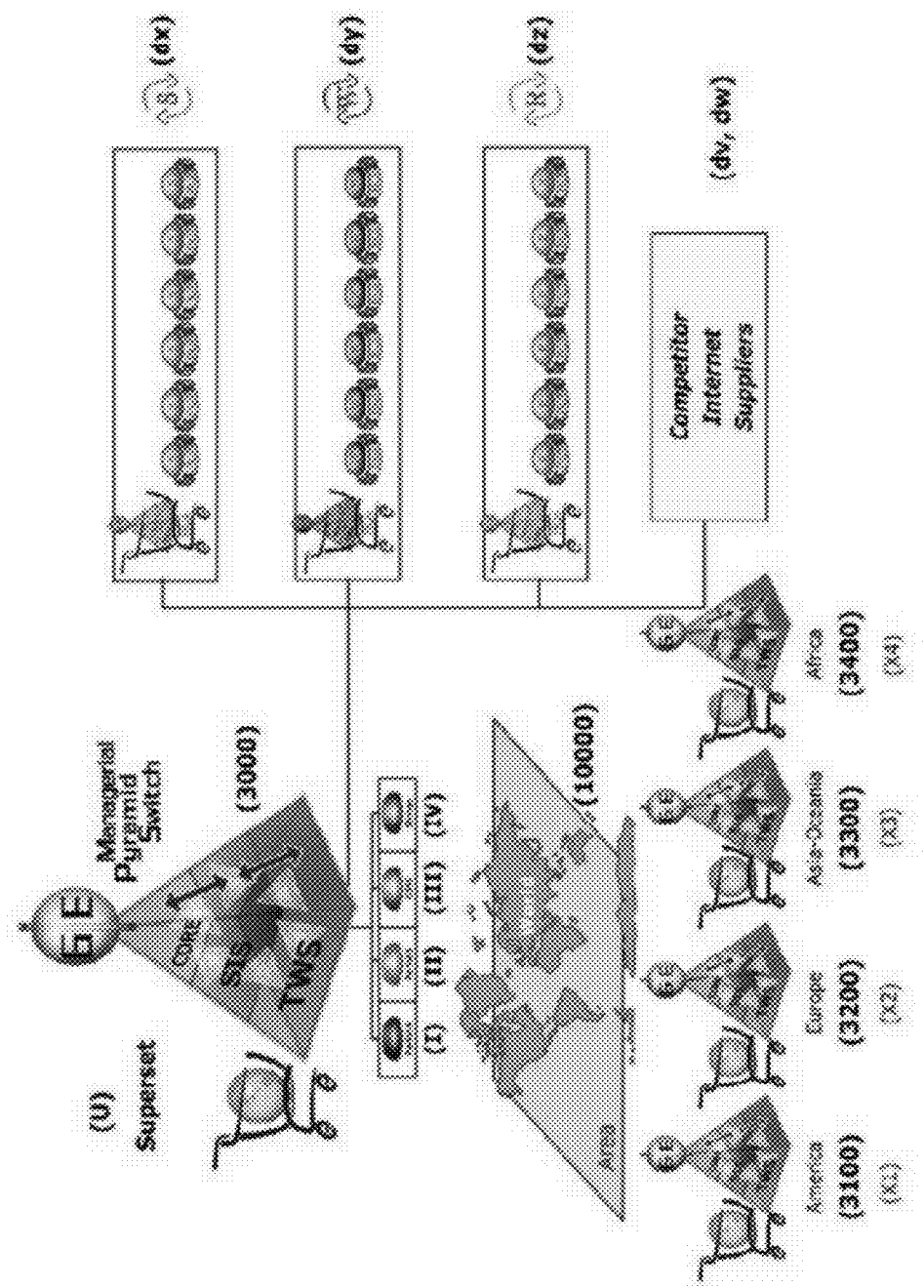
FIG. 92 Normalizing and simplifying the Internet.

FIG. 92: is a diagram of Normalizing and Simplifying the Internet (10000) that consists of a superset (U) that is managed and controlled by a Summit Tier (3000) that possesses a plurality of subordinates Middleware Tier with the following continental regions: America (3100), Europe (3200), Asia-Oceania (3300) and Africa (3400). The plurality of retailers, suppliers, UCommerce warehouses and wholesalers are distributed amongst the nodes as (dx), (dy), (dz) and are compared against Competitor Internet supplier system inventory distribution means (dv) and (dw). The system creates Summary Reports data structures files that calculate, using X_FOB and Y_CDIF methods, optimal delivery means to any point of the Continent. Each $3^{rd}$ party is managed and controlled by a particular UCommerce Warehouse TWS that regulates and rations the available inventory based on cost and need.

Figure 93:
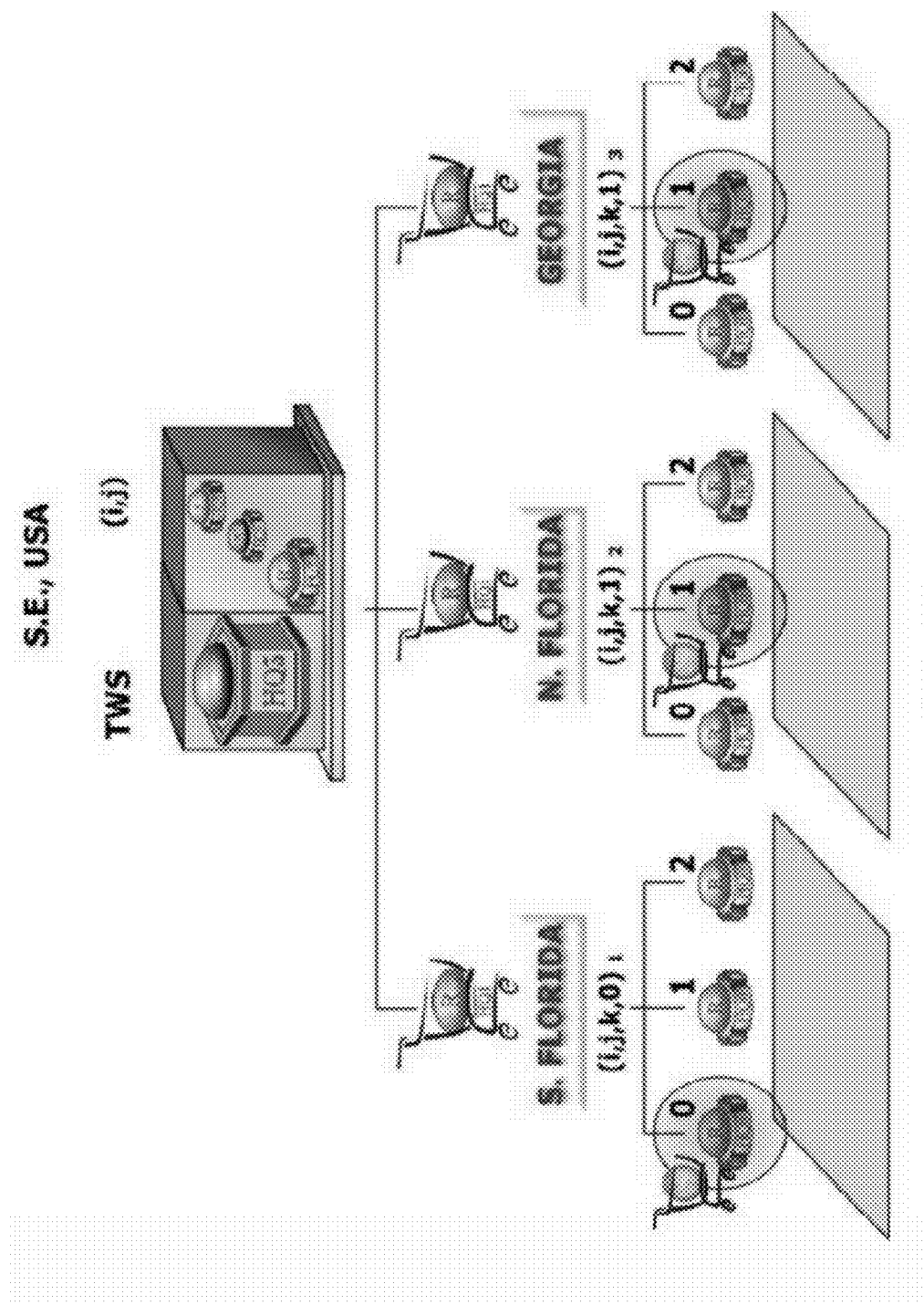
FIG. 93 UCommerce searches retailers (TWS or Lower Tier)
Figure 94:
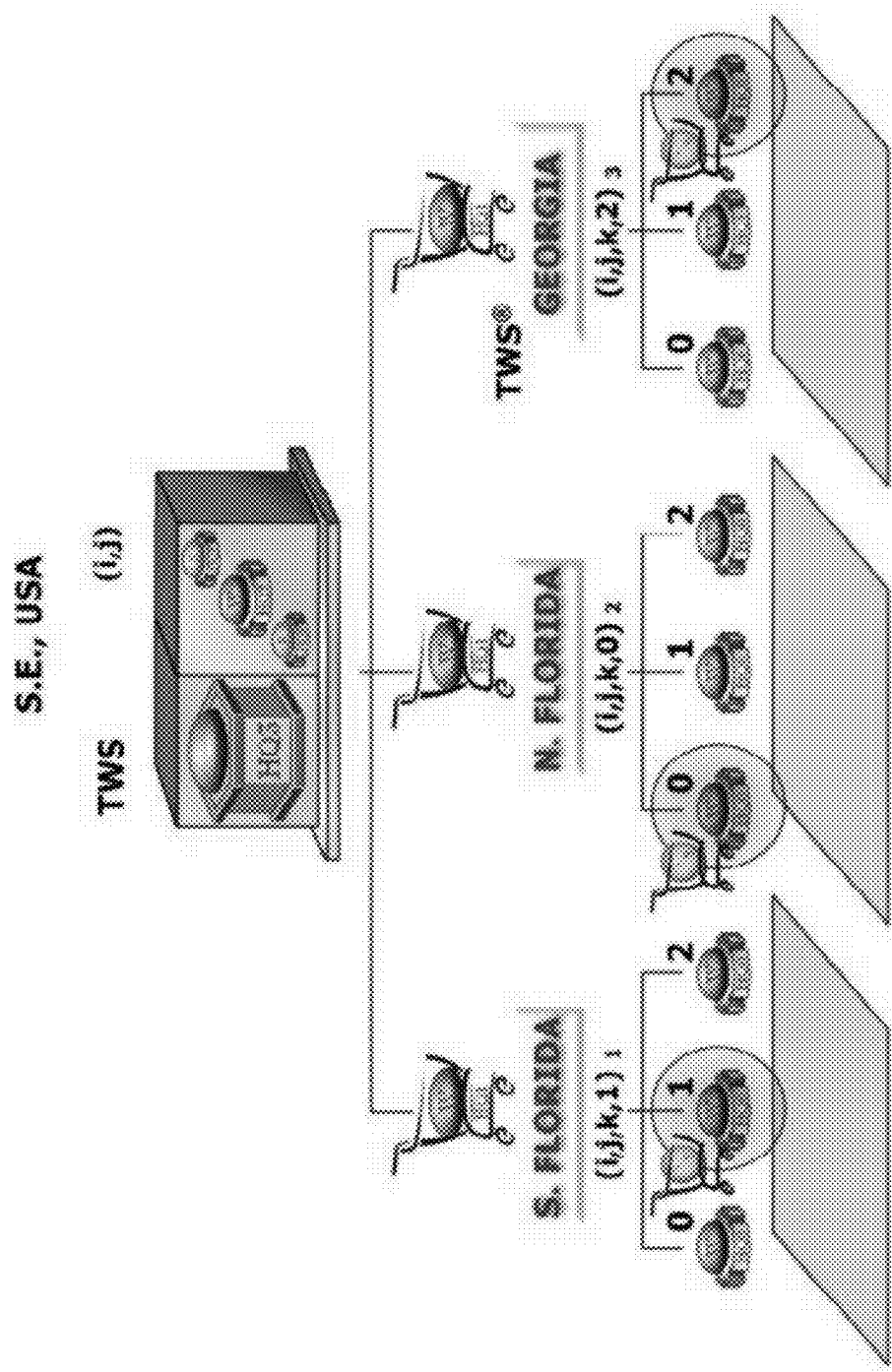
FIG. 94 UCommerce searches wholesalers (TWS or Lower Tier)

FIG. 93: is a schematic representation of how a UCommerce TWS or Lower Tier (1000), controlling the South East of USA, can identify the needs of a customer and search from all of the retailers belonging to the South Florida (10001), North Florida (10001) and Georgia (10002) geographical areas to find the best priced Inventory in Hand the system does as follows:
a) Search the best price based on local scope sector (i, j, k, 0)1 for South Florida (100), (i, j, k, 1)2 for North Florida (200) and (i, j, k, 1)3 for Georgia (300). Then determine overall best price, in this case (i, j, k, 0)1 located in South Florida.
b) Compare the available inventory levels of each retailer. Three retailers have available inventory with optimal prices available for the geographical area.
c) Find the best price at Leg B the destination using Intelligent Inventory Rules.
d) Compares the best retailer price against the UCommerce warehouse prices, using X_FOB and Y_CDIF calculation to find the optimal route to send to the end user the purchase order with the best price, shortest delay and reliable shipping means FIG. 94: is a schematic representation of how a UCommerce Lower Tier or TWS (1000), controlling the South East of USA, can identify the needs of a customer and search from all of the wholesalers belonging to the South Florida (10001), North Florida (10001) and Georgia (10002) geographical areas to find the best priced Inventory in Hand the system does as follows:
a) Search the best price based on local scope sector (i, j, k, 0)1 for South Florida (100), (i, j, k, 1)2 for North Florida (200) and (i, j, k, 1)3 for Georgia (300). Determine the best price, in this case (i, j, k, 0)2 located in North Florida.
b) Compare the available inventory levels of each wholesaler. Three wholesalers have available inventory with optimal prices available for the geographical area.
c) Find the best price at Leg B the destination using Intelligent Inventory Rules.
d) Compares the best retailer price against the UCommerce warehouse prices, using X_FOB and Y_CDIF calculation to find the optimal route to send to the end user the purchase order with the best price, shortest delay and reliable shipping means.

Figure 95:
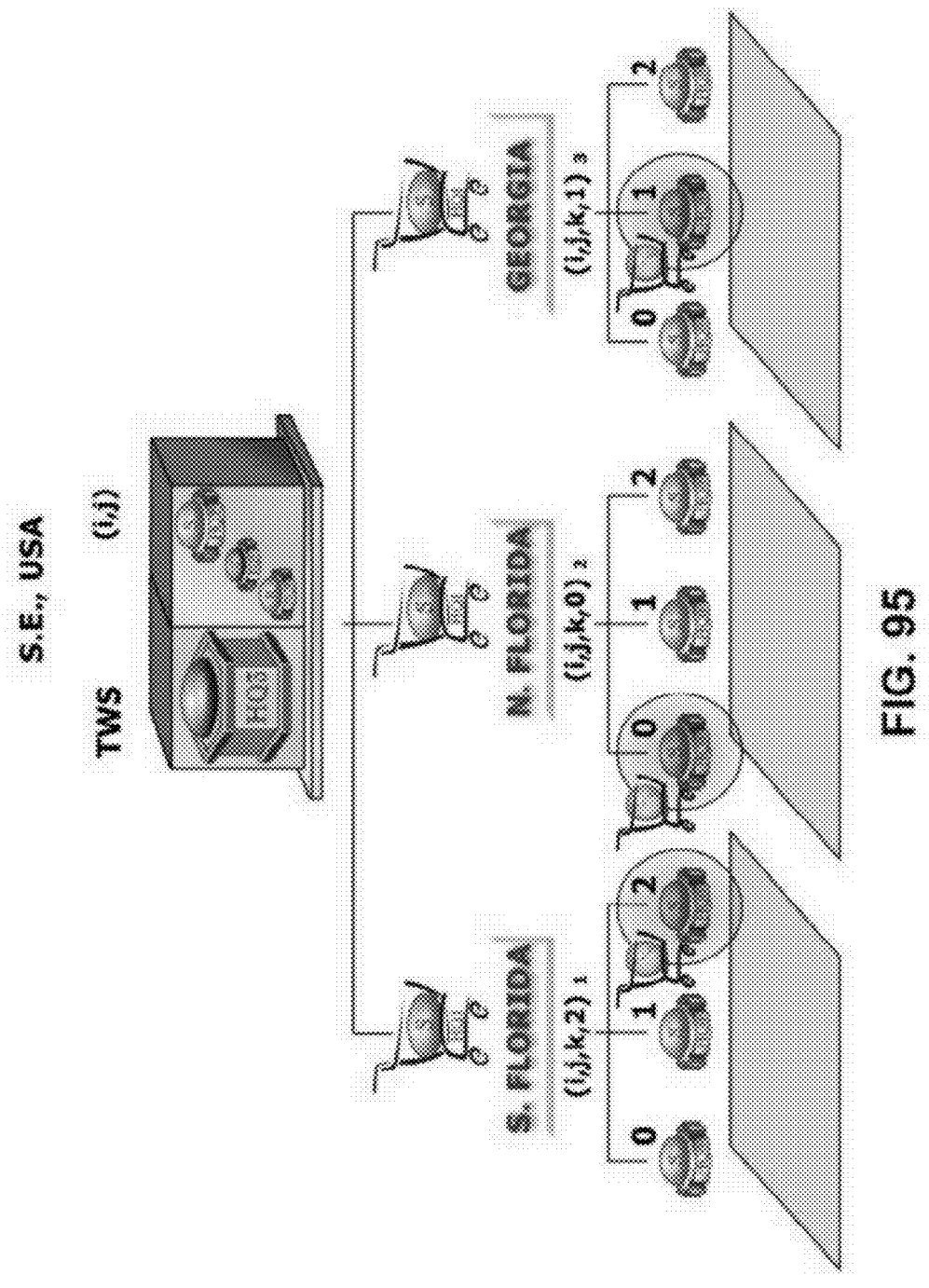
FIG. 95 UCommerce searches suppliers (TWS or Lower Tier)

FIG. 95: is a schematic representation of how a UCommerce Lower Tier or TWS (1000), controlling the South East of USA, can identify the needs of a customer and search from all of the suppliers belonging to the South Florida (10001), North Florida (10001) and Georgia (10002) geographical areas to find the best priced Inventory in Hand the system does as follows:
a) Search the best price based on local scope sector (i, j, k, 0)1 for South Florida (100), (i, j, k, 1)2 for North Florida (200) and (i, j, k, 1)3 for Georgia (300). Determine the best price, in this case (i, j, k, 1)3 located in Georgia.
b) Compare the available inventory levels of each supplier. Three supplier have available inventory with optimal prices available for the geographical area.
c) Find the best price at Leg B the destination using Intelligent Inventory Rules.
d) Compares the best retailer price against the UCommerce warehouse prices, using X_FOB and Y_CDIF calculation to find the optimal route to send to the end user the purchase order with the best price, shortest delay and reliable shipping means.
Note: UCommerce Searches using FIG. 93 to FIG. 95 occurs simultaneously.

Figure 96:
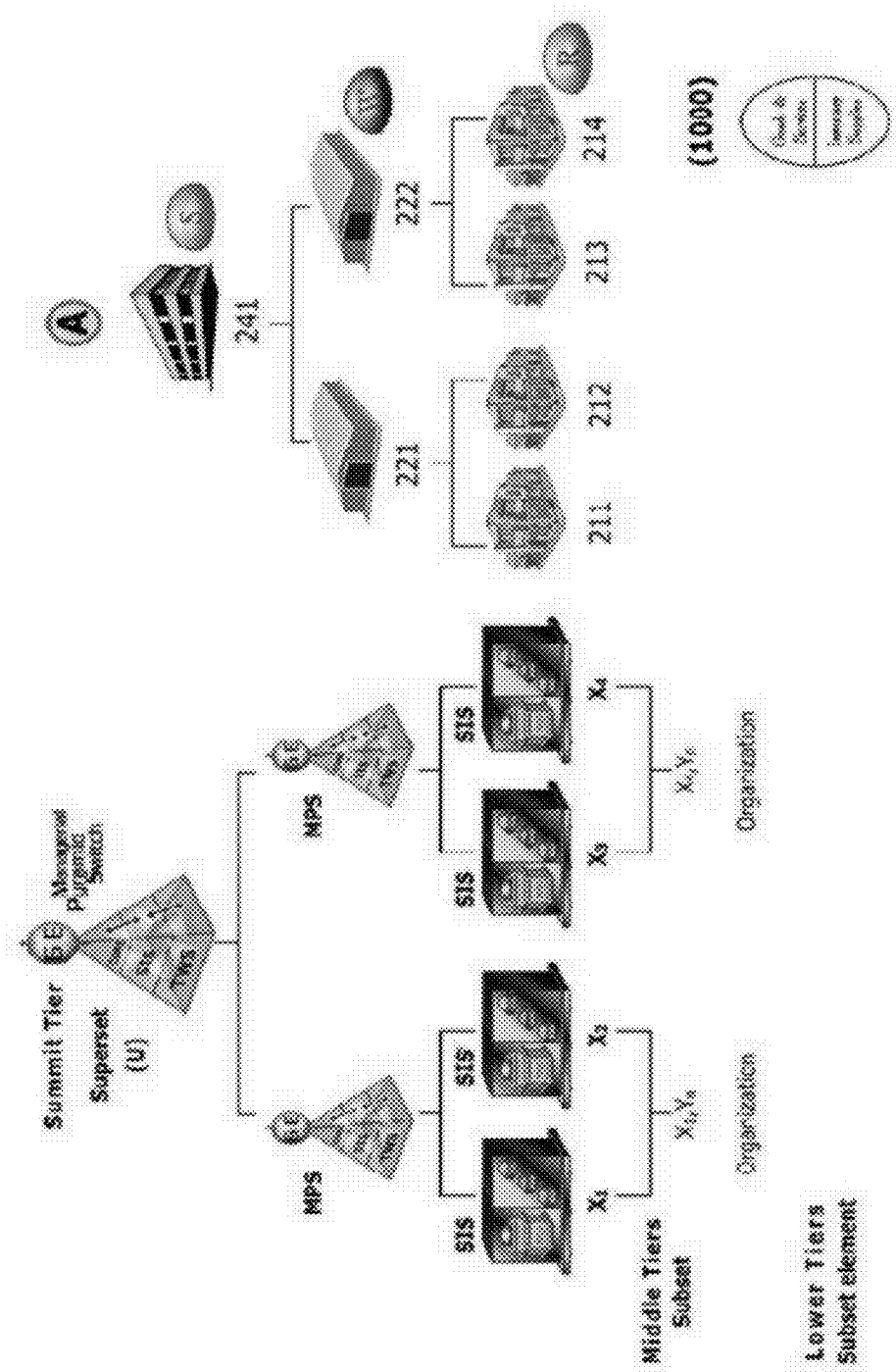
FIG. 96 UCommerce—Overview.

FIG. 96: is a schematic representation of how an UCommerce organization, expressed as (U) the Superset, is subdivided into Sets and Subsets. On the left hand side, (U) is represented by the Internet scope Summit Tiers, Sets X1 and X2 by a plurality of Continental MPS and Subsets (X1, Y1), (X1, Y2), (X2, Y1) and (X2, Y2) by the Regional scope Middleware Tiers. Each SIS has a plurality of subordinates Lower Tier or TWS that monitor and control geographical LATA areas or Area Codes. On the right hand side, a plurality of $3^{rd}$ party retailer (211 to 214), wholesaler (221 to 222) and supplier (241) organizations are integrated to the UCommerce supplier system (1000), permitting goods and services worldwide to be distributed to the end users in optimal conditions, based on their needs.

Billing Engine stores the Summary Reports Data Structures: Collectively, the Billing Engine via the Storager function of each Tier stores the Information in summary reports data structures, so that the system has at its disposal the inventory of each $3^{rd}$ party from point A to point B as optimal based on a quantity and shipping method selected by the customer. E.g. when an end user requests a quote, the system checks for each local, regional, continental and Internet scope retailer, wholesaler and supplier inventory distribution means for the best case scenario that satisfies the consumer.

Vector CDR with Associated Cost and Delays: Once the best case scenario is identified, the system creates a Vector CDR with Legs (A, B, U, T) with the associated cost and delays.

Figure 97:
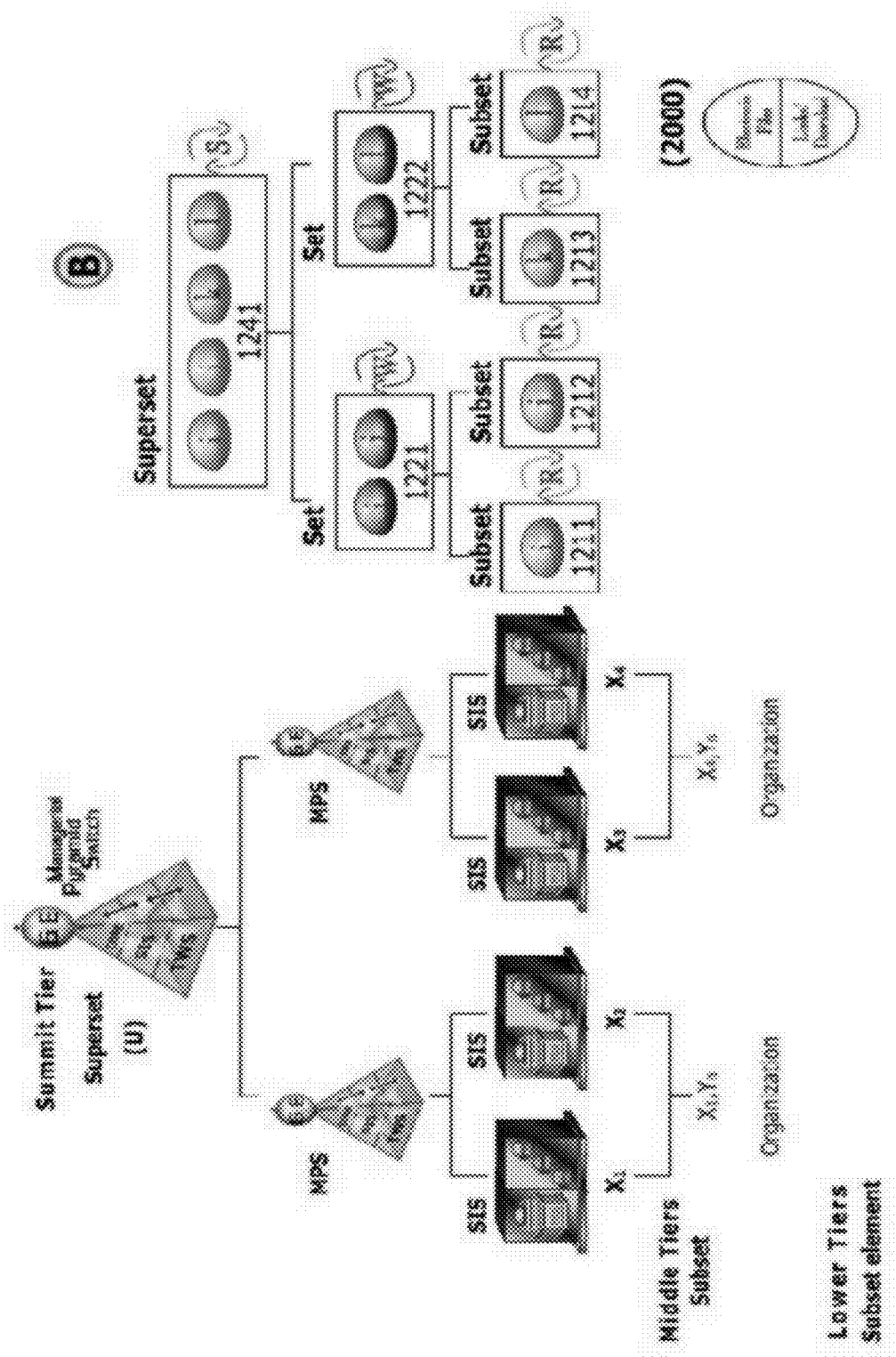
FIG. 97 XCommerce—Overview.

FIG. 97: is a schematic representation of how an XCommerce organization, expressed as (U) the Superset, is subdivided into Sets and Subsets. On the left hand side, (U) is represented by the Internet scope Summit Tiers, Sets X1 and X2 by a plurality of Continental MPS and Subsets (X1, Y1), (X1, Y2), (X2, Y1) and (X2, Y2) by the Regional scope Middleware Tiers. Each SIS has a plurality of subordinates TWS that monitor and control geographical LATA areas. On the right hand side, the Internet links are divided into supersets (1241), sets (1221 to 1222) and subsets (1211 to 1214) that possess search engine clusters of computers that quantify and qualify the environment, and belong to the XCommerce supplier system (2000), permitting the end users to obtain Internet content in optimal conditions, based on their browser driven requests.

Collectively, the Billing Engine via the Storager function of each Tier haw specialized search engine clusters the summary report data structures, so that the system has at its disposal a minor image of the content of the Internet. In this case, when the end user requests an Internet browser search, the system checks based on priority of each keyword contained in its request for the best case scenario that satisfies the consumer. Note: prior art uses the divide and conquer filtering with regular expressions to help quantify and qualify the best case scenario, whereas XCommerce utilizes summary reports from its managerial relationship indices that are derived from higher quality levels of Informational Pyramid Structures.

Once the best case scenario is identified, the system creates a list of discrete amount of responses from the highest to the lowest that are displayed in the end user's browser.

FIG. 96: is a schematic representation of the transformation of the UCommerce technology into the Simulation Network architecture. The left hand side is the system structure that UCommerce uses to distribute $3^{rd}$ party interface means within the supplier system for a continental region (10000), Mexico represented by a HQ3 and subdivided into HQ2 control subdivisions, such as SE Mexico, NW Mexico and DF (Distrito Federal), controlling each supplier. Each subdivision possesses a plurality of subordinates HQ1 that control a plurality of wholesalers. Each HQ1, in turn, possesses a plurality of subordinates HQ0 that control a plurality of retailers. HQ3 to HQ0 Intelligent Components that belong to a XLDB are responsible for normalizing the information and making it readily available to the end user.

UCommerce Lower Tier Transforms the Environment: On the right hand side, consists of the new transformation of the UCommerce technology, in which all of the retailers, wholesalers and suppliers belong to a TWS and all of the Retailers <R>, Suppliers <S> and Wholesalers <W> are working in unison as part of a cluster. The HQ3 controls the entire geographical area that possesses a plurality of subordinates Lower Tiers (1102 to 1104) controlling SE, NW and DF subdivisions of Mexico. Retailers, Suppliers and Wholesalers are arranged as groups of elements working together and continuously interacting to find the best price for the end user.

Figure 99:
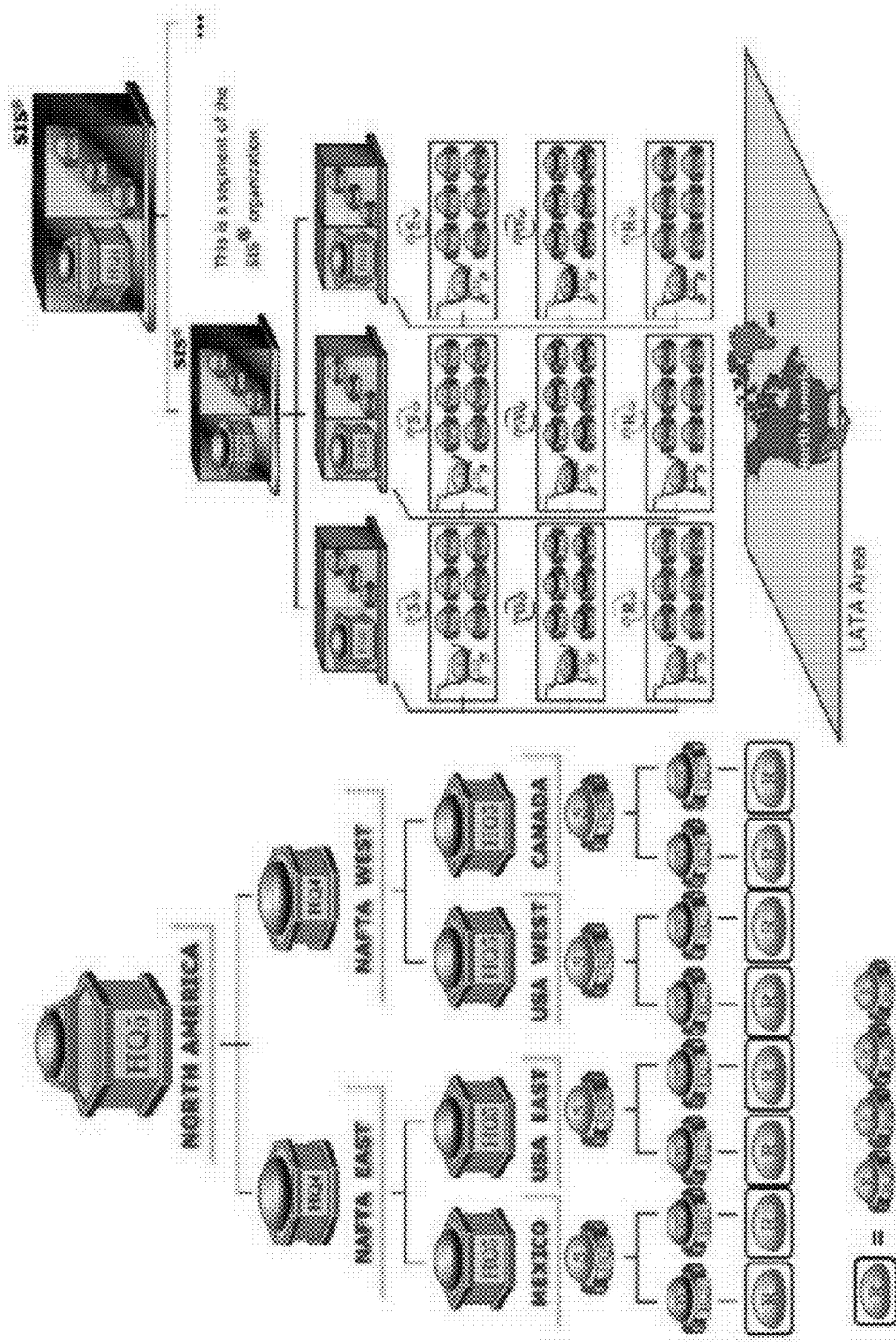
FIG. 99 UCommerce transformation (SIS or Middleware Tier)

FIG. 99: is a schematic representation of the transformation of the original UCommerce technology into the Middleware Tier architecture. In this case, the left hand side is the system structure that UCommerce uses to distribute $3^{rd}$ party interface means within the supplier system for a continent, in this case North America (10000) represented by a HQ5 and subdivided into HQ4, such as NAFTA East, NAFTA West, and is further subdivided into HQ3, such as Mexico, USA East, USA West and Canada. Each subdivision possesses a plurality of subordinates HQ2 to HQ0 that control a plurality of $3^{rd}$ party <R> Retailers, <S> Suppliers, <W> Wholesalers and <U> UCommerce Warehouses. HQ5 to HQ0 nodes, through means of their Intelligent Data Warehouses that are part of an XLDB are responsible for normalizing the information and making it readily available to the end user.

UCommerce Middleware Tier Transforms the Environment: On the right hand side, consists of the new transformation of the UCommerce technology, in which all of the retailers, wholesalers and suppliers belong to a Lower Tier or TWS and all of the Retailers <R>, Suppliers <S> and Wholesalers <W> are working in unison as part of a cluster. The summit SIS (2001) controls the entire geographical area, that possesses a plurality of subordinates SIS (1201+) and TWS (1101 to 1103+) controlling all of the regions of North America. In this case, the figure only shows the Mexico distribution, since USA East, USA West and Canada would not fit in the diagram. For simplicity, let's consider them cloned like with a single HQ4 that possesses HQ3 organizations consisting of HQ2 to HQ0 clusters. Retailers, Suppliers and Wholesalers are arranged as groups of elements working together and continuously interacting to derive the best price.

Figure 100:
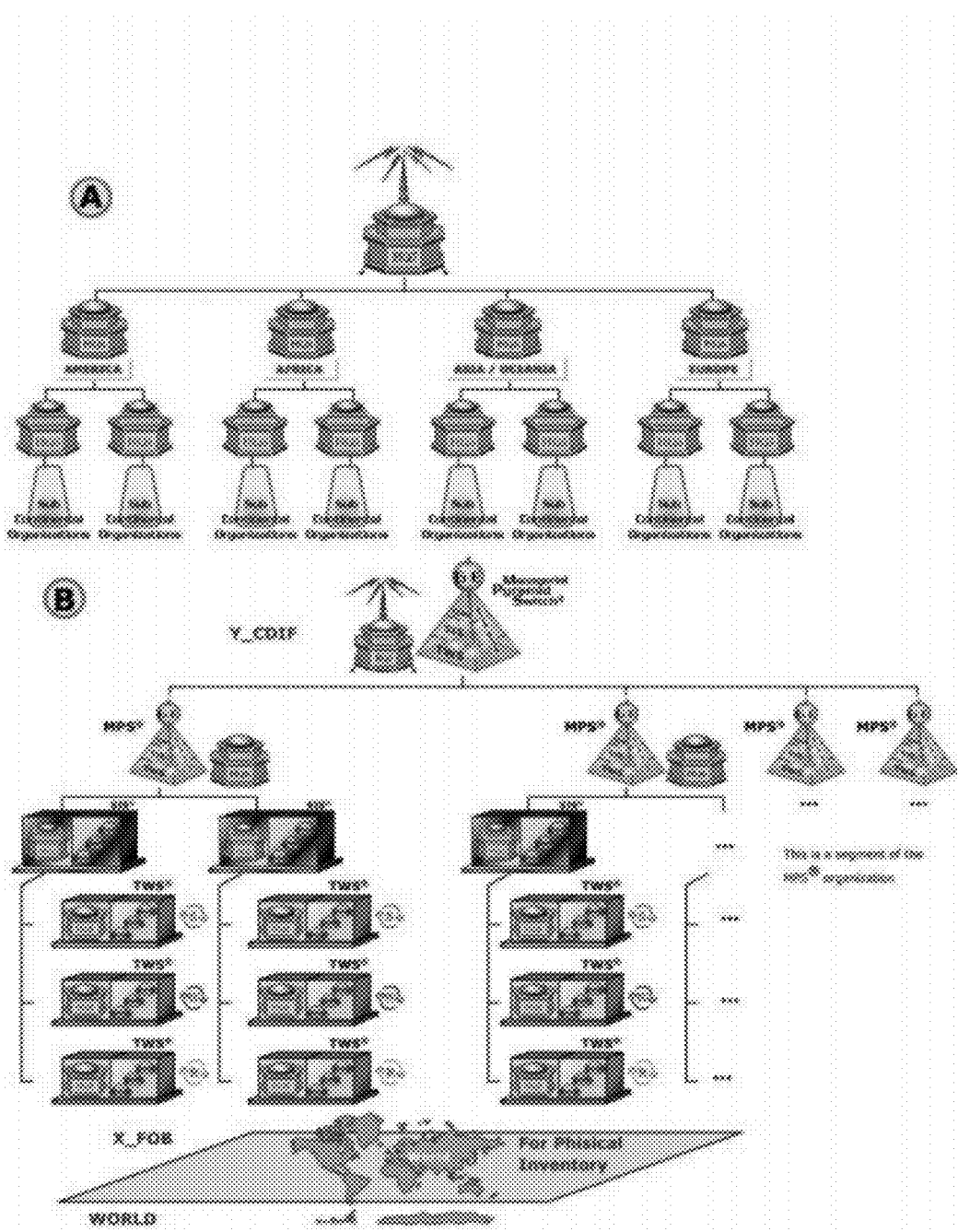
FIG. 100 UCommerce transformation (MPS or Summit Tier)

FIG. 100: is a schematic representation of the transformation of the original UCommerce technology into the Managerial Pyramid Switch architecture. In this case, (A) is the system structure that UCommerce uses to distribute $3^{rd}$ party interface means within the supplier system for a continent, in this case the World (10000) represented by a HQ7 and subdivided into HQ6, such as Africa, America, Asia-Oceania and Europe, and is further subdivided into sub continental regions. Each sub continental region possesses a plurality of subordinates HQ5 to HQ0 that control a plurality of $3^{rd}$ parties <R> Retailers, <S> Suppliers, <W> Wholesalers and <U> UCommerce Warehouses. HQ7 to HQ0 Intelligent Components, through means of their Intelligent Data Warehouses that are part of an XLDB are responsible for normalizing the information and making it readily available to the end user.

UCommerce Summit Tier Transforms the Environment: In this case, (B) consists of the new transformation of the UCommerce technology, in which all of the suppliers, wholesalers and suppliers belong to a Lower Tier and each Retailers <R>, Suppliers <S> and Wholesalers <W> work in unison as part of a cluster. The summit MPS (3001) controls the entire geographical area that possesses a plurality of subordinates MPS (3001+) that possess a plurality of SIS organizations that have a plurality of TWS organizations controlling all of the regions of the World.

Each Tier organization creates their own Summary Report that competes each time and an end user makes a quote for goods and services. And for each item requested by the end user identifies the best price to the Leg B destination. UCommerce warehouse and upon receiving notification of a purchase match/merges each item into a single quote.

Figure 101:
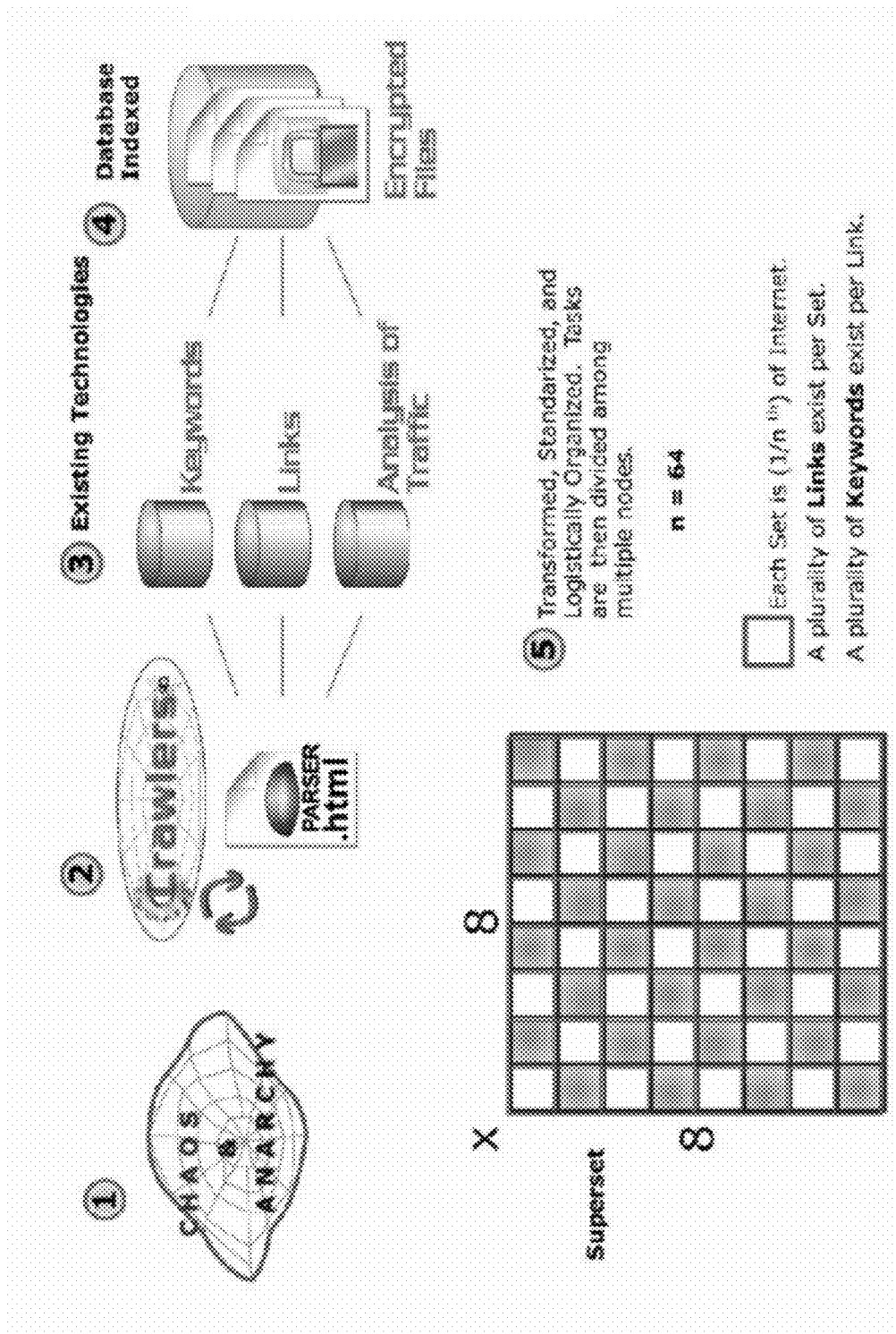
FIG. 101 Cleaning the 'Spaghetti Phenomena'.

FIG. 101: is a schematic representation of cleaning the 'Spaghetti Phenomena' by $3^{rd}$ parties prior are, where (1) the (U) Internet is considered chaos and anarchy. (2) A plurality of Web Crawlers applications gather and analyze the content of different pages, and then further distill, transform and eliminate redundancy by filtering using KEYWORDS, and mathematically quantifying each page. (3) Improving the Informational Entropy to certitude is by statistically associating the relevant KEYWORDS belonging to the English language. (4) Storing the numerical results into managerial relationship data structures. (5) Normalizing, load balancing and converting the original (U) into the information entropy (U') that consists of a plurality of sets (I, J) n that concurrently have stored the information in an organized and logical manner absent of chaos and anarchy FIG. 102: is a schematic representation of Organizing and Transforming the Internet by prior art, using Supercomputer with cluster of 64 nodes that eliminate Chaos and Anarchy by making a virtual replication of the Internet that is normalized, organized and changed into mathematical data. The (U) is even distributed amongst the (8×8) cluster where each node consists of sets (I, J) n that are further subdivided into subsets (I, J, K) n, that are further subdivided into groups (I, J, K, L) n of links where the system desires to obtain the optimal element (A). Each set (I, J) n possesses its own Database Index collection of compressed files.

Web Browser Regular Expression Response: (A) Is the most satisfying responses derived from a search engine to a web browser regular expression. The cluster of 64 nodes is ideally a lower tier configuration, and manage 2^30 web or 1 billion pages, each middleware tier manages x 20 lower tiers, and the x2 summit tiers manages x2 middleware tiers so that the environment is overlapped four times.

Figure 102:
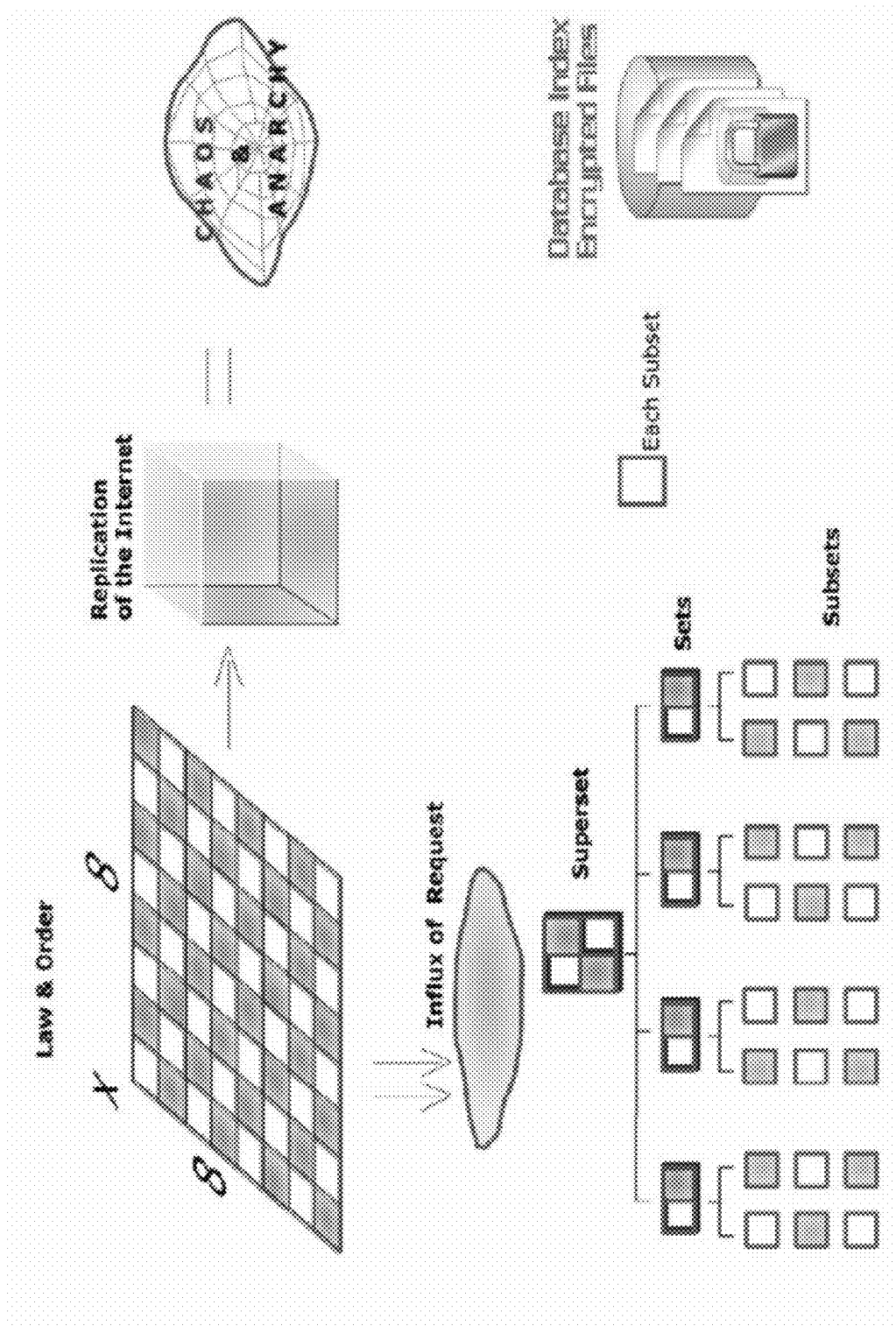
FIG. 102 Organizing and transforming the Internet.
Figure 103:
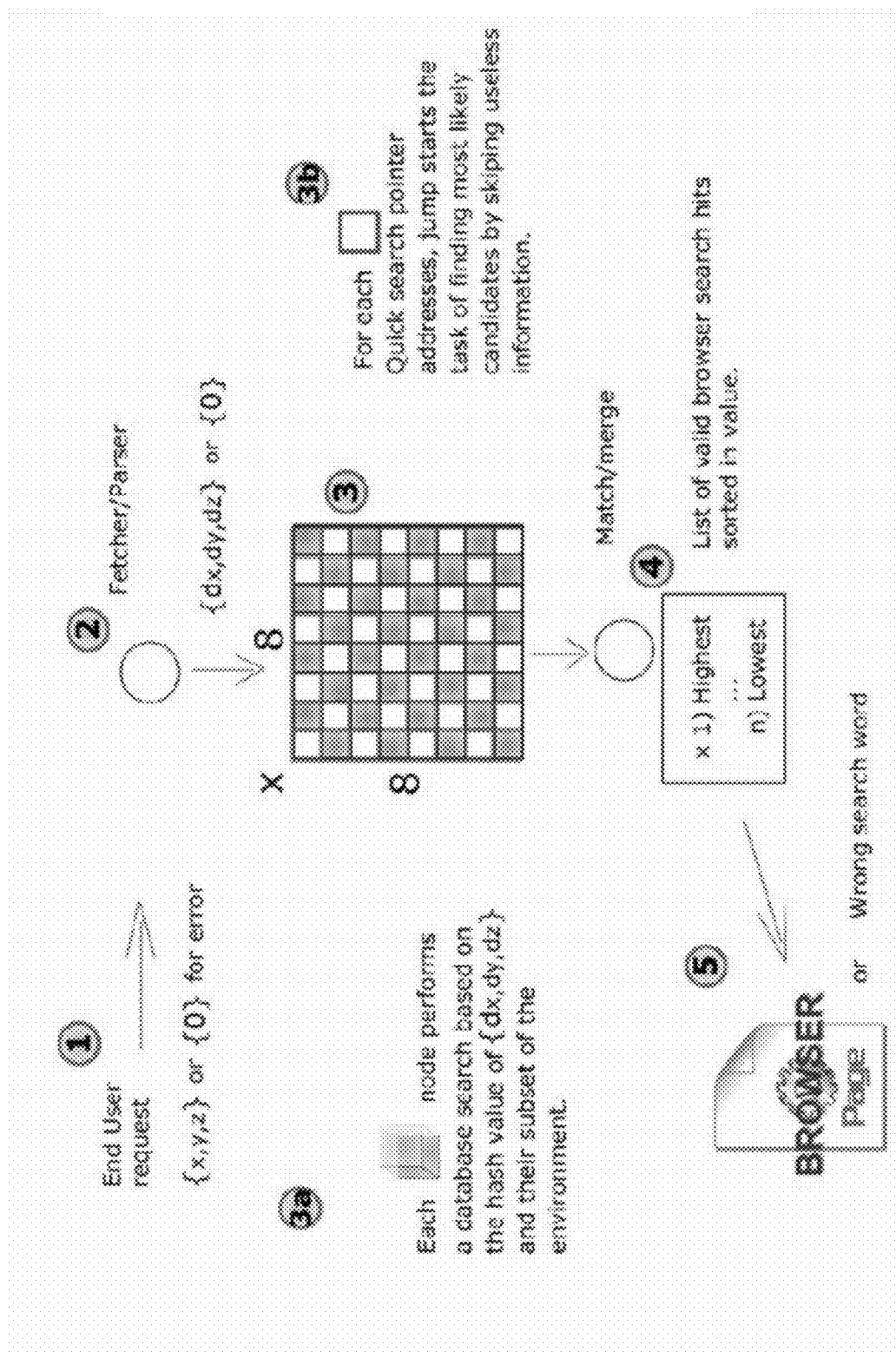
FIG. 103 Classic web search.

FIG. 102: is a schematic representation of a Classical Web Search by $3^{rd}$ parties. (1) Each end user Web Browser search is altered into a set of elements {0, X, Y, Z} where the system compares each of them as belonging to the valid collection of KEYWORDS or an error. (2) A Fetcher/Parser modifies {0, X, Y, Z} into {dX, dY, dZ} or {0} and sends (3) a request for obtaining the optimal element (A) to each parallel running set (I, J) n cluster. (3b) Each cluster carries out a quick search using pointer addresses that jump starts the task of finding the most likely candidates by skipping useless information. As each set (I, J) n match/merges the results that possess a value greater than a predefined limited and sends them to a task handler node that sorts the in order of value and immediately responds via the Web Browser Page with an error message, most likely KEYWORD or a collection of links.

Figure 104:
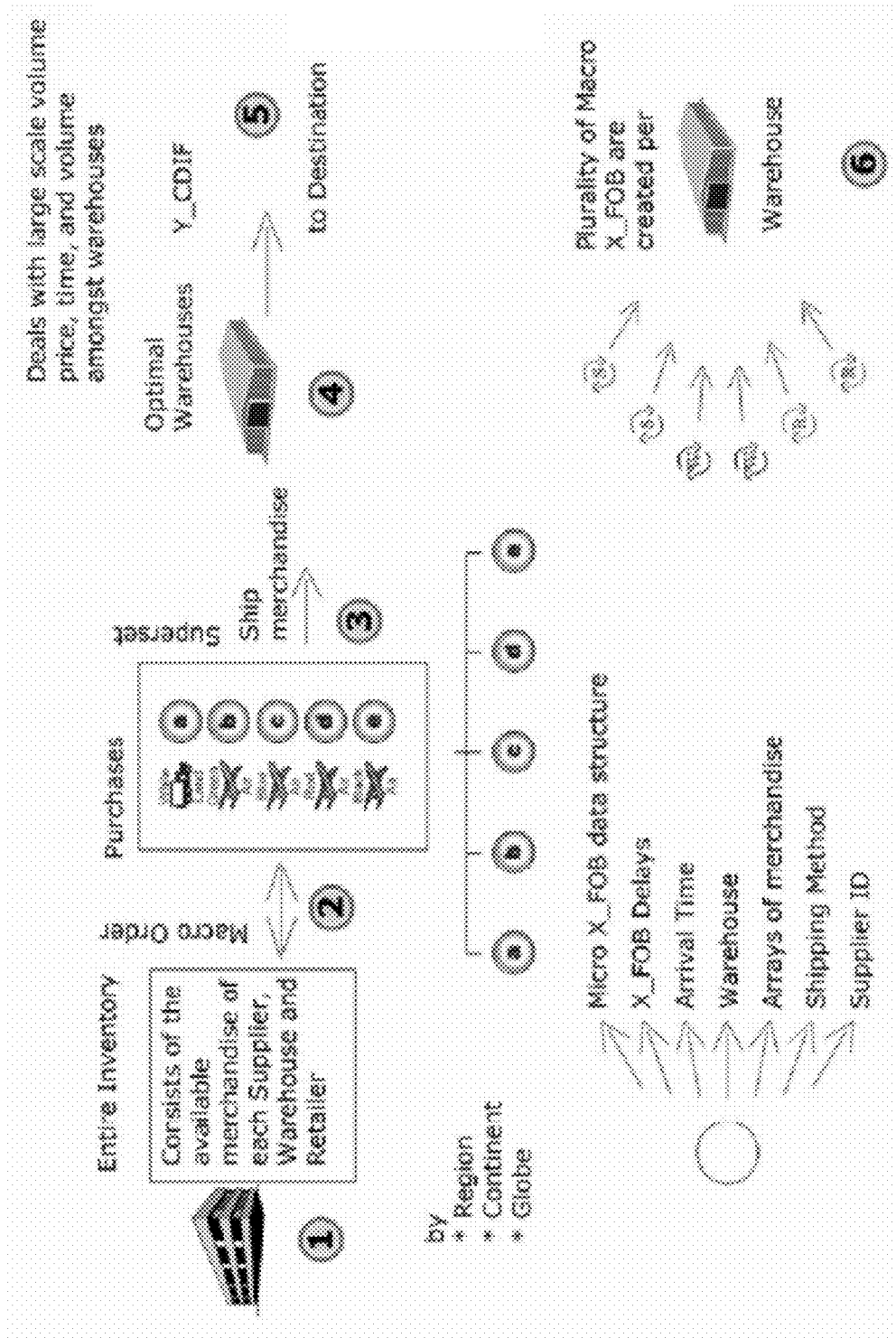
FIG. 104 Macro X_FOB Orders.

FIG. 104: is a schematic representation of Macro X_FOB Orders. (1) The supplier system has stored the entire available merchandise of each Retailer, Supplier, UCommerce Warehouse and Wholesaler by region, continent or global. (2) Each Order is distributed amongst the different system's containers with merchandise using the different transportation means (a, b, c, d, or e). Each container from Leg A, origin, to Leg B, destination, consists of a plurality of partial orders known as a Micro X_FOB data structure that possesses X_FOB delays, arrival time, destination warehouse, an array of merchandise, shipping method (air, land or sea) and a Supplier_ID that denotes the warehouse of the originating $3^{rd}$ party. (3) Collectively, the system match/merges all of the Micro X_FOB into a Superset from an originating region to an (4) optimal UCommerce warehouse, that regulates large scale volume price, time and priorities amongst warehouses.

Final Destination UCommerce Warehouse: (5) match/merges partial orders into a final and complete order, and then sends them through the transportation channels to the final destination.

Plurality of Orders are matched/merged into a Macro Order: (6) Shows how from a plurality of <R> Retailers, <S> Suppliers and <W> Wholesalers, merchandise is sent to an UCommerce warehouse and the system links common denominator containers into a plurality of Macro X_FOB. For example: 5 containers full of merchandise from the same originating warehouse leave via UPS the same day and with the same transportation means to the same destination UCommerce warehouse, the system will consider them as a large container or macro order.

Figure 105:
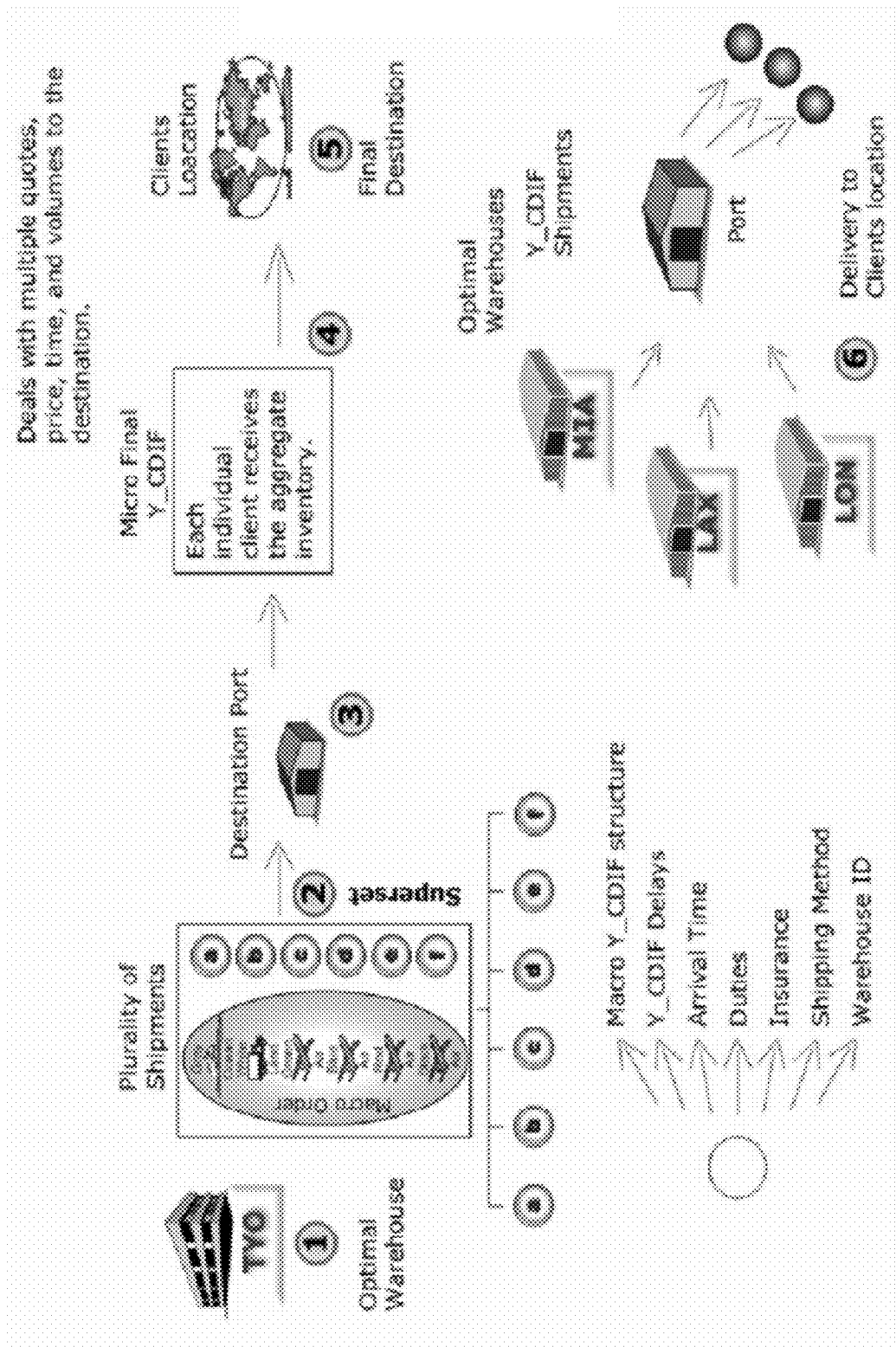
FIG. 105 Macro Y_CDIF Orders.

FIG. 105: is a schematic representation of a Macro Y_CDIF Order. (1) Once the merchandise has arrived to the optimal warehouse to distribute merchandise to the final destination Leg B, (2) the system match/merges a plurality of orders into a large macro order that possesses common denominator origin and final destination. Each container belongs to a Leg U optimal Warehouse and using different transportation means (a, b, c, d, e, or f). Each container from Leg A, origin, to Leg B, destination, consists of a plurality of orders known as a Macro Y_CDIF data structure that possesses Y_CDIF delays, arrival time, associated merchandise duties, insurance, shipping method (air, land or sea) and a Warehouse_ID that denotes where the system match/merges the partial orders into orders. (3) Once the merchandise arrives to the final destination UCommerce warehouse, the Macro Y_CDIF Order is broken up and distributed into order containers. For each common denominator transportation means a plurality of orders that are associated to a Micro Y_CDIF order, where each individual client receives their particular inventory from the whole. (4) Merchandise is shipped to the final destination where duties are paid and then (5) each order is sent to the final destination located in the specified client's location. (6) Shows how from a plurality of UCommerce warehouses <MIA> Miami, <LAX> Los Angeles and <LON> London merchandise is sent to a final destination port for duties clearance, and the system links common denominator containers into a plurality of Macro Y_CDIF. For example: all of the merchandise that is declared at the same time in the same final destination port belonging to a plurality of customers. Once customs are complete, the merchandise is locally shipped to the Leg B located in the specified client's location.

UCommerce 2010: UCommerce purchases the merchandise directly and owns it until delivery, unless the end user purchases Inventory In hand merchandise via GOLD LABEL. Otherwise, the system will purchase in bulk quantities at the lowest prices and lowest transportation cost to replenish its warehouse based of forecasted demands so that it can minimize the forecast demand of its customers.

Figure 106:
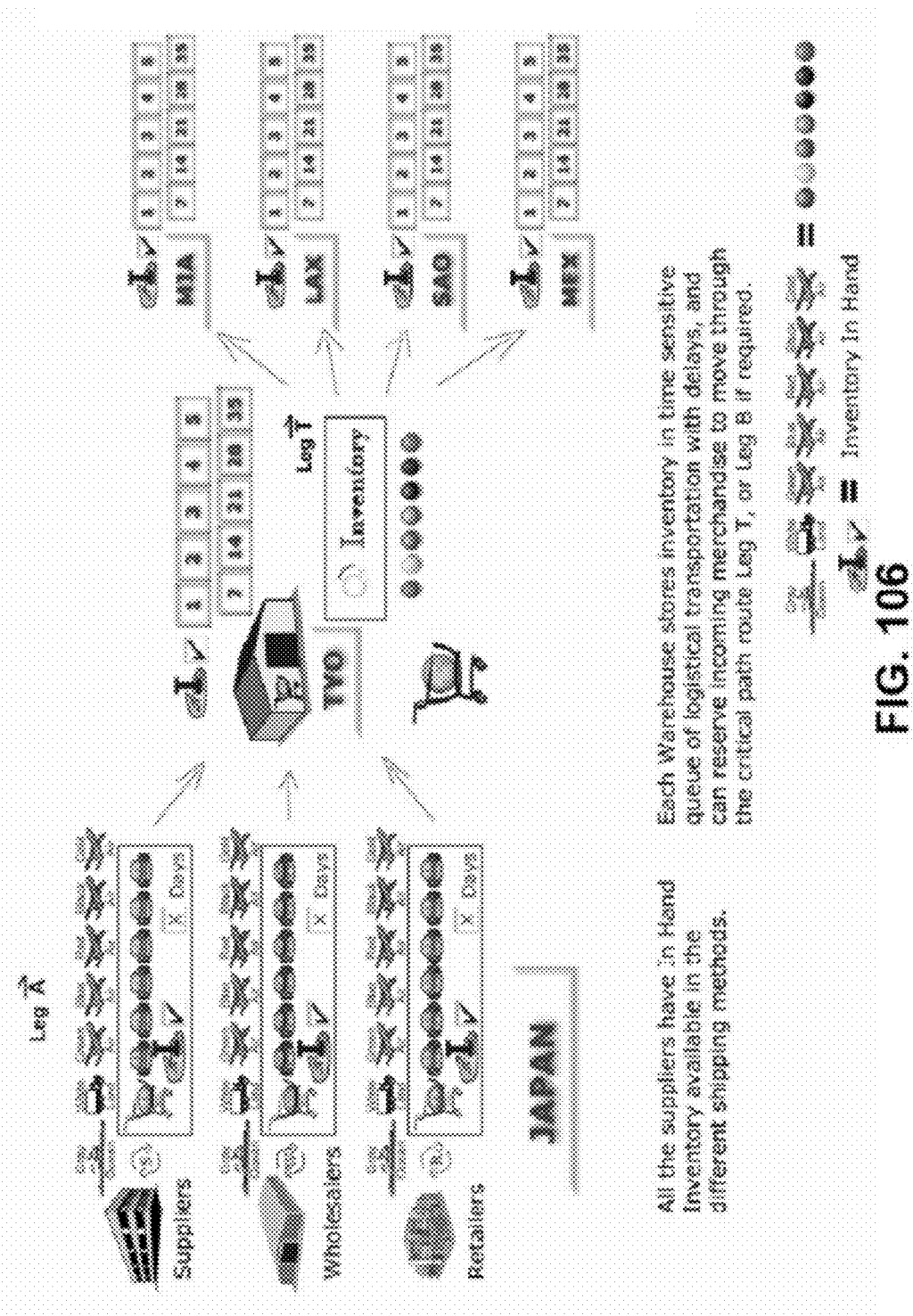
FIG. 106 Distributive Matrix of optimal X_FOB.

FIG. 106: is a schematic representation of the distributive matrix of Optimal X_FOB. (1) Merchandise originating from <R> Retailer, <S> Suppliers and <W> Wholesalers located in the Japan region that possesses the common denominator <TYO> Tokyo UCommerce warehouse with a plurality of transportation means A (Grey Label Ocean), B (White Label Land), C (Air Green Label), D (Air Blue Label), E (Air Red Label) and F (Air Black Label). Each Leg A $3^{rd}$ party possesses Inventory In Hand and a queue of incoming merchandise as manufactured or received by their own distribution means and is sent (2) to the Leg T<TYO> that creates a Macro X_FOB of all of the containers being shipped to its location. (3) Once the merchandise arrives to the Leg T warehouse, the merchandise is shipped to the optimal UCommerce warehouse such as <MIA> Miami, USA, <LAX> Los Angeles, USA, <SAO> Sao Paulo, Brazil, and <MEX> Distrito Federal, Mexico.

Figure 107:
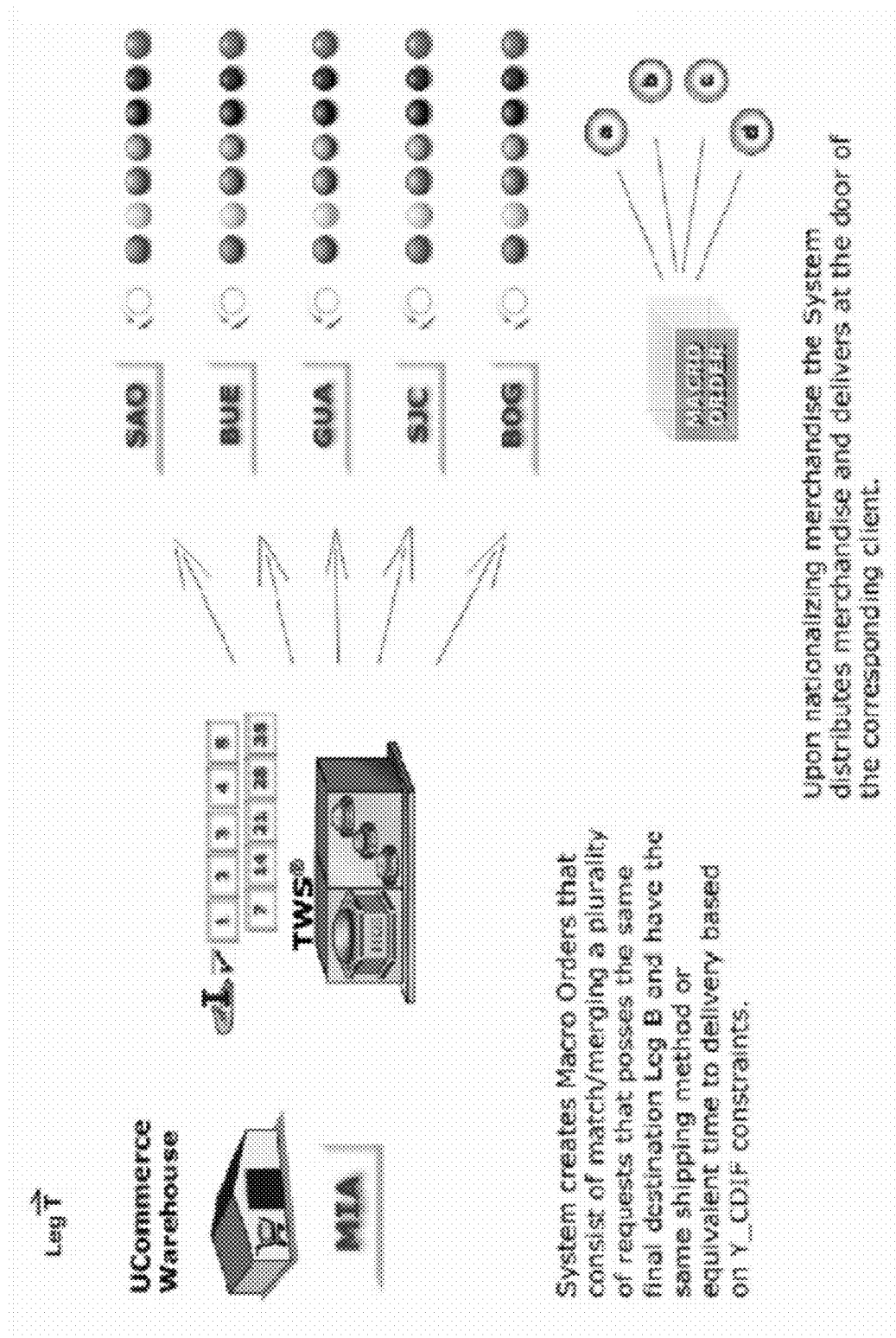
FIG. 107 Distributive Matrix of optimal Y_CDIF.

FIG. 107: is a schematic representation of the distributive matrix of optimal Y_CDIF performed by a TWS or Lower Tier. (1) Leg T the optimal UCommerce warehouse is managed by a (2) TWS or Lower Tier that stores merchandise as Inventory In Hand or in queue with a delay of 1, 2, 3, 4, 5, 7, 14, 21, 28 or 35 ranges of days. And creates a plurality of Macro Order Y_CDIF Orders that possess Air, Land, Sea and Time dimensions to a plurality of destination points <SAO>

Sao Paulo, Brazil, <BUE> Buenos Aires, Argentina, <GUA> Guatemala City, Guatemala, <SJC> San Jose, Costa Rica, or <BOG> Bogota, Colombia. (4) Each Y_CDIF macro order merchandise dimension is nationalized via customs and then shipped to the specified client's location.

Figure 108:
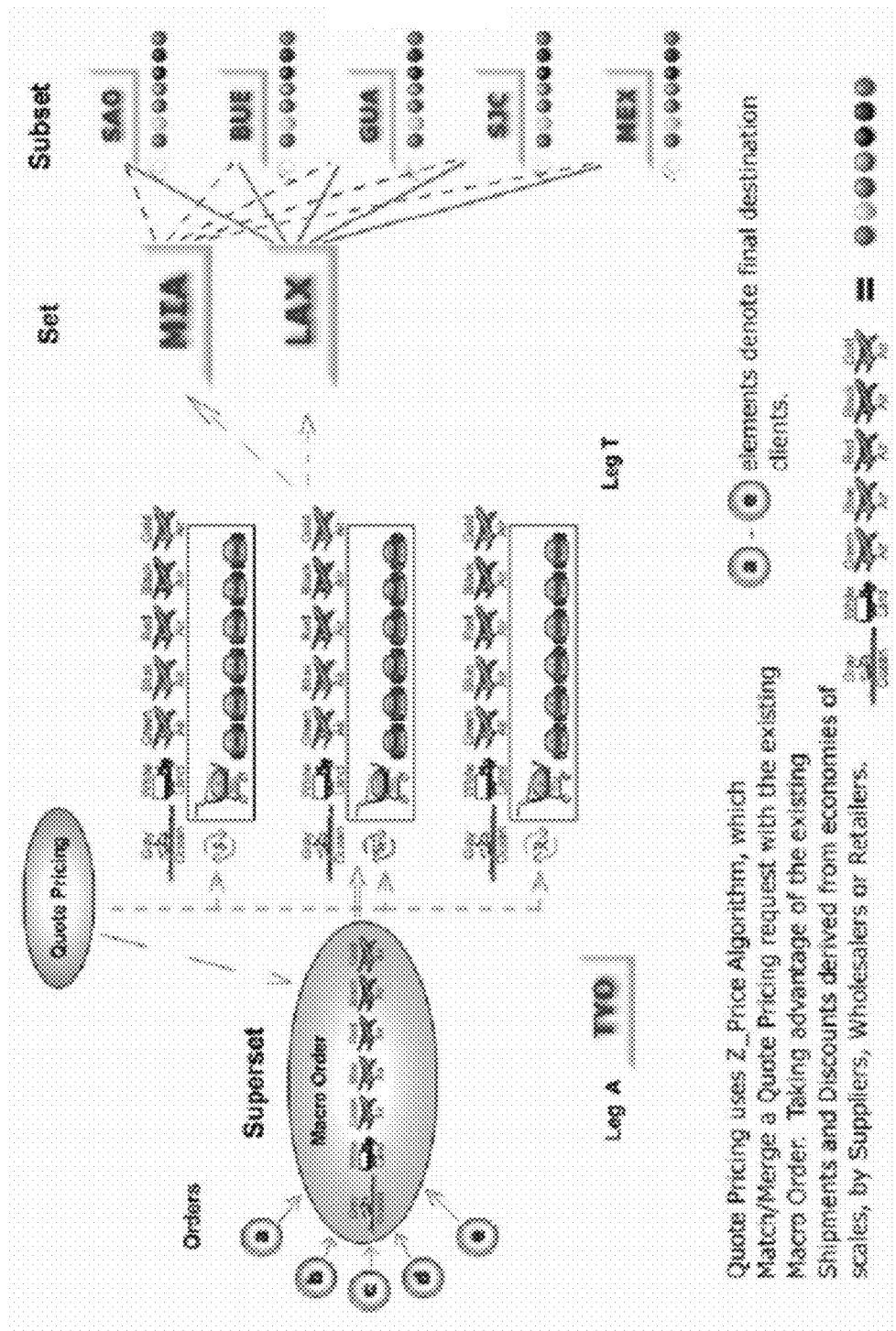
FIG. 108 Z_Price Match/Merge process.

FIG. 108: is a schematic representation of the Z_PRICE Match/Merge process, where incoming queued merchandise is incorporated with real time online sales quotes to maximize cost efficiencies. (1) An X_FOB Macro Superset of merchandise exists from a plurality of <R> Retailers, <S> Suppliers and <W> Wholesalers that belong to the Japan region and that are in the process of being shipped via air, land and sea to the <TYO> Tokyo, Japan Leg A UCommerce warehouse. Assigning transportation time dimensions of arrival, departure and cost to each partial Vector from $3^{rd}$ parties to Leg A, will permit the supplier to optimize each existing container to lower purchase discount rates and minimize transportation cost per item. The supplier system assigns prorated cost to each line item of a quote, and determines the system's lowest cost which comprises the distribution means of participating $3^{rd}$ parties <R>, <S> and <W>. The information is stored in Summary Reports data structures based on Product_ID, Warehouse_ID and Shipping Method. A plurality of shipments that have as a common denominator a (4) Leg T warehouse such as <MIA> Miami, Fla. or <LAX> Los Angeles, Calif., both in the USA as sets, and their destination points (5) Leg B such as points <SAO> Sao Paulo, Brazil, <BUE> Buenos Aires, Argentina, <GUA> Guatemala City, Guatemala, <SJC> San Jose, Costa Rica, or <BOG> Bogota, Colombia as subsets or Macro Y_CDIF Orders. (5) Each Y_CDIF macro order merchandise dimension is nationalized via customs and then shipped to the specified client's location.

Figure 109:
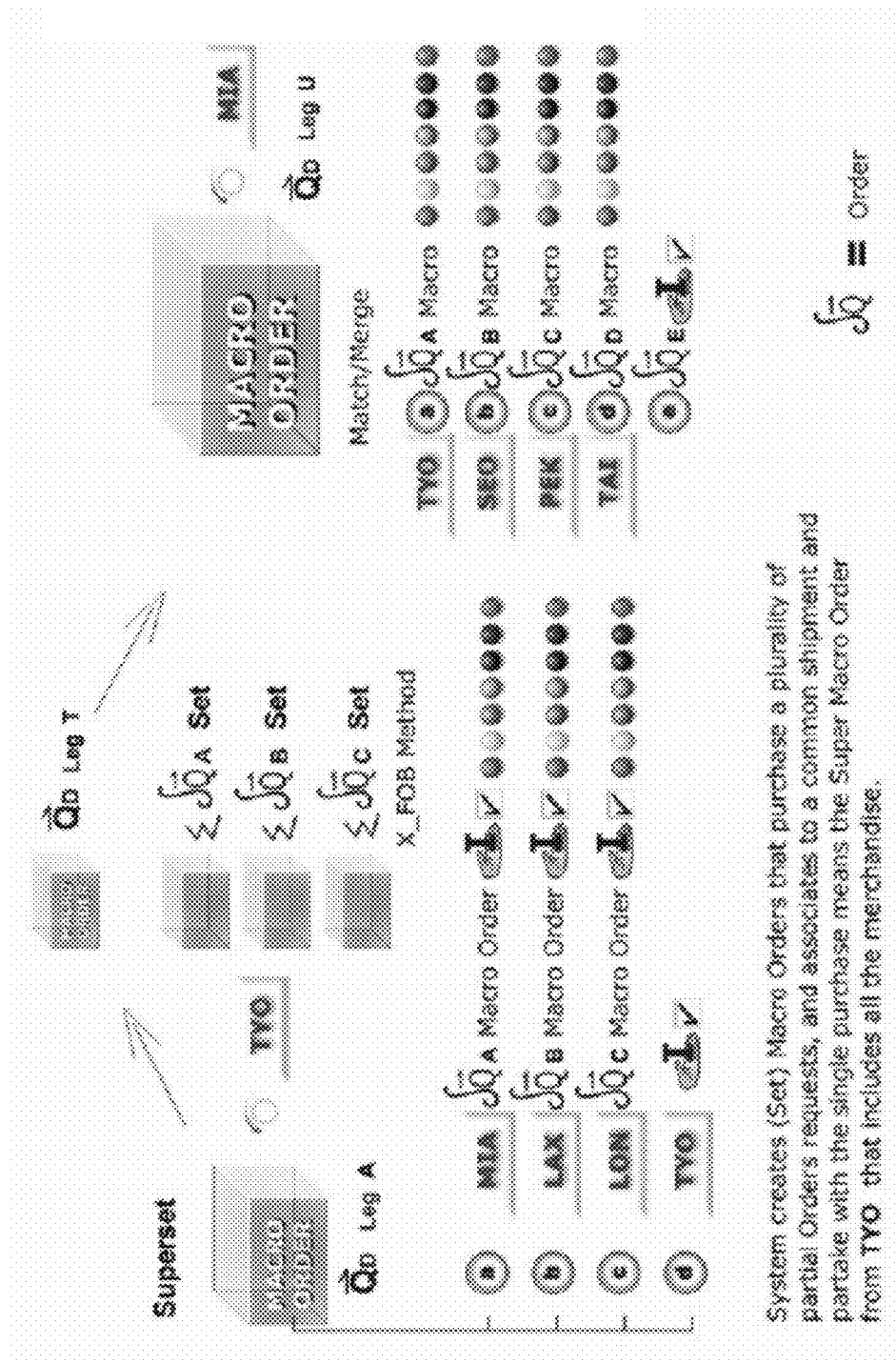
FIG. 109 Lump Sum Z_Price purchases.

FIG. 109: is a schematic representation of Lump Sum Z_PRICE Purchases derived from the supplier, that match/merges a plurality of quotes and buys the collectively as a single Order. (1) The system match/merges a plurality of quotes from a massive amount of end users utilizing the supplier system. For example: using for continental UCommerce warehouses such as <MIA> Miami, Fla., <LAX> Los Angeles, Calif., <LON> London, United Kingdom, and <TYO> Tokyo, Japan, that exist as air, land and sea dimensions that have X_FOB delays, are associated and broken down in as partial orders that are eventually match/merged in the optimal UCommerce warehouse, that possesses route dimensions of incoming dimensions from other supplier distribution means already in progress, such as <TYO> Tokyo, Japan, <SEO> Seoul, Korea, <PEK> Peking, Communist China, or <TAI> Taipei, China, as an in route Y_CDIF macro order that are traveling to the their (3) final destination port and upon being nationalized distributed as distinct orders to the specified client's location.

Figure 110:
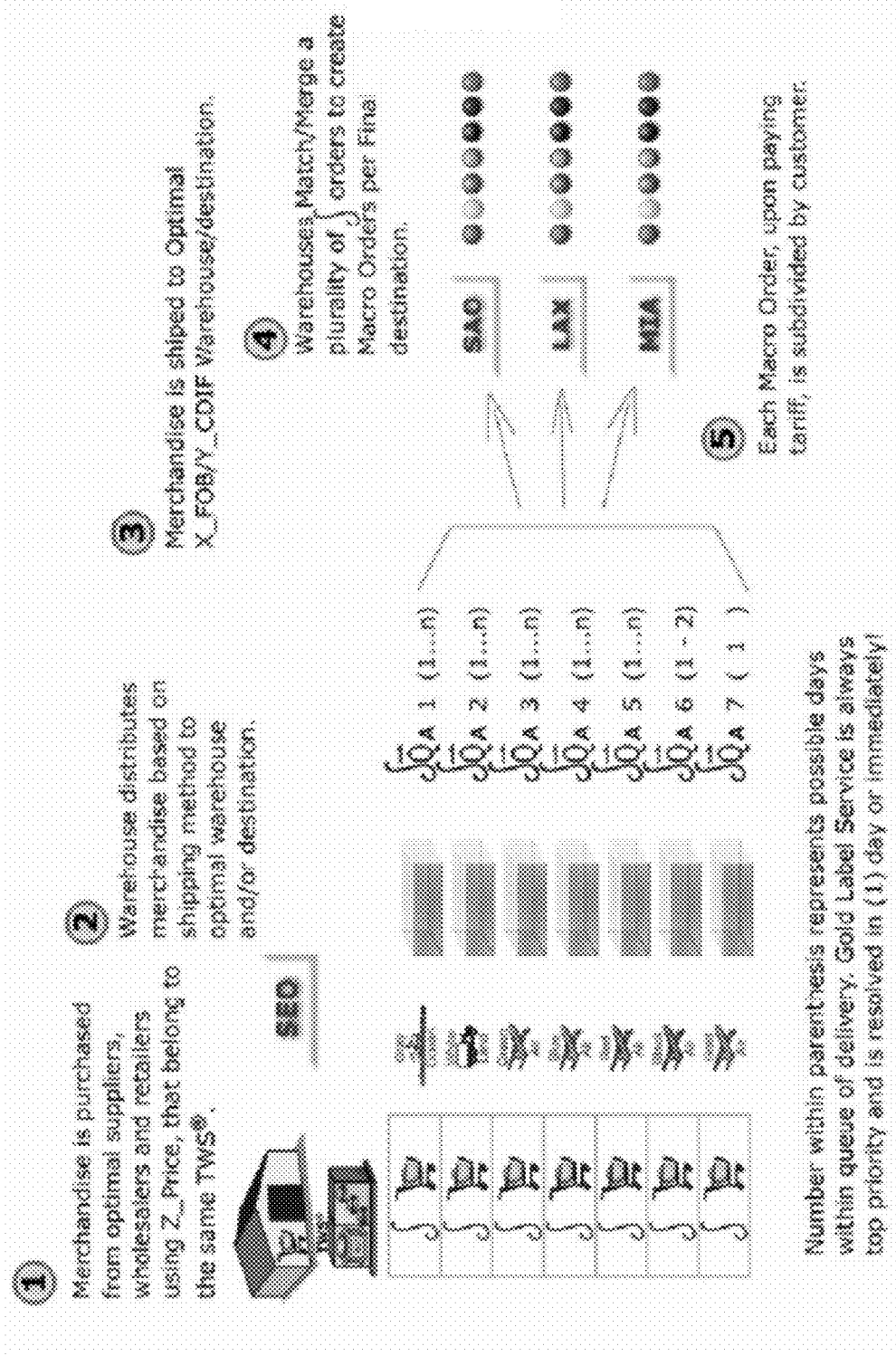
FIG. 110 Aggregate Z_Price transportation.

FIG. 110: is a schematic representation of an aggregate Z_PRICE Transportation matrix that consists (1) of a plurality of merchandise monitored and controlled by a TWS or Lower Tier that were purchased via the Z_PRICE method. (2) The warehouse distributes the merchandise based on the air, land, sea and X_FOB time dimensions from Leg A and is shipped optimal to (3) Legs (T, U) as X_FOB or Y_CDIF Macro Orders. (4) The plurality of incoming X_FOB/Y_CDIF Macro Orders is match/merged to the optimal UCommerce warehouse. (5) Once, the system creates large containers of merchandise to be shipped and nationalized at the final destination ports, and then its partition large containers into individualized containers belonging to an end user.

Figure 111:
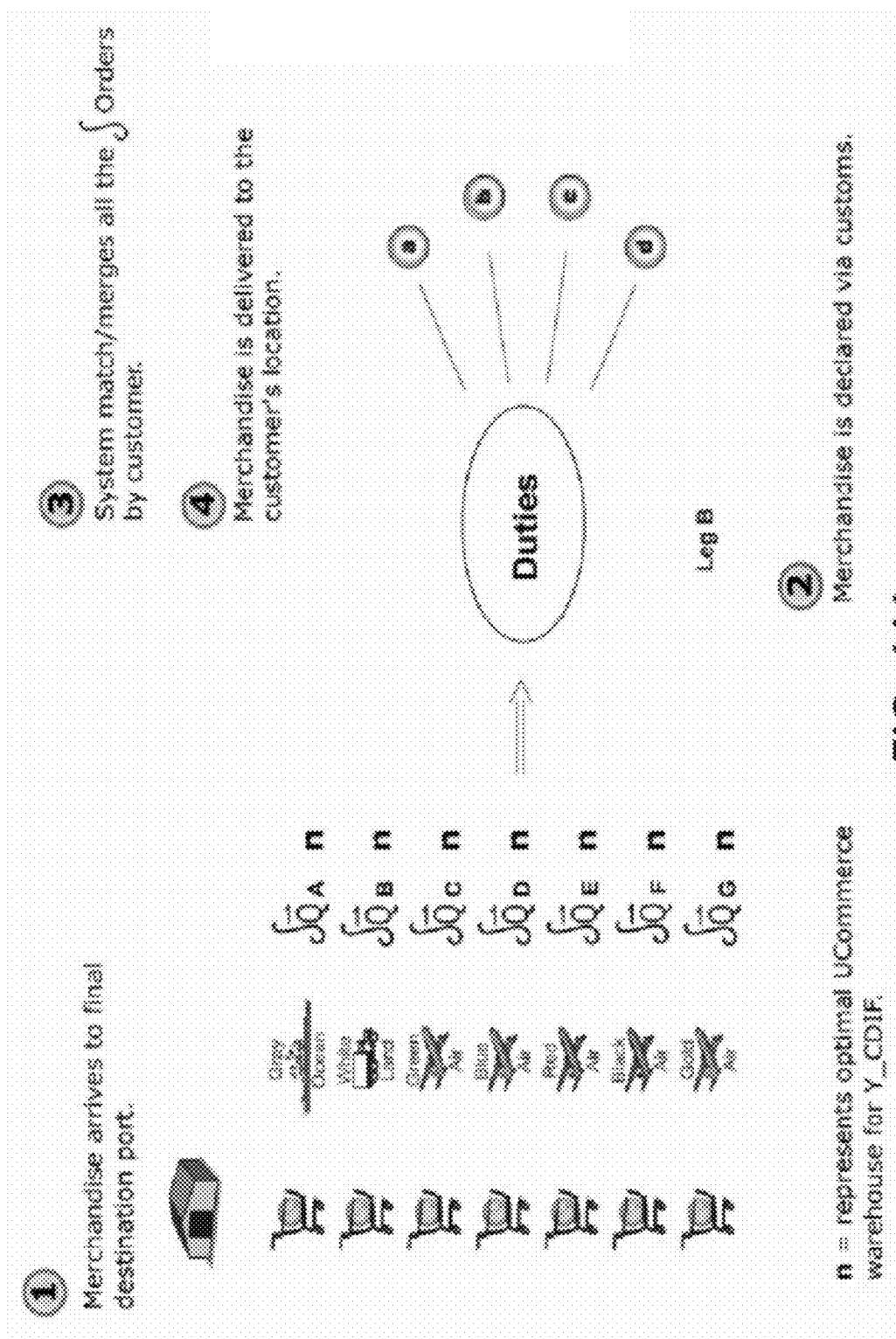
FIG. 111 Distribution of goods via Z_Price.

FIG. 111: is a schematic representation of the distribution of goods via Z_PRICE. (1) As merchandise arrives to the final destination port, the system match/merges them as a single order with a plurality of large containers, and then (2) nationalizes via customs. (3) The match/merge of large containers of merchandise into smaller containers possessing all of the merchandise of each customer as a single order that is transported to the specified client location (A), (B), (C) and (D). Note: specified client locations may force a container to be broken into small containers, in the case where delivery instructions request a plurality of delivery sites.

Figure 112:
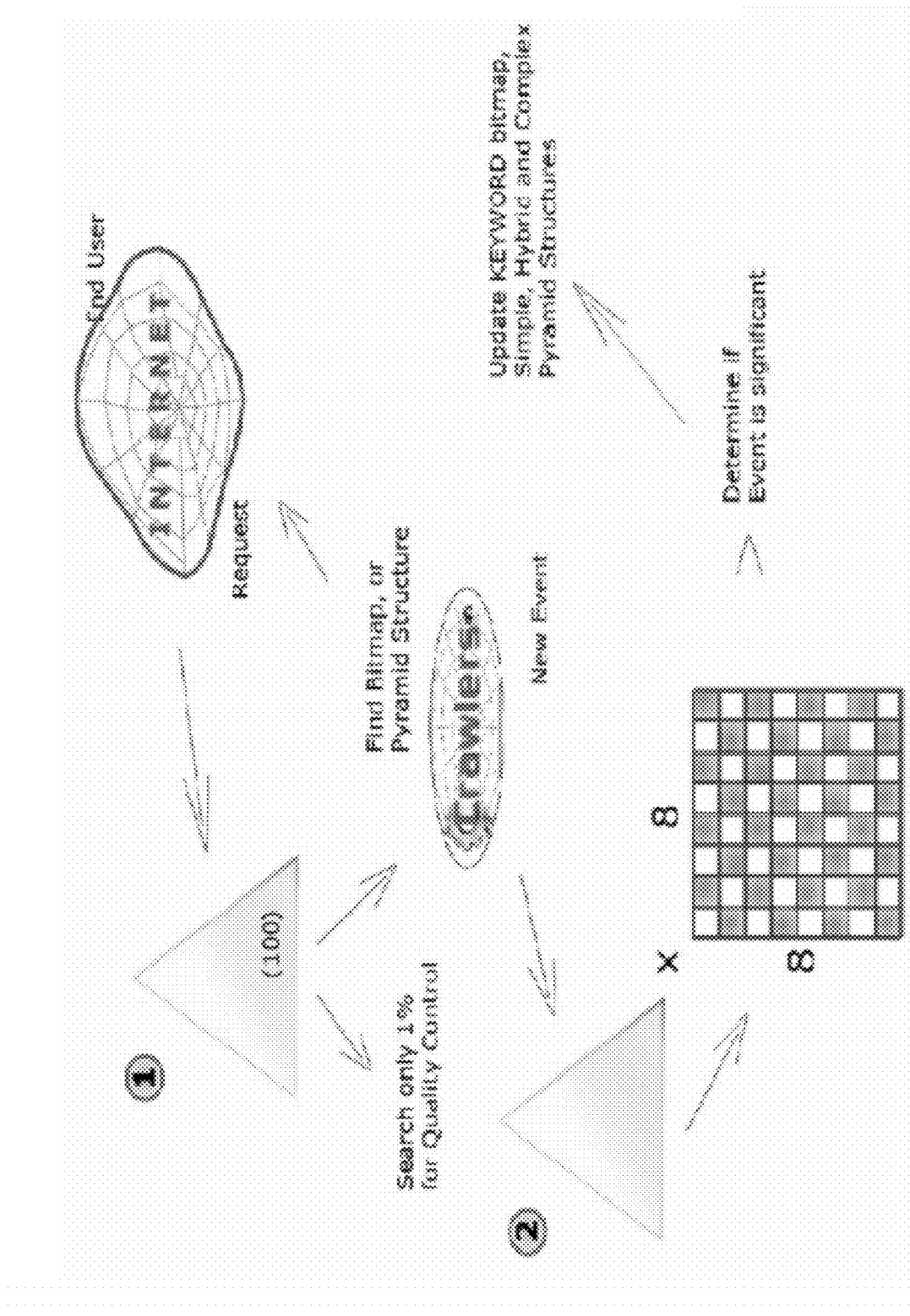
FIG. 112 Interface to Browsers.

FIG. 112: is a schematic representation of an Interface to Browser overview using the XCommerce technology. The (100) computer network system analyzes the content of the Internet by analyzing, distilling, eliminating redundancy, converting, transforming and standardizing it into a lingua franca geospatial data. (1) The computer network system receives requests from end users in the Internet, and the system determines the optimal solution by checking the environmental bitmap information or summary reports data structures of each KEYWORD. (2) The inventory of information is updated by Web Crawlers that measure the quality of each page belonging to a link as each new event is detected. (3) The cluster of nodes comprises a Simulation Network that analyzes the new event, determines if the event is significant and then updates the Summary Report Inventories based on KEYWORDS and KEYWORDS GROUPS and KEYWORDS COMBINATIONS.

Figure 113:
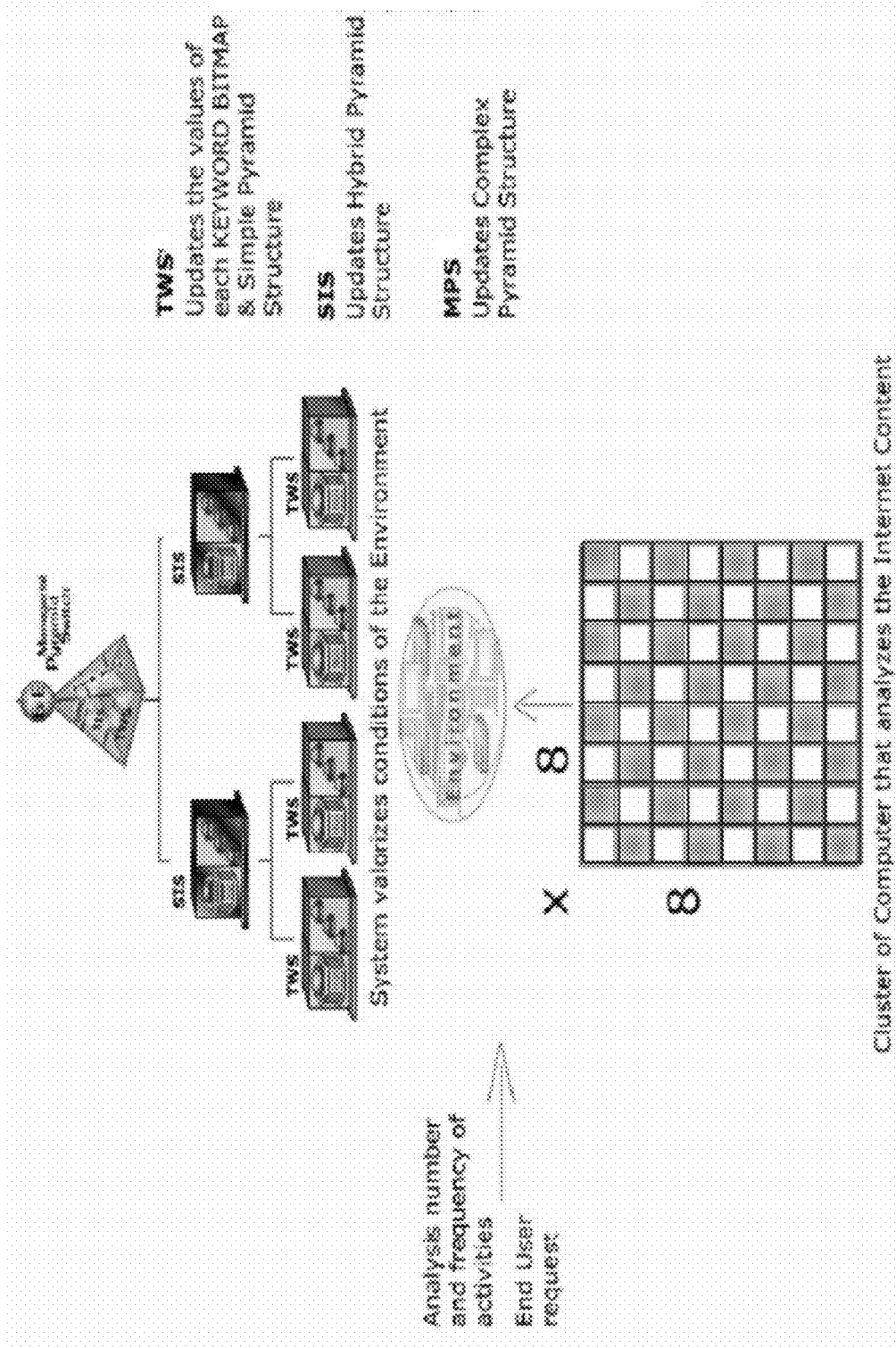
FIG. 113 Web Rank Updates.

FIG. 113: is a schematic representation of WEB_RANK Updates. This Process integrates existing $3^{rd}$ party web browsers with the XCommerce technology. In this case, an HQ7 to HQ0 hierarchical organization is used to cover the Internet that has a global scope. (1) The supplier system consists of a three tier Simulation Network, where the HQ0 to HQ2 creates a single or group based Environmental Bitmap. First, the lower tier has a plurality of TWS responsible for generating Simple Pyramid Structures, and works in conjunction with its subordinates to identify KEYWORDS collections known as Simple Joins, Blocks, Walls and Ceiling that permit a clearer understanding of the value of the content of each link and its associate pages. Second, the Middleware tier has a plurality of SIS responsible for generating Hybrid Pyramid Structures, and works in conjunction with its subordinate TWS organizations to identify KEYWORDS collections known as Hybrid Joins, Blocks, Walls and Ceiling that permit a clearer understanding of the value of the content of each link and its associate pages. Third, the Summit tier has a plurality of MPS responsible for generating Complex Pyramid Structures, and works in conjunction with its subordinate SIS and TWS organizations to identify KEYWORDS collections known as Complex Joins, Blocks, Walls and Ceiling that permit a clearer understanding of the value of the content of each link and its associate pages.

At the same time the MPS has an interface to a (2) browser engines cluster or $3^{rd}$ party Supercomputer (8×8) that analyzes the content of the (3) environment or the Internet, and has the capacity of retrieving the most valuable responses for each KEYWORD regular expression request made by an end user. In other words, the MPS interacts with a search engine supercomputer to create single or groups of KEYWORDS Environmental Bitmaps or Summary Reports data structures which are the basis for developing the higher structures. In this case, the HQ0 to HQ2 are responsible for not just simulating and mimicking the Network Platform Equipment (or Browser Engine individual nodes) of the environment, but for communicating and working together with them. The supplier system, in order to work in real time, must first create the environmental bitmaps and the higher structure Environmental Bitmaps process that can take one or two months, at which point both technologies are integrated and synchronized as is hereinafter referred as XCommerce.

XCommerce 2010: Join, Block, Wall and Ceiling are a collection of language specific keywords that filter and validate the content of the web page.

Figure 114:
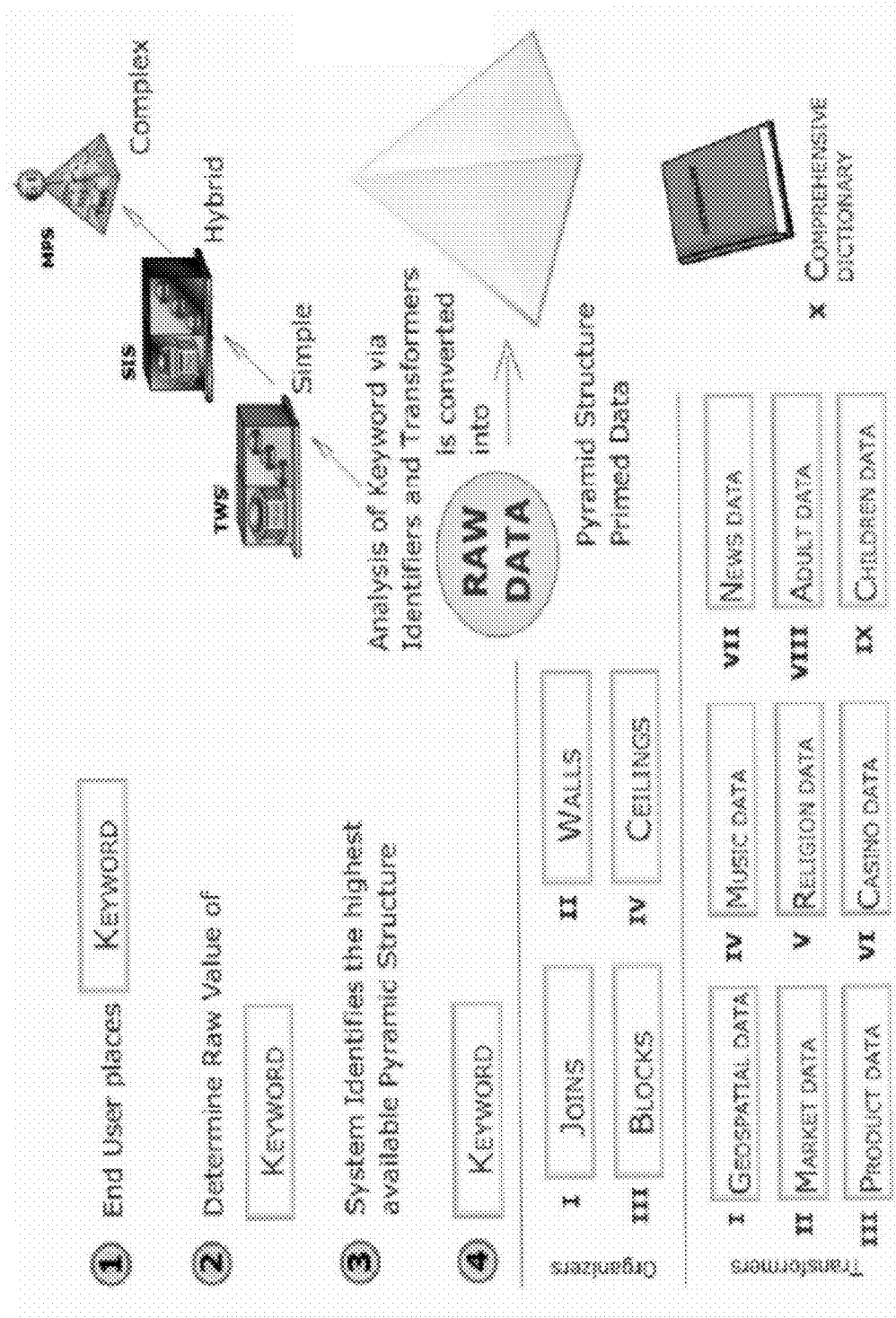
FIG. 114 Browser Identifies the highest match.

FIG. 114: is a schematic representation of how the Browser Identifies the Highest Match. (1) The end users place a single or group of KEYWORDS regular expression. (2) The system identifies the raw value of the KEYWORDS which is expressed from 0 to 15, where 0 is a very broad result of over 1,000,000,000 (or billion) and 15 is a very narrow result with at most 10 instances. Sometimes, they satisfy and most often they don't, and this is the craving need that this technology resolves. Instead of using the classical method of using a Browser Engine to search each time for KEYWORDS Regular Expression, the system precalculates the inquires as part of the Environmental Bitmap for single or group of KEYWORDS. (3) Based on the Regular Expression of KEYWORDS, the system identifies the highest available Pyramid Structure. For Browser Engines an event begins when an end user makes a request, and for XCommerce an event begins when a mathematically significant change in the environment is detected. (4) The system associates for each KEYWORD a weighted probability of also containing Simple Joins, Blocks, Walls and Ceilings that can be further associated with collections of transformers such as geospatial data, market, product, music, religious, casino, news, adult, children and dictionary data. For example, the word Miami can be associated with Dade County, State of Florida, USA, or America and with 305 and 786 Areas Codes, and a plurality of zip codes. The MPS technology uses ANI or telephone number's and zip codes belonging to a Local Access and Transport Areas (LATA) distribution of geographic areas as per Doctorial Dissertation and U.S. Pat. No. 6,614,813.

XCommerce 2010: The lower tier analyzes a request in the millions, middleware tiers in the thousands, and the summit tier in the hundreds using vector math to find the optimize size sample. Each web site is given a quality value from 1 to 10, and weight value of pages that belongs to the optimal size sample from 1 for a quality of 2 or 32 for a quality of 32. Using summary reports statistics data the system knows without searching the exact quality that will yield the twice the optimal size sample thus redundancy and irrelevant calculations.

Figure 115:
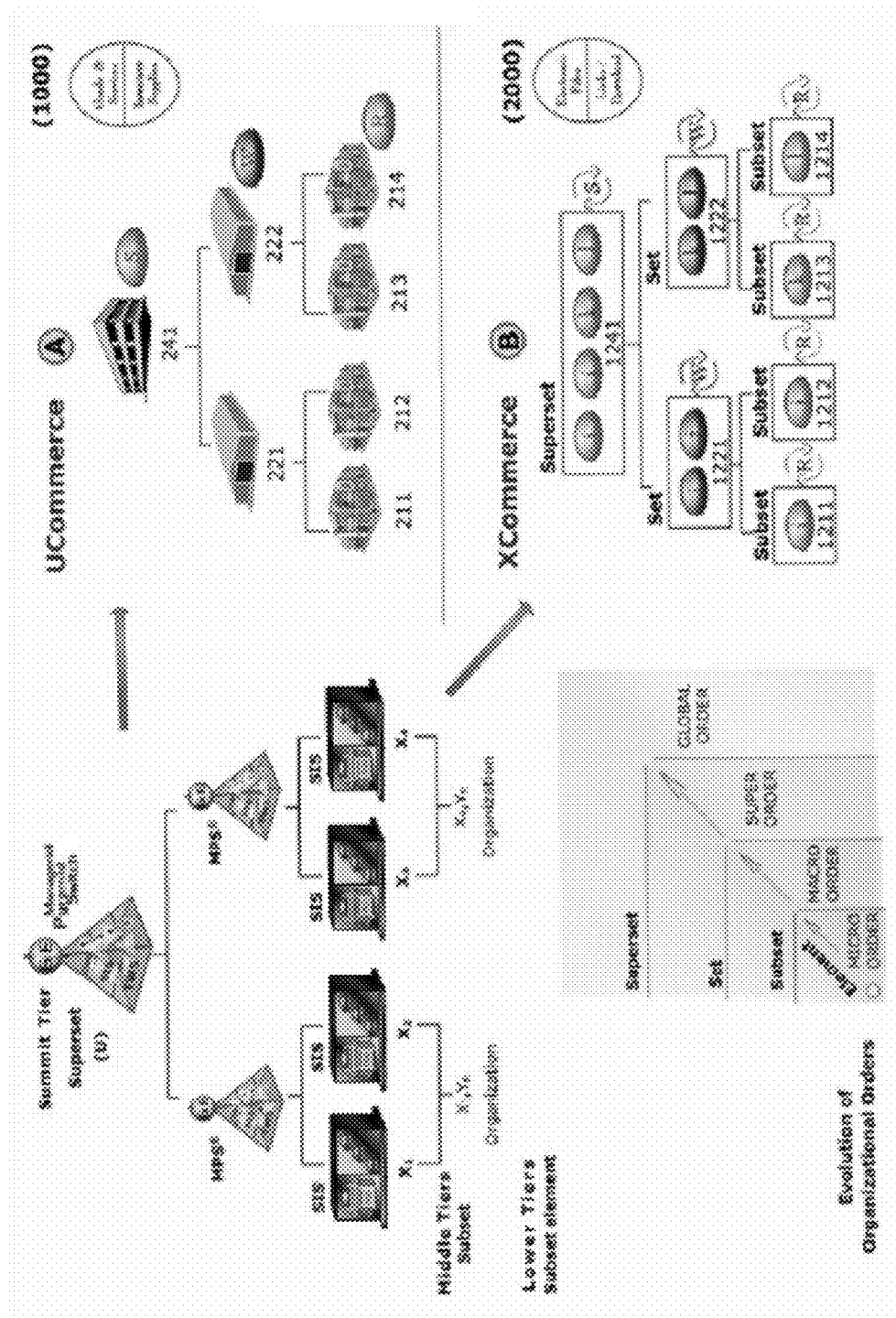
FIG. 115 UCommerce Information Overview.

FIG. 115: is a schematic representation of the UCommerce overview that permits the inventory control of physical and electronic merchandise. The left hand side consists of a Managerial Pyramid Switch that organizes the globe as a superset (U) and is further logically partitioned into sets, subsets and elements. These concepts are the basis for Micro, Macro, Super and Global Orders. In this case, a Micro Order is all of the traffic belonging to a specific element, such as an UCommerce warehouse, a Macro Order is all of the traffic belonging to a specific subset such as a Continental Region, a Super Order is all of the traffic belonging to a specific set such as a Continent, and finally a Global Order consists of all of the traffic belonging to the Superset. (A) Consists of an UCommerce configuration of (241) Suppliers, (221, 222) Wholesalers and (211 to 214) Retailers $3^{rd}$ parties, making (1000) goods and services available to the supplier system. (B) consists of the logical and geospatial distribution of the content of the Internet (U) based on KEYWORDS magnitude and transformed into Simple, Hybrid and Complex Pyramid Structures.

Figure 116:
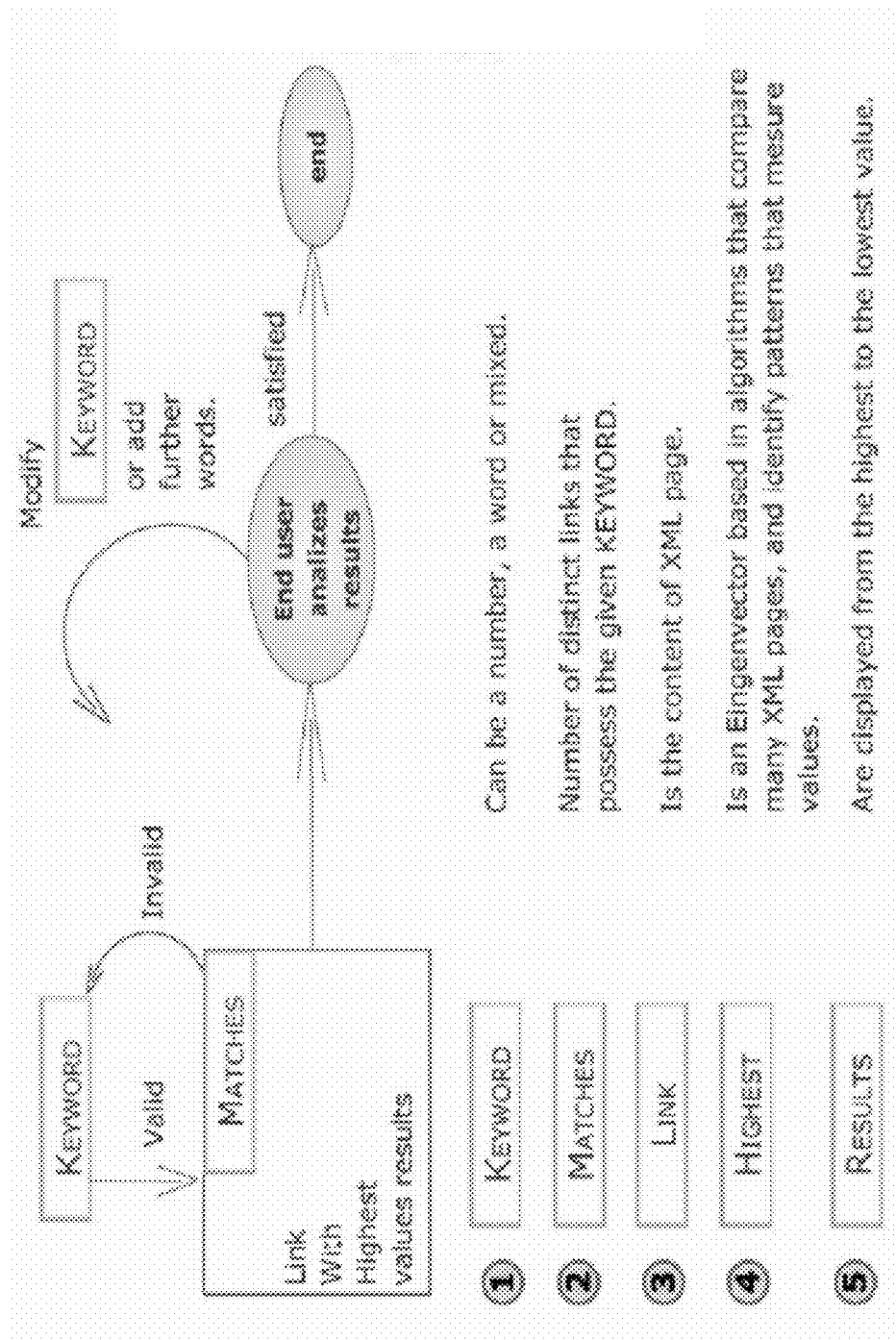
FIG. 116 Using a browser.

FIG. 116: is a schematic representation of using a Browser Engine that uses existing Browser Engines. (1) The system must validate a KEYWORD regular expression hereinafter simply KEYWORD as being valid. If invalid requests another word or supplies most likely candidates to the end user. (2) The system identifies the distinct amount of links and pages that match the KEYWORD. (3) The system identifies the content of each link. (4) And uses Eigenvector algorithms to determine the value of each link and its associate pages. (5) The system displays the highest valued results. This process requires the Browser Engine to utilize each of its nodes to search within their domain the best results and then consolidates the best results using mathematical filters, all as a single list that is the displayed at a browser.

Figure 117:
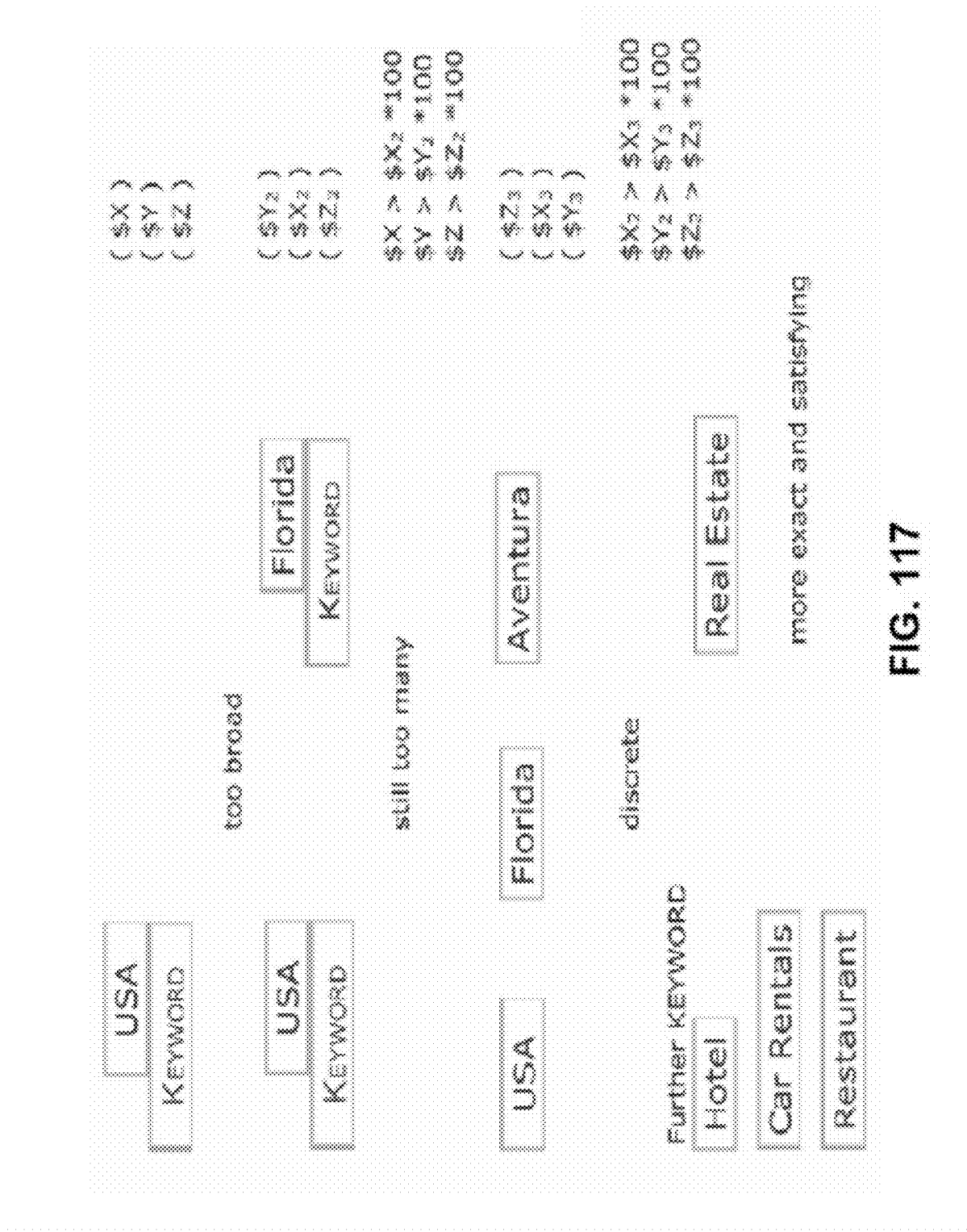
FIG. 117 Fine tuning a search.

FIG. 117: is a schematic representation of Fine Tuning a Search using $3^{rd}$ party Browser Engines. (1) An end user makes an original KEYWORD request using USA, the result based on Prior Art $X, $Y and $Z differs but ranges between 500 million to 1 billion replies. The response to the end user is too broad and thus meaningless. (2) An end user improves the regular expression by adding USA and FLORIDA that creates results of $X2, $Y2 and $Z2 that range between 5 and 10 million replies and are still broad. (3) The end user narrows the search by using the KEYWORDS USA, FLORIDA and AVENTURA that creates results of $X3, $Y3 and $Z3 that range between 500,000 and 1 million replies and are more concise. (4) The end user narrows the search by using the KEYWORDS USA, FLORIDA, AVENTURA and RESTAURANTS that creates results of $X4, $Y4 and $Z4 that range between 5,000 and 10,000 replies. Results can be measured as objects. $X3 is the basis for Simple Pyramid Structures. $X4 is the basis for Hybrid Pyramid Structures.

(Not included in the FIG.) E.g. the end user further narrows the search by using the KEYWORDS USA+FLORIDA+AVENTURA+RESTAURANTS+ARGENTINIAN creating $X5, $Y5 and $Z5 results that range between 50 and 100 replies that are the basis for Complex Pyramid Structures. Prior art uses Caesar's Divide and Conquer strategies, whereas XCommerce uses Summary Report Data Structures or Environmental Bitmaps based on weight values algorithms.

XCommerce 2010: each tier stores information based on quality levels to quickly reach the optimal size sample absent of calculation. 1) XCommerce uses the English language filter of Joins, Blocks, Walls, and Ceiling collection to validate each web page. 2) Assigns a vector value to each web page by matching each KEYWORDS or KEYWORDS GROUP or KEYWORDS COMBINATIONS to determine the best results for a given request.

Figure 118:
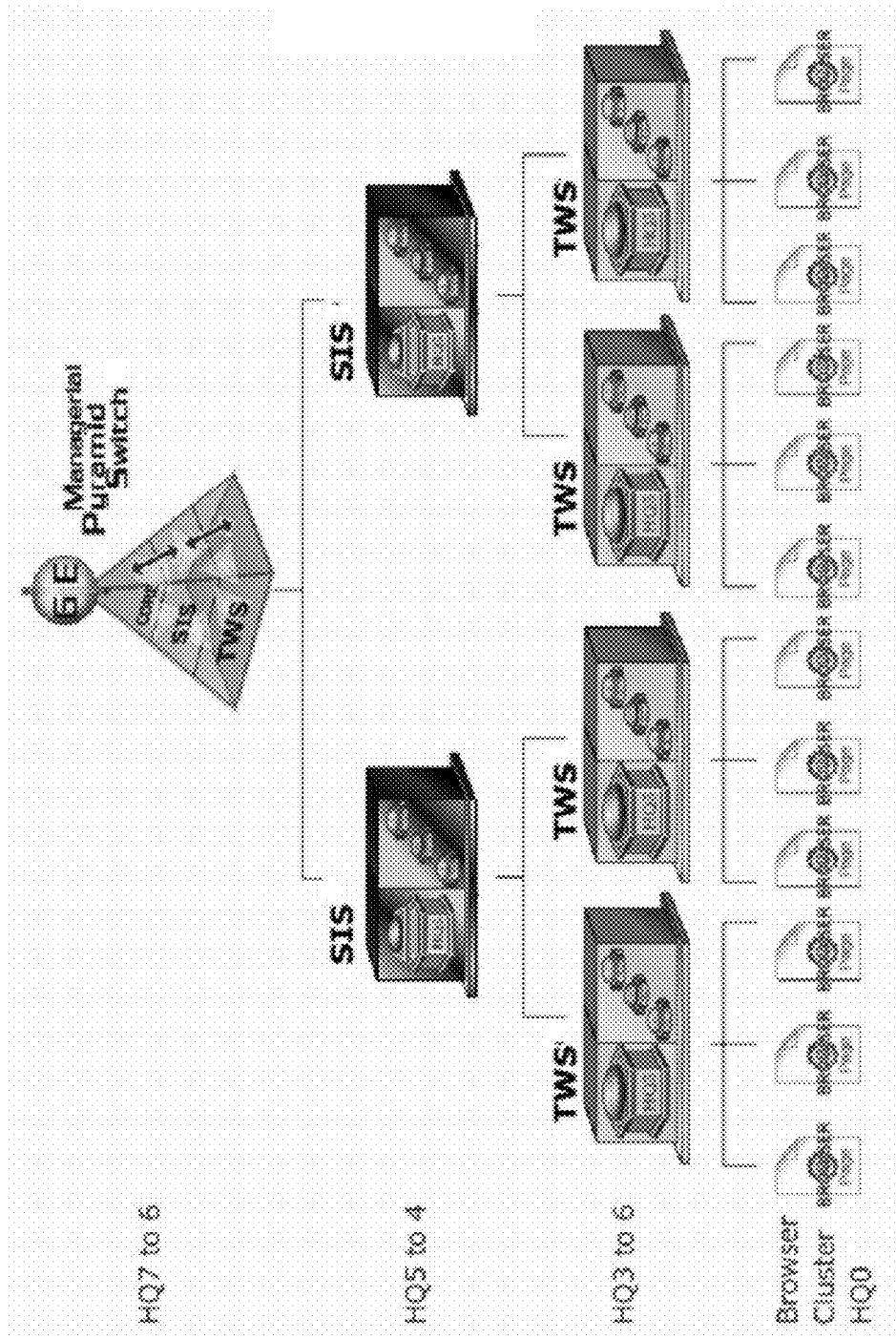
FIG. 118 Distribution of XCommerce.

FIG. 118: is a schematic representation of the Distribution of XCommerce. As a global Managerial Pyramid Switch Architecture, the system is divided into three tiers from top to bottom: 1) MPS HQ7 to HQ6 manages, controls and through lateral synergy live statistics of end users activities, volumes and patterns of behavior, creates Complex Pyramid Structures and handles all of the financial interaction with $3^{rd}$ parties. 2) SIS HQ5 to HQ4 delivers Optimal Value Advertisement instead of Target Advertisement and creates Hybrid Pyramid Structures. 3) TWS HQ3 to HQ0 controls a plurality of HQ1 to HQ0 that interact with the Environment comprising a plurality of Browser Engine Supercomputers (8×8) that help to identify, valorize and quantify KEYWORD, and then create Simple Pyramid Structures.

Figure 119:
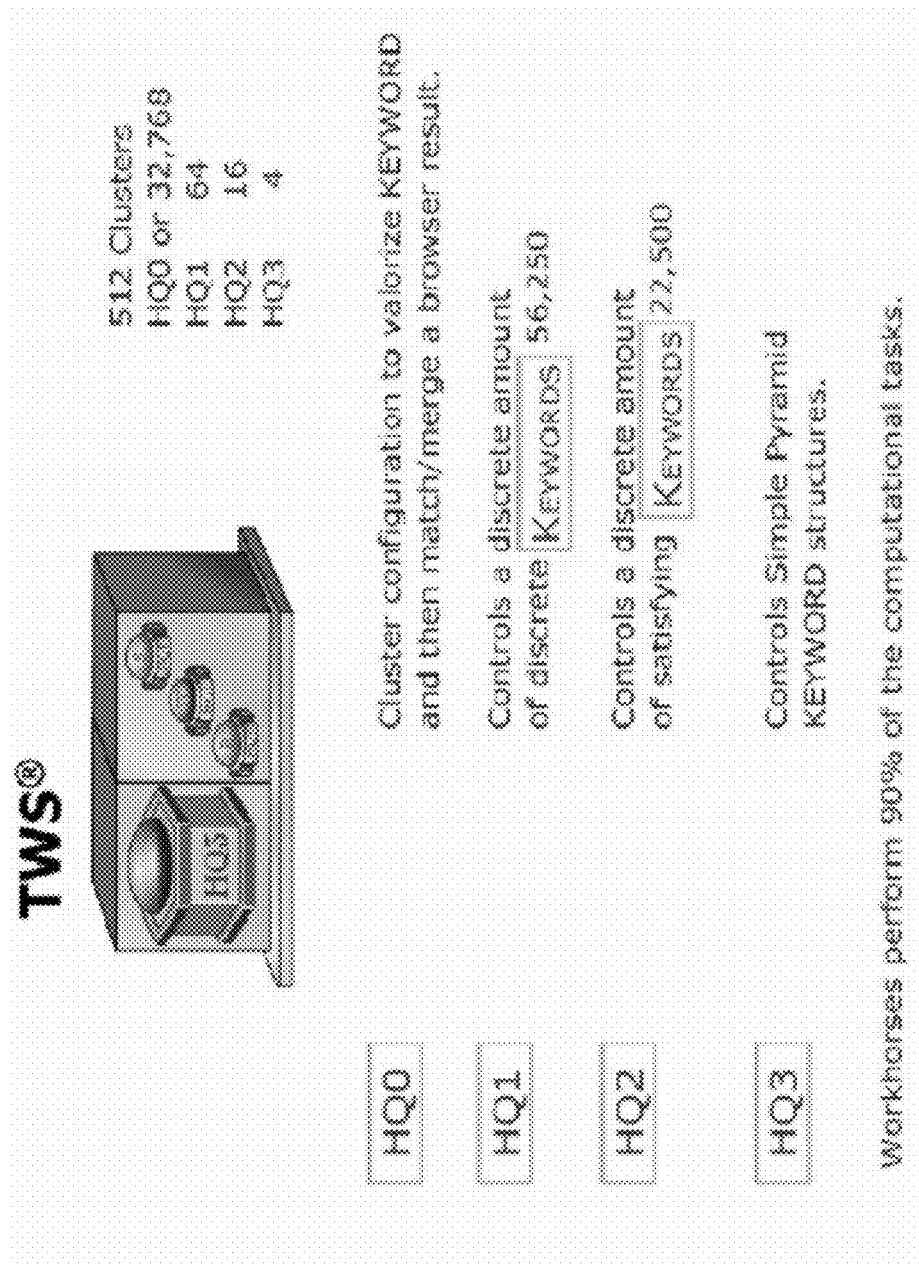
FIG. 119 Fine tuning a XCommerce search (TWS or Lower Tier)

XCommerce 2010: each lower tier is a Browser Engine Supercomputers (8×8) that manages the content of 1 billion web pages FIG. 119: is a schematic representation of Fine Tuning a Search using XCommerce. (1) An end user makes a KEYWORD Regular Expression and the system using the content of the Environmental Bitmaps or Summary Report Inventory responds to the end user. In this case a request does NOT trigger a search event with the Browser Engine Supercomputer (8×8). Furthermore each <HQ0> cluster is responsible for valorizing each KEYWORD; <HQ1> controls common denominator pairs of KEYWORD; <HQ2> controls common denominator quad KEYWORD groups and, <HQ3> controls Simple Pyramid KEYWORD structures. Overall, the TWS or Lower Tier organization performs the lion shares of the computational task of administrating and gathering information from the environment.

XCommerce 2010: the lower tier maintains Simple Pyramids, the middleware tiers Hybrid Pyramids, and the summit tiers Complex Pyramids.

Figure 120:
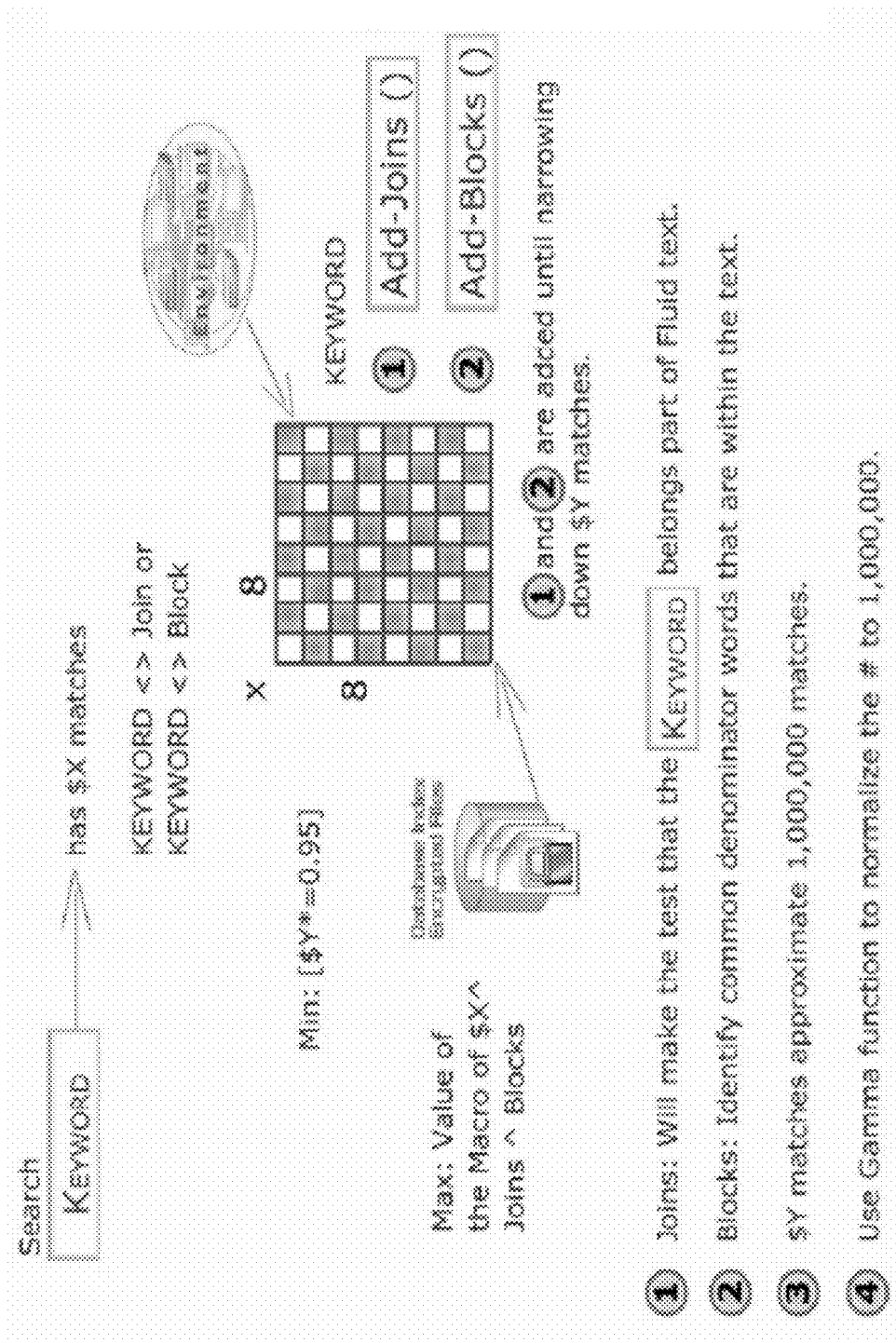
FIG. 120 Optimizing KEYWORDS quality.

FIG. 120: is a schematic representation of Optimizing KEYWORD Quality. An end user makes a request using English language KEYWORDS. Each KEYWORD collection consists of a plurality of common denominator verbs, nouns, prepositions, adverbs, adjectives and other English semantics. For a KEYWORD Search that has $X matches expressed a number greater than 10,000,000 by the environment, the system has pre parsed the content of each and identified their value based on (1) Join and (2) Block collection of KEYWORD filters that are associated until a minimum of 5% or a maximum of 50% is diluted. Each object contains one million logical cells. (3) Configuring each page having pairs, quad and octal collections of KEYWORD as belonging to a cell, and then using (4) Gamma functions the $X of each cell the value is normalized to exactly 1,000,000 responses by associating then to quad or octal collection of groups of KEYWORDS, even though $X number of replies in fact exist. It's like saying all of the pages that possess an octal collection of KEYWORD group of Join and Block belong to as one cell out of one million. The objective of this process is to use math and the English language semantics, the system normalizes each page to belong to one cell. Should $X be less than one million, the gamma function will allow that a KEYWORD collection to possess more than one cell instead of just one. In any case, when everything is said and done exactly, 1,000,000,000 cells exist for a Simple Pyramid Structure based on English language semantics. Note: the working XCommerce was original fine tuned using English and Spanish, so that the system could readily import other languages.

XCommerce 2010: The Simulation Network assigns the optimal lower tier that has a Simple Pyramid with 1,000,000,000 web pages the KEYWORD, KEYWORDS GROUPS or KEYWORDS COMBINATIONS requested by the end user. The system uses the W_RANK value of each web page that is the adjusted value of a web page based on the known quality of their parent site to create the optimal sized sample of 1,000,000 web pages.

Figure 121:
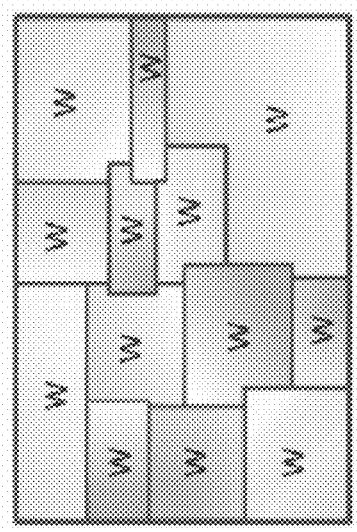
FIG. 121 Using math to balance an object.

FIG. 121: is a schematic representation of Using Math to Balance an Object. An end user makes a request using English language KEYWORDS. Each KEYWORD collection consists of a plurality of common denominator verbs, nouns, prepositions, adverbs, adjectives and other English semantics. For a KEYWORD Search that has $X matches expressed a number greater than 10,000,000 by the environment, the system has pre parsed the content of each and identified their value based on (A) Join and Block collections KEYWORD filters. Should $X be less than one million, the gamma function will allow that a KEYWORD collection to possess more than one cell instead of just one. The owner of the KEYWORD Intelligent Component uses WALL collections KEYWORD to further subdivide cells. Using math, the system determines the highest value Wall that should possess exactly 100 cells and one or more Walls that possess the next 9900 highest valued cells. The quality of the English semantics is measured.

XCommerce 2010: The Simulation Network assigns the optimal middleware tier that has a Hybrid Pyramid with 1,000,000 web pages that owns the KEYWORD, KEYWORDS GROUPS or KEYWORDS COMBINATIONS requested by the end user. The system uses the W_RANK value of each web page that is the adjusted value of a web page based on the known quality of their parent site to create the optimal sized sample of 10,000 web pages.

Figure 122:
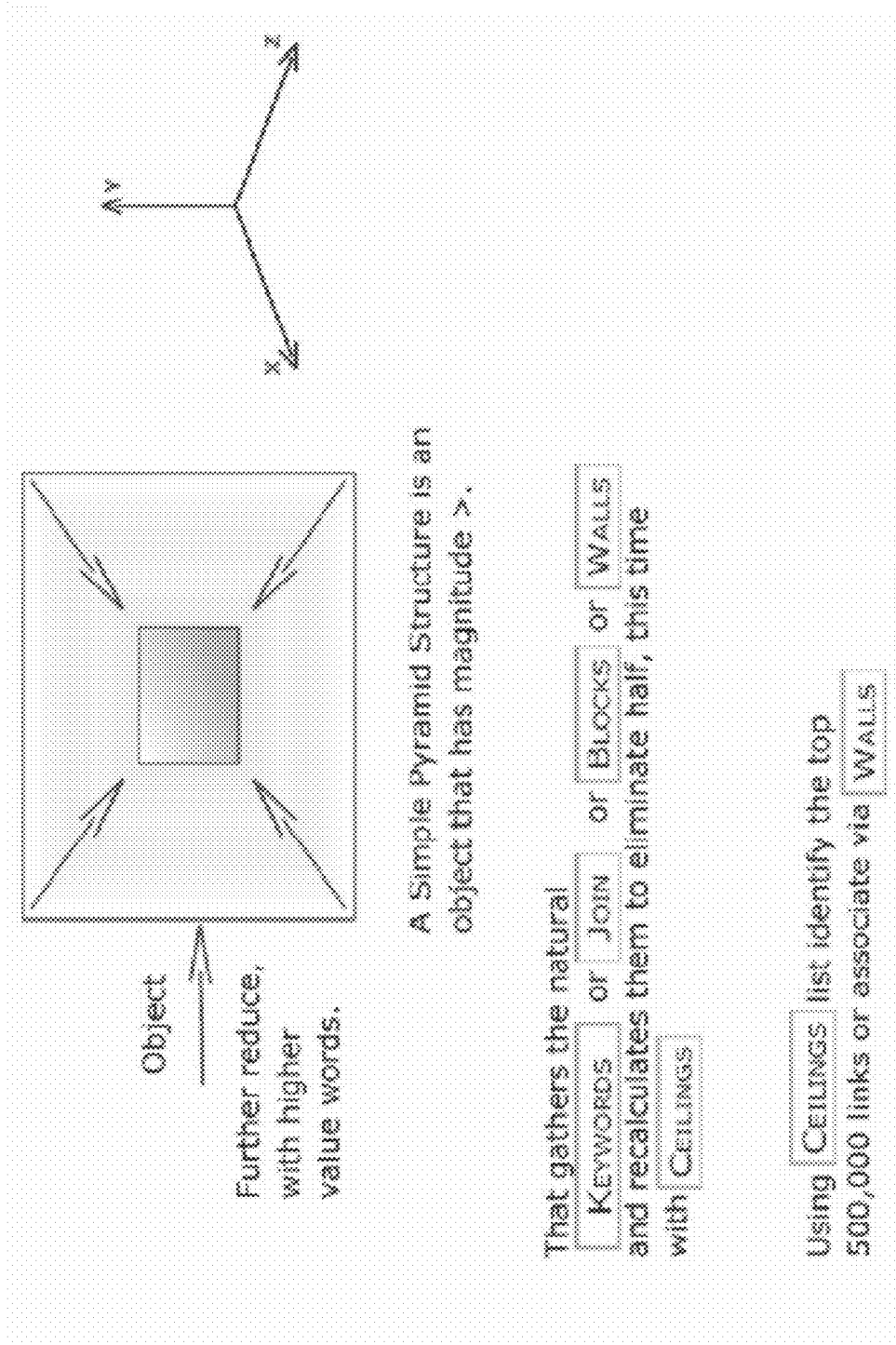
FIG. 122 Optimize Keywords Quality.

FIG. 122: is a schematic representation of Optimizing Keyword Quality by converting the object into a 3D geospatial structure. (1) The system performed Join and Block collection KEYWORD filtering. (2) The system using Wall collection KEYWORD was able to further subdivide the $X matches expressed in millions of raw requests as per FIG. 85. (3) XCommerce creates 3D compartments by using Ceiling collections KEYWORD filters, meaning that within a wall and each cell there existing some higher order attributes of the English language that help identify the optimal element (A) response of the superset (U). The Ceiling collection of KEYWORD filtering further reduces the number of building blocks to 500,000, where each block consists of 2 cells one on top of the other. The 500,000 cells that are in the bottom are the least satisfying results based on the Browser Engine valorization and the English language semantics. Yes, Browser Engine valorization is also used since the system must use site quality, number of hits and other Data Warehousing Business Intelligence statistics to help quantify and qualify an optimal element (A).

Figure 123:
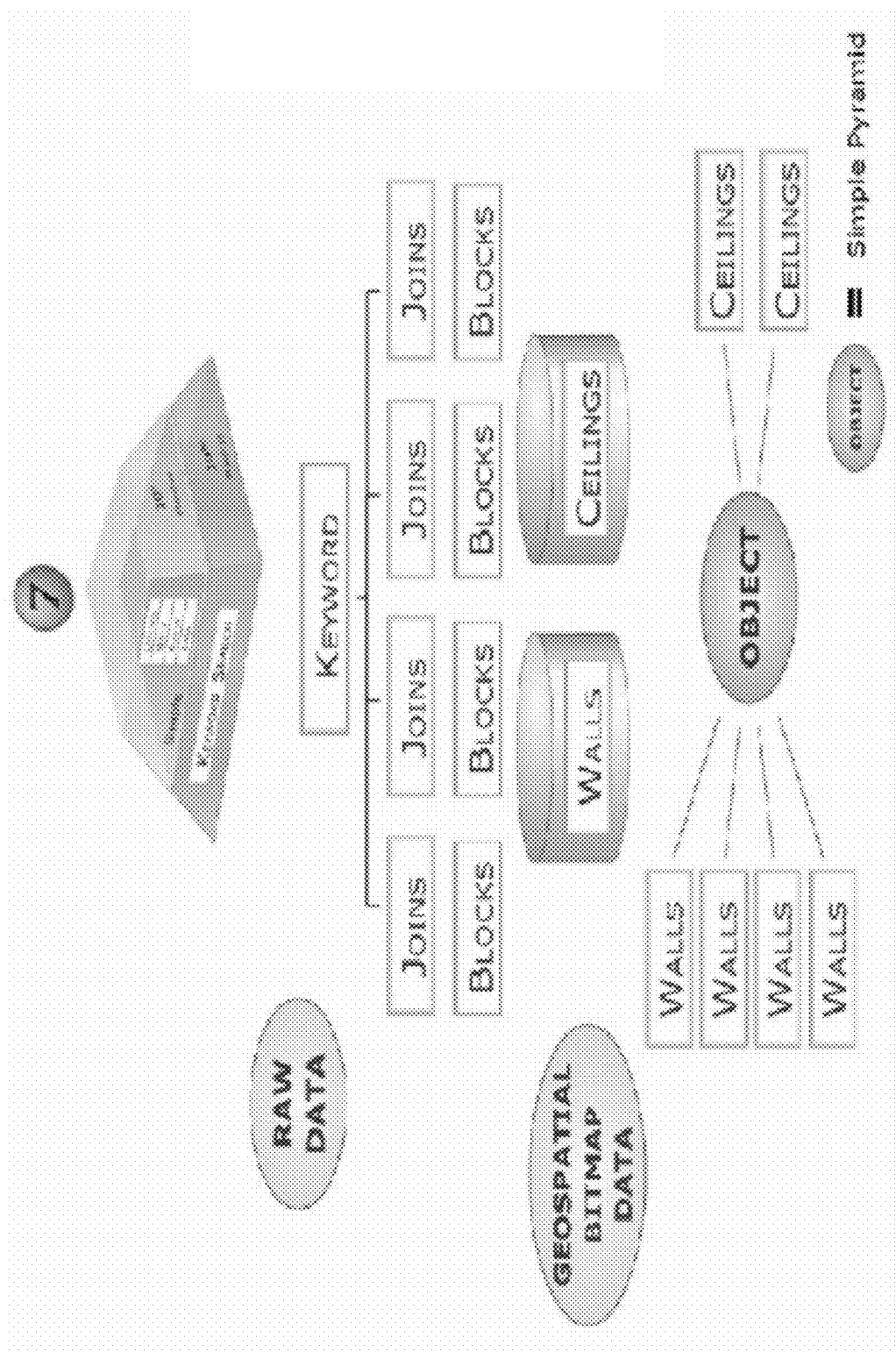
FIG. 123 Simple Pyramid Structure—First Relationship Indices.

FIG. 123: is a schematic representation of a Simple Pyramid Structure. An end user makes a request using English language KEYWORDS. Each KEYWORD collection consists of a plurality of common denominator verbs, nouns, prepositions, adverbs, adjectives and other English semantics. For a KEYWORD Search that has $X matches expressed from the environment, the system has pre parsed the content and stored it into the TWS or Lower Tier XLDB Database Engine. The information is logical distributed, based on Simple Join and Block collection of KEYWORD filters, and further quantified and qualified by Simple Wall and Ceiling collection of KEYWORD. Simple Joins and Blocks help create cells, and Simple Walls and Ceiling create blocks that help construct 3D objects where the highest object is within the Pyramid Structure and the greatest the quality. At the top of the Egyptian pyramid we have the pharaoh that is the optimal element (A) consists of the TOP 10,000 responses. Since the TOP 10,000 responses are too broad, further math and semantics analysis is required via the Hybrid Pyramid Structure that further dilutes the object to the TOP 100, and the Complex Pyramid Structure reaches Informational Entropy and is able to identify the optimal element (A) and the remainder TOP 10.

XCommerce 2010: The Simulation Network assigns the optimal summit tier that has a Complex Pyramid with 10,000 web pages the KEYWORD, KEYWORDS GROUPS or KEYWORDS COMBINATIONS requested by the end user. And uses the W_RANK value of each web page and uses the quality of the parent site to further adjust and create optimal sized sample of 10 web pages.

Figure 124:
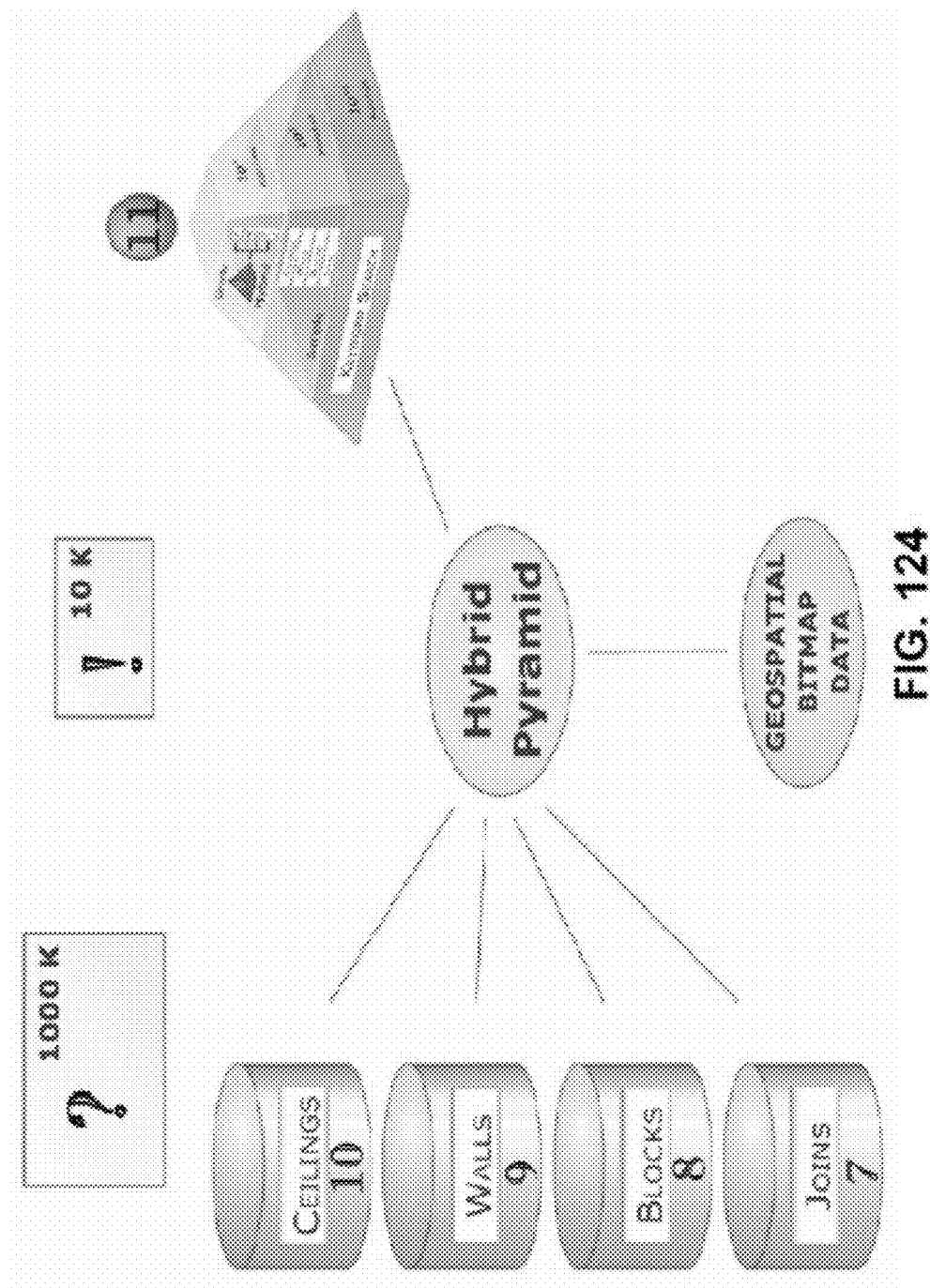
FIG. 124 Hybrid Pyramid Structure—Second Relationship Indices.

FIG. 124: is a schematic representation of a Hybrid Pyramid Structure. An end user makes a request using English language KEYWORDS. Each KEYWORD collection consists of a plurality of common denominator verbs, nouns, prepositions, adverbs, adjectives and other English semantics. For a KEYWORD Search that has $X matches expressed from the environment, the system has pre parsed the content and stored it into the TWS or Lower Tier XLDB Database Engine, and converted it into a Simple Pyramid Structure of 1,000,000 cells. The information is logical distributed, based on Hybrid Join and Block collection of KEYWORD filters, and further quantified and qualified by Hybrid Wall and Ceiling collection of KEYWORD to reach the TOP 10,000. At the top of the Hybrid Pyramid Structure with magnitude of 11, we can find the TOP 100 most satisfy results. Since the TOP 100 responses are too broad, further math and semantics analysis is required via the Complex Pyramid Structure to reach Informational Entropy to identify the optimal element (A) and the remainder TOP 10. Note: Joins collection KEYWORD have a magnitude of 7, Blocks collection of KEYWORD have a magnitude of 8, Walls collection of KEYWORD have a magnitude of 9, and Ceiling collections of KEYWORD have a magnitude of 10.

Figure 125:
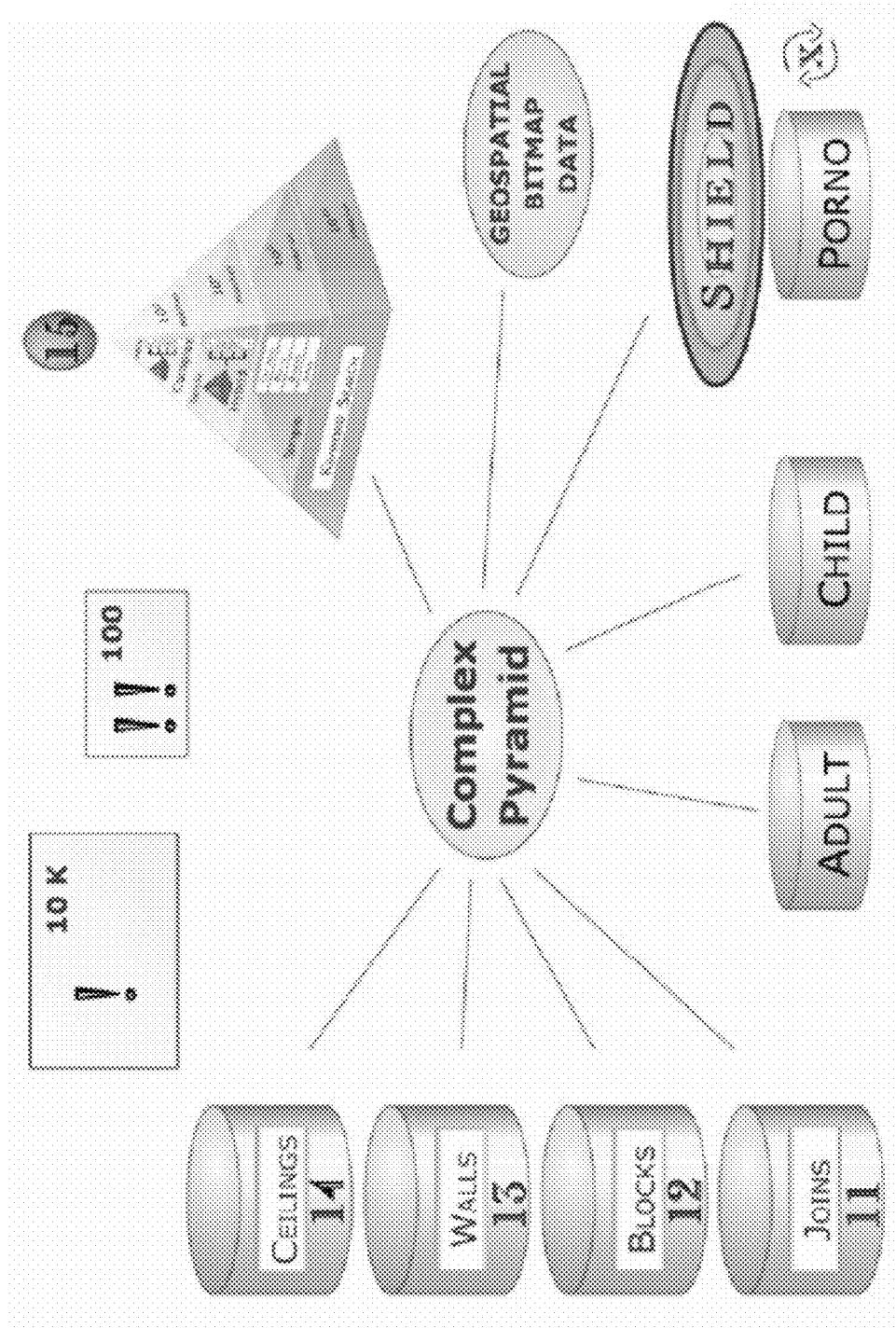
FIG. 125 Complex Pyramid Structure—Third Relationship Indices.

FIG. 125: is a schematic representation of a Complex Pyramid Structure. An end user makes a request using English language KEYWORDS. Each KEYWORD collection consists of a plurality of common denominator verbs, nouns, prepositions, adverbs, adjectives and other English semantics. For a KEYWORD Search that has $X matches expressed from the environment, the system has pre parsed the content and stored it into the TWS XLDB Database Engine, and converted it into a Simple Pyramid Structure of 1,000,000 cells. The information is logical distributed, based on Hybrid Join and Block collection of KEYWORD filters, and further quantified and qualified by Hybrid Wall and Ceiling collection of KEYWORD to reach the TOP 10,000. At the top of the Hybrid Pyramid Structure with magnitude of 11, we can find the TOP 100 most satisfy results. Since the TOP 100 responses is too broad, further math and semantics analysis is required via the Complex Pyramid Structure to reach Informational Entropy and to identify the optimal element (A) and the remainder TOP 10 by using Complex Joins, Blocks, Walls and Ceiling collections. At the top of the Complex Pyramid Structure with magnitude of 15, we can find the TOP 10 most satisfying results. Note: Joins collection of KEYWORD have a magnitude of 11, Blocks collection of KEYWORD have a magnitude of 12, Walls collection of KEYWORD have a magnitude of 13, and Ceiling collections of KEYWORD have a magnitude of 14.

XCommerce 2010: Simple, Hybrid and Complex Joins, Blocks, Walls and Ceiling collections are the filtering mechanism used to make the request have a predefined magnitude by using vector math and optimally shrink the environment.

Figure 126:
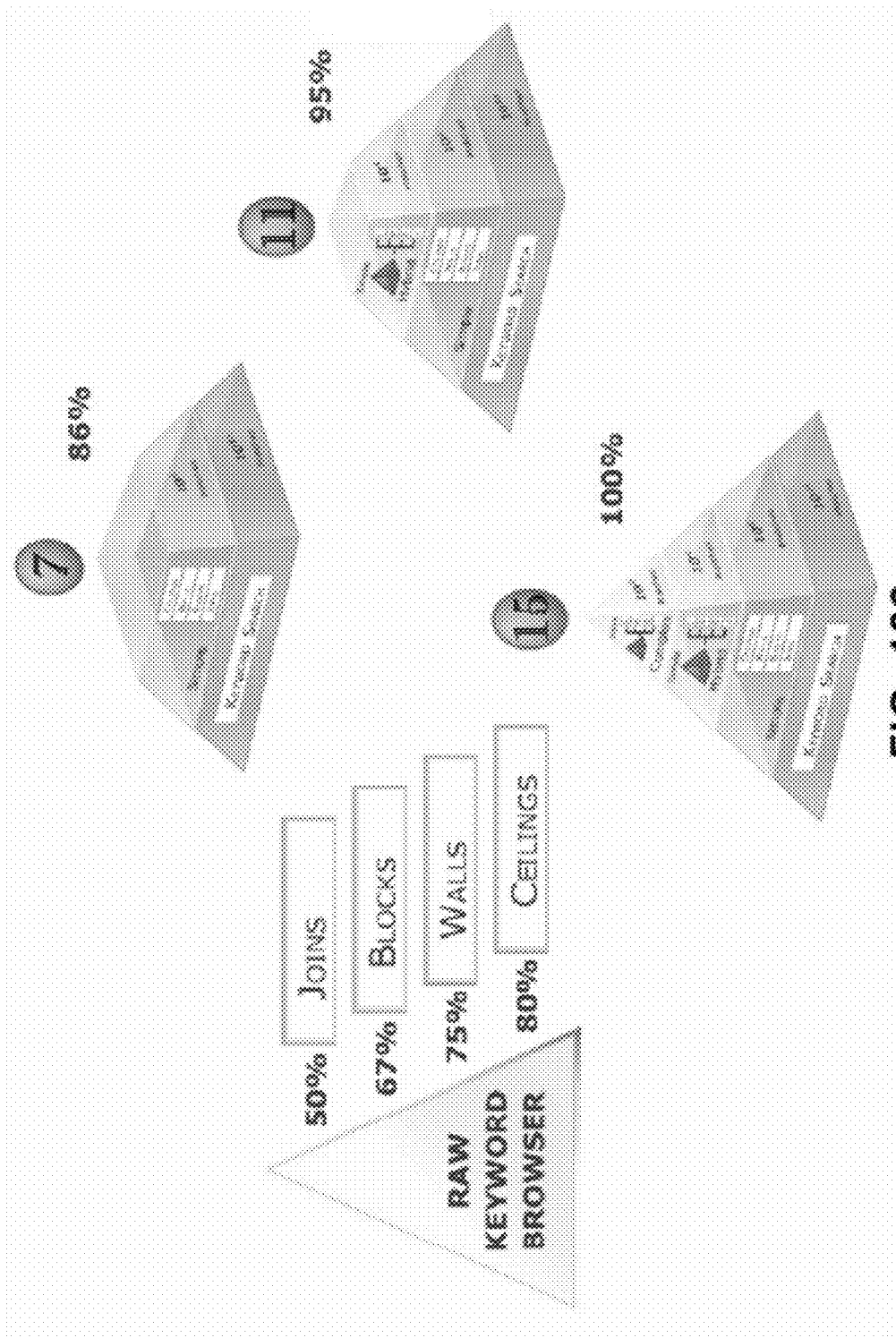
FIG. 126 Informational Entropy.

FIG. 126: is a schematic representation of Informational Entropy. An end user makes a request using English language KEYWORDS. (0) $X responses are obtained by a Browser Engine using Caesar's Divide and Conquer based Eigenvector programming. (1) After using Simple Join Collections of KEYWORD, the quality and English value is 50%. (2) After using Simple Blocks Collections of KEYWORD, the quality is 67% and the content is considered to be proper English. (3) After using Simple Walls Collections of KEYWORD, the quality is 75% and is grouped in cells. (4) After using Simple Ceilings Collections of KEYWORD, the quality is 80% and is grouped in blocks. (5) The Simple Pyramid Structure has filtered, validated and verified the quality of the English language value that is 86%, and has measured through relational association common denominator groups that help elucidate ties breakers in the difficult of finding the optimal element (A) of the Superset (U). (6) The Hybrid Pyramid Structure has filtered, validated and verified the quality of the geospatial data value that is 95%, and has linked each block the different DATA collections groups to further refine and polish the results that help elucidate ties breakers in the difficult of finding the optimal element (A) of the Superset (U). (7) The Complex Pyramid Structure has filtered, validated and verified the quality of the Business Intelligence patterns and statistical analysis of end users' satisfaction to real Informational Entropy of 100%, which has identified the optimal element (A) of the Superset (U). (8) The Simple, Hybrid and Complex Pyramid Structures have $X responses, 1,000,000 cells and 500,000 building blocks each regardless of the original magnitude of the KEYWORD.

Figure 127:
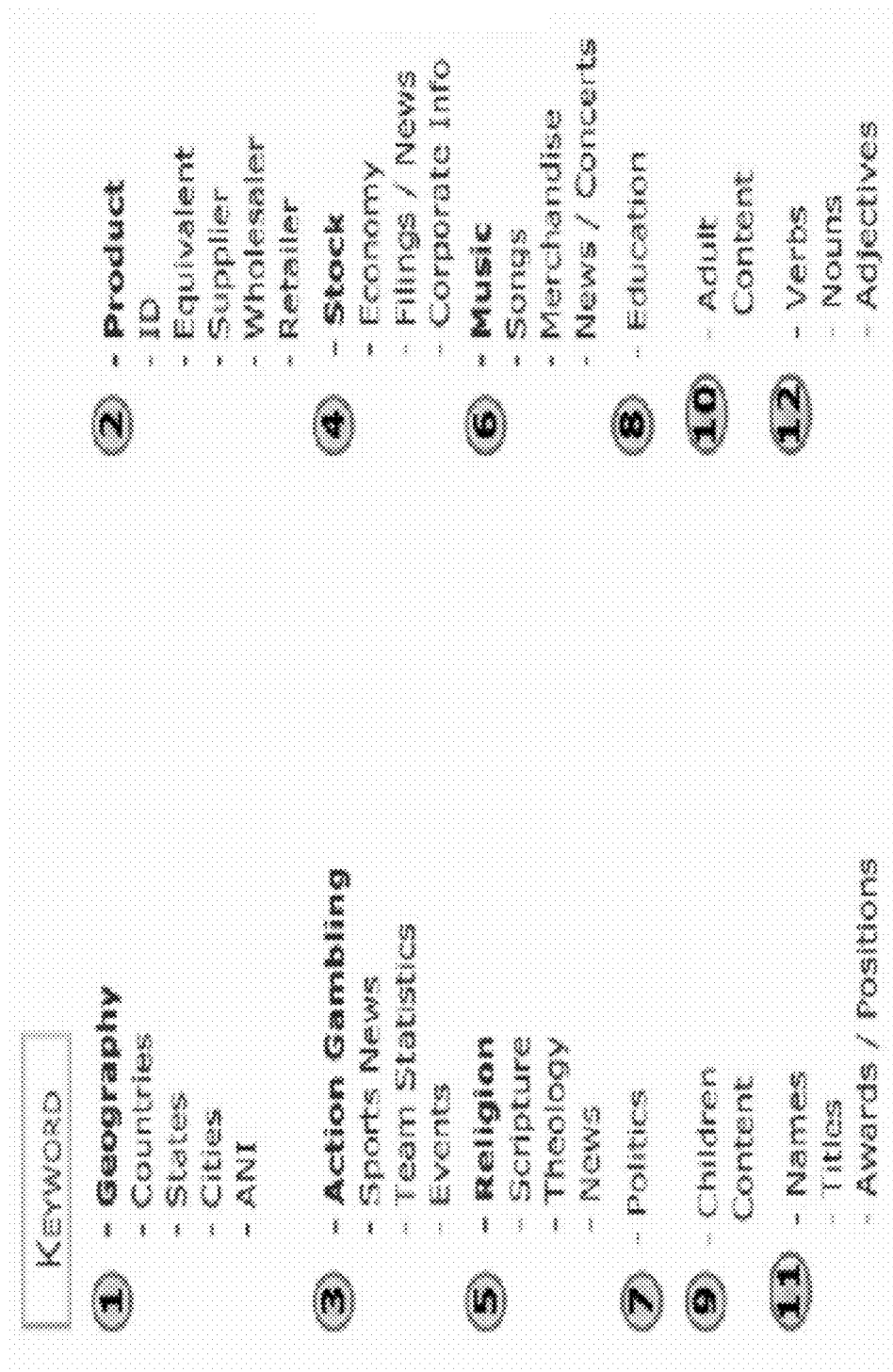
FIG. 127 Sample KEYWORDS collections.

FIG. 127: is a table of Sample DATA collections used by the XCommerce technology to help build Simple, Hybrid and Complex Pyramid Structures. In particular, (10) Adult content carefully monitored and sites propagating Spam are quarantined and those having Viruses are blocked.

Figure 128:
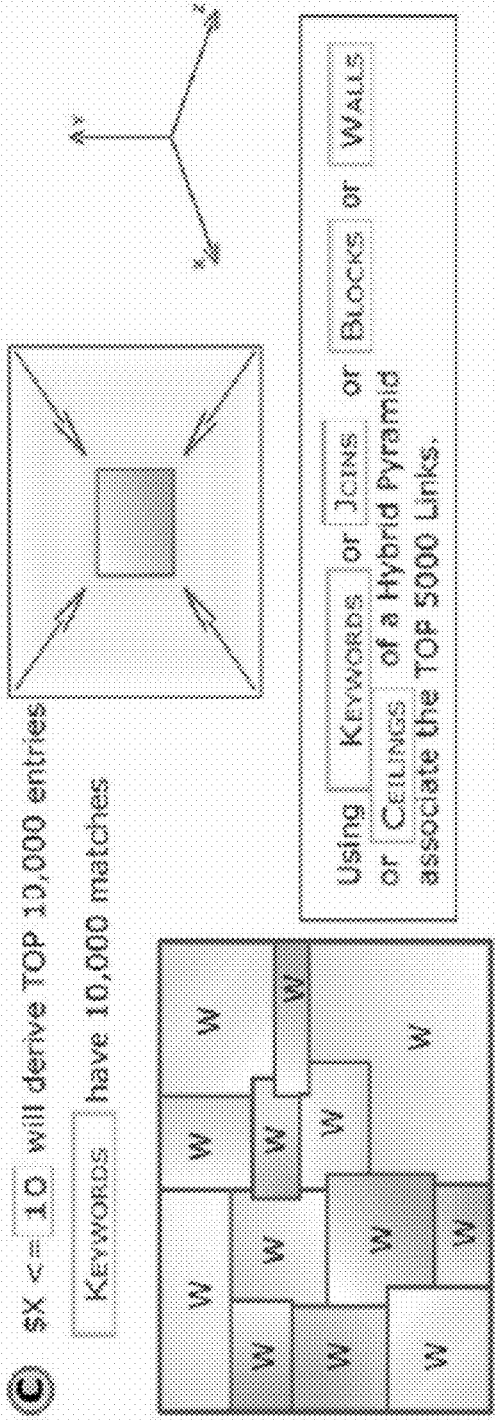
FIG. 128 Using math to balance a Hybrid Pyramid.

FIG. 128: is a schematic representation of Using Math to Balance a Hybrid Pyramid. An end user makes a request using English language KEYWORDS. Each KEYWORD collection consists of a plurality of common denominator verbs, nouns, prepositions, adverbs, adjectives and other English semantics. For a KEYWORD Search that has $X matches by the environment, the system creates basic cells and building blocks via Simple Joins, Blocks, Walls and Ceilings that have helped to create an object with exact characteristics, thanks to weight Gamma functions of 1,000,000 cells and 500,000 building blocks. (A-C) The system identifies the raw magnitude of the KEYWORD and maps the content of the Simple Pyramid Structure as the foundation of the Middleware tier of the higher Information Entropy object that has 10,000 cells or 5,000 building blocks with the TOP 10 and TOP 100 most satisfying responses to the end user. The quality of the English content is measured.

Figure 129:
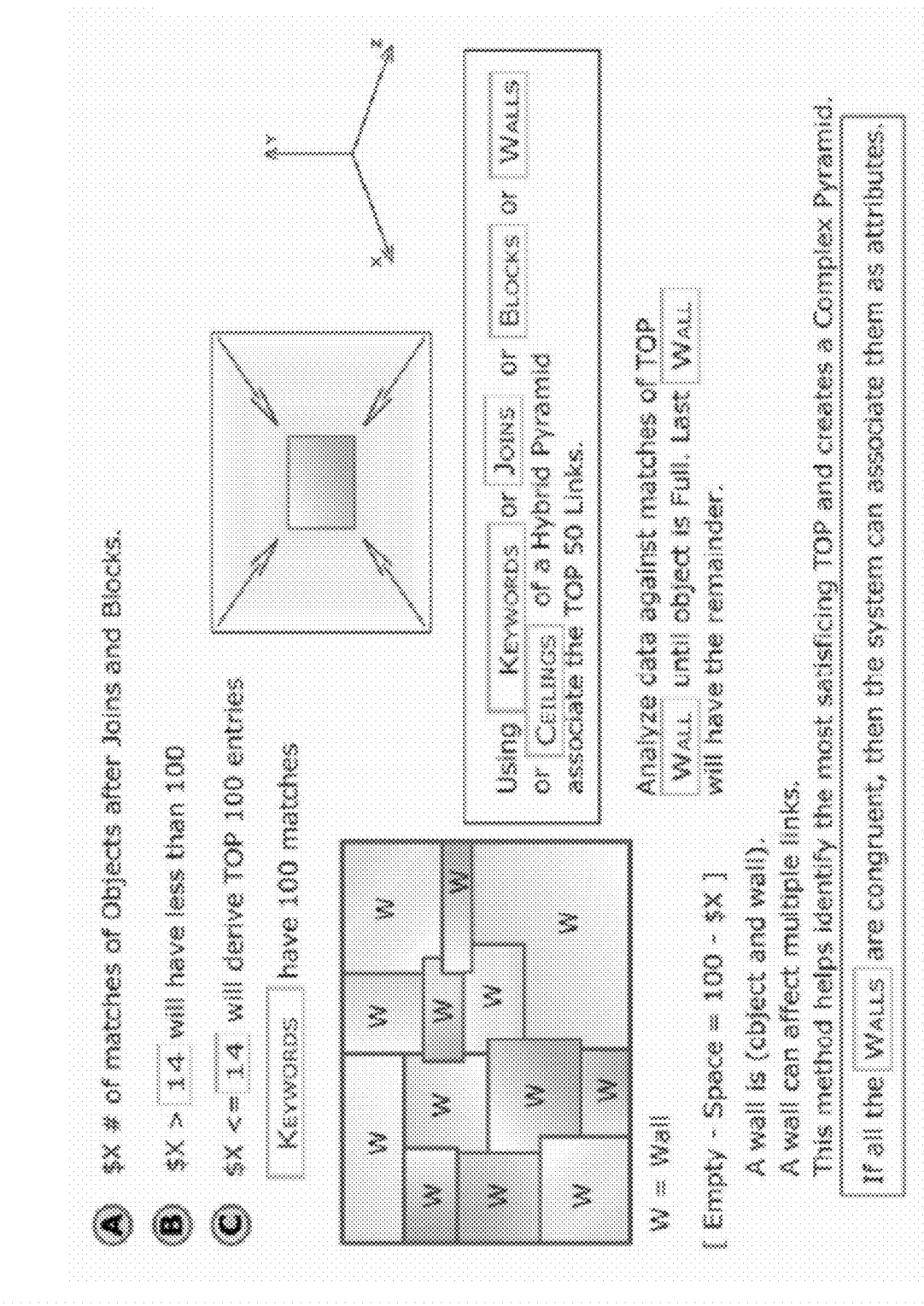
FIG. 129 Using math to balance a Complex Pyramid.

FIG. 129: is a schematic representation of Using Math to Balance a Complex Pyramid. An end user makes a request using English language KEYWORDS. Each KEYWORD collection consists of a plurality of common denominator verbs, nouns, prepositions, adverbs, adjectives and other English semantics. For a KEYWORD Search that has $X matches by the environment, the system creates basic cells and building blocks via Simple Joins, Blocks, Walls and Ceilings that have helped to create an object with exact characteristics, thanks to weight Gamma functions of 1,000,000 cells and 500,000 building blocks. The system creates a higher Informational Entropy object by using Hybrid Joins, Blocks, Walls and Ceilings that have helped to create an object with exact characteristics, thanks to weight Gamma functions of 10,000 cells and 5,000 building blocks, and a Pyramid consisting of a foundation and a middleware tier.

Match/Merge and correlating a plurality of subordinate blocks: (A-C) The system identifies the raw magnitude of the KEYWORD and maps the content of the Simple and Hybrid Pyramid Structure as the foundation of the Summit Tier of the higher Information Entropy object match/merges plurality of building blocks Wall Objects with 50 to 100 cells derived from its subordinate Lower and Middleware Tiers with the TOP 1 and TOP 10 most satisfying responses to the end user. The quality of the HTML content and links to other places is measured.

Figure 130:
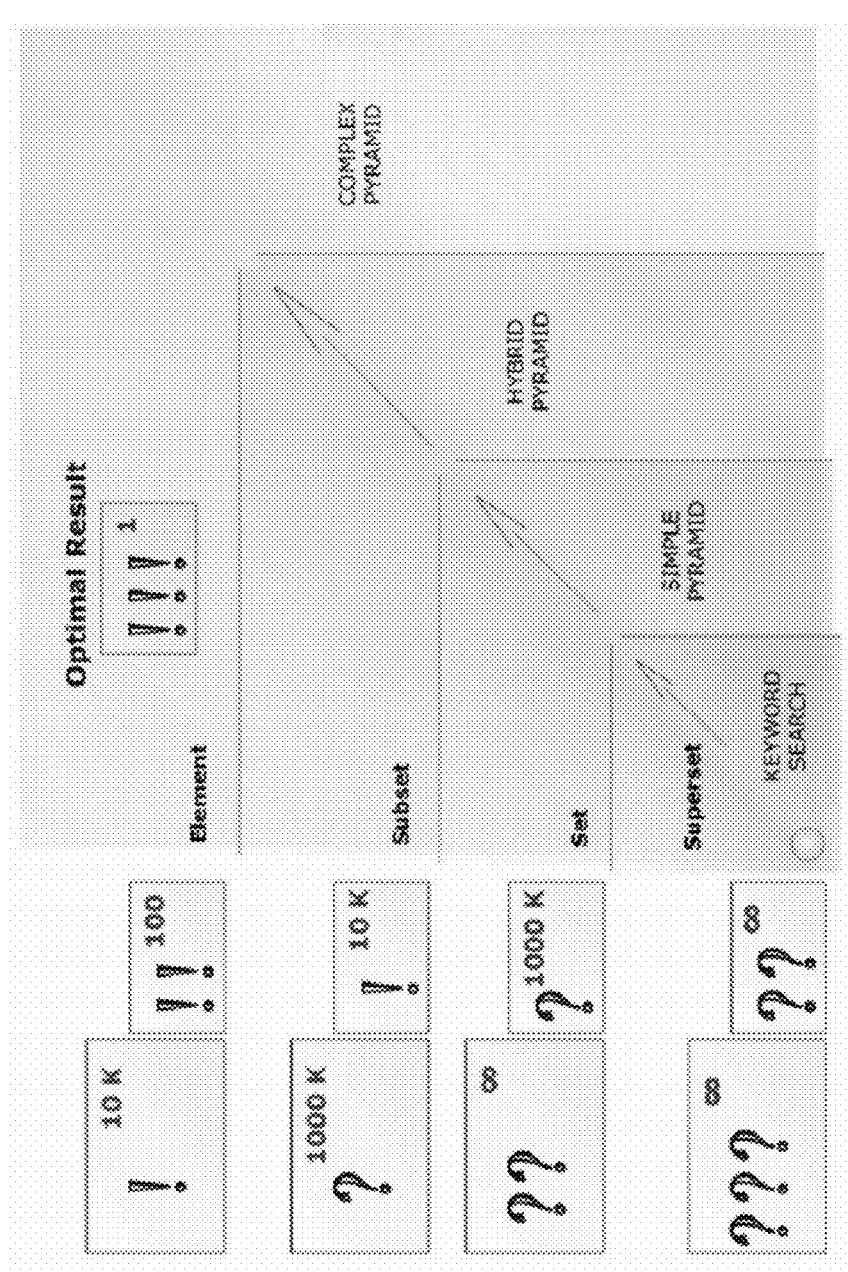
FIG. 130 Deriving Informational Entropy.

FIG. 130: is a schematic representation of Deriving Information Entropy. This example uses chess notation, where (???) is a blunder, (!) is a good move and (!!!) a superb move. In this case, raw Browser Engine filters out the information of the Internet or Superset that is considered to be (???) and improves it to (?? to !).

(1) When the original magnitude <=10,000,000,000 responses, the process of identifying basic English constructs of the contents help narrow down the size of the set to <=100,000,000, which is too broad and thus is measured as (??). (2) When the original magnitude <=10,000,000 responses, the process of identifying the English language semantics and geospatial characteristics of the contents help narrow down the size of the set to 1,000,000, which is too broad and thus is measured as (?). (3) When the original Browser Engine magnitude <=100,000 and is less than responses, the process of identifying the English language and geospatial characteristics of the contents help narrow down the size of the set to 10,000, which is broad and thus is measured as (!). (4) When the original Browser Engine magnitude <=100 and is less than responses, the process of identifying the English language structure and a system understanding of the content of each page helps narrow down the size of the set to 10, which contains 'la crème de la crème' and thus is measured as (!!). (5) From the discrete set of 10 by using Business Intelligence, the optimal element (A) of the Superset is derived and thus is measured as (!!!). The process of identifying the optimal element (A) is the basis of the W_PAGE method.

Detailed Description of the System Architecture

Simulation Network: is a parallel clustered multi-tiered Supercomputer consists of a plurality of nodes. Each node is programmed with Artificial Intelligence, commercially known as Intelligent Components or IC, to perform processing power predefined and ad hoc tasks based, that must be logistical rationalized based on the requirements derived from the environment.

Simulation Network Superset (U) has 3 Tiers: The computer network system is also known as the Superset (U). The cluster is divided into three geospatial tiers: a) Global, b) Regional, and c) local possessing specialized Data Mitigation, Network Trending, Provisioning, 'Data Mart' and Business Intelligence functionality relying on a sharable Extreme Large Data Base (XLDB) tier. Each of the nodes or IC is assigned a geospatial area of coverage range from 0, small geographical areas, to 7, the world, a managerial hierarchy system denoted as HQ. Each Intelligent Component possesses the following characteristics and functions:

UCommerce Simulation Network Functions
  a) Real time availability of the inventory and the latest prices of retailers, suppliers, wholesalers and UCommerce warehouses that will give customers products and services delivered door to door at the optimal P/U and time. This method offers its customers the ability to locally buy and sell worldwide merchandise, thus allowing them to compete globally without the need of storing physical inventory.
  b) Total Quality Management analyzes and identifies product, quality and service designed to determine customer satisfaction and perceived value.
  c) Data Manipulation consists of gathering, reading, priming and inserting transactions into a structured format that can be used for billing, call routing and vectoring, fault management, fraud detection and network statistics.
  d) Management Information Systems: organizes, transforms, distributes and replicates summary data that is derived by analyzing each transactional processes and activities that occurs in the environment.
  e) Expert Information Systems: permits business intelligence software to evaluate information in a structured way for decision makers to understand where and why things happen in an organization to make strategic course corrections
  f) Inventory Control: permits the geospatial assignment of merchandise.

Intelligent Component works independently from each other: All of the Intelligent Components work collectively and independently from each other, and still simultaneously perform the task analyzing, evaluating, gathering and processing information from the environment in real time, or from the moment of incipiency of receiving the fuzzy logic piece of information that triggers new and updates pending activities or tasks. The cluster of computers must be subdivided into a superset, set, subset geospatial tiers:

Summit Tier has Global Geospatial Scope: coordinates the Data Mart cluster used for Business Intelligence and Invoicing that works with UCommerce Software via the Internet that allows users to have access to their business and personal information in real time. The system analyzes each UCommerce Software interaction to better understand what the client values in order to keep the subscriber satisfied. The summit node of the cluster (U) has control of all of the financial institutions interfaces, human resources and Network Platform Equipments of an organization. Consequently, each Intelligent Component has the four cluster configurations as follows: HQx ([I], [K]y, [T]), where x ranges from 0, local, to 7, global geospatial scope, [I] Global (Superset), [J] Region (Set), [K] Local (subset), y denotes the element, and [T] XLDB or Data Mart Cluster.

Middleware Tier has Regional Geospatial Scope: controls UCommerce warehouses based on continent or continental region.

Lower Tier has Local Geospatial Scope: controls a plurality of points of presence that interface with suppliers, wholesalers and retailers. These HQ2 to HQ0 collectively constitute the workhorse of the system, and control of users' requests and replies to the system. These Intelligent Components coordinate and synchronize the entire billing, provisioning and TQM functionality requests and replies. They also have the ability to interact with $3^{rd}$ parties organizations and supply them with a summary of all of the data they have processed.

Simulation Network Synchronizes All Inventories: Virtually simulate $3^{rd}$ parties organization functionality by partitioning and decentralizing their global distribution means by assigning them to regional TWS, continental SIS or worldwide MPS. Each Intelligent Component and Intelligent Data Warehouse must only synchronize the latest inventory once every predefined cycle, and then is programmed to optimize and maximize its organizational management logistics. The nodes of the system will interact directly with the provisioning and physical or queued inventory of each member of a $3^{rd}$ party distribution means.

Summary Reports of the Environment Permit Synergy: each node can request to members of the same cluster any excess buffer resources to complete a task. Each parent tier cluster can coordinate the resources their subordinates to complete a task. Sibling tier cluster can synergistically collaborate to process tasks.

Intelligent Components Remove Chaos and Anarchy: the supplier system interacts with the environment and gathers, distills, analyzes, standardizes and convert the raw information into primed data, which in turn is organized and transformed, so that Information Entropy is achieved and thus chaos and anarchy or 'Spaghetti Phenomena' is eliminated.

UCommerce uses Lingua Franca Primed Messages: Collectively, Intelligent Components work together to parallel and simulate an existing organization that possesses an UCommerce supplier system. And each message has a single version of the truth vector trajectory that assigns a discrete amount of Intelligent Components, so they can communicate amongst themselves or members of the organization and the Internet clients. Based on the vector trajectory, each message has an owner and the path so Intelligent Components can communicate amongst themselves via forward and rearward chaining. The software sends the parameters to a single or plurality of clusters, so they can optimally analyze, assign, calculate, distribute, prioritize and weight the rate of messages and timing limitations for the next queue of incoming messages, based on the conditions of the environment and historical trends.

Intelligent Component: are independent working entity or an element of a given superset, set or subset, grouping with the following characteristics:

Remove Redundancy from the Environment: gather and distill raw data to remove redundancy, geospatially distribute activities, and correlate and update information, and then valorize the resources and capacities of the network by using synergy to avoid not taxing the capacity of the network in real time.

Analyze the Conditions of the Environment: manage and organize the flow of information within their organization, from predefined point A to point B routes to avoid clogs and saturation maximize throughput, and assign and prioritize cluster nodes via synergy that have substantial buffer resources since unused resources are considered waste, which is the independent variable that is directly related in creating the 'Spaghetti Phenomena'. And immediately create, plot and update purchase orders as soon as new messages from the environment are processed.

Remove Complexity to Reach Information Entropy: based on the known latest working conditions of each Intelligent Component, network routing traffic patterns and throughput limitation of each given domain. The Simulation Network performs the non obvious task of removing complexity in order to be a real time system by eliminating data redundancy, filtering, quantifying, qualifying data as good or garbage, and minimizing waste before beginning to transmit the data through the managerial hierarchy system. And thus eliminate the 'Spaghetti Phenomena' at its incipiency to reach Information Entropy.

Autonomous and work together as a Single Unit: Each Intelligent Component is programmed to be autonomous and through means of the managerial hierarchy and synergy, can work in parallel with others to function as a single unit.

UCommerce makes all Purchase Orders in Parallel: Every single activity and purchase order is made in parallel, starting from the point of origin and ending at the point of destination, and by rearward chaining of routing vector information through the simulation network to the point of origin. The computer network system which plots a purchase order providing the lowest prices and the best terms and conditions available for that transaction at that moment, and a request is initiated and continues in real time as the activity progresses.

Simulation Network Managerial Hierarchy: the Simulation Network analyzes and evaluate the best usage network resources as follows:

a) Send summarized information packets to their organizational subordinates. Consequently, these updates facilitate network wide information in real time to each intelligent component, so that the decisions are based on facts, and not lookup tables or hard coded predefined routing patterns. This is the basis for the development of the two new methods: Z_PRICE and W_RANK.

b) Assign cost to each activity and resource to avoid bottlenecks. Each Intelligent Component can request available buffer resources by less taxed members of the cluster, and load balances the demand on the organization's resources, as per anticipated network traffics dire condition scenarios.

c) Operates in conjunction with the Legacy System and its associated technologies, so that existing equipment is not wasted and the cost of updating is minimized. When 2+ independent variables exist, a plurality of subordinate members can take ownership of a plurality of circuits of a transaction and then send the partial Vector CDR information to the assigned transactional owner, so it can gather all of the circuits information and then match/merge the billing entity or purchase order.

Description of the Intelligent Component (2010)

An Intelligent Component is a node that belongs to the Simulation Network and is programmed using artificial intelligence to perform a particular task depending on the tier it belongs, there are three tiers: lower tier, middleware tier and the summit tier.

All the components work collectively and independently from each other, and still simultaneously perform the task analyzing, evaluating, gathering and processed information from the environment in real time or from the moment of incipiency of receiving the fuzzy logic piece of information that triggers new and updates pending activities or tasks. An Intelligent component can programmed to belong any of the following three tiers:

Summit Tier: (Managerial Pyramid Switch)
a) Interacts outside of the environment via UCommerce software.
b) Controls all the interfaces with $3^{rd}$ parties.
c) Coordinates all the resources of its chain of command.
d) Validates each transaction.

Middleware Tier: (Synergy Interface Switch)
a) Control available inventory for all participating suppliers <S>.
b) Control available inventory for all participating wholesalers <W>.
c) Control available inventory for all participating retailers <R>.
d) Control available inventory for all UCommerce warehouses <U>.

Lower Tier: (Team Work Switch)
a) Owns a predefined number of UCommerce end users.
b) Control all the user requests and replies to the system.
c) Perform tasks using lateral and vertical synergy.
d) Remove data redundancy:

The lower tiers analyze, update, monitor, control, validate, verify and administer information independently. This alone eliminates the need for a central mainframe, and also reduces the raw workload in an unobvious manner. The method of the invention removes redundant data at incipiency, enabling the system to function in real time, which is a significant aspect of the present invention Depending on the size of the network, the architecture defining the way the computers are linked together may comprise varying types and degrees of scope, such as, for example, retailer, wholesaler, and supplier organizations, each with its own parent and subordinates. For the purposes of this invention, retailer, wholesaler, and supplier define available scopes that best reflect supply side organizations and their resources.

Detailed Description of the UCommerce Technology

Rephrased Based on (Ser. No. 11/584,271 and 11/584,941)

UCommerce Simulation Network Functions
a) Process Messages and Transactions: Receives and sends messages and transactions for all of the activities performed by the end users that interface with the system (100).

Update Available Inventories: continuously update the latest shipping cost formulas, geographical location of retailers, suppliers, system warehouses, wholesalers and their available inventories.

Match/Merge Multiple Activities: from multiple end users with regards to the same supplier to afford the best competitive rate via economy of scale discounts where applicable.

UCommerce Managerial Hierarchy Distribution: the simulation network has a hierarchical structure that is geospatial in nature where each HQ is assigned a value from 0 (local) to 7 (global) denotes its authority, position, power and responsibility.

Simulation Network Delegation of Command: each node by means of lateral synergy where a subordinate creates a virtual instance of its immediate superior, and acts and functions in the same manner as its supervisor, including the same delegated authority and responsibility within the hierarchy.

Heart Beat: the Summit tier gives a heart beat to the Simulation Network.

Summit Tier the Superset (U): the summit tier monitors and controls the environment or Internet or Superset (U) and is responsible for prioritizing the resources of its subordinates. The summit tier performs the following:

Summit Tier Functions: i) Coordinates the activities of the subscriber software driven requests. ii) Analyzes, gathers and identifies purchasing patterns of behavior. iii) Puts buyers and sellers together. iv) Determines customer level of satisfaction. v) Communicates with the outside of the environment via the Internet.

Middleware Tier the Sets: controls the actual inventory, and makes financial decisions using mini cost algorithms. These elements gather information and study patterns of purchasing and production behavior and faults, and then make on their own ad hoc optimized logistics reports that are submitted $3^{rd}$ parties. This "inverted or reverse" ad hoc query does not hog the resources of the network, since the system builds the report on its own by summarizing the reports of its subordinates and then sending them to the user. Each middleware tier controls a geographical region of the Internet or the set, where U=(I, J, K). And manages the logistical flow of transportation and queuing of delivery of goods and services from an UCommerce warehouse to the destination. And merges multiple requests as one to have better bargaining power and lower costs to the consumer via economies of scale.

Lower Tier Subsets: validates and verifies each end user request and reply, and is assigned an ownership of several end users. This tier at incipiency determines the origin, tandem and destination of the transaction. By means of the data mining activities of the client software, the system updates and keeps the end users profile current. Each lower tier controls a subset of the Internet by modeling a plurality of retailers, suppliers and wholesalers organization points of presence and interacts directly with their provisioning systems.

X_FOB Method: penalizes the FOB price based on the number of days the product is away from the C&F port. X_FOB stands for delay free FOB price. X_FOB is primarily concerned with the optimal distribution of goods and services from Leg A to UCommerce warehouse Leg T or Leg U, using Ocean, Land and Cargo transportation services, where delivery is preferred in days.

Y_CDIF Method: stands for delay free CDIF door-to-door service. Y_CDIF is primarily concerned with the optimal distribution of goods and services from Leg A, Leg T or Leg U to destination Leg B, after paying cargo, duties and insurance, and using Cargo and Express shipment transportation services where delivery is preferred in hours, taking into account cost as constraint. Y_CDIF Gold is a rush service, when the client requires merchandise ASAP, where cost is a secondary constrain and time the primary, and immediate service is optimal.

X_FOB and Y_CDIF Calculations: are a way to calculate the quality and versatility of a transport route from Leg A to Leg B Warehouse.

X_FOB Routing: the supplier system determines the best route for sending merchandise FOB or C&F. The supplier also assigns the best FOB P/U by using via X_FOB method and then determines the best C&F UCommerce Warehouse by default. Alternatively, the end user can select a different path from the critical path and the system will warn any time delays and cost differences.

Y_CDIF Routing: The supplier system determines the best path to send CDF merchandise via Y_CDIF method, and the end user only has to specify where they want the goods and services delivered. Every time the system detects a significant change in inventory for a given product, the system will update all of the clients of the newly derived critical paths for delivering good and services.

X_FOB and Y_CDIF Restocking: After each purchase, each tier determines how to replenish Inventory In Hand levels and purchase optimal levels of merchandise to maintain the minimum amount of inventory in stock at the lowest cost. X_FOB restocks in ocean, land or cargo transportation methods, whereas Y_CDIF uses green, blue or red labels. Y_CDIF Gold uses red or black labels.

UCommerce Searches: The client software must require from the end user a supplier before making a search. Once the end user selects the valid supplier for a given product, the system can start the partial search commands that are sent to each TWS, SIS and MPS that using X_FOB and Y_CDIF methods create optimal transportation cost from Leg X to Leg Y. When the supplier system responds from the active memory information of each Intelligent Component, the client merges all of the partial commands to a single version of the truth. Each node does not make a SQL command request instead has control of the inventory, and is responsible for coordinating the flow of information sent to it to be processed by the different clients. Once the information is made to the node it will match/merge optimal routes in its entirety or partially until the best satisfying means of delivery are obtained.

UCommerce Pickups: the end user delivers at the nearest authorized agents the goods with the original cost, so that the system can generate the quote for the duties and expenses at the final destination. Each order confirmation uses an authorized agent that accepts the goods to be shipped in behalf of the client, and then sends them to the final destination via C&F, CDF or CDIF as the client selected.

UCommerce Restocking: When making a search for C&F, CIF, CDF and CDIF, the system calculates X_FOB and Y_CDIF until the warehouse has enough Inventory In Hand to satisfy the order. Thus if an end user requested quote demands for a quantity of items that exceeds available Inventory In Hand, the system will do the following: 1) Requests the missing Inventory via X_FOB and Y_CDIF restocking means. 2) Then merchandise will receive the appropriate time delay for availability in the system. 3) Ideally, the system will request all of the missing merchandise from the manufacturer as one consolidated order, since the merchandise will not leave until all of the units are available. 4) All of the FOB quotes from UCommerce Warehouse offer X_FOB Inventory In Hand with the corresponding restocking delay. 5) All of the C&F, CDF and CDIF quotes will offer both X_FOB and Y_CDIF to the final destination port with the corresponding restocking delay, whereas Y_CDIF Gold makes available the actual Inventory In Hand with no delay.

X_FOB Inventory Control Bitmaps: Each tier (TWS, SIS, and MPS) creates a X_FOB real time Inventory control tables that allow subordinate Intelligent Components to monitor a specific geographic area to store several bitmaps of information such as: 1) Availability, 2) Quantity In Hand, 3) Highest Quantity, 4) Best Price, 5) Most Reliable route, and 6) transportation means.

Y_CDIF Inventory Control Bitmaps: Each tier creates an Y_CDIF real time Inventory control tables that allow subordinate nodes to monitor a specific geographic area to store several bitmaps of information. The bitmaps consist of 0 and 1 to notify which supplier carries a specific product in the Available field. The In Hand consists of a number of 2 to the n−1 power in hexadecimal form 0 to 32758 products in hand. The highest bitmap is a hexadecimal value that calculates how much inventory a specific supplier has where F means unlimited. The best Price and Most Reliable bitmaps sort with ranking which supplier offers the best service to the end user. These numbers are updated after each change in inventory to reflect the latest optimal prices and paths. These bitmaps have preprocessed all of the calculations with the best case inventory and logistical flow for a given item using X_FOB and Y_CDIF guidelines, eliminating the need for end users' software components to have to do the calculations or bog down the system with unnecessary queries.

UCommerce 2010: The X_FOB and Y_CDIF Inventory Control Bitmaps are commonly known and referred as managerial relationship indices summary results, that have precalculated look up information to eliminate the need of redundant and resource intensive calculations.

System Business Rules

Ser. No. 10/852,394

The system when calculating X_FOB and Y_CDIF calculates the U-Commerce value that ranges from best to worst, which is used to modify the expected time delays when shipping goods from origin to destination.

Rule 1: U-Commerce warehouses in strategic locations worldwide that have Inventory Hand have a plus 2 UC Value. Otherwise the warehouse will offer merchandise from the same country shipping via ground or express mail.

Rule 2: define Service Economies which include US, Japan, Germany, Spain, Italy, Japan, France and United Kingdom and have an Industrial Basis of 2.

Rule 3: define Industrial Market Economies which include Argentina, Australia, Austria, Belgium, Brazil, Chile, China, Denmark, Egypt, Greece, Hong Kong, Ireland, Israel, Mexico, Morocco, Netherlands, Nigeria, Norway, Poland, Portugal, Russia, Singapore, South Korea, Switzerland, Taiwan, Turkey, and Ukraine and have an Industrial Basis of 1.

Rule 4: define Third World Economies, consisting of the remainder of the countries in the World, and have an Industrial Basis of 0.

Rule 5: If Leg A and Leg B belong to the same country then add a +2 for domestic modifier. International shipments have a +0 modifier. The system can calculate FOB, C&F, or CDF prices. The system will only calculate FOB and C&F when Leg A and Leg B reside in the same country.

Rule 6: Countries within the same continental region get a +1 modifier.

Rule 7: Service and Industrial Market Economies can enhance trade using comparative advantage philosophy of trade. To reflect this protrade variable to the U-Commerce system the following assumption: SE (Service Economies) and IE (Industrial Market Economies) located in America, Asia and Europe with region being 1 are considered to be part of the Supra Continent and receive no adverse intercontinental modifier. Commerce between the United States of America and another country receives a plus 1 pro-trade modifier.

Rule 8: Countries of the former Soviet Union where Continent is Asia or Europe and with region =5 receive a +1 regional modifier and no adverse intercontinental modifier.

Rule 9: Countries that belong to the Middle East where Continent is Asia or Europe and with Region=3 receive a +1 regional modifier and no adverse intercontinental modifier.

Rule 10: Industrial Market Economies (IE) countries in Asia get a regional modifier of 1 when exporting to other industrial economies in America or Europe with Region=1. Asian Industrial Market Economies in region =1 get a −1 adverse intercontinental modifier when importing goods and services from any region Europe or America. This is to further adjust the asymmetrical trade between continents. Japan receives the export +1 regional modifier to other Industrial Market Economies (IE) but doesn't suffer an adverse intercontinental modifier.

Rule 11: Industrial Market Economies (IE) countries in Europe with Region=2 (Central) or 4 (Balkans) get a regional modifier of 1 when exporting to Europe Region=1 (European Common Market). These countries get a −1 adverse regional modifier when importing goods and services from Europe Region=1. Note countries that become expanded members of the European Common Market will become Region=1.

Rule 12: Industrial Market Economies (IE) countries in South America get a regional modifier of 1 when importing from America Region=1. These countries get a −1 adverse regional modifier when exporting goods and services from America Region=1. This is to further adjust the asymmetrical trade between regions due to the NAFTA. Note countries that become part of the expanded North America Free Trade Agreement will become Region=1.

Rule 13: Intercontinental Barriers for (3E) third world countries.

|  | America | Asia | Europe |
| --- | --- | --- | --- |
| Africa South = 1 | −2 | −1 | −0 |
| Central = 2 | −3 | −2 | −0 |
| West = 3 | −3 | −0 | −1 |
| North = 4 | −4 | −3 | −2 |

|  | Africa | America | Europe |
| --- | --- | --- | --- |
| Asia Far East = 1 | −1 | −3 | −2 |
| India = 2 | −1 | −3 | −1 |
| Middle East = 3 | −2 | −3 | −0 |
| Oceania = 4 | −3 | −4 | −3 |
| Former USSR = 5 | −2 | −3 | −0 |

|  | America | Asia | Europe |
| --- | --- | --- | --- |
| America NAFTA = 1 | −2 | −1 | −0 |
| South = 2 | −3 | −2 | −1 |
| Central = 3 | −3 | −3 | −2 |
| Caribbean = 4 | −3 | −3 | −3 |

|  | Africa | America | Asia |
| --- | --- | --- | --- |
| Europe ECM = 1 | −3 | −1 | −0 |
| Central = 2 | −4 | −2 | −1 |
| Middle East = 3 | −4 | −3 | −2 |
| Balkans = 4 | −4 | −3 | −3 |
| Former USSR = 5 | −2 | −3 | −0 |

Rule 14: (IE) Industrial Market Economies using Continental Barriers for (3E) world countries or vice versa when shipping:

|  | America | Asia | Europe |
| --- | --- | --- | --- |
| Africa South = 1 | −1 | −0 | −0 |
| Central = 2 | −2 | −0 | −0 |
| West = 3 | −2 | −0 | −0 |
| North = 4 | −2 | −1 | −0 |

|  | Africa | America | Europe |
| --- | --- | --- | --- |
| Asia Far East = 1 | −0 | −0 | −0 |
| India = 2 | −0 | −1 | −0 |
| Middle East = 3 | −0 | −1 | −0 |
| Oceania = 4 | −1 | −2 | −1 |
| Former USSR = 5 | −0 | −1 | −1 |

|  | America | Asia | Europe |
| --- | --- | --- | --- |
| America NAFTA = 1 | −0 | −0 | −0 |
| South = 2 | −1 | −0 | −0 |
| Central = 3 | −1 | −1 | −1 |
| Caribbean = 4 | −2 | −1 | −0 |

|  | Africa | America | Asia |
| --- | --- | --- | --- |
| Europe ECM = 1 | −1 | −0 | −0 |
| Central = 2 | −2 | −0 | −0 |
| Middle East = 3 | −2 | −1 | −1 |
| Balkans = 4 | −2 | −1 | −1 |
| Former USSR = 5 | −1 | −1 | −0 |

Rule 15: Intercontinental trade between two industrial market economies or service economies has no adverse modifiers.

Rule 16a: To calculate the U-Commerce Value the system must determine the value of six variables and then add them together to find the final value.

Rule 1: Warehouse has Inventory In Hand 0 or +2.
Rules 2-4: Industrial Basis for Leg A country 0, +1, or +2.
Rules 2-4: Industrial Basis for Leg B country 0, +1, or +2.
Rule 5: Domestic shipment modifier 0 or +2
Rule 6: Same region modifier 0 or +1
Rules 7-15: Intercontinental modifiers −4, −3, −2, −1, 0, +1, +2.

Rule 16b: U-Commerce will offer services based on the final system value defined by using the following formula based on the U-Commerce Value (UCV) services can be determined.

UCV 4 to 10 has same day Black and Gold Label services available.
UCV 2 to 3 has next day Blue Label services available.
UCV 0 to 1 has two days Red Label services available.
UCV −1 to −2 has three days Green Label services available.
UCV −3 to −4 has standard express shipping only.

Rule 17 to determine C&F U-Commerce uses the Maxi Cost method to derive prices. The system calculates the lowest price to deliver the goods to a specific port. C&F also includes Ocean and Air line Cargo that calculated by pound or kilogram shipments.

Rule 18: To determine CDF U-Commerce uses the Maxi Cost method to derive the cost. Use C&F cost plus duties. U-Commerce allows the end user to make the tariff 0% where applicable, or user defined based on the actual circumstances. The system assigns the Mini Duties Cost to be 50% the actual duties rate, this is done reflect the Far East Asia low costs for durable goods.

Rule 19: Depending on the origin and destination countries, and the U-Commerce value the system offers the following air shipment methods:

WHITE_LABEL: regular air 3 to 7 days or classical USPS services. (_W)
GREEN_LABEL: 3 day express mail. (_G)
BLUE_LABEL: 2 day express mail. (_B)
RED_LABEL: 1 day express mail or international priority. (_R)
BLACK_LABEL: same day or next flight mail. (_K)
GOLD_LABEL: emergency spare part service (_AU)

These services can be added to the FOB cost since the U-Commerce supplier system has multiple warehouses in strategic locations worldwide.

Rule 20: Gold Label services tie-breakers to find the best route:
Next flight services available
Inventory In hand.
Fastest delivery from supplier-warehouse-destination.
The highest U-Commerce Value.
Supplier is in a Service Economy Country.
Supplier is in an Industrial Market Economy.
Supplier is in the same continent.
Supplier is in the same region
Lowest Cost
Same time zone
End user choice, if two or more still exist.

Rule 21: End user client software protocols to improve throughput and to eliminate unnecessary requests that burden a supplier system database.
Locally to the client software the program has in the CPU a CD Rom media device or a download compressed file structure that possesses data and product search information.
The client software has local files with all of the static information of a product.
The server has the latest prices and inventory in hand, and inventory in reorder information.
When the client login the system ask from the supplier system the highest value U-Commerce retailers, wholesalers, suppliers, and warehouse for each supplier.
When the supplier system responds with available inventory and prices, the client on its own determines FOB, C&F and CDF prices.
The FOB, C&F, and CDF prices are further adjusted if the end user wants them to be insured, or request express mail. The system can calculate Express Mail to a FOB warehouse. For C&F or CDF alternatively the system can have the products shipped to the destination country. These prices are just approximations. The system allows the end user to select from competing shippers such as United States Postal Services, Federal Express, UPS and TNT to name a few.
The system can consolidate several shipments inbound ground or ocean via a free trade zone.
The system can consolidate all of the packages that are not urgent to the most price effective U-Commerce Continental-Regional warehouse and ship C&F to the destination port.
When the end user decides to check out and convert the quote to an order the system verify against the retailer, wholesaler, supplier, and/or U-Commerce warehouse for inventory in hand. The system places a priority time stamp to each quote, and allocates available inventory free until the critical inventory level is reached.
When the user request Gold Label CDIF mode the system request to the system all of those Genesis Engine components that carry a given product. The system instructs each retailer, wholesaler, supplier, and warehouse to reserve the items and not to sell their inventory until the system is able to satisfy the need. Users will be prioritized based on the priority assigned to the order shipping method:
a) Inventory In hand availability.
b) Use the route that has the lowest delay.
c) Use the lowest Y_CDIF cost.
d) Use the route that has the highest U-Commerce Value.
e) Use the route that has the lowest time zones differential.

Rule 22: X_FOB calculations: the software uses stored media devices or downloaded compressed file structure with critical data that allows the client to perform optimized searches. The client will take advantage of look up tables stored in memory or open file with a product list to determine what product are valid. Then the system opens the data specification files all the static data that is displayed in the graphical user interface (GUI). The system subdivides a search and then disseminates the request. The client analyzes the request using the fuzzy logic and then breaks it into several partial commands by suppliers. Each partial request is sent to the supplier system and replied to the client that is responsible to merge and integrating each of the partial commands to a single version of the truth. The system will prioritize each available product based on U-Commerce shipment value and overall net price. Once the client gets the updated price it adds the domestic shipment when Inventory is not available. X_FOB penalizes the FOB price based on the number of days the product is away from the C&F port. X_FOB stands for delay free FOB price.

Rule 23: Y_CDIF calculations: the software uses stored media devices or downloaded compressed file structure with critical data that allows the client to perform optimized searches. The client will take advantage of look up tables stored in memory or open file with a product list to determine what product are valid. Then the system opens the data specification files all the static data that is displayed in the graphical user interface (GUI). The system subdivides a search and then disseminates the request. The client analyzes the request using the fuzzy logic and then breaks it into several partial commands by suppliers. Each partial request is sent to the supplier system and replied to the client that is responsible to merge and integrating each of the partial commands to a single version of the truth. Once the system has assigned a X_FOB price for a given product. The end user's selects a C&F international shipping method via Air White, Green, Blue, Red and/or Black Label express mail services. The International shipment charge if any are added to the FOB price per unit. The system then calculates the Air shipment method expressed in hours to further adjust the FOB price+ International Shipment+Value Added Duties. In other words the system will penalize or make more expensive the Y_CDIF price of a product the more time it requires to reach the front door of the customer. Y_CDIF stands for delay free CDIF door-to-door service.

UCommerce 2010: Single version of the truth, is a management information system common terms that is used in billing. And involves the gathering all the related information related to a particular transaction. And then requires the steps of data mediation to convert and prime the information into a common data structure. And then sends the primed information to a centralized mainframe or billing component that match/merges all the transactional pieces of information and then associates by transaction. And finally correlates all the transactional pieces into a final billing entity with all the dynamic and static costs.

Rule 24: Each Intelligent component determines for each supplier and wholesaler the best continental-regional warehouse for sending merchandise FOB or C&F. The supplier also assigns the best FOB price via X_FOB rule 22 and then determines the C&F destination ports to sends goods and services. When making calculation the client uses the geographical U-Commerce Warehouse by default. Alternatively the end user can different path from the critical path, and the system will make the appropriate calculation. The client software will immediately monitor and track the critical path and end user defined path and warn any time delays and cost differences.

Rule 25: The supplier system determines the best path to send CDF merchandise via Y_CDIF rule 23, and the end user only has to specify where they want the goods and services delivered. Every time the system detects a significant change in inventory for a given product, it will update all of the clients of the newly derived critical paths for delivering good and services.

Rule 26: The client software must require from the end user a supplier before making a search. Once the end user selects the valid supplier for a given product, the system can start the partial search commands that are sent to the Genesis Engine architecture. When the supplier system responds from the active memory information of each intelligent component the client merges all of the partial command to a single version of the truth. The Intelligent component do not make a SQL command requests instead the Intelligent Component has control of the inventory, and is responsible managing and coordinating the flow of information send to them to be processed by the different clients.

Rule 27: The end user can also request the shipping only through the U-Commerce method supplier system. The end user delivers at the nearest authorized agents the goods with the original cost so that the system can generate the quote for the duties and expenses at the final destination. Each order confirmation uses an authorized agent that accepts the goods to be ship in behalf of the client and then sends them to the final destination via C&F, CDF, or CDIF as the client selected.

Rule 28: When making a search for C&F, CIF, CDF and CDIF the system calculates X_FOB and Y_CDIF until the warehouse has enough Inventory In Hand to satisfy the order. Thus if an end users requested quote demands for a quantity of items that exceeds available Inventory In Hand the system will do the following:

Request the missing Inventory via Ground for X_FOB, and Air for Y_CDIF. All of the units will receive the added delay.

Ideally the system will request all the missing merchandise from the manufacturer as one consolidated order, since the merchandise will not leave until all the units are available. Unless the customer accepts partial shipments to satisfy a large order that uses several suppliers.

All FOB quotes from U-Commerce Warehouse offer X_FOB Inventory In Hand with the corresponding delay All C&F quotes, CDF, and CDIF quotes will offer both X_FOB and Y_CDIF to the final destination port with the corresponding delay.

Rule 29: X_FOB real time Inventory control allows Intelligent Component monitoring a specific geographic area to store several bitmaps of information such as available, In Hand, Highest Quantity, Best Price and Most Reliable Rule 30: works the same as Rule 29 except it is for Y_CDIF. The bitmaps consist of 0 and 1 to notify, which supplier carries a specific product in the Available field. The In Hand consist to a number of 2 to the n−1 power in hexadecimal form 0 to 32758 products in hand. Highest bitmap is a hexadecimal value that calculates how much inventory a specific supplier has where F means unlimited. Best Price and Most Reliable bitmaps sort with ranking, which supplier offers the best service to the end user. These numbers are update after each change in inventory to reflect the latest optimal prices and paths. These bitmaps or summary report database structures have all the preprocessed math done with best case inventory and logistical flow for a given item using X_FOB and Y_CDIF guidelines, eliminating the need for clients components to have to do the calculations or bog down the system with unnecessary queries.

Rule 31: The system also offers CSF method, which is identical to CDF with the only exception is that it use sub rates normally 50% below regular duties. Optionally the end user can select CWF that is identical to CDF with the only exception that duties are calculated based weight only. CSF and CWF with insurance become CSIF and CWIF respectively.

Rule 32: X_FOB and Y_CDIF end user adjustments. X_FOB usually made to offset the cost associated with Ocean Cargo delays from origin to destination. In some instances the end user will be able to prioritize the X_FOB to be measured in days and not in weeks by allowing the system to calculate X_FOB with Air Cargo. Y_CDIF usually made to offset cost related with Air Cargo delays from origin to destination. In some instances the end user will be able to prioritize the Y_CDIF to be measured in hours and not in days by allowing the system to calculate Y_CDIF with Gold Label.

Rule 33: Makes a shipment between U-Commerce warehouses with a time delay for execution. The system will consolidate multiple orders of several customers to lower the cost. The system will reflect the shipping cost at the quote module level anticipating minimal shipping cost taking into account the critical shipment weight to derived substantial discount is reached. Once a consolidated order is sent from Warehouse A to Warehouse B, the order is broken down piece meal, distributed, and then delivered to the final destination to each individual customer.

EXAMPLES

Ser. No. 10/852,394

Example 1

User wants to purchase industrial spare parts from available U-Commerce warehouses using X_FOB rules to determine the best real cost.

Referring to FIG. 57, an end user requires an industrial part FOB for maintenance of existing machinery. To perform said task using the supplier system the end user first has the following:

1) Select the category of products; 2) Select the U-Commerce Warehouse. For simplicity the end user select WORLD. Once a valid spare part is place in the input field the local UCommerce software verify that the product is valid and is available. Furthermore, interchange spare parts that have the same characteristics will be made.

Warehouses that have Inventory In Hand or via Domestic Rush FOB availability participating. When the end user selects Domestic Rush FOB a shipping method must be selected. The cost of shipment and the delay time required to send the merchandise from the supplier outlet to the U-Commerce is added to any calculation.

E.g. The end user selects an Industrial Ball Bearing, product XYZ. The end user wants to know all available Inventory In Hand available or any valid merchandise that matches the product interchange table. UCommerce validates that the product exist, and also identifies all of the interchange table equivalents. UCommerce software identifies within the U-Commerce Supercomputer hierarchy, which warehouses carryout the spare part or equivalents.

UCommerce software reads the compressed file structure with critical data that allows for optimized searches. UCommerce software breaks the file structure and the field of Inventory In Hand. The system reads 0 or 1 as part of string where each string element corresponds to physical warehouses. After scanning the field it determines three ones that correspond to three U-Commerce warehouses located at New Delhi, India, Nairobi, Kenya, and Miami, Fla. USA. The system identifies the location of the end user, which is Sao Paolo, Brazil and will be used from X_FOB calculations. X_FOB will adjust raw prices with time delays and U-Commerce Values using Ground or Ocean Express.

Using Rules 1-22, the supplier system makes the subqueries request, and calculates the real cost and X_FOB delays and adjustments using Ocean and Ground shipping constraints to make calculations absolute in terms of the clients perspective that would ultimately require the merchandise to be delivered in Sao Paolo Brazil. Then UCommerce software match and merge the results of each subquery as a single version of the truth and highlight to the end users the most satisfying alternative via New Delhi, India route since it is the most cost efficient in absolute terms.

Once the client gets the updated price it adds the Domestic Rush FOB when Inventory In Hand is not available. X_FOB penalizes the FOB price based on the number of days the product is away from the C&F port. X_FOB stands for delay free FOB price.

Example 2

User wants the best door-to-door CDIF service to purchase an industrial spare part from available U-Commerce using X_FOB and Y_CDIF rule to determine the fastest route and best cost.

Referring to FIG. 58, an end user requires an industrial part CDIF for maintenance of existing machinery. To perform said task using the supplier system the end user first has the following:

1) Select the category of products; 2) Select the U-Commerce Warehouse. For simplicity the end user select WORLD; 3) Once a valid spare part is place in the input field the local UCommerce software verify that the product is valid and is available. Furthermore, interchange spare parts that have the same characteristics will be made; 4) Select the destination port; 5) Select the shipping method Warehouses that have Inventory In Hand or that are available via Domestic Rush FOB. When the end user selects Domestic Rush FOB a shipping method must be selected. The cost of shipment and the delay time required to send the merchandise from the supplier outlet to the U-Commerce is added to any calculation. The system also calculates the appropriate duties fees and insurance for the transaction. The end user must select a shipping method from FOB origin warehouse to destination. In this case the end user is willing to pay for Black Label or Next Flight service door to door to Sao Paolo, Brazil.

In this example the end user selects an aircraft spare part, product ABC. The end user wants to know all available Inventory In Hand available or any valid merchandise that matches the product interchange table. UCommerce software validates that the product exist, and also identifies all of the interchange table equivalents. UCommerce software identifies within the U-Commerce Supercomputer hierarchy, which warehouses carryout the spare part or equivalents.

For the purposes of this example UCommerce software reads the compressed file structure with critical data that allows for optimized searches. UCommerce software breaks the file structure and the field of U-Commerce with Inventory In Hand. The system reads 0 or 1 as part of string where each string element corresponds to physical warehouses. After scanning the field it determines three ones that correspond to three U-Commerce warehouses located at Seoul, Korea, London, UK, and Miami, Fla. USA. The system identifies the location of the end user, which is Sao Paolo, Brazil and will be used from Y_CDIF calculations. Y_CDIF will adjust raw prices with time delays and U-Commerce Values using Express Ail Mail.

Using Rule 1-28, the supplier system makes the sub-queries request, and calculates the real cost and X_FOB and Y_CDIF delays and adjustments using Air, Ground and Ocean shipping constraints to make calculations absolute in terms of the clients perspective that would ultimately require the merchandise to be delivered in Sao Paolo Brazil. Then UCommerce software match and merge the results of each sub-query as a single version of the truth. The software takes into account shipping and time delays constraints to identify the best absolute price using time, customs and duties fees, and Air Express Shipping as part of the final cost.

When the supplier system Supercomputer searches for available merchandise within its scope of control it will use the default route, unless the end user specifically request to consolidate the shipment at a Tandem port. Rule 24, when the end user requests consolidated shipment the system calculates the best satisfying alternative from Origin to Tandem to Destination ports.

Then UCommerce software match and merge the results of each sub-query as a single version of the truth and highlight to the end users the most satisfying alternative via Seoul, Korea route since it is the most cost efficient in absolute terms. In this case the fastest method is Miami-Sao Paolo with an intrinsic delay of 14 hrs. The system selects to ship the goods and service from Korea since it has the lowest price of $16,783 after paying duties and insurance and a delay of 36 hrs.

Example 3

User is in a dire emergency requiring an industrial spare part, a request Gold Label door-to-door service to determine the safest and fastest.

Referring to FIG. 59, the U-Commerce supplier systems determines the best Y_CDIF calculation using Gold Label Emergency Spare Part service from Seoul Korea, Miami, USA and London, UK to the destination point of Sao Paolo Brazil within 20 hrs. In this case the fastest method is Miami-Sao Paolo with an intrinsic delay of 14 hrs. The system selects to ship the goods and service from Miami, Fla. USA since it allows the Emergency Spare Part to be delivered to the end user door to door with the 20 hrs limitation. Shipments from Korea and UK are made non-applicable since their delay value exceeds 20 hrs.

An end user requires an industrial part emergency CDIF for maintenance of existing machinery. To perform the task using the supplier system the end user first has the following: 1) Select the category of products; 2) End Users selects Gold Label, which finds the fastest and safest route only; 3) Once a valid spare part is place in the input field the local UCommerce software verify that the product is valid and is available. Furthermore, interchange spare parts that have the same characteristics will be made; 4) Select the destination port and 5) Time constraint.

The supplier system follows the guidelines of Rule 20. The end user wants the product ASAP or within the same day 0-23 hrs.

Warehouses that have Inventory In Hand or that are available via Domestic Rush FOB. The cost of shipment and the delay time required to send the merchandise from the supplier outlet to the U-Commerce is added to any calculation. The system also calculates the appropriate duties fees and insurance for the transaction. The end user must select a shipping method from FOB origin warehouse to destination. In this case the end user is willing to pay for Gold Label or emergency spare part service door to door to Sao Paolo, Brazil.

E.g. The end user selects an oil refinery spare part, product CRITICAL_PART. The end user wants to know the product or equivalent that will meet the emergency. UCommerce software validates that the product exist, and also identifies all of the interchange table equivalents. UCommerce software identifies within the U-Commerce Supercomputer hierarchy, which warehouses carryout the spare part or equivalents.

After scanning for available warehouse that carry product CRITICAL_PART it determines three ones that correspond to three U-Commerce warehouses located at Seoul, Korea, London, UK, and Miami, Fla. USA. The system identifies the location of the end user, which is Sao Paolo, Brazil and will be used from Y_CDIF calculations. Y_CDIF will adjust raw prices with time delays and U-Commerce Values using Express Ail Mail.

Applying Rules 1-28 and Intelligent Inventory Delivery Rules, the supplier system makes the sub-queries request, and calculates the real cost and X_FOB and Y_CDIF delays and adjustments using Air, Ground and Ocean shipping constraints to make calculations absolute in terms of the clients perspective that would ultimately require the merchandise to be delivered in Sao Paolo Brazil. Then UCommerce software matches/merges the results of each sub-query as a single version of the truth. The software takes into account shipping and time delays constraints to identify the best absolute price using time, customs and duties fees, and Air Express Shipping as part of the final cost.

When performing calculations the supplier system searches for available merchandise within its scope of control it will use the default route path. An alternate path is used for calculations when the end user specifically requests to consolidate the shipment at a Tandem port. Rule 24, when the end user requests consolidated shipment the system calculates the best satisfying alternative from Origin to Tandem to Destination ports.

UCommerce matches/merges the results of each sub-query as a single version of the truth and highlight to the end users the most satisfying alternative via Miami, Fla. USA route since it is the most cost efficient in absolute terms with 23 hours parameter.

In this case the lowest price is Seoul, Korea to Sao Paolo with a cost of $16,783. The system selects to ship the goods and services from the USA since it is the safest route within 14 hrs.

Intelligent Inventory Delivery Rules

Inventory changes occur as purchases orders, sales order, and/or changes of available inventory. Nodes of the system do not have to perform redundant inquiries with regards of price, quantity, and availability. The system has three paths form origination to destination:

Via U-Commerce, the merchandise is shipped from retailer, wholesaler, or supplier to an U-Commerce Leg A. Thus each U-Commerce node as inventory changes calculates for the cost of shipping a specific product from origin to Leg A. These values alone are updated to all pertinent subordinate nodes and to any higher hierarchal node. Once the merchandise arrives to the U-Commerce warehouse, the system adds the average cost, time of arrival to its final destination on the shipping label.

Via U-Commerce Inbound, the merchandise is shipped from retailer, wholesaler, or supplier to an U-Commerce Leg A and then shipped Inbound to Leg T. Thus the system calculates the average cost, time of arrival from Leg A to Leg T. Then the system adds the average cost, time of arrival to its final destination based on the shipping label.

Direct Shipment the merchandise is shipped directly from Leg A to final destination without intermediary Leg T. Then the system adds the average cost, time of arrival to its final destination based on the shipping label.

A shipping by Label from U-Commerce to each destination country exist, that contains the best, worst and average time of delivery, cost, and end users customer's satisfaction rating. The reason most shipment go to an U-Commerce Warehouse is that an order must require a consolidation of multiple purchase orders from different places.

For example U-Commerce has 1024 participating retailers. The system would have several string fields of 1024 where is a binary number, where 0 is false and 1 is true.

Field 0 Retail Price system assigned by the supplier node
Field 1 Availability system assigned by the U-Commerce node
Field 2 Product Available
Field 3 Inventory In Stock
Field 4 Quantity is a number 0 to 9 and a letter A-Z #2 to the n−1 power. Where A=10 and Z=35. The system doesn't convert the quantity request in a number for example 1024=2 to 10 power, so it would be B. 0=0; 1=1; 2=2; 3=4; 4=8; 5=16; 6=32; 7=64; 8=128; 9 =256; A=512, B=1024; C=2048; D=4096; E=8192; F=16384 and Z=343599738368;
Field 5 Price to U-Commerce X hexadecimal where
F is the best price 1
E is the second best price 2
D is the next best three prices 3-5
C is the next five prices 5-10
B is the next five prices 11-15
A is the next ten prices 16-25
2 to 9 are ranges based on the number of available retailers.
1 is the worst range price.
Field 6 Price Percentage: is an ASCII value from 0 to 250, where each point is integer round up of the actual price/retail price. ASCII value 125 is 50% of retail price.
Field 7 Availability Percentage ASCII value 0 to 250.
Field 8 Customer satisfaction rating that ranges from (1 to 10).
Field 9 Quality system assigned summit tier Total Quality Manager.
Field 10 Minimum Shipping cost assigned by the U-Commerce CFO.
Field 11 Maximum Shipping cost assigned by the Warehouse manager of each U-Commerce Warehouse.

These tables exist for GRAY, WHITE, GREEN, BLUE, RED, BLACK, and GOLD label service, while the Intelligent Inventory Delivery algorithm has more pre-calculated fields.

UCommerce 2010: UCommerce is the Simulation Network, and UCommerce software is the tool used by the end user to buy products. UCommerce purchases the merchandise, and moves its inventory through the supply line based on predicted demand to optimally lower P/U.

Detailed Description of the Search Engine Technology

Ser. No. 11/584,941

Search Engine Supercomputers: Several Search Engines exist in the lucrative market of delivering valorized content via the Internet, such as Ask, Altavista, Google, MSN and Yahoo, to name a few, that are based on large scale Supercomputers of thousands of CPU (U) that are subdivided into groups (sets) and clusters (subsets) of 64 specialized nodes or elements that a lightning speed identifies the best satisfying response for a given parameters of regular expressions. Note: clusters of 64 nodes distribution tend to be the most cost/efficiency arrangement based on the magnitude of the superset (UI). These search engines perform millions of daily searches and lion share of the responses occur in less than 0.1 seconds.

XCommerce: Is an Inventory Control system similar to UCommerce, where the distribution of goods and services is expanded to include electronic links and their corresponding html content. Since the browser entities are a very lucrative endeavor and enjoy long term stream of revenues due in part to the teachings of mass media Target Advertisement from the Berkeley's University professor Dr. Goldhaber. Note: this technology will use Optimal Value Advertisement that takes into account economies of scale, limited advertisement budgets and mathematical algorithms to maximize customers' satisfaction.

Browsers Gather Information: The (UI) or the Internet Universe Superset contains all of the information that is obtained by web crawlers that are programmed to scan predefined subdivision of the chaos and anarchy environment, and in return then as geospatial data with balance, harmony and proportion, so that a cluster of 64 CPU can divide and conquer its content. Each node has 1/n links or content of the Internet. These nodes parse the information with a plurality of regular expressions designed to identify common denominator patterns of alphanumeric characters that are hereinafter referred as KEYWORDS. Each unique IP Address is considered a link that is comprised by a plurality of HTML web pages with content, hereinafter referred as PAGES. The cluster, using a dictionary of valid Keywords and databases of LINK values, helps populate the multi independent variables associated with solving the Eigenvector most satisfying solution based on the known content (UI).

Browsers Standardize Information: The browsers gather the information from the environment as begin rationalizing and standardizing the raw mountains of meaningless data into the essence of the matter that mathematical explains with quantifiable values what is good, bad or redundant. As each HTML is parsed, the browser detects Keywords and compares the historical LINK information (X, Y, Z,) preserved in a Data Warehouse. Then the system uses eigenvectors based on algorithms to normalize, quantify and qualify as statistical distribution that permits which discrete group of PAGES (I, J, K,) or elements of the Superset (UI) is the most satisfying response to the end user inquiry.

Browsers Organized Information: Now, that the information has been normalized and standardized, the cluster can correlate the data to eliminate bad or incomplete information and through the process of simplification remove the lion share of data which is redundant, leaving only exact data that is highly useful and unique. As each link is extracted and valorized for content value of its subordinate PAGES, the system places signature values such as (I) KEYWORD, (J) Frequency, (K) LINGUISTIC WORD PATTERNS, (X)

LINK Value, (Y) Reliability and (Z) Popularity, with a mini set or micro universe of the browsers (UB) limitations to a discrete number of responses n, where the cluster cherry picks the discrete sorted by valuing the resultant of the maximized Eigenvector (UB) with (I, J, K, X, Y, Z,) characteristics that respond to a simple regular expression inquiry. LINGUISTIC WORD PATTERN valorization method is explained in the new art concerning XCommerce.

Browsers Transform Information: As the content of a HTML is converted into Keywords and WORD PATTERNS values, all of a sudden, the raw meaningless data can be expressed as the primed correlated single version of the truth vector based data with (I, J, K, X, Y, Z,) independent variables, to name a few. Where (I, J, K,) are the independent variables that analyze the KEYWORD content as it refers to a group of logically organized words, used to communicate a message that has been translated into a lingua franca mathematical language that is not confounded. Furthermore, possessing (X, Y, Z,) that independent variables that are used to normalize links within the scope of particular sets, that belong to the superset UI that is relational and dimensioned based on quality, popularity, product and satisfaction patterns of behavior.

Browsers Analyze Information: (Data Mart) means that they reduce complexity to better understand what the end user is searching and augment Keywords, LINGUISTIC WORD PATTERNS and LINKS values.

Browsers Evaluate Information: Business Intelligence allows the human intelligence to better understand the environment as it relates to each customer.

Browsers Identify Customers: (From Universal to Personal) Understanding personalized means of advertisement have a greater significant impact on persuading an individual to satisfy a craving need Browsers Target Advertisements: (Paying the Bills) Corporate advertiser must be able to use the Internet as a new method to reach the public that is better than traditional mass media technology.

Browsers Corporate Sponsors Value: (cost justifying with results) a personalized relationship between the corporate sponsors and customers is generated. This bond of trust and confidence facilitates sales.

UCommerce Business Rules 2006

Ser. No. 11/584,941

Rule 1: UCommerce versions I and II always try to minimize delays, duties and costs to service the customer with the best product and the door to door service. As a business, UCommerce also applies discounts to individual, small, medium and large scale corporations to promote and reward volume purchasing. Discount formulas are therefore beyond the scope of this document, since they are considered to be trade secrets nevertheless for completeness we acknowledge that they do exist.

Rule 2: For an emergency mission critical spare part GOLD, label is king by using reserved Inventory In Hand, hands on management supervision and the highest assignable priority.

Rule 3: UCommerce version I is an optimal condition where clients purchase merchandise via the direct option or pick up directly FOB merchandise from an UCommerce warehouse, and they have selected for immediate purchase, and for the rest UCommerce version II, starting from Rule 4, may identify more satisfying solutions.

Rule 4: All of the orders made by UCommerce become a Superset.

Rule 5: All of the orders made by a specific warehouse as a set.

Rule 6: Each route of orders made to a warehouse as a subset.

Rule 7: Each order belonging to a route as an element.

Rule 8: Each element of the superset can be an independent variable X_FOB or Y_CDIF.

Rule 9: Each X_FOB element can be an independent variable Ocean, Land and Cargo that possesses minimal surcharges and dynamical cost based on weight and purchase value.

Rule 10: The supplier system calculates profit per unit based on the least probable discount level for a day, week, month or year, depending on the $3^{rd}$ party sales structure.

Rule 11: The supplier system always derives the same profit for the same product when it sells one unit or the entire inventory of a given $3^{rd}$ party.

Rule 12: When a $3^{rd}$ party threshold for a greater discount is realized for a predefined interval of time, the discount is credit to the end users in a prorated manner.

Rule 13: Each Y_CDIF element can be an independent variable GREEN, BLUE, RED, BLACK and GOLD labels with dynamical cost based on weight and purchase value.

Rule 14: A plurality of orders originated from distinctly situated $3^{rd}$ parties warehouses being transported to a common denominator UCommerce warehouse destination are associated as a Macro Order that consists of a group of elements.

Rule 15: UCommerce acts as a single end user purchaser in behalf of all of its customers.

Rule 16: UCommerce immediately replenishes Inventory In Hand merchandise sold in GOLD or BLACK label using Y_CDIF means.

Rule 17: UCommerce purchases directly to the $3^{rd}$ parties and negotiates the best discounts based on economies of sales, pre production purchases and pre arrival to a FTZ sellout.

Rule 18: The end user can assign to the system Y_CDIF purchasing parameters that are used during the decision process of creating Macro Orders.

Rule 19: The system programming primarily purchases merchandise via X_FOB for the supplier system.

Rule 20: Leg A is shipping merchandise from $3^{rd}$ party retailer, supplier and wholesaler to an UCommerce Warehouse.

Rule 21: Leg B is shipping merchandise door to door to the end user from the UCommerce supplier system.

Rule 22: Leg T is the intercontinental transport of merchandise from one UCommerce warehouse to another one.

Rule 23: Leg U is the shipment to the final destination port where merchandise must be declared.

Rule 24: Each transportation method has a weight and volume restriction. The system closes a container once 85%+ is reached.

Rule 25: The supplier system distributes merchandise based on priority GOLD, BLACK, RED, BLUE, GREEN, WHITE (Cargo or Land) and GREY (Ocean).

Rule 26: Y_CDIF has priority over X_FOB of the same label.

Rule 27: Each dimension of a Leg X is considered a partial Vector. For Leg A, partial vectors are named after the originated $3^{rd}$ party, city and country is located. Example: KOYO, Tokyo, Japan.

Rule 28: For Legs (T, U, V) partial vectors are named after the UCommerce warehouse city abbreviation. Example: UCommerce TYO=Tokyo.

Rule 29: The system purchases Y_CDIF on demand as per client's instructions, and then calculates the optimal route. For direct orders, rule 3 applies.

Rule 30: The system purchases Y_CDIF twice a day or as discretionary events are identified.

Rule 31: The system purchases X_FOB as discretionary events are identified.

Rule 32: The system analyzes, compares and coordinates pending X_FOB and Y_CDIF quotes in queue, based on containers weight and volume restrictions, delays, clogs and purchasing patterns, associated merchandise monetary value and transportation means that can help instantiate a discretionary interval.

Rule 33: Leg A, Leg T or Leg U Macro Order can have both X_FOB and Y_CDIF elements since the distribution merchandise based on priority.

Rule 34: A Macro Order consists of match/merging a plurality of common denominator routes that have the same Leg A, Leg T, Leg U or Leg B, as to reduce the cost of transportation and simplify, at the point, the complexity of moving massive amounts of inventory.

Rule 35: A Macro Order must also satisfy the time interval criteria of each order and can express it in days, such 1, 2, 3, 4, 5, 7, 10, 15, 20, 30 and 45 business days. Business days are based on US calendars.

Rule 36: The system identifies common inventory suppliers in a geospatial coverage area belonging to an UCommerce warehouse, and takes advantage of the condition of the environment, such as buffer space of transportation containers.

Rule 37: The system has an internal cost for opening a new container that has to be filled with merchandise, and will prefer to fill an existing container to reach the 85% capacity that automatically closes the container and immediately triggers shipping.

Rule 38: The UCommerce lower tier match/merges each Macro Order that possesses the traffic to point X to point Y belonging to a regional scope or subset level of the domain.

Rule 39: The UCommerce middleware match/merges a plurality of regional scope Macro Orders to create a Super Order that has a continental scope or set level of the domain.

Rule 40: The UCommerce summit tier matches/merges a plurality of continental scope Super Orders to create a Global Order that has a global scope or superset level of the domain.

Rule 41: Each Macro, Super and Global order has a plurality of dimensions, such as time intervals to open and close particular purchasing events, queue and capacity parameters, discretionary events, labels transportation flow, X_FOB, Y_CDIF, restocking, and BLACK and GOLD Label.

Rule 42: The UCommerce summit tier, with global scope, will be converted into a MPS that manages and controls the worldwide traffic through a plurality of Global Orders.

Rule 43: The UCommerce middleware, with continental scope, will be converted into a SIS that manages and controls the continental traffic through a plurality of Super Orders.

Rule 44: The UCommerce lower tier, with regional scope, will be converted into a TWS that manages and controls the continental traffic through a plurality of Macro Orders.

Rule 45: The 'CORE' node of each MPS, SIS and TWS is responsible for generating the Global, Super and Macro Orders.

Rule 46: The 'Parser' of each MPS, SIS and TWS is responsible for updating, gathering, analyzing and distilling significant portions of the environment.

Rule 47: The 'Storager' is responsible for updating, normalizing, validating and verifying the information into the XLDB 'Data Mart', so the human resources of the organization can use it for business intelligence.

Rule 48: Intelligent Components, controlling the activities and inventory of a $3^{rd}$ party, can create a localized micro order that can control special conditions, promotions, transportation means and containers with pre sold merchandise that belong to them until sold.

Rule 49: The Partial Leg A is responsible for creating, ordering, synchronizing and match/merging all of the orders in queue into the UCommerce owned Micro, Macro, Super and Global orders, once they are requested and updated until they reach the different points of the trajectory.

Rule 50: The Partial Leg B is responsible for verifying, controlling, distributing and storing the Micro, Macro, Super and Global orders that have arrived into a UCommerce warehouse into the appropriate end user Order, so that they can dispatch to the final destination.

Rule 51: The system creates purchases based on discretionary events to calculate optimal price bitmap inventory tables, known as Z_PRICE. The system tries to identify cost reduction at a point of the trajectory from origin to destination, and must adhere to known limitations such as transportation flow, warehousing and human resources capabilities that quickly create complexity. As shown, in other inventions complexity is a geometrically growing cost. The UCommerce supplier system lowers discretionary events frequency once the complexity level exceeds 1, which is the level where Informational Entropy exists absent of a tax burden.

Guidelines for Z_PRICE

Ser. No. 11/584,941

Rule 52: Using the Simulation Network architecture, the environment is subdivided into global, regional and sector geospatial areas, based on Area Codes with an eight hierarchical levels HQ7 to HQ0 organization.

Rule 53: The lower tier consists of a TWS with four hierarchical levels, HQ3 to HQ0, that handle all of the Retailer, Supplier, UCommerce and Wholesaler warehouse organization purchasing and traffic synchronization within sector geospatial areas, where each organization, based on their complexity, is assigned to distinct ownerships, such as HQ0 small, HQ1 medium, HQ2 large organizations and HQ3 UCommerce continental regions or sectors.

Rule 54: The middleware consists of a SIS with two hierarchical levels, HQ5 to HQ4, which handles all of the purchasing and traffic synchronization within a continental region geospatial area.

Rule 55: The summit tier consists of a MPS with two hierarchical levels, HQ7 to HQ6, which handles all of the purchasing and traffic synchronization for the worldwide geospatial area.

Rule 56: The system consists of a Simulation Network with artificial intelligence programming that gives a heart beat to each node. And consists of a plurality of managerial hierarchical Intelligent Components that possess programming that enables each node to perform complex tasks, while the summit tier supervisor assigns, coordinates, controls, prioritizes and synchronizes the logistical flow of information with throughput capacity limitations, network latency cost and transactional weighted time intervals to avoid saturation.

Rule 57: The Simulation Network is considered a superset that is subdivided into subsets, sets and elements. The MPS tier manages the superset, the SIS tier manages a set, the TWS tier manages a subset, and specific nodes manage elements such Retailer, Supplier, UCommerce and Wholesaler organizations.

Rule 58: The superset HQ7-HQ6 global Data Mart controls, coordinates, manages, optimizes and synchronizes the flow and profit for the system's inventory via domain data.

Rule 59: Each set HQ5-HQ4 Extreme Large Database (XLDB) Data Mart controls, coordinates, manages, optimizes and synchronizes the flow and profit for the system's inventory via regional data.

Rule 60: Each subset HQ3 Very Large Database (VLDB) Data Mart controls, coordinates, manages, optimizes and synchronizes the flow and profit for the system's inventory via local data.

Rule 61: Each element HQ2-HQ0 controls, coordinates, manages, optimizes and synchronizes the inventory, storage and transportation for each participating $3^{rd}$ party.

Rule 62: For large multinational distribution means, HQ6 and HQ4 will match/merge global and regional/continental scope activities.

Rule 63: The system consolidates all of the orders and pre sold and critical inventory levels to make direct purchases to $3^{rd}$ parties twice a day. Macro_Order_Begin is performed at the beginning of the day and Macro_Order_End appends business day transactions. This rule applies for Micro, Super and Global Orders that must harmonize all of the transactions into universal time and take into account different business hours.

Rule 64: The system gathers, standardizes, organizes and transforms into lingua franca each $3^{rd}$ party point of presence, where all of the transactions are preferably quoted in the same currency. E.g. USD.

Rule 65: Each order is converted into geospatial vectors, where Leg A is the origin, Leg B the destination, and Leg T and U are transport shipment segments. The system creates a plurality of optimal matrices of Z_PRICE inventories based on X_FOB and Y_CDIF independent variables, which mandate that the match/merge process of all of the end users and 3rd party orders is best described in Partial Vectors, which have containers, time delays, transportation and profit methods.

Rule 66: The system profit method is created by each TWS, SIS and MPS. The Mini Cost algorithm profit margin is made flexible to encapsulate the maximal amount of inventory with a common P/U.

Rule 67: The profit method takes into account instantiating new containers of shipping merchandise.

Rule 68: Partial Leg A consists of moving merchandise to an UCommerce warehouse from a plurality of $3^{rd}$ party points of presence.

Rule 69: Partial Leg B consists of delivering merchandise to the client via FOB, C&F and CDIF methods.

Rule 70: Partial Legs (T, U) consist of moving merchandise amongst UCommerce Warehouses.

Rule 71: The summation of all of the Partial Vectors derives a resultant Vector. When everything is said is done, when the merchandise arrives to the final destination each purchase order is unique.

Z_PRICE Rules

Ser. No. 11/584,941

Rule 72: Z_PRICE is a bitmap system that enables optimal large scale sales. 1) Where each warehouse has several transportation queues with goods in route, 2) the system assigns the discount rates of purchasing large quantities of merchandising, and 3) the minimum weight and its associated cost of shipping has to be diluted by maximizing containers' capacities.

Rule 73: Z_PRICE is made not piecemeal item by item, instead, the system purchases the inventory by Retailer, Supplier, UCommerce and Wholesaler, using X_FOB and Y_CDIF means.

Rule 74: Each Order is an independent billing entity that can belong to micro, macro, super or global orders.

Rule 75: Once an end user selects the merchandise, the system match/merges to consolidate the demand for merchandise, and then utilizes optimal cost P/U and most efficient container management.

Rule 76: When using Z_PRICE, the system considers the merchandise to belong to the end user once it arrives to the final UCommerce warehouse.

Rule 77: Z_PRICE optimizes traffic using Inventory in Hand, swap or barter similar merchandise amongst micro, macro, super and global orders.

Rule 78: Common denominator shipments originating from a plurality of $3^{rd}$ parties to the same UCommerce warehouse are linked together to a given delay interval and associated to the appropriate Partial Leg A Vectors.

Rule 79: Common denominator shipments, originating from an UCommerce warehouse to be distributed to a plurality of end users door to door, are linked together to a given delay interval and associated to the appropriate Partial Leg B Vectors and then broken up piece meal according to actual purchase orders.

Rule 80: Z_PRICE method possesses algorithms that are programmed to generate multi dimensional bitmaps that deplete optimally available inventories in $3^{rd}$ parties.

Rule 81: End users, purchasing with the Z_PRICE, receive an estimated P/U Quote that using business intelligence calculates with probability the final prorated cost.

Rule 82: End users receive a better P/U at the cost, sacrificing an optimally available direct purchase.

Rule 83: Each UCommerce warehouse can purchase merchandise for Inventory In Hand to maximize containers, using Business Intelligence purchase patterns that predict future purchase streams of multi time intervals and transportation methods.

Rule 84: Electronic Files, Internet links and the associated HTML content can be standardized and transformed into geospatial information that can be valorized using Z_PRICE, like bitmaps, known as W_RANK.

Rule 85: W_RANK uses eigenvectors to identify the value of each link and its content, and the supplier system must normalize this information into a compatible Partial Vector CDR method that is based on Partial Differential Equations. The lion share of the conversion and normalization is done by the specialized programming of the Simulation Network which gathers, distills and analyzes the spaghetti of the environment by mapping, standardizing, organizing and transforming the information into logical groups and sets to make them compatible.

Rule 86: Each node belonging to the supplier system Simulation Network will receive the additional programming and functionalities to process in parallel UCommerce and XCommerce methods.

Rule 87: A Quote Search and Browser Search query responses are considered transactional objects derived from end users with a discrete amount of items that the system must optimally satisfy.

Web Browser System (Intro to Existing Technologies)

Rule 88: The end users content to the Internet and obtain information from the web host Supercomputer via a proprietary interface that creates requests based on mathematical valorized methods, using regular expression parameters to obtain content.

Rule 89: The web host Supercomputer is ideally subdivided into sub clusters.

Rule 90: A sub cluster is composed of a plurality of nodes that possess programming means to search, find, identify and valorize its subset of the domain.

Rule 91: A master node for each sub cluster match/merges the responses of its subordinates based on synergistic proprietary intellectual property guidelines.

Rule 92: The web host Supercomputer must integrate Browser Engine, Shopping Cart, Advertisement means and Business Intelligence to identify what satisfies the consumer.

Rule 93: The web host Supercomputer brings law and order to the chaos and anarchy of the Internet. The Internet is considered a $4^{th}$ generation Telecommunications network of 2,000,000,000 subscribers and an independent geospatial superset.

Rule 94: Browser Engine (E), Shopping Cart (S), Advertisement means (A), Billing (B) and Business Intelligence (I) are considered informational functions of the superset.

Rule 95: The superset consists of thousands of nodes that are distributed into sets of parallel working clusters, possessing the (A, B, E, I, S,) informational functions that are physically and often geographically separated for redundancy and greater fault tolerance.

Rule 96: Each set is further partitioned into subsets possessing a plurality of sub clusters, ideally and for simplicity to this document of a configuration of 8 by 8 or 64 nodes.

The System: W_RANK Basic Characteristics

Rule 97: Each node is an element belonging to a superset, set, subset and sub cluster or group configuration.

Rule 98: XCommerce uses W_RANK, the environmental bitmap of optimal inventory that measures the Internet content based on quality, quantity, reliability and security values. The Internet is considered a Superset (U) that can consist of a plurality of sets, subsets, groups and basic elements.

Rule 99: Each link is considered to be a container that has a plurality of pages.

Rule 100: Each page consists of a plurality of valid words that are used to measure the value of each page in the Internet.

Rule 101: End users can use a valid word or Keyword to make a broad search of the content of the Internet that has the same characteristics of an Order.

Rule 102: Advanced Keyword Searches consist of associating valid words and operands to form a group set that has the same characteristics of a Micro Order.

Rule 103: Each cluster has a hash table for the most valuable results of a Keyword Search, in addition, the hash table contains the pointer address of location within the compressed files possessing the content of the Internet. The hash table contains information of the domain of each node.

Rule 104: The Master node possesses a hash table for the entire Internet that helps derive the filtering parameters to instantiate a query response.

Rule 105: The system uses Eigenvectors to quantify and qualify with mathematical formulas Advanced Keyword Searches, so the system can derive an optimal discrete query response. The Master node match/merges the response of each node and then correlates into a single list.

Rule 106: The first Keyword is considered primary, the second one secondary, the third one tertiary, and so forth. A primary Keyword has a higher weighted value than a secondary one, and so forth.

Rule 107: The system matches/merges an Advanced Keyword Search or a Regular Expression instantiates the equivalent of a Micro Order container.

Rule 108: The system categories the magnitude of each Keyword from 0 to 15, where 0 is vague expressed in billions of responses, and 15 unique.

Rule 109: The system for each Keyword creates three structures: Simple, Hybrid and Complex Pyramids that gather, distill, analyze, organize and transform the content into geospatial bitmap data.

Rule 110: A Simple Pyramid search consists of a container that possesses the equivalent of exactly 1,000,000 optimal query responses that resemble a resultant Macro Order after match/merging a plurality of Partial Vector Set Searches.

Rule 111: A Hybrid Pyramid search consists of a container that possesses the equivalent of exactly 10,000 optimal query responses that resemble a resultant Super Order after match/merging a plurality of Partial Vector Set Searches.

Rule 112: A Complex Pyramid search consists of a container that possesses the equivalent of exactly 100 optimal query responses that resemble a resultant Global Order after match/merging a plurality of Partial Vector Set Searches.

Rule 113: A plurality of Advanced Keyword Searches uses magnitude 0 to 6 words to derive the most valuable weighted 1,000,000 query responses that make up a Simple Pyramid search with a relative weighted magnitude of 7.

Rule 114: A plurality of Simple Pyramid structure searches and Keywords of magnitude 6 to 9 are used to derive the most valuable weighted 10,000 query responses that make up a Hybrid Pyramid search with a relative weighted magnitude of 11.

Rule 115: A plurality of Hybrid Pyramid structure searches and Keywords of magnitude 10 to 13 are used to derive the most valuable weighted 100 query responses that make up a Complex Pyramid search with a relative weighted magnitude of 15.

Rule 116: The system must first identify the magnitude of each valid word.

Rule 117: A valid word with a magnitude of 2 or more is considered a Keyword. Thus a set of characters and their associated magnitudes help define the process of converting it into geospatial bitmap data.

Rule 118: For each Keyword a Simple Pyramid Search is made.

Rule 119: For each Keyword a Hybrid Pyramid Search is made.

Rule 120: For each Keyword a Complex Pyramid Search is made.

W_RANK Pyramid Search Characteristics

Rule 121: When the end user makes a single word request for a Keyword Search with a word with a magnitude of 0, 1, 2; the system at random replaces the search with a magnitude 5 Keyword.

Rule 122: Magnitude 3 Keyword is considered a Simple Pyramid Join.

Rule 123: Magnitude 4 Keyword is considered a Simple Pyramid Block.

Rule 124: Magnitude 5 Keyword is considered a Simple Pyramid Wall.

Rule 125: Magnitude 6 Keyword is considered a Simple Pyramid Ceiling.

Rule 126: Magnitude 7 Keyword is considered a Hybrid Pyramid Join.

Rule 127: Magnitude 8 Keyword is considered a Hybrid Pyramid Block.

Rule 128: Magnitude 9 Keyword is considered a Hybrid Pyramid Wall.

Rule 129: Magnitude 10 Keyword is considered a Hybrid Pyramid Ceiling.

Rule 130: Magnitude 11 Keyword is considered a Complex Pyramid Join.

Rule 131: Magnitude 12 Keyword is considered a Complex Pyramid Block.

Rule 132: Magnitude 13 Keyword is considered a Complex Pyramid Wall.

Rule 133: Magnitude 14 Keyword is considered a Complex Pyramid Ceiling.

XCommerce 2010: To derive Simple, Hybrid and Complex Pyramid Joins, Blocks, Walls and Ceiling uses quality values to shrinks the size of the environment, and uses vector math to add up the relevant KEYWORDS used in the requests, and the added GEOSPATIAL and LINGUISTIC KEYWORDS obtained from the collections that were used to create exact magnitude objects.

Rule 134: The process of converting a simple Keyword into a Pyramid Search structure is the process of transforming raw confounded and worthless information into primed standardized geospatial bitmap data. W_RANK method takes into account the human capacity to measure and understand quality for discrete quantities, such 10 to 100 responses.

Rule 135: A Keyword that is transformed into geospatial bitmap data will possess a higher magnitude value. W_RANK method takes into account the human nature that considers time as money, whereas it can be amusing to have a query response with millions responses, they don't want to have to distill, analyze and find on their own the most valuable answer.

Lingua Franca Standard

Rule 136: The system reads the entire content of the Superset (U) and determines for each link the valid languages, such as English, French, Germany or Spanish, to name a few. The algorithm then determines the language of each page belonging to a link.

Rule 137: A link can have a plurality of valid languages associated to it.

Rule 138: A Keyword is compared against a language identifier dictionary and also to corporate, technology and mathematical geospatial libraries.

Rule 139: A Keyword can belong to a plurality of languages.

Rule 140: The system uses Keyword Validation filtering that distills the words inside each Page, based on magnitude 0 to 6 Keywords or Simple Pyramid Structure 1) Joins, 2) Blocks, 3) Walls, and 4) Ceilings. The weighted algorithm ranks the content of the document versus a given language standard from 0 to 10000.

Rule 141: Pages that have a value less than the language limit are not considered to belong to that language.

Rule 142: Pages that have a value greater than the language limit and below the language structural limit are confounded. 0 Pages are eliminated from the process.

Rule 143: The system reads the content of a Page to derive basic linguistic and geospatial characteristics.

Rule 144: The system performs a Keyword Value filtering that distills the words inside each Page based on magnitude 7 to 10 Keywords or Hybrid Pyramid Structure 1) Joins, 2) Blocks, 3) Walls, and 4) Ceilings.

Rule 145: The system performs a Keyword Quality filtering that distills the words inside each Page based on magnitude 11 to 14 Keywords or Complex Pyramid Structure 1) Joins, 2) Blocks, 3) Walls, and 4) Ceilings.

Rule 146: The Keyword Value and Keyword Quality filtering algorithms results are converted into environmental bitmap data from the point of view of a subset U, where the common denominator element is the primary Keyword.

Rule 147: The Keyword Validation mechanism identifies if the data belongs to a language and if it is valid or invalid.

Rule 148: The Keyword Value mechanism identifies if the content is bad, fair or good.

Rule 149: The Keyword Quality mechanism identifies if the content is best, fair or good.

EXAMPLES

Ser. No. 11/584,941

Example #1

A Macro Order

A Macro Order permits the supplier system to have the capacity to partially match/merge the contents of several distinct orders belonging to a plurality of end users to take advantage of economies of scale.

Let's suppose that a given product, such as HD TV, is sold in massive scale 20,000 units per day and its supplier is located in Japan. For the purchase of a single HD TV, the P/U X_FOB TYO is $699 and P/U Y_CDIF is $999 ($699 FOB (TYO)+$100 Shipping TYO–MIA via Ocean=$150 customs+$50 UCommerce Shipping and Handling with delivery in 4 weeks.

Buying in bulk 20,000 units, the supplier X_FOB price to UCommerce TYO is $549 (or $699 minus 20% discount)

The product weight is 20 lbs. Thus, the UCommerce by purchasing in behalf of the 20,000 end users with common denominator Leg A TYO and Leg T Miami, can create two Macro Orders that offer optimal P/U to the end users:

1) Macro Order Leg A has a X_FOB Price UCommerce TYO of $549, significantly reducing the cost to the end user by $150.

2) Macro Order Leg T has a Y_CDIF Price UCommerce MIA of:
 a) GRAY LABEL P/U $684 ($549 FOB (TYO)+$100 Ocean+$100 customs+$35 UCommerce S&H) with delivery in 4 weeks.
 b) WHITE LABEL P/U $699 ($549 FOB (TYO)+$115 Cargo+$100 customs+$35 UCommerce S&H) with delivery in 2 weeks.
 c) GREEN LABEL P/U $724 ($549 FOB (TYO)+$130 Cargo+$115 customs+$35 UCommerce S&H) with delivery in 1 week.
 d) BLUE LABEL P/U $734 ($549 FOB (TYO)+$140 Cargo+$115 customs+$35 UCommerce S&H) with delivery in 4 to 5 days.
 e) RED LABEL P/U $749 ($549 FOB (TYO)+$155 Cargo+$115 customs+$35 UCommerce S&H) with delivery in 2 to 3 days.
 f) BLACK LABEL P/U $774 ($549 FOB (TYO)+$180 Cargo+$115 customs+$35 UCommerce S&H) with delivery in 2 days.
 g) GOLD LABEL P/U $789 ($549 FOB (TYO)+$180 Cargo+$115 customs+$50 UCommerce S&H) with delivery in 2 days.

Thus, the end users significantly lower their aggregate cost of FOB or CDIF costs, and with optional shorter time delays and improved services such as GOLD LABEL when required for an emergency spare part.

Example #2

Z_PRICE: Z_PRICE permits an end user the best price door to door. For example, an end user living in Sao Paolo Brazil wants to purchase a single HD TV. If the end user purchases a single item via direct method, the cost would be P/U X_FOB TYO $699, P/U X_FOB MIA $949 and P/U Y_CDIF SAO $1,249. Instead, the end user allows each UCommerce system and method to find the best price based on time delays:

1) Macro Order Leg A has a X_FOB Price UCommerce TYO of $549, significantly reducing the cost to the end user by $150.

2) Macro Order Leg T has a X_FOB Price UCommerce MIA of $699.

3) Macro Order Leg T has a X_FOB Price UCommerce LAX of $689.

4) Macro Order Leg T has a X_FOB Price UCommerce MEX of $704.

5) Macro Order Leg T has a X_FOB Price UCommerce BUE of $784.

6) Macro Order Leg T has a Y_CDIF Price UCommerce SAO of $919.

Z_Price rates the best price door to door as follows:
a) GRAY LABEL P/U $899 ($549 FOB (TYO)+$200 Ocean+$100 customs+$50 UCommerce S&H) with delivery in 6 weeks.
b) WHITE LABEL P/U $924 ($549 FOB (TYO)+$225 Cargo+$100 customs+$35 UCommerce S&H) with delivery in 4 weeks.
c) GREEN LABEL P/U $834 ($699 FOB (MIA)+$100 Cargo+$35 UCommerce S&H) with delivery in 2 weeks.
d) BLUE LABEL P/U $844 ($704 FOB (MEX)+$105 Cargo+$35 UCommerce S&H) with delivery in 1 week.
e) RED LABEL P/U $839 ($689 FOB (LAX)+$125 Cargo+$35 UCommerce S&H) with delivery in 2 to 3 days.
f) BLACK LABEL P/U $899 ($784 FOB (BUE)+$80 Cargo+$35 UCommerce S&H) with delivery in 1 day.
g) GOLD LABEL P/U $914 ($879 FOB (SAO)+$35 UCommerce S&H) with immediate delivery.

Note: c)-g) X_FOB/Y_CDIF pricing has already taken into account $115 for customs' declarations since the merchandise is handled via Free Trade Zones.

Example #3

Classical Divide and Conquer Browser Search: Is a description of how to use the present 3$^{rd}$ party prior art to derive an optimal query response. For example, an end user wants to find out the World Cup Final match between France and Italy, in Germany Jul. 9, 2006:

1) Let's assume the end user did not go directly to a favorite sports site that has previously stored in his browser.

2) The end user requests the KEYWORD {WORLD} that has 2,500,000,000 responses.

3) The end user requests the KEYWORD {WORLD, CUP} that has 35,000,000 responses.

4) The end user requests the KEYWORD {WORLD, CUP, FIFA} that has 16,000,000 responses.

5) Note: 2)-4) the browser will suggest the use www.fifa.com still the end user must find the information within, easy during the tournament, not 6 months after the fact when League Tournaments, Olympic, Women World Cup soccer event dominate the spotlight.

6) The Simple Pyramid Structure validates and filters out {WORLD, CUP, FIFA} 16,000,000 responses minus 90 redundancy or pork equals 1,600,000 responses, still the end user is not satisfied since over a million responses exist or is not impressed using 1) www.favoritesite.com or 5) www.fifa.com, using the KEYWORD regular expression {WORLD, CUP, FIFA}, and English language only.

7) The end user adds the KEYWORD {GERMANY} that has 2,000,000 responses.

8) The end user adds the KEYWORD {ITALY} that has 1,000,000 responses.

9) The end user requests the KEYWORD {CHAMPION} that has 500,000 responses. Fact Italy is the FIFA Germany 2006 World CUP Champion. This logically eliminates the need to use France since they are runners up and any news making reference to the final in future tense.

10) The Hybrid Pyramid Structure validates and filters out {GERMANY, ITALY, CHAMPION} 500,000 responses minus 50 redundancy or pork equals 250,000 responses 11) The end user adds the KEYWORD {RED} that has 250,000 responses.

12) The end user adds the KEYWORD {GOLD} that has 75,000 responses.

13) The end user requests the KEYWORD {PENALTY} that has 25,000 responses. Fact Z. Z. was given a red card and ejected from the game, he was also awarded the Golden Ball award for being the best tournament player, and his team France lost the final in penalty kicks.

14) The Hybrid Pyramid Structure that validates and filters out {RED, GOLDEN, PENALTY} 25,000 responses minus 50 redundancy or pork equals 12,500 responses.

Example #4

Pyramid Structures Browser Search Analysis: The XCommerce supplier system is responsible for creating the Informational Pyramid Structures for FIFA content, which includes the World Cup and League Tournaments.

Simple Pyramid Calculations: using Simple Pyramid collections of Joins, Blocks, Walls and Ceiling to create 1,000,000 cells:

World is a Join with magnitude 0 and is a location.
Cup is a Join with magnitude 0 and is an object.
FIFA is a Block with magnitude 2 and is a company.

Hybrid Pyramid Calculations: using Hybrid Pyramid collections of Joins, Blocks, Walls and Ceiling to create 10,000 cells:

Germany is a Join with magnitude 1 and is a country and geospatial.
Italy is a Join with magnitude 1 and is a country and geospatial.
Champion is a Block with magnitude 2.
Red is a Join with magnitude 0 and is a color.
Gold is a Join with magnitude 1 and is a color.
Penalty is a Join with magnitude 1.
World and Cup regular expression have a magnitude 0 or 1 and thus are not considered Keywords, whereas FIFA with a magnitude 2 is.

Analysis of KEYWORD GROUPS
{WORLD, CUP} have a magnitude of 2 and is considered a KEYWORD. {WORLD, CUP, FIFA, GERMANY} have a magnitude of 3.
{WORLD, CUP, FIFA, GERMANY, ITALY} have a magnitude of 6.

{WORLD, CUP, FIFA, GERMANY, ITALY, CHAMPION} have a magnitude of 7.

{WORLD, CUP, FIFA, GERMANY, ITALY, CHAMPION, RED} have a magnitude of 8.

{WORLD, CUP, FIFA, GERMANY, ITALY, CHAMPION, RED, GOLD} have a magnitude of 10.

{WORLD, CUP, FIFA, GERMANY, ITALY, CHAMPION, RED, GOLD, PENALTY} have a magnitude of 11.

Simple Pyramid Constructs: based on the Simple Pyramid Structure constructs, the system top objects consists of the following:

Uruguay 1930, Uruguay, Argentina, Stabile
Italy 1934, Italy, Czechoslovakia, Meazza, Schiavo
France 1938, Italy, Hungary, Piola, Leonidas
Brazil 1950, Uruguay, Brazil, Schaffino, Ademir
Switzerland 1954, Germany, Hungary, Kocsis
Sweden 1958, Brazil, Sweden, Pele, Fontaine
Chile 1962, Brazil, Czechoslovakia, Garrincha, Vava
England 1966, England, Germany, Robinson, Eusebio
Mexico 1970, Brazil, Italy, Riva, Pele, Muller
Germany 1974, Germany, Netherlands, Muller, Cruyff, Lato
Argentina 1978, Argentina, Netherlands, Kempes, Filiol
Spain 1982, Italy, Germany, Rossi, Rummenigge
Mexico 1986, Italy, Germany, Maradona, Platini, Lineker
Italy 1990, Germany, Argentina, Schilaci, Maradona, Baggio
USA 1994, Brazil, Italy, Romario, Baggio, Salenco, Stoitchkov
France 1998, France, Brazil, Ronaldo, Zidane, Suker
Korea+Japan 2002, Brazil, Germany, Ronaldo, Kahn
Germany 2006, Italy, France, Zidane, Cannavaro, Buffon
RSA 2010, n/a Thus using the player collection, for example Diego Armando Maradona, can be associated as a player that played for Boca Juniors, Argentina, Barcelona, Spain and Napoli, Italy. In particular, Zidane can be associated as a player that played for Bordeaux in France, Juventus in Italy and Real Madrid in Spain. Boca Juniors, Real Madrid and Napoli are members of the Teams collections. Both Maradona and Zidane won the Adidas Golden Ball 1986 and 2006 respectively.

Complex Pyramid Calculations: using Complex Pyramid collections of Joins, Blocks, Walls and Ceiling to create 100 cells: {WORLD, CUP, FIFA, GERMANY, ITALY, CHAMPION, RED, GOLD, PENALTY, ZIDANE, BUFFON, CANNAVARO, SHAKIRA} have a magnitude of 15.

XCommerce 2010: Simple, Hybrid and Complex collections have at there disposal the same English language semantics KEYWORDS, nevertheless the use different quality values to create objects of exact magnitudes.

Example #5

Is a comparative analysis of $3^{rd}$ parties Browser Search Engines versus the W_RANK: The Basic Keyword search {WORLD, CUP, FIFA} versus the Simple Pyramid Structure. The End user begins the Divide and Conquer process of placing enough words until a satisfying response is encountered.

PRIOR ART CALCULATIONS

{WORLD} generates 2.5 billion responses.
{WORLD, CUP} generates 35 million responses.
{WORLD, CUP, FIFA} generates 16 million responses.

Simple Pyramid Structure W_RANK Calculations: The Simple Pyramid Structure for {WORLD, CUP, FIFA} is a process that logically associates other valuable common denominator KEYWORDS to derive to the optimal element.

1) {WORLD, CUP, FIFA} consists of 2.5 billion links that are placed into 1,000,000 Building blocks cells.

2) The System uses Simple Joins, Blocks, Walls and Ceilings English Semantics to further valorize each of the links and to associate them to belong to one cell. Thus the 1,000,000 cells have the 2.5 billion responses.

a) Forbidden, Spam, Viral and Porn sites with cookie traps have a value of 0.000000000001
b) Duplicates have a value of 0.0000000001
c) Links that fail the Simple Join test have a value of 0.00000001
d) Links that fail the Simple Block test have a value of 0.000001
e) Links that fail the Simple Wall test have a value of 0.0001
f) Links that fail the Simple Ceiling test have a value of 0.01
g) Links that pass the Simple Join to Ceiling test have a value of 1
h) Links that pass the KEYWORD {WORLD, CUP, FIFA} 1,000,000
i) Links that pass the KEYWORD {WORLD, CUP, FIFA} 250,000
j) Links that pass the KEYWORD {WORLD, CUP, FIFA} 500,000
k) Links that pass the KEYWORD {WORLD, CUP, FIFA} 50,000
l) Links that pass the KEYWORD {WORLD, CUP, FIFA} 100,000
m) Links that pass the KEYWORD {WORLD, CUP, FIFA} 50,000
n) Links that pass the KEYWORD {WORLD, CUP, FIFA} 10,000

Note: 2) to 9) consists of a preprocessed task done to all of the pages of the Internet having a given language content, in this case English. As per Examples 3 and 4 only FIFA is a KEYWORD. Primary word is WORLD. Secondary word is CUP. Tertiary word is FIFA.

Hybrid Pyramid Structure W_RANK Calculations: the Intermediate Keyword search {WORLD, CUP, FIFA, GERMANY, ITALY, CHAMPION} versus the Hybrid Pyramid Structure. The End user begins the Divide and Conquer process of placing enough words until the Browser Engine responds with a satisfying response.

3) {WORLD, CUP, FIFA, GERMANY} generates 2 million responses.

4) {WORLD, CUP, FIFA, GERMANY, ITALY} generates 1 million responses.

5) {WORLD, CUP, FIFA, GERMANY, ITALY, CHAMPION} generates 500,000 responses.

The Hybrid Pyramid Structure for {WORLD, CUP, FIFA, GERMANY, ITALY, CHAMPION} is a process that logically associates other valuable common denominator KEYWORDS to derive to the optimal element.

6) {WORLD, CUP, FIFA} consists of 2.5 billion links that are placed into 1,000,000 Building blocks cells.

Hybrid Pyramid Structure Constructs

7) The System uses Hybrid Joins, Blocks, Walls and Ceilings English Semantics by paragraph to further valorize each of the links and then associate them to belong to one cell. Thus the 10,000 cells have the 2.5 billion responses.

a) Links having a value of less than 1 belong to 1 cell.
b) Links having a value of less than 10 belong to 3 cells.
c) Links having a value of less than 100 belong to 3 cells.
d) Links having a value of less than 1,000 belong to 3 cells.

e) Links having a value of less than 10,000 belong to 10 cells.

f) Links having a value of less than 50,000 belong to 10 cells.

g) Links having a value of less than 125,000 belong to 30 cells.

h) Links having a value of less than 250,000 belong to 40 cells.

i) Links having a value greater than 500,000 belong to 9900 cells.

j) Links that pass {SIMPLE+GERMANY, ITALY, CHAMPION} x16 k) Links that pass {SIMPLE+GERMANY, ~ITALY, CHAMPION} x8 l) Links that pass {SIMPLE+~GERMANY, ITALY, CHAMPION} x6 m) Links that pass {SIMPLE+GERMANY, ITALY, ~CHAMPION} x6 n) Links that pass {SIMPLE+~GERMANY, ~ITALY, CHAMPION} x4 o) Links that pass {SIMPLE+GERMANY, ~ITALY, ~CHAMPION} x3 p) Links that pass {SIMPLE+~GERMANY, ITALY, ~CHAMPION} x2 q) Links that fail a Hybrid Join test have a multiplier of 0.7070707 r) Links that fail a Hybrid Block test have a multiplier of 0.7070707 s) Links that fail a Hybrid Wall test have a multiplier of 0.7070707 t) Links that fail a Hybrid Ceiling test have a multiplier of 0.7070707

Hybrid Pyramid Valorization Means: The pages that the system measured having a weighted value >=500,000 such as {WORLD, CUP, FIFA} or {WORLD, ~CUP, FIFA} are valid.

{WORLD, CUP, FIFA}={SIMPLE} or {SIMPLE PYRAMID}

As per Examples 3 and 4 only CHAMPION is a KEYWORD. For the second filter, the Primary word is GERMANY. Secondary word is ITALY. Tertiary word is CHAMPION.

Hybrid Pyramid Construct Test: A Hybrid Pyramid Construct test is based on the unique number of words in a given page. The system match/merges common denominator 1 to 256 Hybrid Joins, Blocks, Walls and Ceilings out of the most likely 1024 comparisons.

Complex Pyramid Structure W_RANK Calculations

8) The System uses Complex Joins, Blocks, Walls and Ceilings Data and Geospatial data by content to further valorize each of the links and then associate them to belong to one cell. Thus the 100 cells have the 2.5 billion responses.

a) Links having a value of less than 1,000 belong to 1 cell.

b) Links having a value of less than 10,000 belong to 1 cell.

c) Links having a value of less than 100,000 belong to 1 cell.

d) Links having a value of less than 250,000 belong to 3 cells.

e) Links having a value of less than 500,000 belong to 4 cells.

f) Links having a value greater than 1,000,000 belong to 90 cells.

Complex Pyramid Structure Constructs

9) The pages that the system measured having a weighted value >=3,000,000 such as {WORLD, CUP, FIFA, GERMANY, ITALY, CHAMPION} or {HYBRID} or {HYBRID PYRAMID} combinations are valid.

a) Links that pass {HYBRID+RED, GOLD, PENALTY} x16 b) Links that pass {HYBRID+RED, GOLD, ~PENALTY} x8 c) Links that pass {HYBRID+RED, ~GOLD, PENALTY} x5.6 d) Links that pass {HYBRID+~RED, GOLD, PENALTY} x4.2 e) Links that pass {HYBRID+~RED, ~GOLD, PENALTY} x4 f) Links that pass {HYBRID+~RED, GOLD, ~PENALTY} x2.8 g) Links that pass {HYBRID+~RED, ~GOLD, PENALTY} x2.

h) Links that fail a Complex Join test have a multiplier of 0.7070707 i) Links that fail a Complex Block test have a multiplier of 0.7070707 j) Links that fail a Complex Wall test have a multiplier of 0.7070707 k) Links that fail a Complex Ceiling test have a multiplier of 0.7070707

As per Examples 3 and 4 none are KEYWORDS. For the third filter, the Primary word is RED. Secondary word is GOLD. Tertiary word is PENALTY.

Complex Pyramid Construct Test: A Complex Pyramid Construct test is based on the unique number of words in a given page. The system match/merges common denominator 1 to 256 Complex Joins, Blocks, Walls and Ceilings out of the most likely 1024 comparisons.

The Highest Satisfying KEYWORDS

10) Finally, after the system has match/merged the Complex Pyramid Switch, the system identifies the highest satisfying KEYWORD to further valorize each of the links and then associate them to belong to the TOP ten cell. Thus, the 11 cells have the 2.5 billion responses. The pages that the system measured having a weighted value >=10,000,000 such as {WORLD, CUP, FIFA, GERMANY, ITALY, CHAMPION, RED, GOLD, PENALTY} or {COMPLEX} or {COMPLEX PYRAMID} combinations are valid.

a) Links that pass {ZIDANE} x2 b) Links that pass {BUFFON} x2 c) Links that pass {CANNAVARO} x2 d) Links that pass {SHAKIRA} x2

Example #6

Shows how the W_RANK differs from the $3^{rd}$ party browser engines: When the end user makes a request such as {WORLD, CUP, FIFA}, the query requires the (8×8) cluster to perform an eigenvector search to derive the highest valued replies to the end user. Whereas, W_RANK identifies the HQ1 owner of the FIFA KEYWORD Environmental Bitmap Pyramid Structure for the result, without performing any calculations, since the data within the supplier system is current. Finally, W_RANK uses a weighted algorithm instead a Regular Expression filtering mechanism (or Caesar's Divide and Conquer) strategy as shown in the Examples 3 to 5.

What is claimed is:

1. A computerized system for performing financial resource management, inventory control and online purchasing in real-time, the computers provided in a non-centralized, hierarchically-arranged, multi-tiered computer network and incorporating system software for imparting artificial intelligence to system hardware, the computer network communicatively coupled to a plurality of customer, retailer, supplier and wholesaler online transaction supplier systems, and at least one warehouse for facilitating the logistical distribution of door-to-door goods and services to a customer using a chosen shipping method, each end user interacting with the supplier system server through a computer terminal software application, the computerized system comprising:

- a virtual environment that includes a plurality of computers that are networked together to function as a single unit, including at least one parent computer having software that synchronizes and delegates tasks between the plurality of computers, so that the single unit scans and gathers data from the virtual environment, and processes the data into an implementable representation of the data;
- the single unit additionally includes at least one dedicated computer for performing a specific task, at least one processing computer for performing a specific task, and at least one processing computer providing processing power to the single unit;
- the single unit includes software that outputs the implementable representation of the data in a form of a report to a user computer terminal and waits for a decision from a human user;
- the virtual environment defining an online environment that coordinates and manages an entire available inventory of a supplier distribution system, wherein the entire available inventory is arranged in a managerial hierarchy based on geographical territories;
- the supplier system comprising at least one physical warehouse having a plurality of time interval based inbound shipments originating from at least one of retailers, wholesalers and suppliers, inventory control of "in-hand" and domestic rush freight on board (FOB), and also purchasing forecasted inventory lots based upon demand, economies of scale, historical trends, and storage capacities;
- the single unit comprising of at least two tiers, each tier consisting of at least one cluster having at least one parent computer and one child computer working together, wherein the at least one cluster is assigned to a particular geographical layer;
- a lower-tier computer cluster comprising a plurality of computers that are configured and arranged within said computer network system configured to perform a regional scope online financial resource management;
- a middleware-tier computer cluster comprising a plurality of computers that are hierarchically superior to the lower-tier computer cluster, the middleware-tier computer cluster configured and arranged within the computer network system to perform a continental scope online financial resource management;
- a summit-tier computer cluster comprising a plurality of computers that are hierarchically superior to the middleware-tier computer cluster, the summit-tier computer cluster configured and arranged within said computer network system configured to perform a worldwide scope financial resource management,
- each lower-tier computer cluster is directly assigned to one respective physical warehouse, each lower-tier computer cluster having software that controls and coordinates the regional scope online financial resource management in real-time;
- each middleware-tier computer cluster having software that manages a respective chain of command of the lower-tier computer clusters and controls and coordinates the continental scope online financial resource management in real-time;
- each summit-tier computer cluster having software that manages a respective chain of command of lower-tier and middleware-tier computer clusters and controls and coordinates the worldwide scope online financial resource management in real-time;
- each computer cluster configured and arranged within the computer network system to enable the control of system user requests and replies, and coordinating and synchronizing financial resource management, inventory control, and online purchasing in real-time and supplying the organization with a summary of all system-processed data, and available inventory;
- each computer cluster communicatively enabling system user access to business and personal information in real time and configured to continuously process and filter raw information to better understand what a client values in order to keep the subscriber satisfied;
- each computer cluster forward chaining customer satisfaction information to the summit-tier computer clusters to identify what is satisfying to each end user;
- each computer cluster configured and arranged within the computer network system to manage and control available inventory for their assigned participating retailers, wholesalers and suppliers, based on a geographic scope;
- each computer cluster directly linked to their respectively assigned retailer, wholesaler, and supplier provisioning and inventory system means by forward chaining forecasted end user's demand based on known available inventory;
- a simulation network artificial intelligence comprising software that makes X_FOB decisions, which measures the FOB price per unit of merchandise being made available through ocean and land transportation means to its physical warehouse originating from participating retailers, wholesalers and suppliers where time is measured in X days dimensions and thus the term X_FOB;
- the simulation network artificial intelligence comprising software that makes Y_CDIF decisions, which measures the cargo duties insurance freight (CDIF) P/U of forecasted inventory in hand merchandise through air transportation means and door to door services to the end user and time is measured in Y hours dimensions and thus the term Y_CDIF;
- each cluster artificial intelligence storing 'the price' summary reports and pronounced 'the price' and thus the term Z_PRICE, by using X days dimensions X_FOB calculations and Y hour dimension Y_CDIF calculations based on said inventory control of "in-hand" and domestic rush FOB, and also purchasing forecasted inventories lots based on demand, economies of scale, historical trends and storage capacities;
- each cluster belonging to the three tier simulation network having the following functionalities:
- a) a parser, which is responsible for deleting, inserting, load balancing, replicating and updating data, as well as converting all of the messages into a lingua franca standard and updating all of the $3^{rd}$ party inventory means;
- b) a storager, which distributes tasks to satisfy quotes and orders providing a lowest cost and minimal time delay to the end user and is responsible for interfacing with the environment and converting all of the information into a lingua franca and assigning it to the correct directory and the appropriate forward and rearward chained updates to the system, the assignment of unique ID, and different distinct transactional element Legs (A, B, T, X, Y, W) and Transactional Owner;

c) wherein partial leg A is responsible for gathering all of the information originating from the assigned participating retailers, wholesalers, and suppliers and creating a summary report analysis and vector trajectory calculations so that the each node belonging to the simulation network can at least one of match and merge partial vector call data record (CDR) information using the X_FOB calculations;
d) wherein partial leg B is responsible for gathering all of the information of each end user purchase order and creates a summary report analysis and vector trajectory calculations so that the each node belonging to the simulation network can at least one of match and merge partial vector CDR information using the Y_CDIF calculations;
e) summit grid node creates geographical scoped calculation using time dimensions, transportation cost, and risk to at least one of match and merge the partial differential vector CDR leg A and leg B equations of a plurality of quotes and orders into complex structures and also permits that each end user request be unique wherein upon normalizing the X_FOB and Y_CDIF data the system can use available inventory, shipping and handling to find a Z_PRICE for its end users, each assigned participating retailer, wholesaler and supplier rearward chaining latest available inventories and pricing of merchandise;

the simulation network directly interfacing with financial institutions and using artificial intelligence in order to make purchasing and financial resource management decisions to optimally maintain and replenish available inventory to end users at the lowest possible price per unit (P/U) and with minimal delay of delivery;

each cluster of said simulation network using artificial intelligence in order to make purchasing and financial resource management decisions to optimally maintain and replenish available inventory to end users at the lowest possible P/U and with minimal delay of delivery;

the simulation network having software that calculates the risk and delays associated with the transportation of goods and services from origination to destination points when giving at least one of a quote and invoice order to a customer;

the simulation network allowing subordinate clusters to cooperate and are configured to instantaneously generate, plot and update a lowest price and optimal shipping cost trajectory between two geographic locations for each user request, immediately upon scanning an initial user network message, and storing it in the 'price' summary reports;

the simulation network minimizes bandwidth usage by performing scheduled and synchronized supplier and wholesale inventory availability calculations and updates throughout the network, accurately projecting future resource requirement trends in order to update end user software to avoid system congestion;

the summit-tier and middleware-tier clusters updating all of the system components by rearward chaining summarized information to its chain of command;

the single unit is configured to have multiple links meeting at a junction point describing the organization hierarchy of the network, the links in communications with each other as lower-tier and higher-tier nodes; and the single unit collectively acting as a server and correlating billing entities, data manipulation (DM), error and fraud handling, message and packet monitoring, network traffic system statistical analysis, system failure analysis, and transactions at each junction point;

wherein the junction point device having the capacity to process information to and from the unit and the virtual environment from a network of client subscriber terminals and clustered together by the world wide Internet and the network hyperlinks.

2. The computerized system as recited in claim 1, wherein each cluster for each relevant and particular transaction concurrently plot the optimal shipping trajectory provides the lowest billing rate available, wherein the purchase order contains pricing data enabling billing to commence the moment the financial resources are made available and is initiated and continued in real time as the transaction progresses.

3. The computerized system as recited in claim 1, wherein each cluster allows each node to convert each message interacting with the system into a lingua franca, with vector trajectory information and ownership, to provide the flexibility to operate in conjunction with antiquated financial institution and supplier technologies.

4. The computerized system as recited in claim 1, wherein the simulation network searches for the best FOB prices from one of the supplier system distribution warehouses in such a manner that a customer can request out-of-stock merchandise to be made available quicker than traditional land transportation by paying air express.

5. The computerized system as recited in claim 1, wherein the system searches for the best cargo and freight (C&F) directly from a supplier to the destination country upon giving at least one of a quote and invoice to a customer, the system calculating against the distribution of said merchandise from available inventory in-hand for any supplier system warehouses consolidated at the destination supplier system continental-regional warehouse.

6. The computerized system as recited in claim 5, wherein the system calculates the best price and delivery from origin and destination taking into account at least one of:
ocean and land transportation as the method of choice, and
express air transportation as the method of choice.

7. The computerized system as recited in claim 5, wherein the system allows each node to have the best price, quantity, and availability of all the participating warehouses, suppliers, wholesalers, and retailers by incorporating an intelligent inventory delivery algorithm.

8. The computerized system as recited in claim 5, wherein the system allows suppliers to ship their merchandise from point A to point B via ocean, wherein the system will sell the entire lot of merchandise before the merchandise reaches its destination affording the consumer significant lower shipping cost and time delays.

9. The computerized system as recited in claim 5, wherein the system facilitates a partial satisfaction of a whole purchase order by customers and multiple suppliers collectively.

10. The computerized system as recited in claim 1, wherein the system searches for the best cargo duties insurance freight (CDIF) directly from a determined supplier to the destination country upon giving at least one of a quote and invoice to a customer, the system calculating against the distribution of said merchandise from available inventory in-hand for any supplier system warehouses consolidated at a destination supplier system continental-regional warehouse.

11. The computerized system as recited in claim 10, wherein the system calculates the best price and delivery from origin and destination taking into account at least one of:
ocean and land transportation as the method of choice, and
express air transportation as the method of choice.

12. The computerized system as recited in claim 10, wherein the system allows each node to have the best price, quantity, and availability of all the participating warehouses, suppliers, wholesalers, and retailers by incorporating an intelligent inventory delivery algorithm.

13. The computerized system as recited in claim 10, wherein the system allows suppliers to ship their merchandise from point A to point B via ocean, wherein the system will sell the entire lot of merchandise before the merchandise reaches its destination affording the consumer significant lower shipping cost and time delays.

14. The computerized system as recited in claim 10, wherein the system facilitates a partial satisfaction of a whole purchase order by customers and multiple suppliers collectively.

15. The computerized system as recited in claim 10, wherein the system searches for the best cargo weight-duties insurance freight (CWIF) directly from a supplier to the destination country when giving at least one of a quote and invoice to a customer, the system calculating against the distribution of said merchandise from available inventory in-hand for any supplier system warehouse consolidated at the destination continental-regional warehouse.

16. The computerized system as recited in claim 12, wherein the system calculates the best price and delivery from origin and destination taking into account at least one of:
- ocean and land transportation as the method of choice, and
- express air transportation as the method of choice.

17. The computerized system as recited in claim 12, wherein the system allows each node to have the best price, quantity, and availability of all the participating warehouses, suppliers, wholesalers, and retailers by incorporating an intelligent inventory delivery algorithm.

18. The computerized system as recited in claim 12, wherein the system allows suppliers to ship their merchandise from point A to point B via ocean, wherein the system will sell the entire lot of merchandise before the merchandise reaches its destination affording the consumer significant lower shipping cost and time delays.

19. The computerized system as recited in claim 12, wherein the system facilitates a partial satisfaction of a whole purchase order by customers and multiple suppliers collectively.

20. The computerized system as recited in claim 1, wherein the system allows an end user to place rush priority to at least one of a quote and invoice order that adjusts the calculations by using Y_CDIF time-cost constraints to derive an optimal solution, which searches the best time of delivery, next flight express with door-to-door service, and possesses the lowest cost, risk and delays from origination to destination preferring to assign merchandise that is physical owned as inventory in-hand located in one of the supplier system's warehouse.

* * * * *